(12) United States Patent
Okuhara

(10) Patent No.: US 12,170,833 B2
(45) Date of Patent: Dec. 17, 2024

(54) DISPLAY DEVICE AND METHOD FOR CONTROLLING DISPLAY DEVICE

(71) Applicant: CANON KABUSHIKI KAISHA, Tokyo (JP)

(72) Inventor: Ryusuke Okuhara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 18/188,230

(22) Filed: Mar. 22, 2023

(65) Prior Publication Data

US 2023/0308613 A1    Sep. 28, 2023

(30) Foreign Application Priority Data

Mar. 24, 2022   (JP) ................. 2022-049063

(51) Int. Cl.
| | |
|---|---|
| *H04N 23/611* | (2023.01) |
| *G06F 3/04845* | (2022.01) |
| *G06T 5/80* | (2024.01) |
| *H04N 5/262* | (2006.01) |
| *H04N 5/77* | (2006.01) |
| *H04N 23/667* | (2023.01) |

(52) U.S. Cl.
CPC ....... *H04N 23/611* (2023.01); *G06F 3/04845* (2013.01); *G06T 5/80* (2024.01); *H04N 5/2628* (2013.01); *G06T 2200/24* (2013.01); *G06T 2207/10016* (2013.01); *G06T 2207/20192* (2013.01); *G06T 2207/30201* (2013.01); *H04N 5/77* (2013.01); *H04N 23/667* (2023.01)

(58) Field of Classification Search
None
See application file for complete search history.

(56) References Cited

U.S. PATENT DOCUMENTS

2016/0080650 A1* 3/2016 Okazawa ........... H04N 21/4325
348/36

FOREIGN PATENT DOCUMENTS

| | | |
|---|---|---|
| JP | 2007074033 A | 3/2007 |
| JP | 2017060078 A | 3/2017 |
| JP | 2017212550 A | 11/2017 |

* cited by examiner

*Primary Examiner* — Mark T Monk
(74) *Attorney, Agent, or Firm* — Canon U.S.A., Inc. IP Division

(57) ABSTRACT

A display device includes an acquisition unit configured to acquire moving image data acquired by adding information of a cutout area of a moving image set on the basis of a face direction of a user capturing the moving image to the moving image; a display control unit configured to display a frame representing the cutout area when the moving image data is reproduced; an acceptance unit configured to accept an operation for the frame for correcting the cutout area; a correction unit configured to add correction information of the cutout area corrected by the operation to the moving image data; and a generation unit configured to generate a cutout moving image from the moving image on the basis of the information of the cutout area and the correction information.

18 Claims, 91 Drawing Sheets

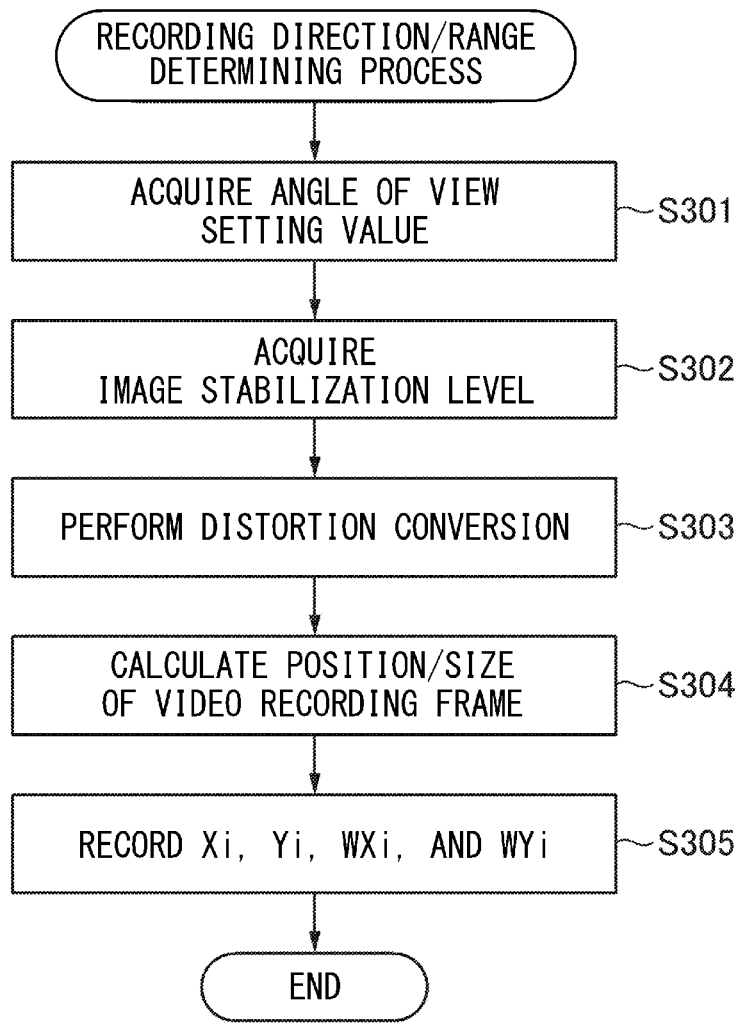

CHART 1　　CHART 2

CHART 1　　CHART 2

FIG. 8K
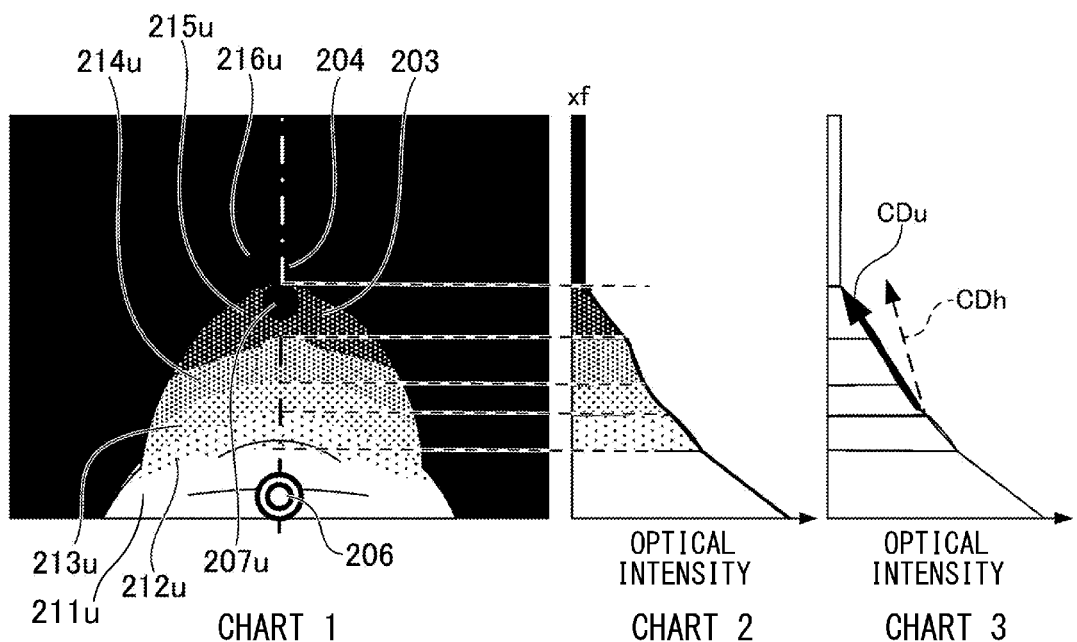
CHART 1  CHART 2  CHART 3
FIG. 9A  V SIGNAL
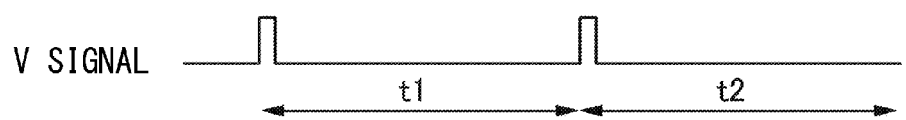
FIG. 9B  H POSITION OF IMAGE SIGNAL
FIG. 9C  IR-ON
FIG. 9D  CAPTURED IMAGE DATA
FIG. 9E

DEVELOPING AREA

IMAGE ON IMAGING ELEMENT

SUBJECT

AFTER IMAGE STABILIZATION PROCESS

AFTER DISTORTION CORRECTION PROCESS

CUTTING OUT DEVELOPING

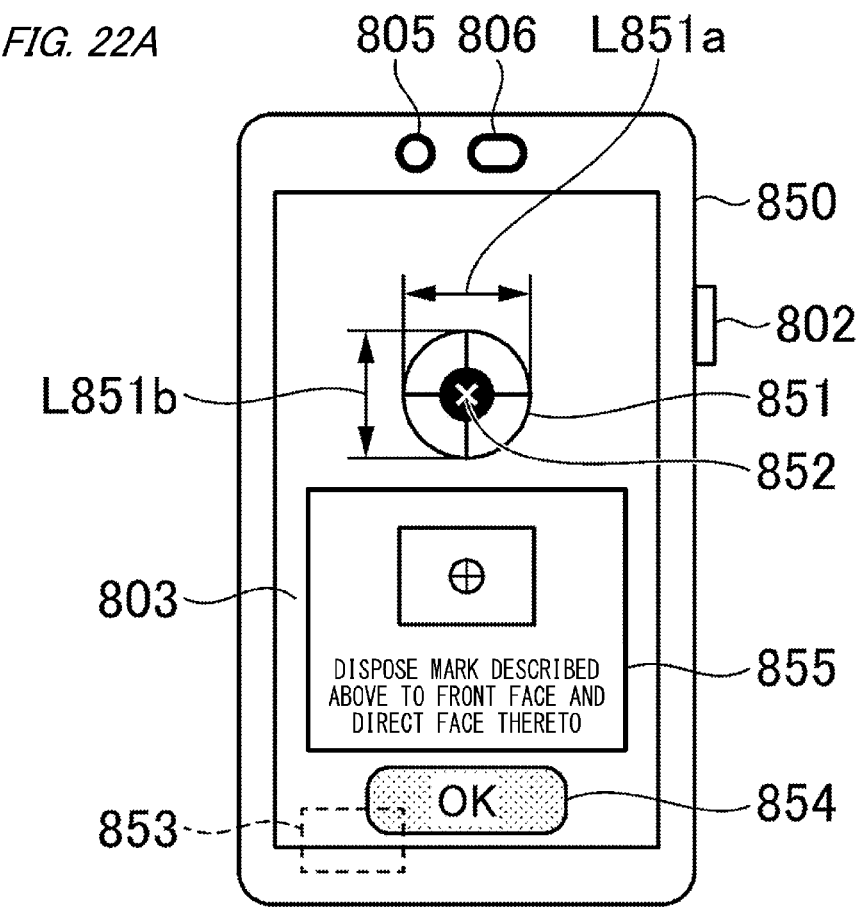
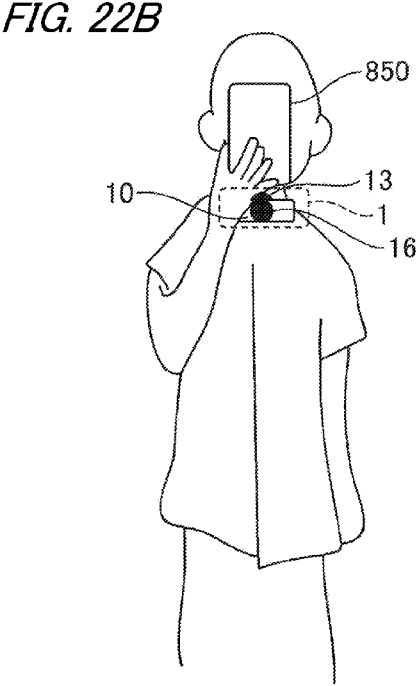

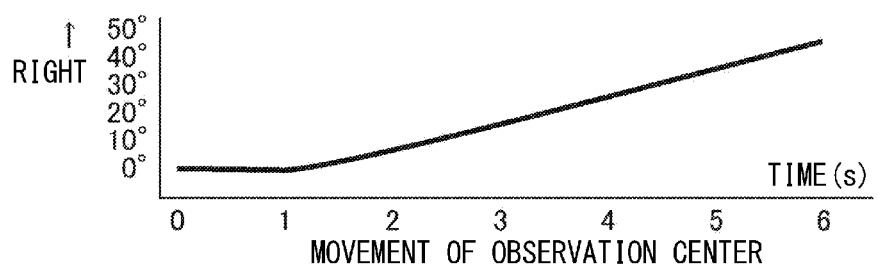
FIG. 27A MOVEMENT OF OBSERVATION CENTER
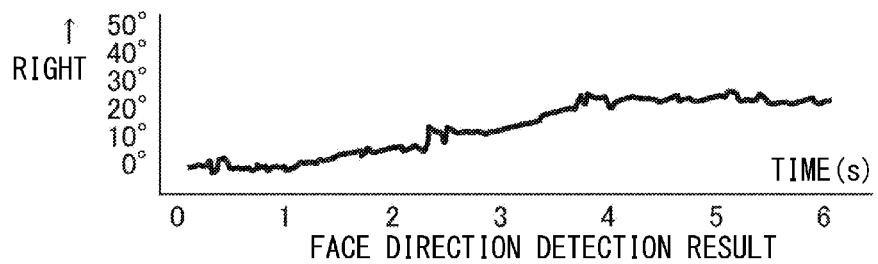
FIG. 27B FACE DIRECTION DETECTION RESULT
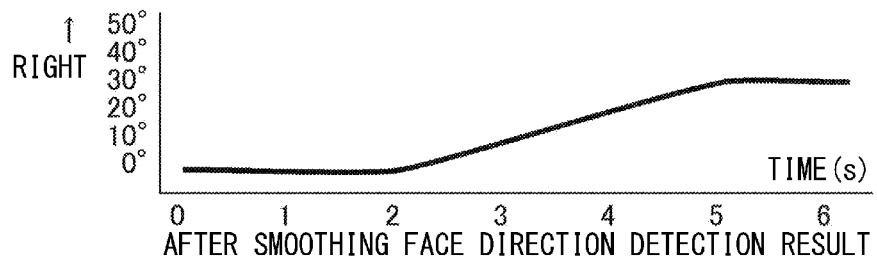
FIG. 27C AFTER SMOOTHING FACE DIRECTION DETECTION RESULT
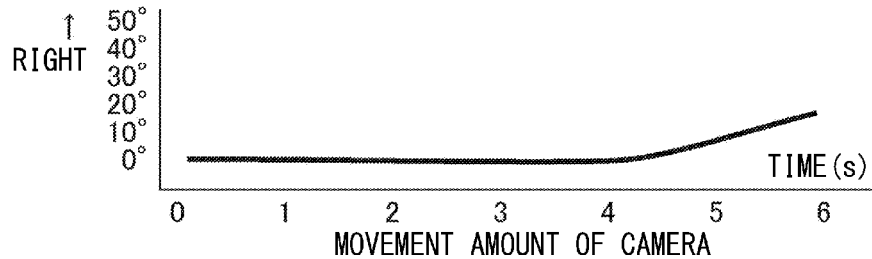
FIG. 27D MOVEMENT AMOUNT OF CAMERA
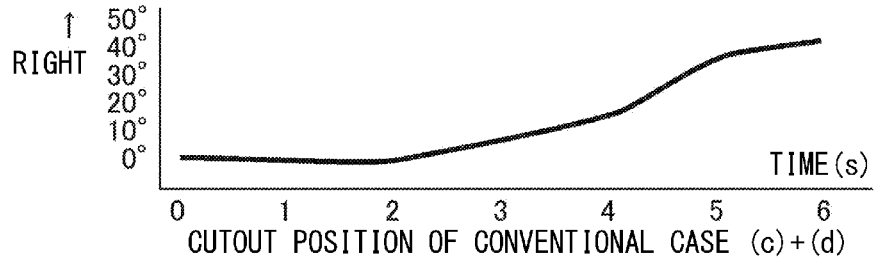
FIG. 27E CUTOUT POSITION OF CONVENTIONAL CASE (c)+(d)
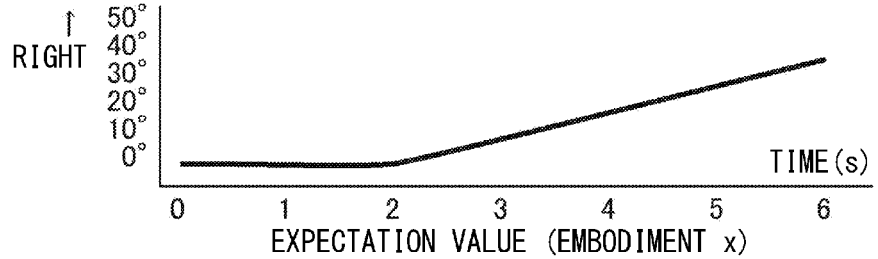
FIG. 27F EXPECTATION VALUE (EMBODIMENT x)

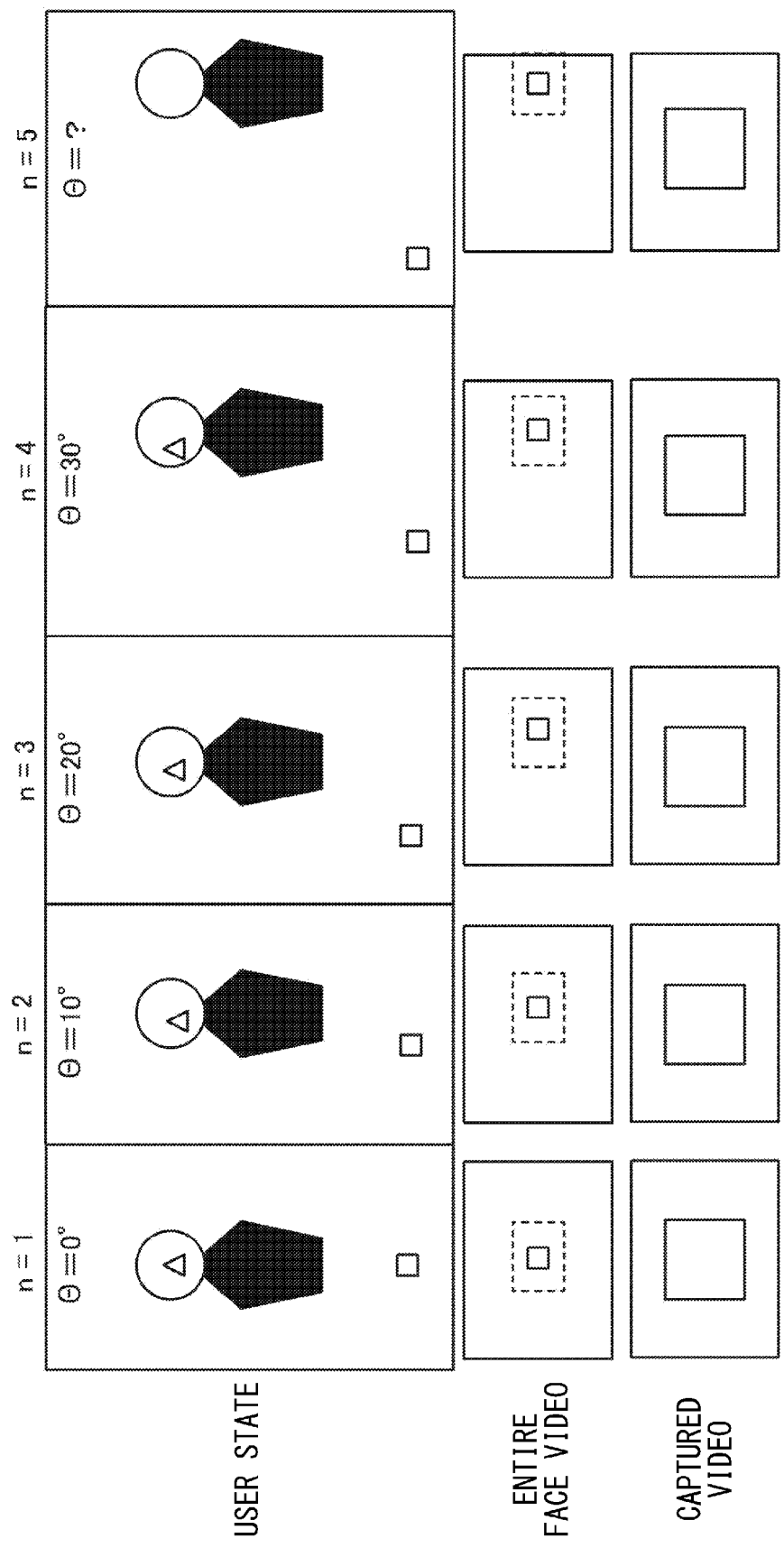

FRONT FACE DIRECTION  RIGHT 45 DEGREES  RIGHT 90 DEGREES

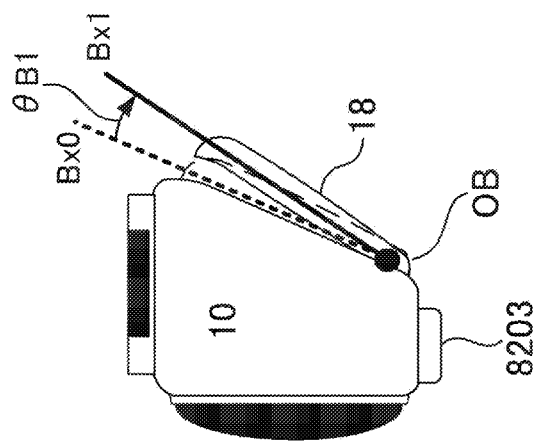
FIG. 43C
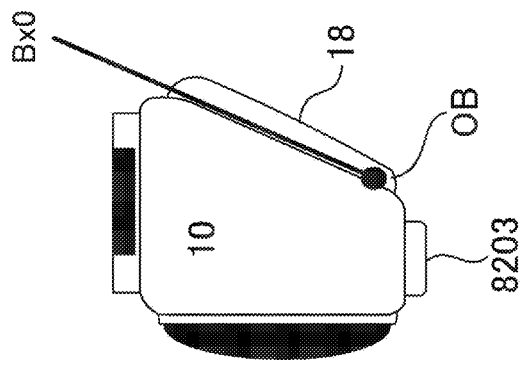
FIG. 43B
FIG. 43A

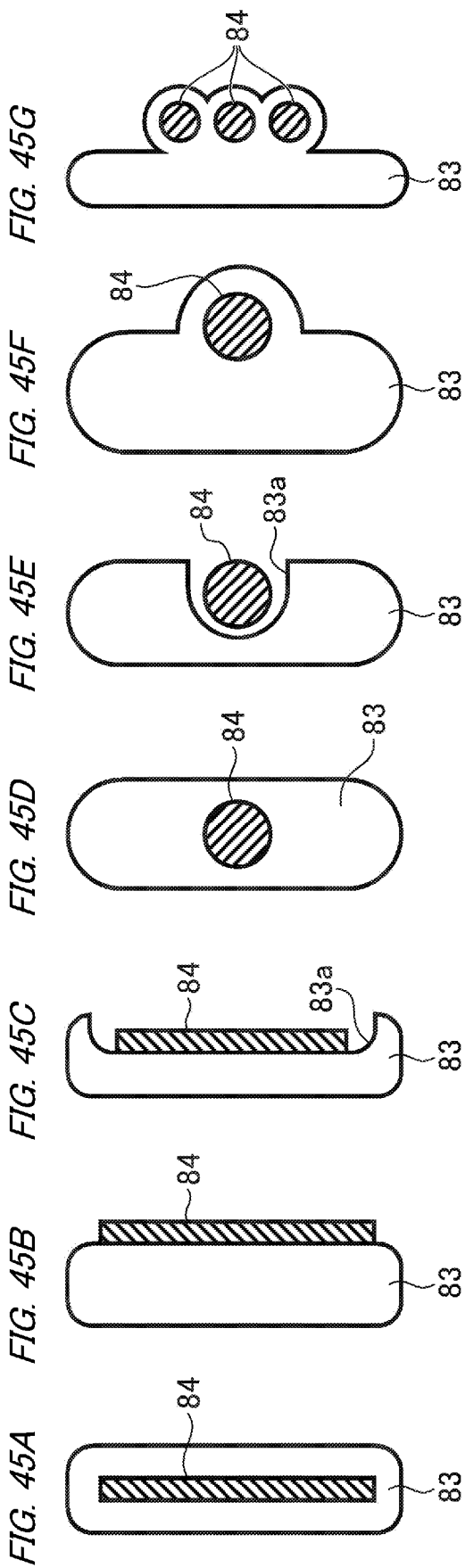

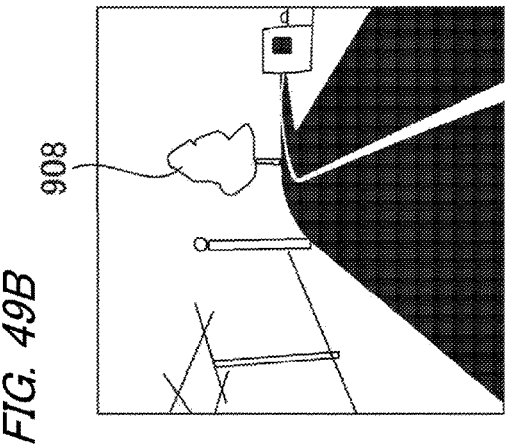
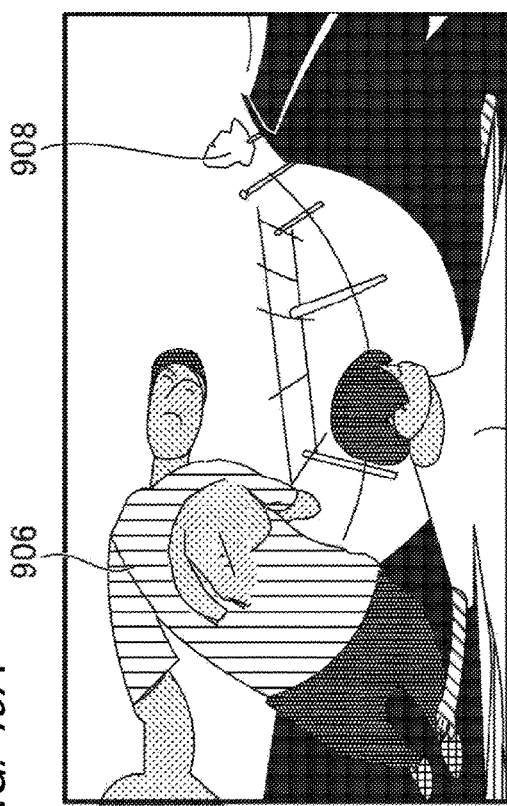
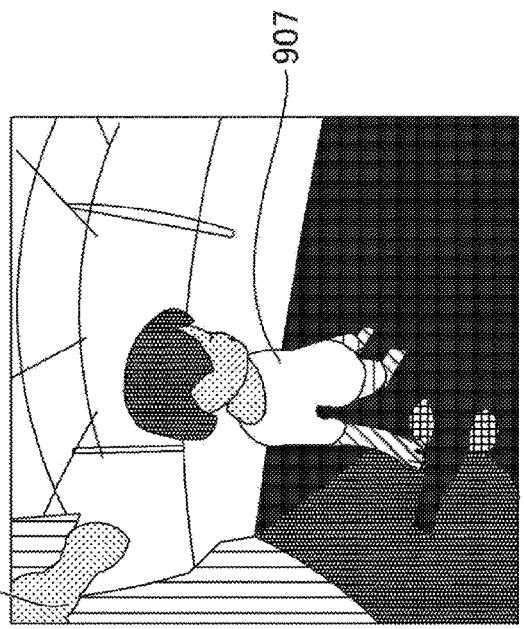
FIG. 49A
FIG. 49B
FIG. 49C

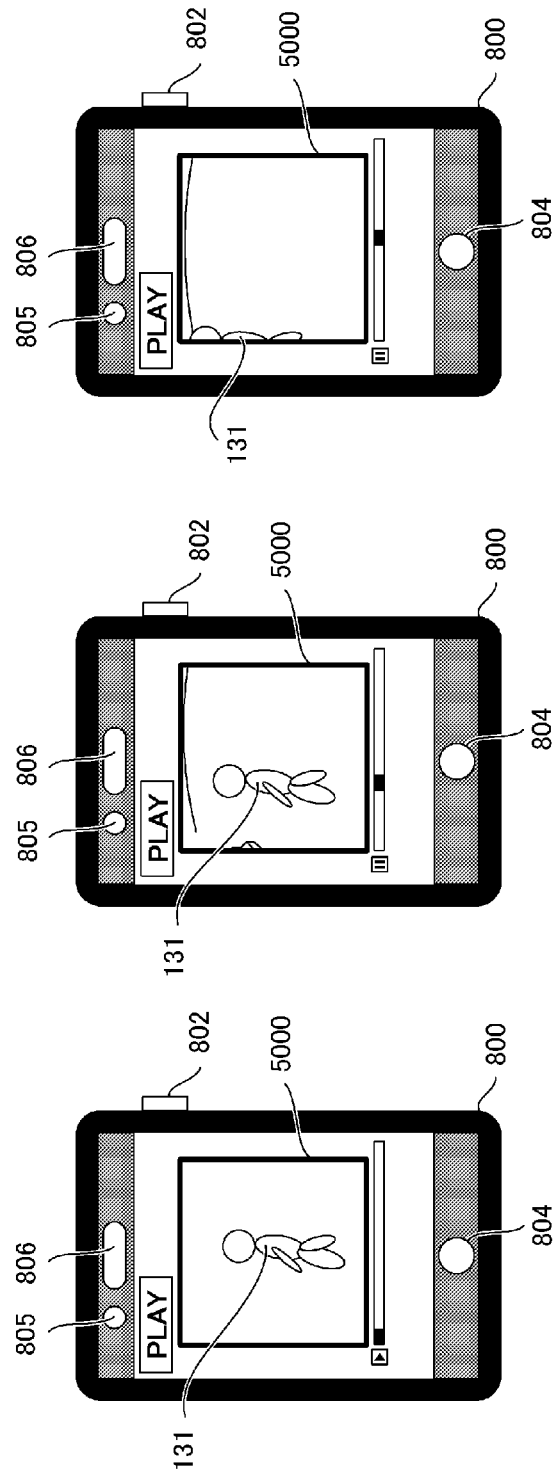

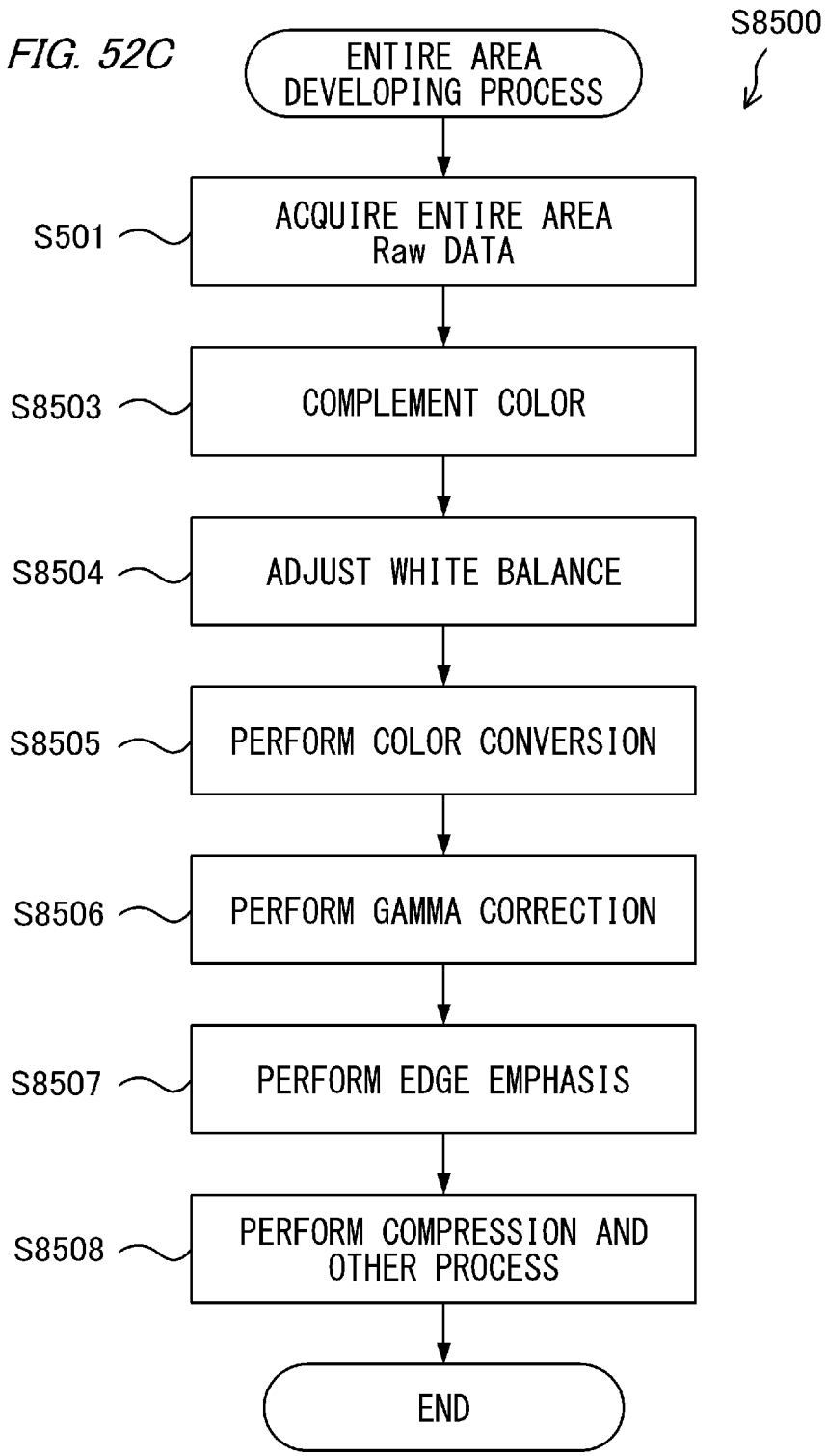

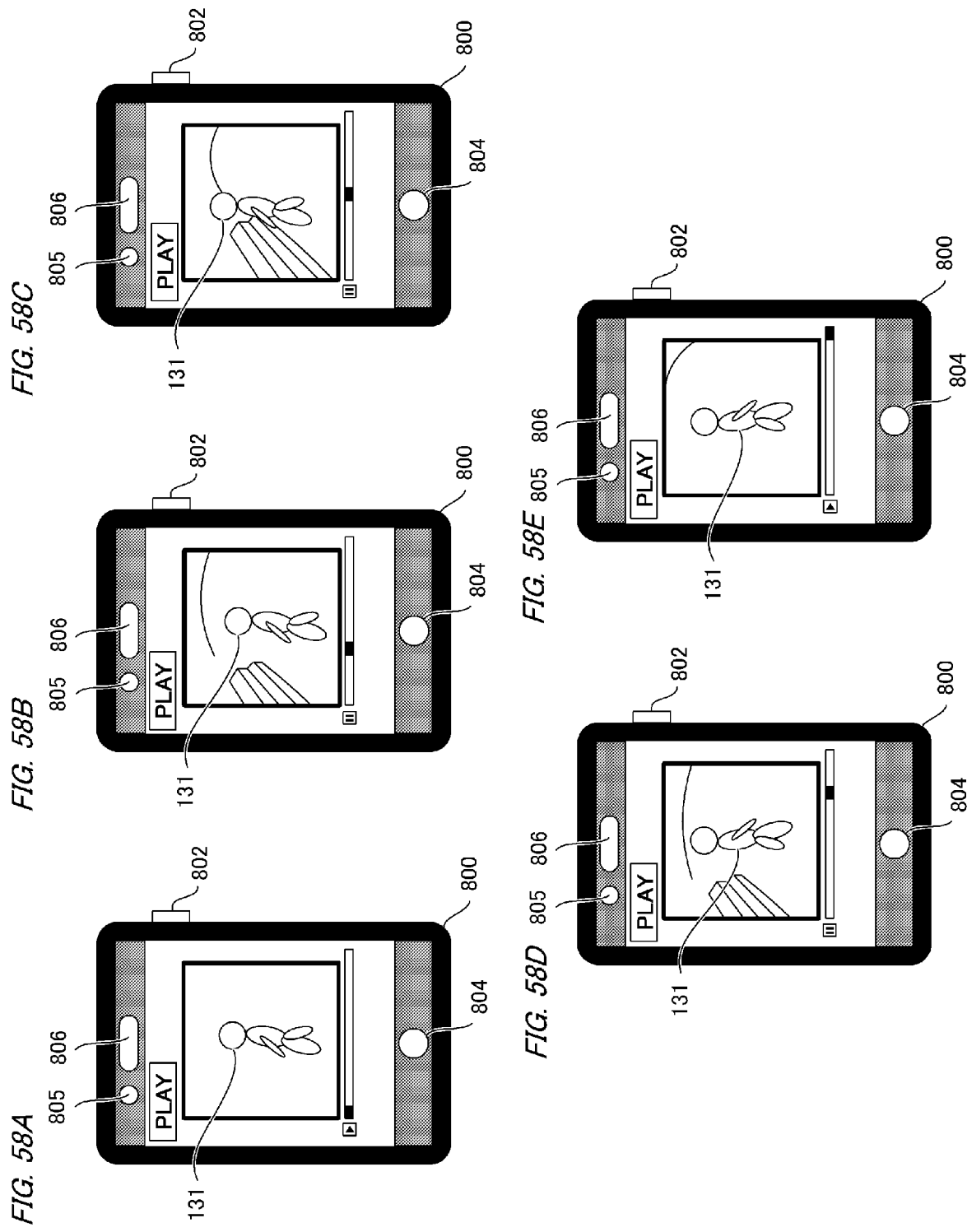

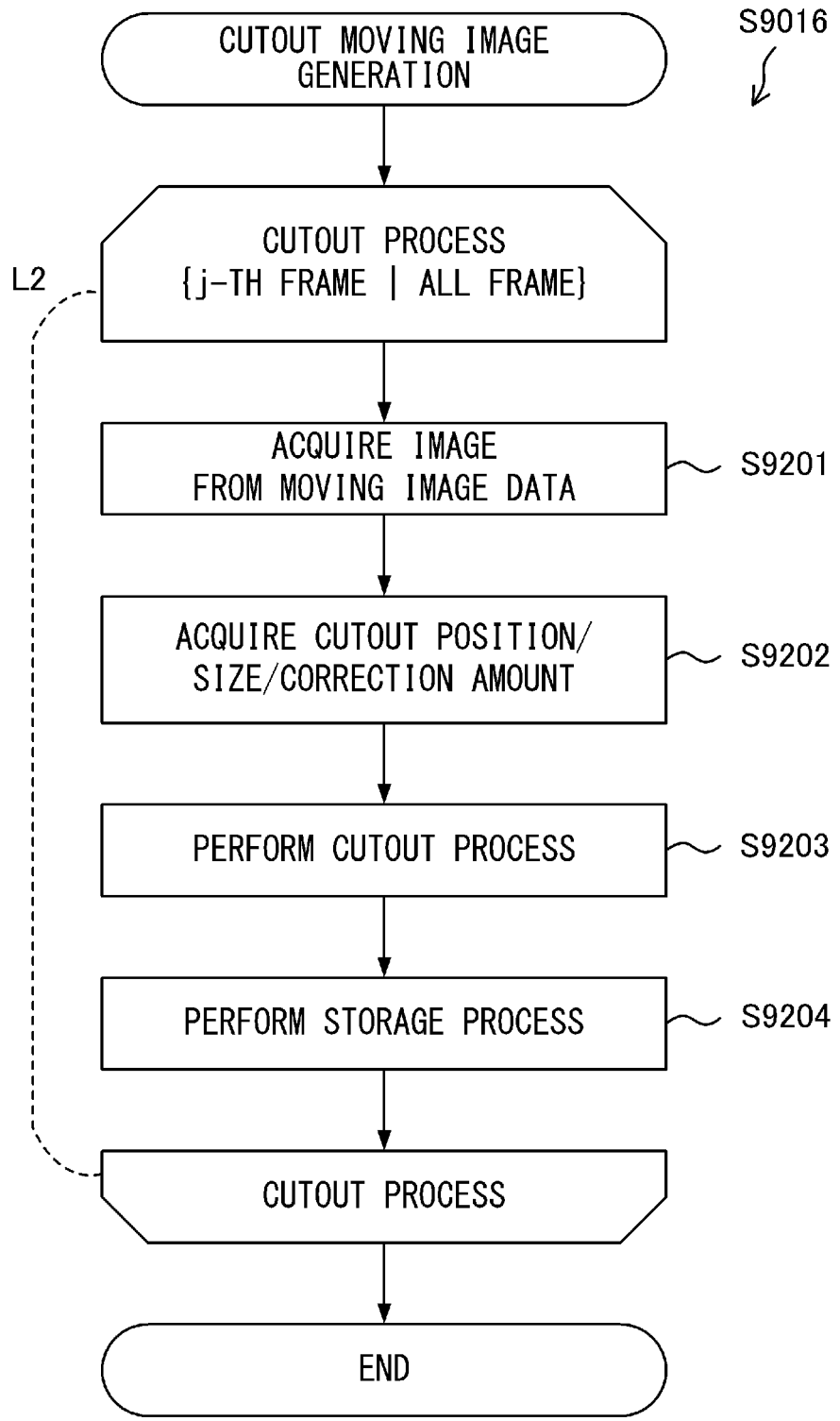

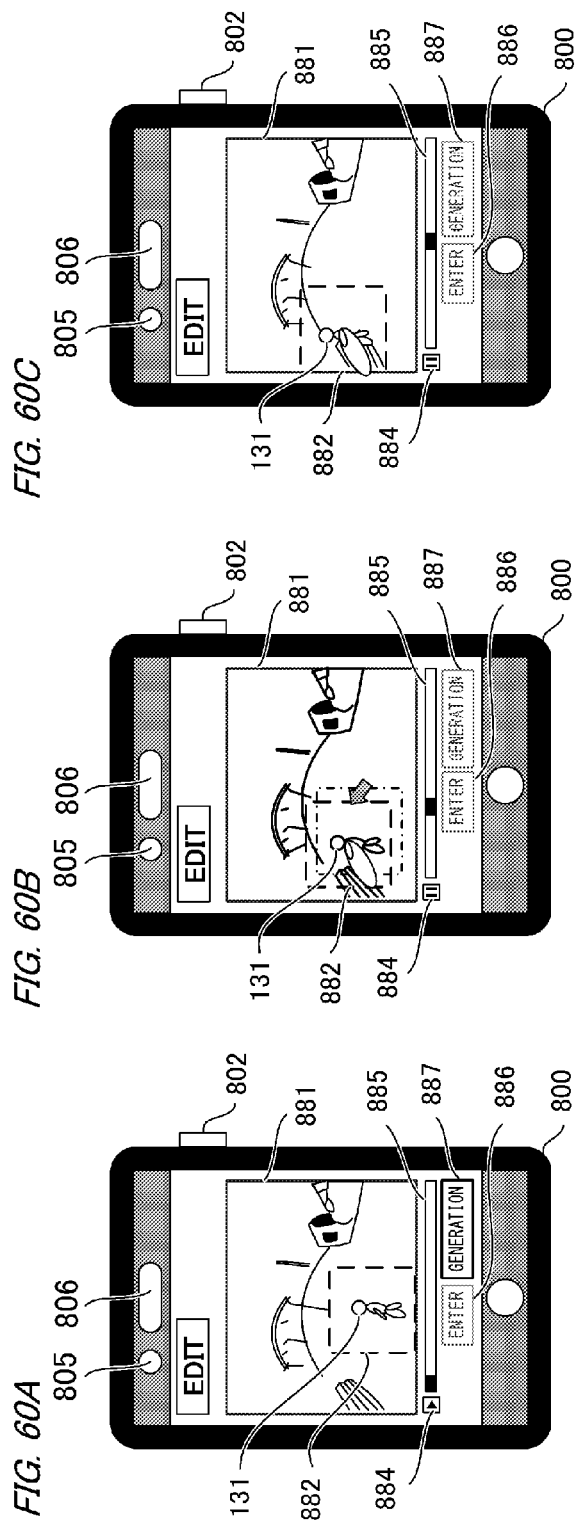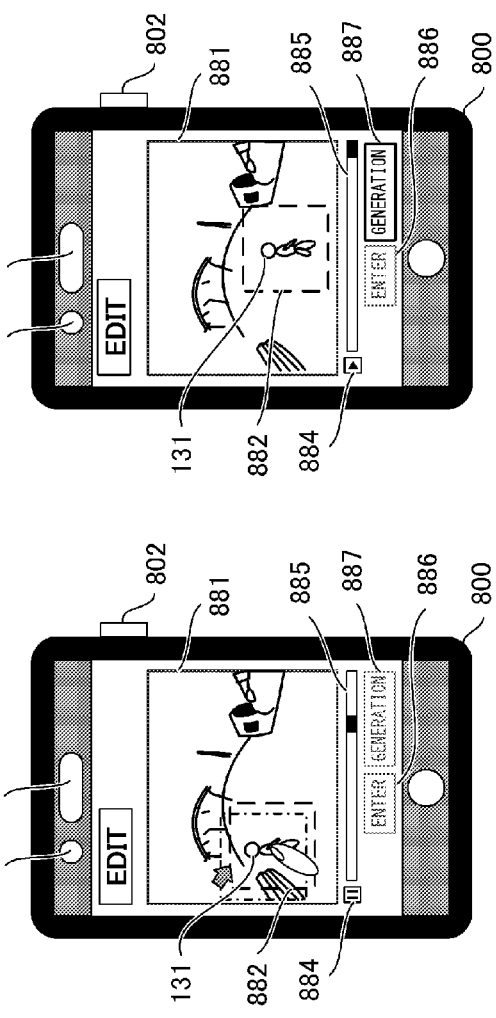

DISPLAY DEVICE AND METHOD FOR CONTROLLING DISPLAY DEVICE

BACKGROUND OF THE DISCLOSURE

Field of the Disclosure

The present disclosure relates to a display device and a method for controlling a display device.

Description of the Related Art

Conventionally, in imaging using a camera, a camera operator needs to continuously direct the camera in an imaging direction, thus his or her hands are occupied by an imaging operation, the hands cannot be used for handling an operation other than an imaging operation, and the camera operator has his or her attention focused on imaging and thus cannot focus his or her attention on an experience in a place.

For example, in a case in which an imaging operation is considered, there are circumstances in that a parent who is a camera operator cannot play with a child while imaging the child, and, when a parent tries to play with a child, he or she cannot perform imaging.

In addition, in a case in which attention being focused on imaging is considered, there are circumstances in that a camera operator cannot cheer or does not memorize details of a game, or imaging cannot be performed when a camera operator has his or her attention focused on sports watching. Similarly, there are circumstances in that, when photographing is performed during a group tour, a camera operator cannot experience an impression at the same level as that of the other members, and, when an experience is prioritized, imaging is neglected.

As a method for dealing with such circumstances, there is a method in which, by fixing an action camera to a head part using a head-part fixing accessory and performing imaging in an observation direction, a camera operator performs imaging without his or her hands taken for an imaging operation. In addition, there is also a method in which, by imaging a wide range using an entire celestial sphere-type imaging camera, an experience is focused on during the experience, a required video part is cut out from a captured entire celestial sphere video and is edited after the experience, and a video of the experience is allowed to remain.

However, in the former method, an annoying action of mounting a head-part fixing accessory to which a main body of an action camera 901 is fixed as illustrated in FIG. 47A on the head is necessary. In addition, as illustrated in FIG. 47B, when a camera operator mounts the action camera 901 on the head part using the head-part fixing accessory 902, the appearance is degraded, and there is a circumstance in that the shape of the hair of the camera operator is disturbed, and the like. Furthermore, for the head-part fixing accessory 902 and the action camera 901 mounted in the head, the camera operator will have concerns about presence of the weight and the like thereof or concerns about a degraded appearance for a third party. For this reason, there are issues in that it is difficult to perform imaging due to the camera operator being unable to focus on an experience in a state illustrated in FIG. 47B, the camera operator feeling resistance against being in the state illustrated in FIG. 47B, and the like.

On the other hand, in the latter method, a series of operations such as image conversion, cut position designation, and the like are necessary. For example, an entire celestial sphere-type imaging camera 903 including a lens 904 and an imaging button 905 as illustrated in FIG. 48 is known. The lens 904 is one of one pair of fish-eye lenses for imaging a half-celestial sphere that are configured on both faces of a casing of the entire celestial sphere-type imaging camera 903, and the entire celestial sphere-type imaging camera 903 performs entire celestial sphere imaging using this one pair of fish-eye lenses. In other words, by composing projection images of this one pair of fish-eye lenses, entire celestial sphere imaging is performed.

FIGS. 49A to 49C are diagrams illustrating an example of a conversion operation of a video captured by the entire celestial sphere-type imaging camera 903.

FIG. 49A is an example of a video acquired by entire celestial sphere imaging using the entire celestial sphere-type imaging camera 903, and a camera operator 906, a child 907, and a tree 908 that are subjects are included. This video is a video of a semi celestial sphere optical system acquired by composing a projection image of one pair of fish-eye lens, and thus the camera operator 906 is much distorted. In addition, the child 907 that is a subject to be imaged by the camera operator 906 has a body part that is much horizontally distorted to be enlarged due to the body part being present in the vicinity of the semi-celestial sphere optical system. On the other hand, the tree 908 is a subject positioned in front of the lens 904 and thus is imaged without a large distortion.

In order to create a video of a visual field seen by an ordinary person from the video illustrated in FIG. 49A, it is necessary to cut out a part thereof, perform a plane conversion thereof, and display a resultant video.

FIG. 49B is a video acquired by cutting out a video positioned in front of the lens 904 from the video illustrated in FIG. 49A. In the video illustrated in FIG. 49B, in a visual field seen by an ordinary person, the tree 908 is shown at the center. However, the child 907 to be imaged by the camera operator 906 is not included in FIG. 49B, and thus a cutout position needs to be changed.

Here, more specifically, the cutout position needs to be changed in a leftward direction and a 30° downward direction of the tree 908 viewed in the drawing in FIG. 49A. A video that is displayed through plane conversion after this cutout operation is FIG. 49C. In this way, in order to acquire the video, which is illustrated in FIG. 49C, intended to be captured by a camera operator from the video illustrated in FIG. 49A, it is necessary to perform an operation of cutting out a necessary portion and performing plane conversion. For this reason, while the camera operator can focus on an experience during the experience (during imaging), there is a circumstance in that an amount of operation performed thereafter becomes huge.

In Japanese Patent Application Publication No. 2017-212550, as a technology for correcting a cutout position of an image, a user changing a deviation correction intensity at the time of reproducing an image and determining a cutout size, a cutout position, and the like of an image on the basis of the deviation correction intensity has been disclosed.

Although a cutout area can be indirectly corrected by changing the deviation correction intensity, it is difficult for a user to correct the cutout area to an intended position unless the cutout area is directly changed.

SUMMARY OF THE DISCLOSURE

An object of the present disclosure is to provide a technology for generating a cutout moving image cut out at a predetermined position using a simple and easy operation.

A display device of the present disclosure includes an acquisition unit configured to acquire moving image data acquired by adding information of a cutout area of a moving image set on the basis of a face direction of a user capturing the moving image to the moving image; a display control unit configured to display a frame representing the cutout area when the moving image data is reproduced; an acceptance unit configured to accept an operation for the frame for correcting the cutout area; a correction unit configured to add correction information of the cutout area corrected by the operation to the moving image data; and a generation unit configured to generate a cutout moving image from the moving image on the basis of the information of the cutout area and the correction information.

Further features of the present disclosure will become apparent from the following description of exemplary embodiments with reference to the attached drawings.

BRIEF DESCRIPTION OF THE DRAWINGS

FIG. 7D is a flowchart of a subroutine of a recording direction/range determining process of Step S300, which is illustrated in FIG. 7A, according to Embodiment 1.

FIG. 8K is a diagram in which signs of a double circle and a black circle respectively representing a neck position and a jaw tip position are superimposed on a differential video calculated using a method similar to that of FIG. 8E when the user has his or her face directed to a side upper than the horizontal side by 33°.

FIGS. 9A to 9E are timing diagrams illustrating turn-on timings of an infrared LED.

FIG. 22A is a diagram illustrating a screen displayed in a display unit of the calibrator in Step S3103 illustrated in FIG. 21 when a calibration operation for a front-face direction of a user is performed.

FIG. 22B is a perspective view illustrating an appearance in which a user holds the calibrator up to a front side in accordance with an instruction represented in an instruction display illustrated in FIG. 22A.

FIGS. 27A to 27F are conceptual diagrams of a cutout range correcting process according to Embodiment 4.

FIG. 36A is a diagram illustrating a relation between an observation direction detection state of a user and a captured video for each frame according to Embodiment 6.

FIGS. 43A to 43C are enlarged views representing appearances of the imaging/detecting unit seen from a side face in a case in which a connection unit is set as non-display.

FIGS. 45A to 45G are diagrams illustrating a band part and a connection face that is a cutout face of an electric cable configured integrally with this.

FIGS. 49A to 49C are diagrams illustrating an example of a conversion operation for a video captured by the entire celestial sphere-type imaging camera illustrated in FIG. 48.

FIGS. 50A to 50E are diagrams illustrating parts of a cutout moving image.

FIG. 52C is a flowchart of an entire area developing process.

FIGS. 58A to 58E are diagrams illustrating cutout moving images generated by a display device.

FIG. 59C is a flowchart of a cutout moving image generating process.

FIGS. 60A to 60E are diagrams illustrating corrections of a cutout area that is during reproduction.

DESCRIPTION OF THE EMBODIMENTS

Hereinafter, preferred embodiments of the present disclosure will be described in detail with reference to the attached drawings.

Embodiment 1

FIGS. 1A to 1D are diagrams illustrating a camera system formed from a camera main body 1 including an imaging/detecting unit 10 as an imaging apparatus according to this embodiment and a display device 800 configured separately from this. In this embodiment, although an example in which the camera main body 1 and the display device 800 are separately configured is illustrated, the camera main body 1 and the display device 800 may be integrally configured. In addition, hereinafter, a user wearing the camera main body 1 around the neck will be referred to as a user.

Figure 1A:
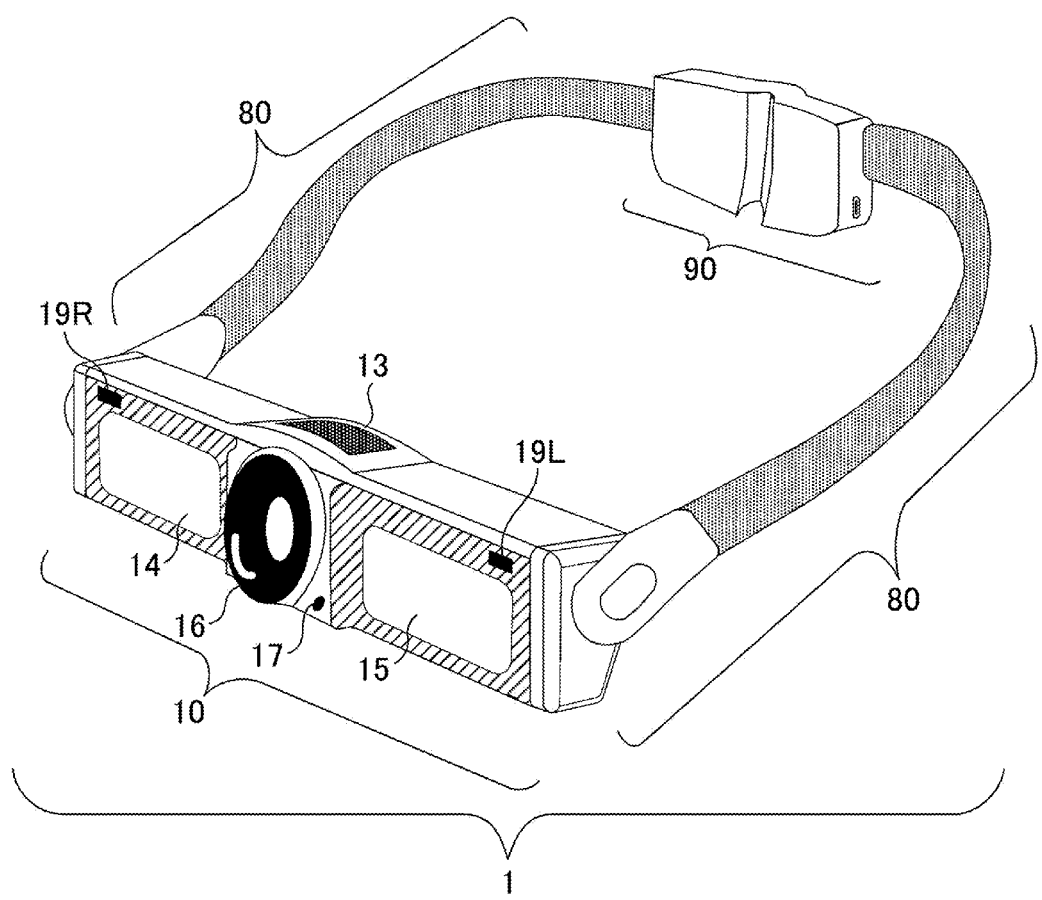
FIG. 1A is an external view of a camera main body including an imaging/detecting unit as an imaging apparatus according to Embodiment 1.

FIG. 1A is an external view of the camera main body 1.

Referring to FIG. 1A, the camera main body 1 includes an imaging/detecting unit 10, a battery unit 90, and a connection unit 80 connecting the imaging/detecting unit 10 and the battery unit 90 (a power supply unit).

The imaging/detecting unit 10 includes a face direction detecting window 13, a start switch 14, a stop switch 15, an imaging lens 16, an LED 17, and microphones 19L and 19R.

The face direction detecting window 13 causes infrared rays transmitted from an infrared LED lighting circuit 21 (an infrared ray emitting unit in FIG. 5) used for detecting positions of parts of a face of a user, which is built into the imaging/detecting unit 10, and a reflected light beam thereof to be transmitted.

The start switch 14 is a switch for starting imaging.

The stop switch 15 is a switch for stopping imaging.

The imaging lens 16 guides a light beam for imaging to a solid-state imaging element 42 (FIG. 5) inside the imaging/detecting unit 10.

The LED 17 is an LED that indicates being under imaging or a warning.

The microphones 19R and 19L are microphones taking in surrounding sounds, the microphone 19L receiving a sound of left-side surroundings (a right side toward FIG. 1A) of a user, and the microphone 19R takes in a sound of a surrounding right side (a left side toward FIG. 1A) of a user.

Figure 1B:
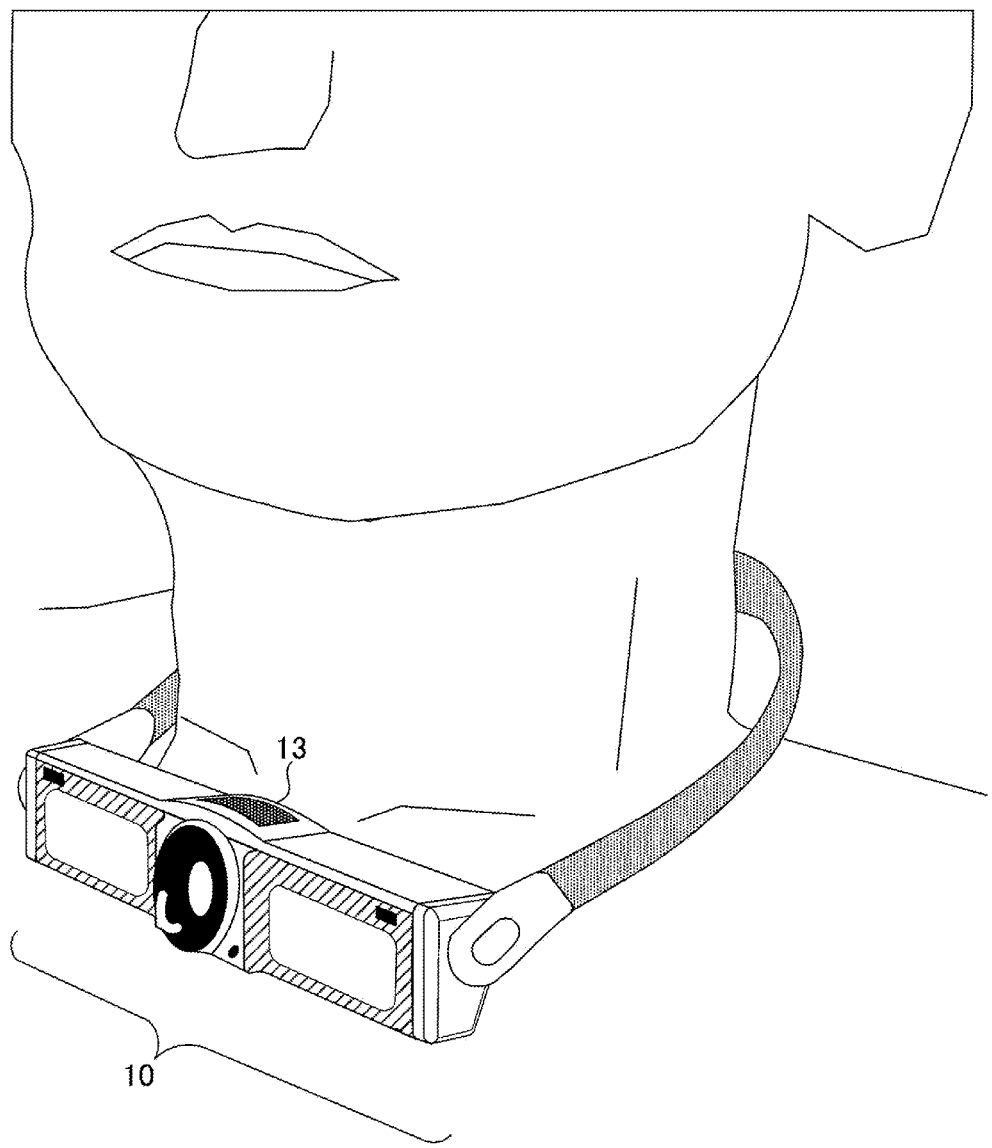
FIG. 1B is a diagram illustrating an appearance of a user wearing the camera main body.

FIG. 1B is a diagram illustrating an appearance of a user wearing the camera main body 1.

When the camera main body 1 is worn such that the battery unit 90 is on a back side of the user, and the imaging/detecting unit 10 is on a front side of the body of the user, it is biased and held in a chest direction by the connection unit 80 having both ends connected near left and right ends of the imaging/detecting unit 10. In accordance with this, the imaging/detecting unit 10 is positioned around the clavicle of the user. At this time, the face direction detecting window 13 is positioned below the jaw of the user. Inside the face direction detecting window 13, an infrared ray condensing lens 26 to be illustrated in FIG. 2E is present. An optical axis of the imaging lens 16 (an imaging optical axis) and an optical axis of the infrared ray condensing lens 26 (a detection optical axis) are directed in different directions, and an observation direction of a user is detected from the positions of the parts of the face by a face direction detecting unit 20 to be described below (a face direction detecting unit). In accordance with this, imaging for the observation direction using an imaging unit 40 (an imaging unit) to be described below can be performed.

A method of adjusting a setting position and the like according to individual differences in a body shape and a difference in clothing will be described below.

In addition, in this way, by disposing the imaging/detecting unit 10 on the front face of the body and disposing the battery unit 90 on the rear face, the weight is distributed, and there are effects of reducing fatigue of the user and inhibiting a deviation according to a centrifugal force and the like at the time of a user's movement.

Although this embodiment has illustrated an example in which the camera main body 1 is worn such that the imaging/detecting unit 10 is positioned around the clavicle of the user, the configuration is not limited thereto. In addition, as long as the camera main body 1 can detect an observation direction of a user using the face direction detecting unit 20, and imaging for the observation direction can be performed by the imaging unit 40, the camera main body 1 may be worn in any part of the body other than the head part of the user.

Figure 1C:
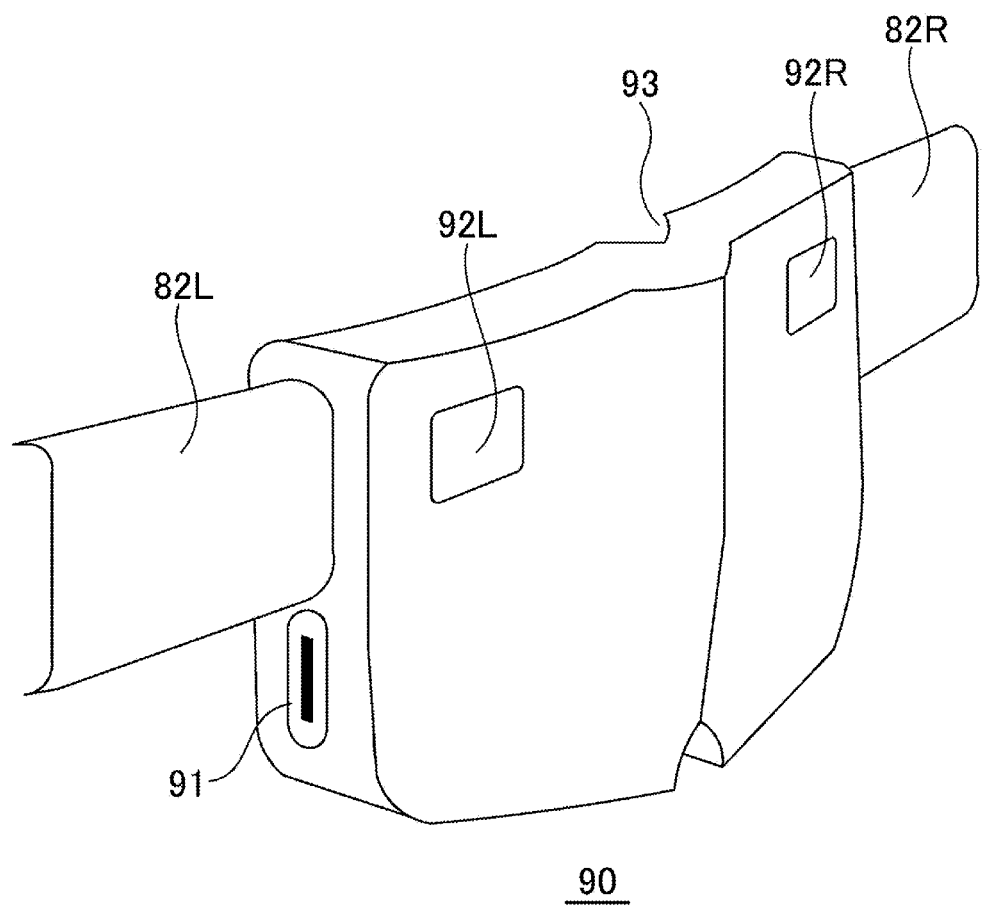
FIG. 1C is a diagram of a battery unit of the camera main body seen from a rear side of FIG. 1A.

FIG. 1C is a diagram of the battery unit 90 seen from a rear side of FIG. 1A.

Referring to FIG. 1C, the battery unit 90 includes a charging cable insertion port 91, adjustment buttons 92L and 92R, and a backbone avoiding notch 93.

The charging cable insertion port 91 is an insertion port of a charging cable not illustrated in the drawing and charges batteries 94 disposed inside from an external power supply through this charging cable or feeds electric power to the imaging/detecting unit 10.

The adjustment buttons 92L and 92R are buttons for adjustment of lengths of band parts 82L and 82R of the connection unit 80. The adjustment button 92L is a button for adjustment of the band part 82L facing the left side, and the adjustment button 92R is a button for adjustment of the band part 82R facing the right side. In this embodiment, although lengths of the band parts 82L and 82R are independently adjusted by the adjustment buttons 92L and 92R, the band parts 82L and 82R may be simultaneously adjusted by one button. Hereinafter, the band parts 82L and 82R will be collectively referred to as a band part 82.

The backbone avoiding notch 93 is a notch part for avoiding a backbone part such that the battery unit 90 does not come into contact with the backbone part of the user. By avoiding a convex part of the backbone of a human body, discomfort of wearing is reduced, and the main body is prevented from horizontally moving during use.

Figure 1D:
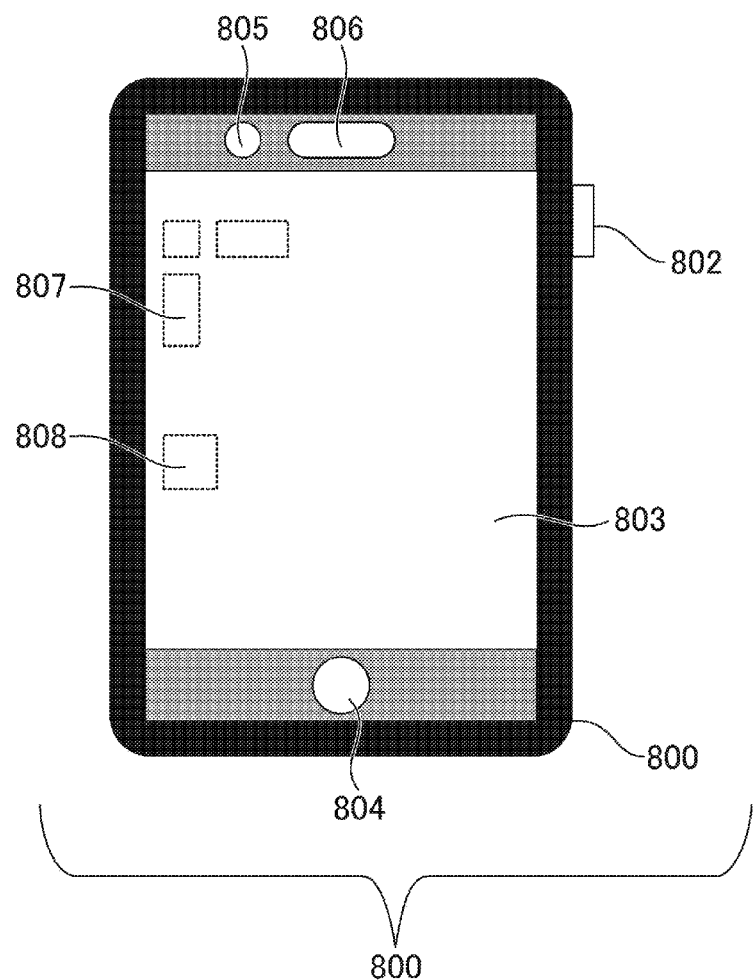
FIG. 1D is an external view of a display device as a portable device according to Embodiment 1 that is configured separately from the camera main body.

FIG. 1D is an external view of a display device 800 as a portable device according to Embodiment 1 that is configured separately from the camera main body 1.

Referring to FIG. 1D, the display device 800 includes a button A802, a display unit 803, a button B804, an in-camera 805, a face sensor 806, an angular velocity sensor 807, and an acceleration sensor 808. Although not illustrated in FIG. 1D, a wireless LAN that can be connected to the camera main body 1 at a high speed is included.

The button A802 is a button having a function of a power button of the display device 800, accepts an operation of power on/off according to a long press, and accepts an instruction of another processing timing according to a short press.

The display unit 803 can allow checking of a video captured by the camera main body 1 or display a menu screen required for setting. In this embodiment, a transparent touch sensor is disposed on the surface of the display unit 803, and an operation according to a touch on the screen under display (for example, a menu screen) is accepted.

The button B804 is a button that functions as a calibration button 854 used in a calibration process to be described below.

The in-camera 805 is a camera that can image a person observing the display device 800.

The face sensor 806 detects a face shape and an observation direction of a person observing the display device 800. Although a specific structure of the face sensor 806 is not particularly limited, for example, various sensors such as a structured optical sensor, a ToF sensor, a millimeter wave radar, and the like may be used.

The angular velocity sensor 807 is disposed inside the display device 800 and thus is denoted using a dotted line in a perspective view scene. The display device 800 according to this embodiment also has a function of a calibrator to be described below, and thus a three-dimensional gyro sensor able to be used in three directions including X, Y, and Z directions is mounted therein.

The acceleration sensor 808 detects a posture of the display device 800.

A general smartphone is used in the display device 800 according to this embodiment, and thus, by associating firmware in the smartphone with firmware of the camera main body 1 side, the camera system according to the present disclosure can be implemented. Here, by associating the firmware of the camera main body 1 side with an application or an OS of the smartphone for the display device 800, the camera system according to the present disclosure can be implemented as well.

FIGS. 2A to 2F are diagrams illustrating the imaging/detecting unit 10 in detail. In these and subsequent drawings, by assigning the same reference numerals to parts that have already been described, the same functions are represented, and description thereof in this specification will be omitted.

Figure 2A:
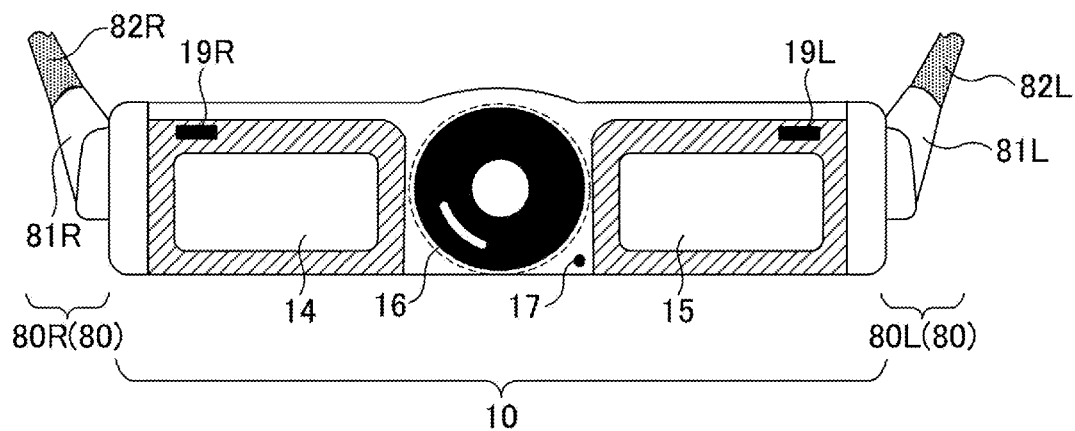
FIG. 2A is a diagram of the imaging/detecting unit seen from a front side.

FIG. 2A is a diagram of the imaging/detecting unit 10 seen from a front face.

In the connection unit 80, a right connection unit 80R present on a right side (a left side in FIG. 2A) of the body of the user and a left connection unit 80L configured by a left side (a right side toward FIG. 2A) of the body of the user are connected to the imaging/detecting unit 10. In more detail, the connection unit 80 is divided into an angle maintaining part 81, which is made of a hard material, maintaining an angle with respect to the imaging/detecting unit 10 and a band part 82. In other words, the right connection unit 80R includes an angle maintaining part 81R and a band part 82R, and the left connection unit 80L includes an angle maintaining part 81L and a band part 82L.

Figure 2B:
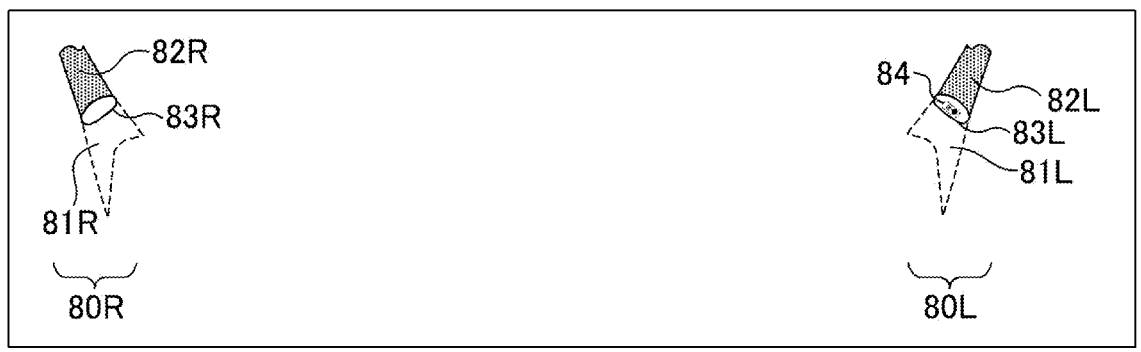
FIG. 2B is a diagram illustrating a shape of a band part of a connection unit of the camera main body.

FIG. 2B is a diagram illustrating a shape of the band part 82 of the connection unit 80. In this drawing, in order to show the shape of the band part 82, the angle maintaining part 81 has a transparent view scene.

The band part 82 includes a connection face 83 and an electric cable 84.

The connection face 83 is a connection face between the angle maintaining part 81 and the band part 82 and has a shape of a cross section that is not a perfect circle, here, an oval shape. Hereinafter, in the connection faces 83, connection faces 83 that are disposed with horizontal symmetry on the right side (the left side toward FIG. 2B) and the left side (the right side toward FIG. 2B) of the body of the user at the time of wearing the camera main body 1 among connection faces 83 will be respectively referred to as a right connection face 83R and a left connection face 83L. The right connection face 83R and the left connection face 83L precisely have a shape of a letter "HA" of katakana. In other words, viewed in FIG. 2B, a distance between the right connection face 83R and the left connection face 83L becomes shorter going upward from the bottom. In accordance with this, in a case in which a user is wearing the camera main body 1, a direction of the major axis of the connection face 83 of the connection unit 80 is a direction along the body of the user, and thus there are effects in which the band part 82 is comfortable at the time of being in contact with the body of the user, and the imaging/detecting unit 10 does not move in leftward/rightward directions and forward and backward directions.

The electric cable 84 (a power supply unit) is a cable that is wired inside the band part 82L and electrically connects the battery unit 90 and the imaging/detecting unit 10. The electric cable 84 connects a power supply of the battery unit 90 to the imaging/detecting unit 10 and transmits/receives electrical signals to/from the outside.

Figure 2C:
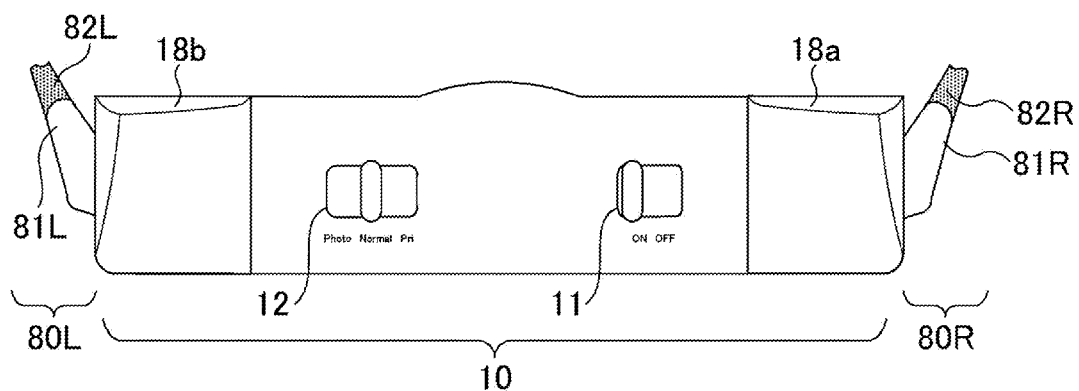
FIG. 2C is a diagram of the imaging/detecting unit seen from a rear side.

FIG. 2C is a diagram of the imaging/detecting unit 10 seen from behind. FIG. 2C is a drawing seen from a side that is in contact with the body of the user, that is, a side opposite to FIG. 2A, and thus a positional relation between the right connection unit 80R and the left connection unit 80L is reverse to that of FIG. 2A.

The imaging/detecting unit 10 includes a power switch 11, an imaging mode switch 12, and a chest connecting pad 18 on the rear side thereof.

The power switch 11 is a power switch that performs switching between on/off of power of the camera main body 1. Although the power switch 11 according to this embodiment is a slide lever switch, the power switch 11 is not limited thereto. For example, the power switch 11 may be a push-type switch and may be a switch configured integrally with a slide cover, which is not illustrated in the drawing, of the imaging lens 16.

The imaging mode switch 12 (a changing unit) is a switch changing an imaging mode and can change a mode relating to imaging. In this embodiment, the imaging mode switch 12 can perform switching to a Pri-setting (private setting) mode that is set using the display device 800 to be described below in addition to a still image mode and a moving image mode.

In this embodiment, the imaging mode switch 12 is a switch in the form of a slide lever allowing selection of one of "Photo", "Normal", and "Pri" illustrated in FIG. 2C by the lever being slid. The imaging mode transitions to a still image mode through sliding to "Photo", transitions to a moving image mode through sliding to "Normal", and transitions to the Pri-setting mode through sliding to "Pri". The imaging mode switch 12 is not limited to the form according to this embodiment as long as it is a switch capable of changing the imaging mode. For example, the imaging mode switch 12 may be composed of three buttons of "Photo", "Normal", and "Pri".

The chest connecting pad 18 (a fixing unit) is a part corresponding to a body of a user when the imaging/detecting unit 10 is biased to the body of the user. As illustrated in FIG. 2A, the imaging/detecting unit 10 is formed such that an entire lateral (horizontal) length is longer than an entire vertical (up-down) length at the time of wearing, and the chest connecting pad 18 is disposed near left and right ends of the imaging/detecting unit 10. By disposing as such, horizontal rotation deviation during imaging in the camera main body 1 can be inhibited. In addition, by disposing the chest connecting pad 18, the power switch 11 and the imaging mode switch 12 can be prevented from being in contact with the body. In addition, the chest connecting pad 18 also has a role of preventing transfer of heat to a body of a user even when the temperature of the imaging/detecting unit 10 rises due to long term imaging and a role of adjusting the angle of the imaging/detecting unit 10.

Figure 2D:
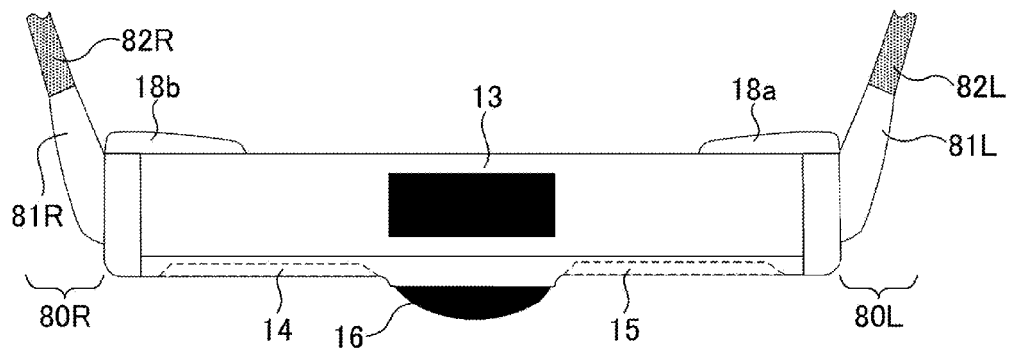
FIG. 2D is a diagram of the imaging/detecting unit seen from above.
Figure 2E:
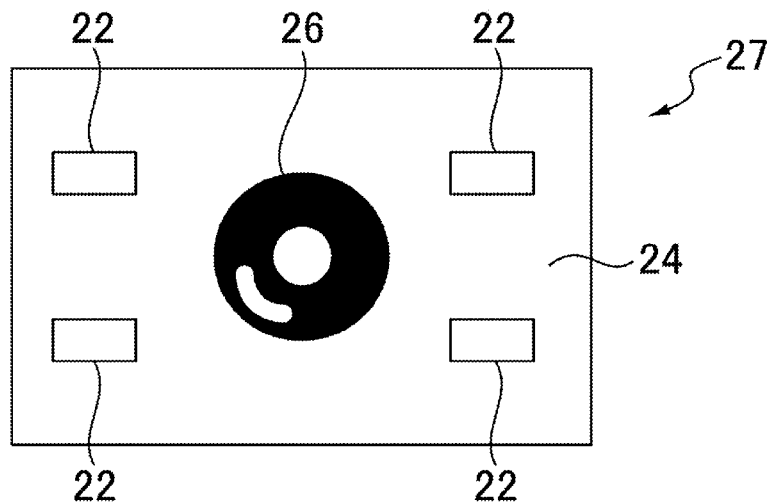
FIG. 2E is a diagram illustrating a configuration of an infrared detection processing device disposed below a face direction detecting window inside the imaging/detecting unit in the camera main body.

FIG. 2D is a diagram of the imaging/detecting unit 10 seen from above.

As illustrated in FIG. 2D, the face direction detecting window 13 is disposed at a center part of the surface of the imaging/detecting unit 10, and the chest connecting pad 18 protrudes from the imaging/detecting unit 10.

FIG. 2E is a diagram illustrating a configuration of an infrared detection processing device 27 and is disposed inside the imaging/detecting unit 10 and below the face direction detecting window 13.

The infrared detection processing device 27 includes an infrared LED 22 and an infrared ray condensing lens 26.

The infrared LED 22 projects an infrared ray 23 (FIG. 5) toward a user.

The infrared ray condensing lens 26 is a lens that forms an image of a reflected light beam 25 (FIG. 5) reflected from a user at the time of projecting the infrared ray 23 from the infrared LED 22 on a sensor, which is not illustrated in the drawing, of the infrared detection processing device 27.

Figure 2F:
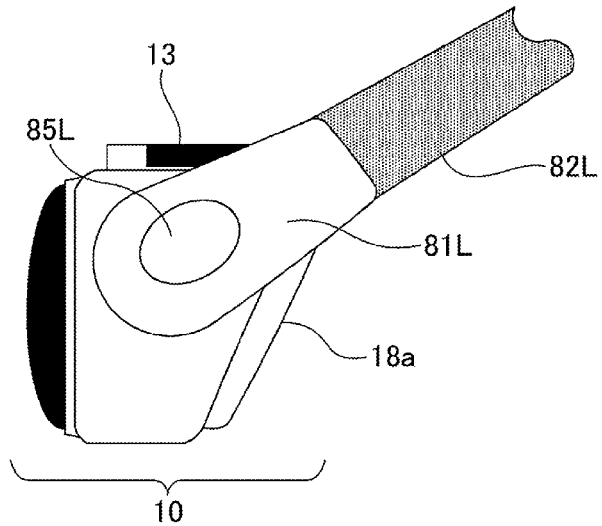
FIG. 2F is a diagram illustrating a state in which a user is wearing a camera main body seen from a left side of the user.

FIG. 2F is a diagram illustrating a state in which a user is wearing the camera main body 1 seen from a left side of the user.

An angle adjustment button 85L is a button that is disposed in the angle maintaining part 81L and is used when the angle of the imaging/detecting unit 10 is adjusted. Although not illustrated in this drawing, also inside the angle maintaining part 81R disposed on the opposite side face, an angle adjustment button 85R is set at a position symmetrical to the angle adjustment button 85L. Hereinafter, when the angle adjustment buttons 85R and 85L are collectively referred to, they will be referred to as an angle adjustment button 85.

Although the angle adjustment button 85 is present at a position that can also be seen in FIGS. 2A, 2C, and 2D, for simplification of illustration, it is omitted.

By vertically moving the angle maintaining part 81 toward FIG. 2F while pressing the angle adjustment button 85, a user can change the angle between the imaging/ detecting unit 10 and the angle maintaining part 81. In addition, the chest connecting pad 18 can change a protruding angle thereof. By using functions of these two angle changing members (the angle adjustment button 85 and the chest connecting pad 18), the imaging/detecting unit 10 can adjust the orientation of the imaging lens 16 to a horizontal direction for an individual difference of the position and shape of the chest of a user.

Figure 3A:
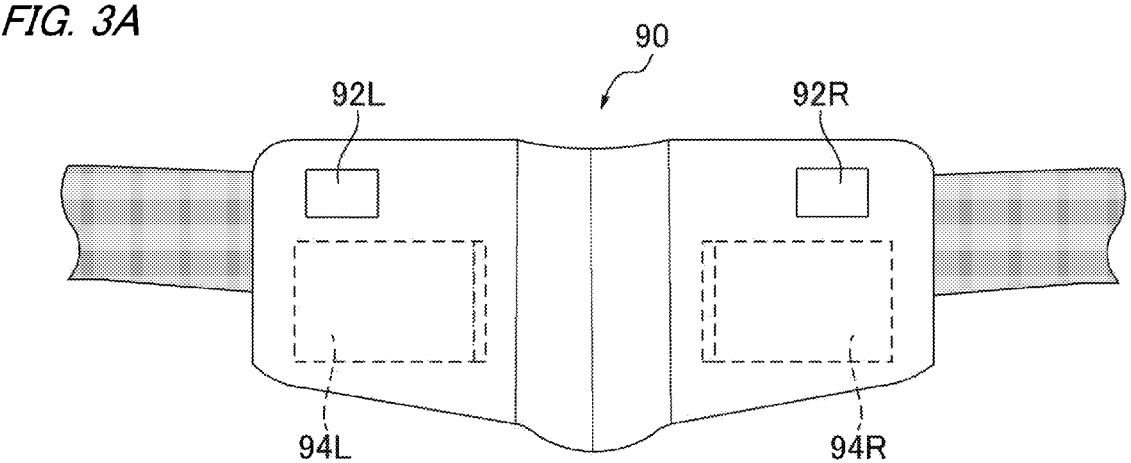
FIGS. 3A to 3C are diagrams illustrating details of the battery unit.
Figure 3B:
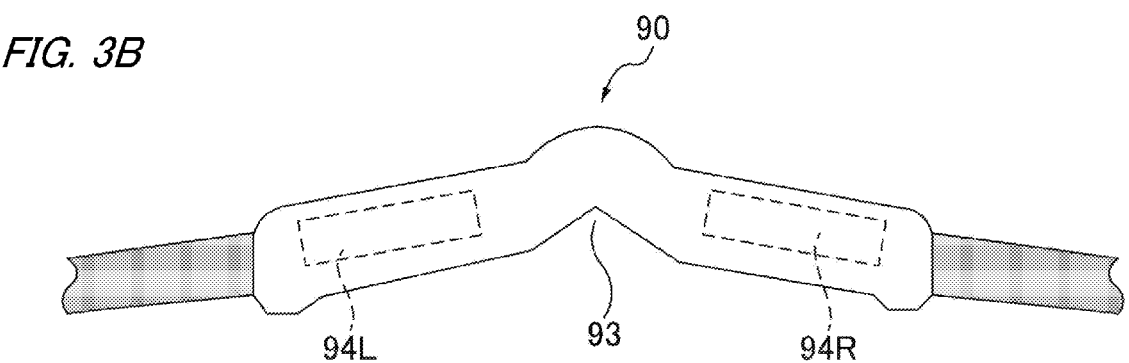
Figure 3C:
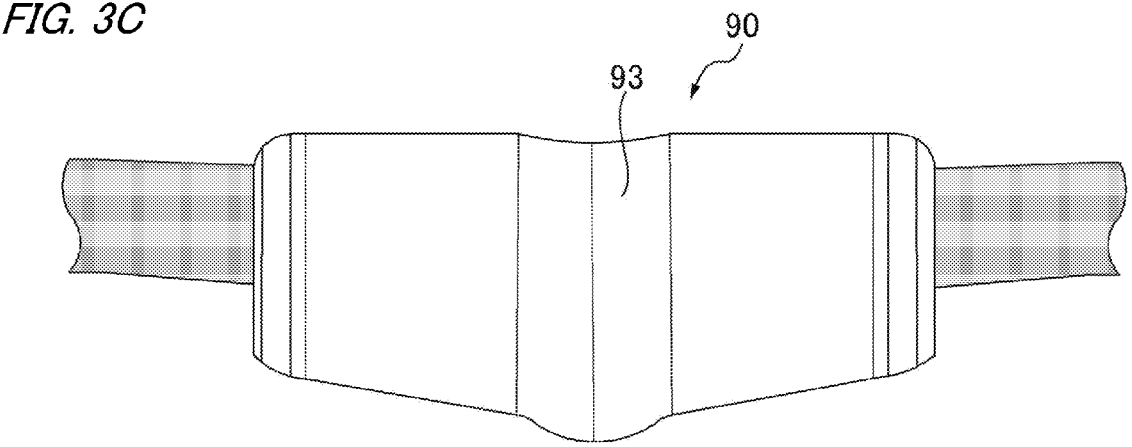

FIGS. 3A to 3C are diagrams illustrating details of the battery unit 90.

FIG. 3A is a diagram in which the battery unit 90 is partially displayed to be seen through from the rear face.

As illustrated in FIG. 3A, in order to take a weight balance of the battery unit 90, two batteries including a left battery 94L and a right battery 94R (hereinafter, also referred to as a battery 94) are symmetrically mounted inside thereof. In this way, by disposing the batteries 94 symmetrically with respect to the center part of the battery unit 90, left and right weight balance can be adjusted, and a positional deviation of the camera main body 1 is prevented. The battery unit 90 may be configured such that only one battery is mounted.

FIG. 3B is a diagram of the battery unit 90 seen from above. Also in this drawing, the battery 94 is illustrated to be seen through.

As illustrated in FIG. 3B, a relation between the backbone avoiding notch 93 and the battery 94 can be acquired. In this way, by oppositely disposing the batteries 94 on both sides of the backbone avoiding notch 93, the battery unit 90 having a relatively considerable weight can be mounted without causing a burden to a user.

FIG. 3C is a diagram of the battery unit 90 seen from the rear side. FIG. 3C is a diagram seen from a side being in contact with the body of the user, that is, a side opposite to that of FIG. 3A.

As illustrated in FIG. 3C, the backbone avoiding notch 93 is disposed at the center along the backbone of the user.

Figure 4:
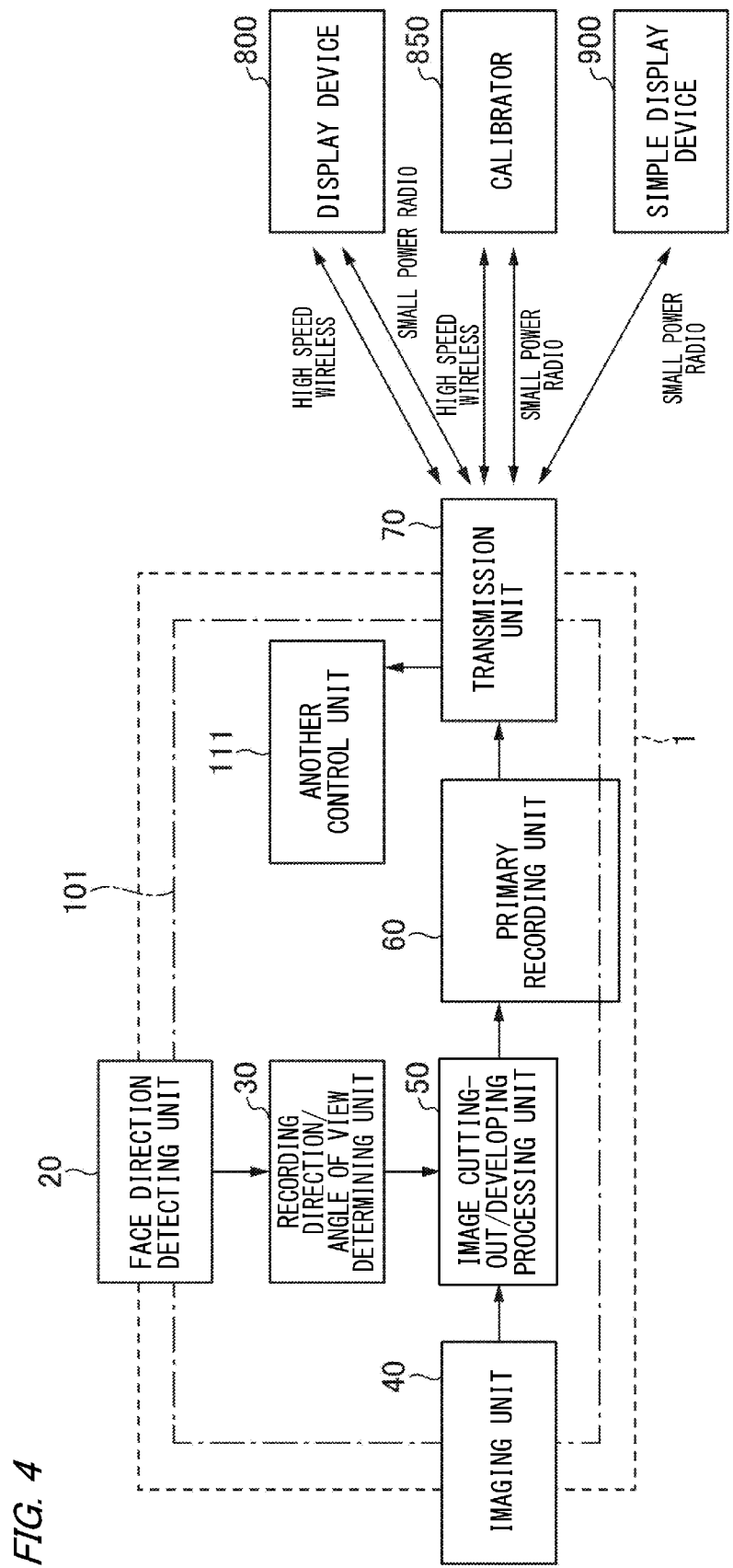
FIG. 4 is a functional block diagram of the camera main body according to Embodiment 1.

FIG. 4 is a functional block diagram of the camera main body 1. Details will be described below, and thus, here, the flow of an overall process performed by the camera main body 1 will be described with reference to FIG. 4.

Referring to FIG. 4, the camera main body 1 includes a face direction detecting unit 20, a recording direction/angle of view determining unit 30, an imaging unit 40, an image cutting-out/developing processing unit 50, a primary recording unit 60, a transmission unit 70, and another control unit 111. Such functional blocks are executed under the control of an overall control CPU 101 (FIG. 5) performing overall control of the camera main body 1.

The face direction detecting unit 20 (an observation direction detecting unit) is a functional block executed by the infrared LED 22, the infrared detection processing device 27, and the like described above, estimates an observation direction by detecting a face direction, and delivers this to the recording direction/angle of view determining unit 30.

The recording direction/angle of view determining unit 30 (a recording direction determining unit) performs various arithmetic operations on the basis of an observation direction estimated by the face direction detecting unit 20, determines information of a position and a range at the time of cutting out a video supplied from the imaging unit 40, and delivers this information to the image cutting-out/developing processing unit 50.

The imaging unit 40 converts a light beam transmitted from a subject into a video and delivers the video to the image cutting-out/developing processing unit 50.

The image cutting-out/developing processing unit 50 (a developing unit) cuts out and develops a video supplied from the imaging unit 40 using information supplied from the recording direction/angle of view determining unit 30 and thus delivers only a video of a direction in which a user sees to the primary recording unit 60.

The primary recording unit 60 is a functional block configured using a primary memory 103 (FIG. 5) and the like, records video information, and delivers the video information to the transmission unit 70 at a necessary timing.

The transmission unit 70 (a video output unit) is wirelessly connected to the display device 800 (FIG. 1D), a calibrator 850, and a simple display device 900 that are communication partners determined in advance and performs communication therewith.

The display device 800 is a display device that can be connected to the transmission unit 70 using a wireless LAN that can be connected at a high speed (hereinafter, referred to as "high speed wireless"). Here, in this embodiment, although radio communication corresponding to IEEE802.11ax(WiFi 6) standard is used for the high speed wireless, radio communication corresponding to another standard, for example, WiFi 4 standard or WiFi 5 standard may be used. In addition, the display device 800 may be a device that is dedicatedly developed for the camera main body 1 or may be a general smartphone, a tablet terminal, or the like.

For connection between the transmission unit 70 and the display device 800, small power radio may be used, or the connection may be performed using both the high speed wireless and the small power radio or may be performed through switching therebetween. In this embodiment, data of which a data amount is large such as a video file of a moving image video to be described below is transmitted using the high speed wireless, and data of which a data amount is small or data of which transmission is allowed to take time is transmitted using the small power radio. Here, in this embodiment, although Bluetooth is used for the small power radio, another near field (short distance) radio communication such as Near Field Communication (NFC) may be used.

The calibrator 850 is a device that performs initial setting and individual setting of the camera main body 1 and is, similar to the display device 800, a device that can be connected to the transmission unit 70 using high speed wireless. Details of the calibrator 850 will be described below. In addition, the display device 800 may also have a function of this calibrator 850.

For example, the simple display device 900 is a display device that can be connected to the transmission unit 70 only using small power radio.

The simple display device 900 is a display device that cannot transmit a moving image video to the transmission unit 70 due to a time limit and can perform timing transmission of imaging start/stop, image checking of a composition confirmation degree, and the like. In addition, similar to the display device 800, the simple display device 900 may be a device that is dedicatedly developed for the camera main body 1, a smartwatch, or the like.

Figure 5:
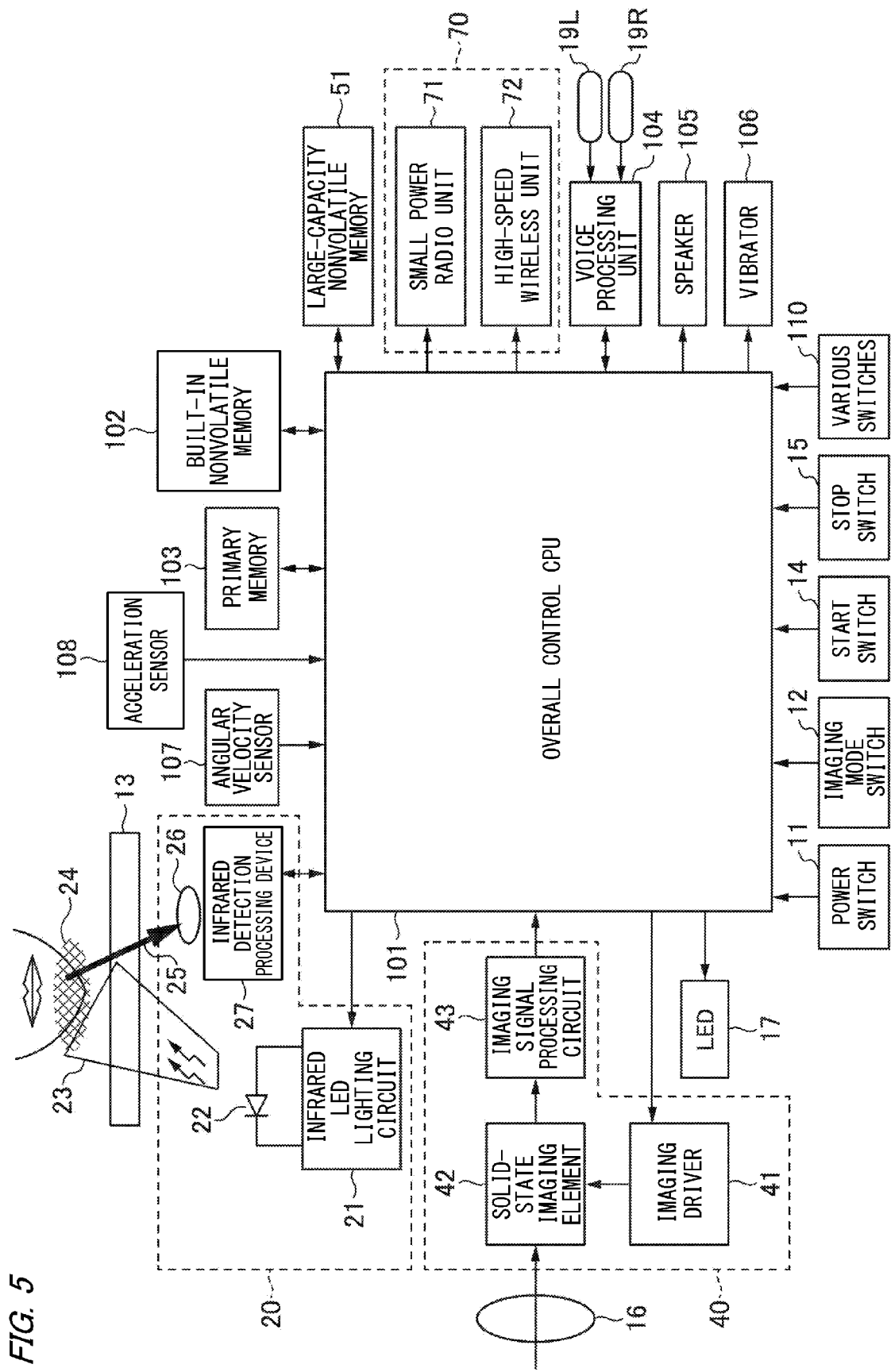
FIG. 5 is a block diagram illustrating a hardware configuration of the camera main body.

FIG. 5 is a block diagram illustrating a hardware configuration of the camera main body 1. The same reference numerals will be used for configurations and functions that have been described with reference to FIGS. 1A to 1C and the like, and detailed description thereof will be omitted.

Referring to FIG. 5, the camera main body 1 includes an overall control CPU 101, a power switch 11, an imaging mode switch 12, a face direction detecting window 13, a start switch 14, a stop switch 15, an imaging lens 16, and an LED 17.

In addition, the camera main body 1 includes an infrared LED lighting circuit 21, an infrared LED 22, an infrared ray condensing lens 26, and an infrared detection processing device 27 that configures the face direction detecting unit 20 (FIG. 4).

In addition, the camera main body 1 includes an imaging unit 40 (FIG. 4) formed from an imaging driver 41, a solid-state imaging element 42, and an imaging signal processing circuit 43 and a transmission unit 70 (FIG. 4) formed from a small power radio unit 71 and a high-speed wireless unit 72.

In the camera main body 1, although only one imaging unit 40 is disposed in this embodiment, by disposing two or more imaging units 40, a 3D video may be captured, a video of an angle wider than the angle of view that can be acquired by one imaging unit 40 may be captured, or imaging may be performed in a plurality of directions.

In addition, the camera main body 1 includes various memories such as a large-capacity nonvolatile memory 51, a built-in nonvolatile memory 102, a primary memory 103, and the like.

Furthermore, the camera main body 1 includes a voice processing unit 104, a speaker 105, a vibrator 106, an angular velocity sensor 107, an acceleration sensor 108, and various switches 110.

The overall control CPU 101 has the power switch 11 described above with reference to FIG. 2C and the like connected thereto and performs control of this camera main body 1. The recording direction/angle of view determining unit 30, the image cutting-out/developing processing unit 50, and the other control unit 111 illustrated in FIG. 4 are configured by the overall control CPU 101.

The infrared LED lighting circuit 21 controls turning on/off of the infrared LED 22 described above with reference to FIG. 2E and controls projection of an infrared ray 23 from the infrared LED 22 to a user.

The face direction detecting window 13 is configured using a visible light cutoff filter, causes visible light beam to be hardly transmitted, and causes an infrared ray 23 that is light of an infrared region and a reflected light beam 25 thereof to be sufficiently transmitted.

The infrared ray condensing lens 26 is a lens that condenses the reflected light beam 25.

The infrared detection processing device 27 (an infrared ray detecting unit) includes a sensor that detects the reflected light beam 25 condensed by the infrared ray condensing lens 26. This sensor images the condensed reflected light beam 25 as a video, converts the video into sensor data, and delivers the sensor data to the overall control CPU 101.

As illustrated in FIG. 1B, in a case in which a user is wearing the camera main body 1, the face direction detecting window 13 is positioned below the jaw of the user. For this reason, the infrared ray 23 projected from the infrared LED lighting circuit 21, as illustrated in FIG. 5, is transmitted through the face direction detecting window 13 and is emitted to an infrared ray emission surface 24 that is near the jaw of the user. In addition, the infrared ray 23 reflected on the infrared ray emission surface 24 becomes a reflected light beam 25, is transmitted through the face direction detecting window 13, and is condensed in a sensor present in the infrared detection processing device 27 by the infrared ray condensing lens 26.

The various switches 110 are not illustrated in FIGS. 1A to 1C and the like, and details thereof will be omitted. The various switches 110 are switches for executing functions not relating to this embodiment.

The imaging driver 41 includes a timing generator and the like, generates various timing signals, outputs the generated various timing signals to units relating to imaging, and performs imaging driving of the units.

The solid-state imaging element 42 outputs a signal acquired by performing photoelectric conversion of a subject image projected from the imaging lens 16 described with reference to FIG. 1A to the imaging signal processing circuit 43.

The imaging signal processing circuit 43 outputs captured image data generated by performing a clamp process, an AD conversion process, and the like on a signal supplied from the solid-state imaging element 42 to the overall control CPU 101.

The built-in nonvolatile memory 102 uses a flash memory or the like, and a startup program of the overall control CPU 101 and setting values of various program modes are stored therein. In this embodiment, a change in the observation visual field (angle of view) and an effect level of image stabilization control can be set, and thus such setting values are recorded as well.

The primary memory 103 is configured using a RAM and the like, temporarily stores video data under processing, and temporarily stores a result of an arithmetic operation of the overall control CPU 101.

The large-capacity nonvolatile memory 51 performs recording or reading of primary image data. In this embodiment, for simplification of description, although a case in which the large-capacity nonvolatile memory 51 is a semiconductor memory having no attachment/detachment mechanism is described, the configuration is not limited thereto. For example, the large-capacity nonvolatile memory 51 may be configured using an attachable/detachable recording medium such as an SD card and may be also used as the built-in nonvolatile memory 102.

The small power radio unit 71 exchanges data with the display device 800, the calibrator 850, and the simple display device 900 using small power radio.

The high-speed wireless unit 72 exchanges data with the display device 800, the calibrator 850, and the simple display device 900 using high speed wireless.

The voice processing unit 104 includes a microphone 19L of a right side toward FIG. 1A and a microphone 19R of a left side toward the drawing which receive sounds (analog signals) of the outside and generate voice signals by processing the analog signals received as sounds.

By emitting light, emitting a sound, or performing vibration, the LED 17, the speaker 105, or the vibrator 106 gives a notification or warning of the state of the camera main body 1 to a user.

The angular velocity sensor 107 is a sensor using a gyro or the like and detects movement of the camera main body 1 as gyro data.

The acceleration sensor 108 detects a posture of the imaging/detecting unit 10.

The angular velocity sensor 107 and the acceleration sensor 108 are built into the imaging/detecting unit 10, and an angular velocity sensor 807 and an acceleration sensor 808 that are separately configured from these are also disposed inside the display device 800 to be described below.

Figure 6:
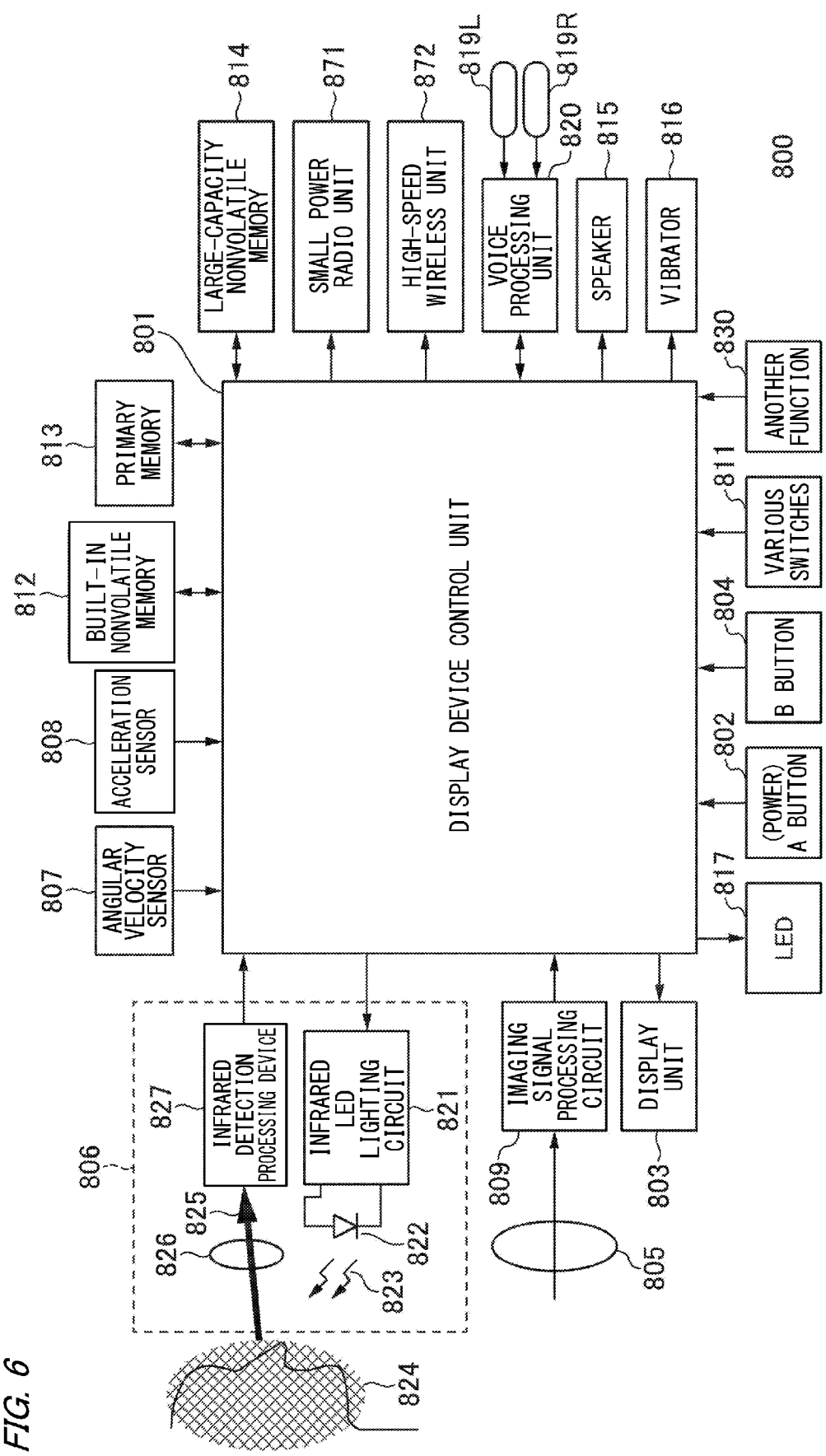
FIG. 6 is a block diagram illustrating a hardware configuration of the display device.

FIG. 6 is a block diagram illustrating a hardware configuration of the display device 800. For simplification of description, the same reference signs will be used for the parts described with reference to FIG. 1D, and description thereof will be omitted.

Referring to FIG. 6, the display device 800 includes a display device control unit 801, a button A802, a display unit 803, a button B804, an in-camera 805, a face sensor 806, an angular velocity sensor 807, an acceleration sensor 808, an imaging signal processing circuit 809, and various switches 811.

In addition, the display device 800 includes a built-in nonvolatile memory 812, a primary memory 813, a large-capacity nonvolatile memory 814, a speaker 815, a vibrator 816, an LED 817, a voice processing unit 820, a small power radio unit 871, and a high-speed wireless unit 872.

The display device control unit 801 is configured using a CPU, has the button A802, the face sensor 806, and the like described with reference to FIG. 1D connected thereto, and performs control of the display device 800.

Although the imaging signal processing circuit 809 is responsible for functions equivalent to those of the imaging driver 41, the solid-state imaging element 42, and the imaging signal processing circuit 43 disposed inside the camera main body 1, description thereof is not important that much in this embodiment, and thus, for simplification of description, they will be described collectively as one. Data output by the imaging signal processing circuit 809 is processed inside the display device control unit 801. Processing details of this data will be described below.

The various switches 811, which are not illustrated in FIG. 1D, although details thereof will be omitted, is a switch for executing a function not relating to this embodiment.

The angular velocity sensor 807 is a sensor using a gyro or the like and detects movement of the display device 800.

The acceleration sensor 808 detects a posture of the display device 800.

As described above, the angular velocity sensor 807 and the acceleration sensor 808 are built into the display device 800 and have functions similar to those of the angular velocity sensor 107 and the acceleration sensor 108 disposed in the camera main body 1 described above and are separately configured.

The built-in nonvolatile memory 812 uses a flash memory or the like, and a startup program of the display device control unit 801 and setting values of various program modes are stored therein.

The primary memory 813 is configured using a RAM or the like, temporarily stores video data during processing, and temporarily stores a result of an arithmetic operation of the imaging signal processing circuit 809. In this embodiment, during recording of a moving image video, gyro data detected by the angular velocity sensor 807 at an imaging time of each frame is stored in the primary memory 813 with being associated with each frame.

The large-capacity nonvolatile memory 814 records or reads image data of the display device 800. In this embodiment, the large-capacity nonvolatile memory 814 is configured using an attachable/detachable memory such as an SD card. Similar to the large-capacity nonvolatile memory 51 disposed in the camera main body 1, the large-capacity nonvolatile memory 814 may be configured using a memory that is not attachable/detachable.

By emitting a sound, performing vibration, or emitting light, the speaker 815, the vibrator 816, or the LED 817 gives a notification or warning of the state of the display device 800 to a user.

The voice processing unit 820 includes a left microphone 819L and a right microphone 819R that receive sounds (analog signals) of the outside and generate voice signals by processing the analog signals received as sounds.

The small power radio unit 871 exchanges data with the camera main body 1 using small power radio.

The high-speed wireless unit 872 exchanges data with the camera main body 1 using high-speed wireless.

The face sensor 806 (a face detecting unit) includes an infrared LED lighting circuit 821, an infrared LED 822, an infrared ray condensing lens 826, and an infrared detection processing device 827.

The infrared LED lighting circuit 821 is a circuit having a function similar to the infrared LED lighting circuit 21 illustrated in FIG. 5, performs control of turning on/off of the infrared LED 822, and controls projection of an infrared ray 823 from the infrared LED 822 to a user.

The infrared ray condensing lens 826 is a lens that condenses a reflected light beam 825 of the infrared ray 823.

The infrared detection processing device 827 includes a sensor that detects the reflected light beam condensed by the infrared ray condensing lens 826. This sensor converts the condensed reflected light beam 825 into sensor data and delivers the sensor data to the display device control unit 801.

When the face sensor 806 illustrated in FIG. 1D is directed toward a user, as illustrated in FIG. 6, an infrared ray 823 projected from the infrared LED lighting circuit 821 is emitted to an infrared ray emission surface 824 that is an entire face of the user. In addition, the infrared ray 823 reflected on the infrared ray emission surface 824 becomes a reflected light beam 825 and is condensed on a sensor disposed in the infrared detection processing device 827 by the infrared ray condensing lens 826.

Other details of function units 830 will be omitted, and the functional units execute functions that do not relate to this embodiment and can be performed only by a smartphone such as a telephone function, functions of other sensors, and the like. Hereinafter, a method of using the camera main body 1 and the display device 800 will be described.

Figure 7A:
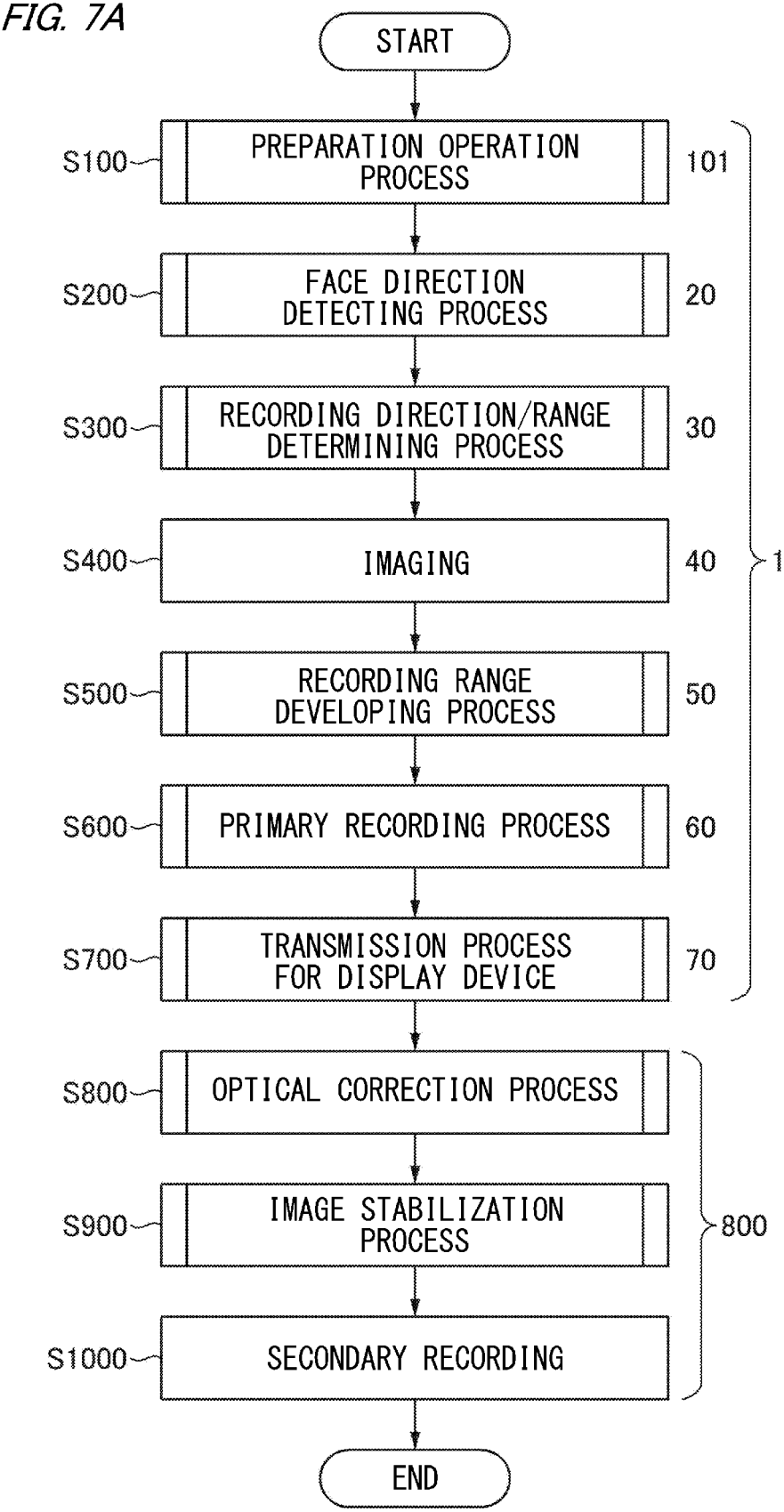
FIG. 7A is a flowchart illustrating an overview of an imaging recording process according to Embodiment 1 that is performed in the camera main body and the display device.

FIG. 7A is a flowchart illustrating an overview of an imaging recording process according to this embodiment that is performed in the camera main body 1 and the display device 800.

As an assistance for description, on a right side of each step in FIG. 7A, one of devices illustrated in FIG. 4 that performs the step is represented. In other words, Steps S100 to S700 illustrated in FIG. 7A are performed by the camera main body 1, and Steps S800 to S1000 illustrated in FIG. 7A are performed by the display device 800.

In Step S100, when the power switch 11 is turned on, and power is input to the camera main body 1, the overall control CPU 101 starts to operate and reads a startup program from the built-in nonvolatile memory 102. Thereafter, the overall control CPU 101 performs a preparation operation process for performing setting before imaging of the camera main body 1. Details of the preparation operation process will be described below with reference to FIG. 7B.

In Step S200, the face direction detecting unit 20 detects a face direction, thereby performing a face direction detecting process for estimating an observation direction. Details of the face direction detecting process will be described below with reference to FIG. 7C. This process is performed at a predetermined frame rate.

In Step S300, the recording direction/angle of view determining unit 30 performs a recording direction/range determining process. Details of the recording direction/range determining process will be described below with reference to FIG. 7D.

In Step S400, the imaging unit 40 performs imaging and generates captured image data.

In Step S500, the image cutting-out/developing processing unit 50 performs the recording range developing process in which a video is cut out for the captured image data generated in Step S400 using a recording direction and angle of view information determined in Step S300, and a developing process of that range is performed. Details of the recording range developing process will be described below with reference to FIG. 7E.

In Step S600, a primary recording process in which a video developed in Step S500 is stored in the primary memory 103 as video data by the primary recording unit 60 (a video recording unit) is performed. Details of the primary recording process will be described below with reference to FIG. 14.

In Step S700, a transmission process for the display device 800 in which the transmission unit 70 wirelessly transmits a video that is primarily recorded in Step S600 to the display device 800 at a designated timing is performed. Details of the transmission process for the display device 800 will be described below with reference to FIG. 16.

Step S800 and subsequent steps are performed by the display device 800.

In Step S800, the display device control unit 801 performs an optical correction process in which an optical correction is performed for a video transmitted from the camera main body 1 in Step S700. Details of the optical correction process will be described below with reference to FIG. 17.

In Step S900, the display device control unit 801 performs an image stabilization process on a video that has been optically corrected in Step S800. Details of the image stabilization process will be described below with reference to FIG. 19.

The order of Step S800 and Step S900 may be reversed. In other words, after an image stabilization correction of a video is performed first, an optical correction may be performed later.

In Step S1000, the display device control unit 801 (a moving image recording unit) performs secondary recording in which a video for which the optical correction process and the image stabilization process have been completed in Steps S800 and S900 is recorded in the large-capacity nonvolatile memory 814 and ends this process.

Next, a subroutine of each step described with reference to FIG. 7A will be described in detail together with order of the process with reference to FIGS. 7B to 7F while referring to other diagrams and the like.

Figure 7B:
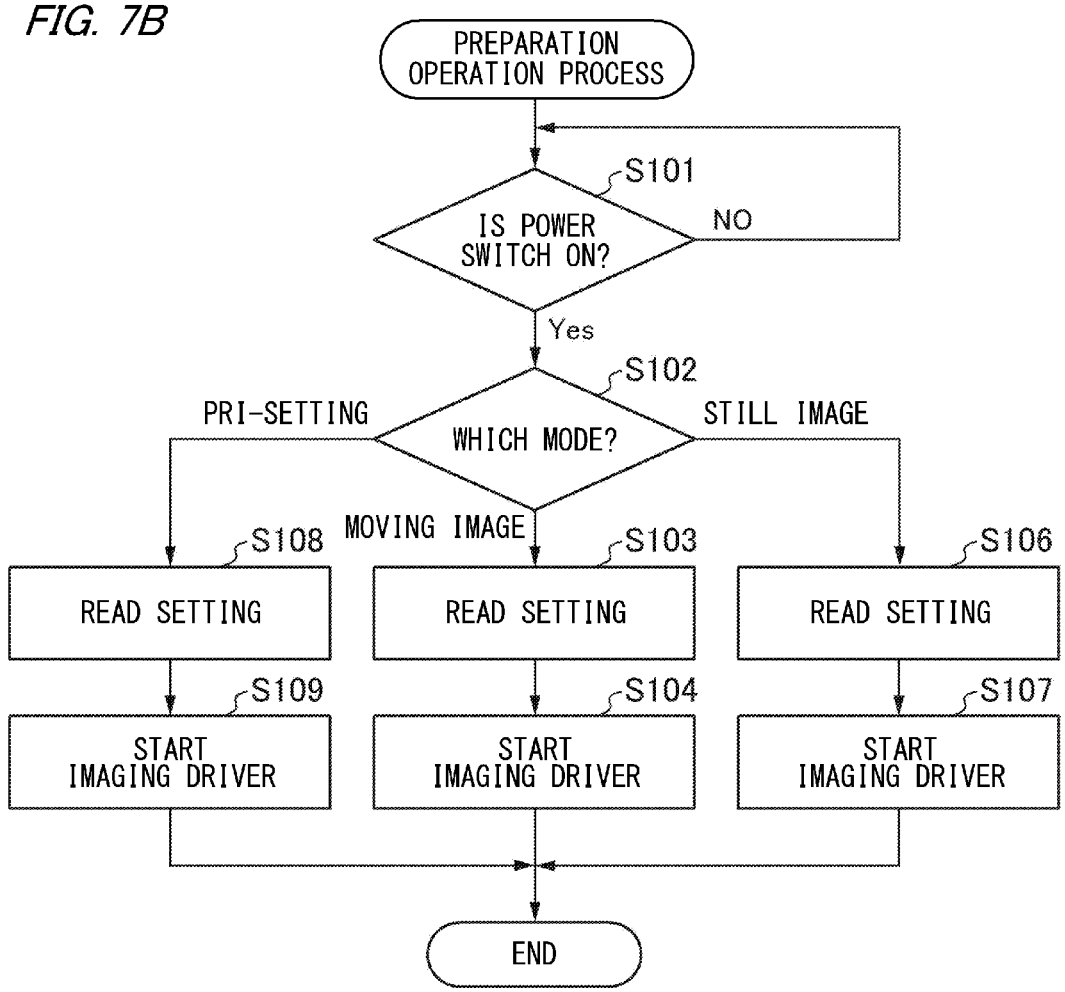
FIG. 7B is a flowchart of a subroutine of a preparation operation process of Step S100, which is illustrated in FIG. 7A, according to Embodiment 1.

FIG. 7B is a flowchart of a subroutine of the preparation operation process of Step S100 illustrated in FIG. 7A. Hereinafter, this process will be described using parts illustrated in FIGS. 2A to 2F and 5.

In Step S101, it is determined whether or not the power switch 11 is on. In a case in which power remains to be off, the process stands by. When power becomes on, the process proceeds to Step S102.

In Step S102, a mode selected by the imaging mode switch 12 is determined. As a result of the determination, in a case in which the mode selected by the imaging mode switch 12 is a moving image mode, the process proceeds to Step S103.

In Step S103, various settings of the moving image mode are read from the built-in nonvolatile memory 102 and are stored in the primary memory 103, and then, the process proceeds to Step S104. Here, in the various settings of the moving image mode, an image stabilization level designated by an angle of view setting value ang (in this embodiment, set to 90° in advance), "strong", "intermediate", "off" or the like is included.

In Step S104, after an operation of the imaging driver 41 starts for the moving image mode, the process exits from this subroutine.

As a result of the determination of Step S102, in a case in which a mode selected by the imaging mode switch 12 is a still image mode, the process proceeds to Step S106.

In Step S106, various settings of the still image mode are read from the built-in nonvolatile memory 102 and are stored in the primary memory 103, and then, the process proceeds to Step S107. Here, in the various settings of the still image mode, an image stabilization level designated by an angle of view setting value ang (in this embodiment, set to 45° in advance), "strong", "intermediate", "off" or the like is included.

In Step S107, after an operation of the imaging driver 41 starts for the still image mode, the process exits from this subroutine.

As a result of the determination of Step S102, in a case in which a mode selected by the imaging mode switch 12 is a Pri-setting mode, the process proceeds to Step S108. Here, the Pri-setting mode is a mode in which setting of the imaging mode is performed for the camera main body 1 from an external device such as the display device 800 and is one of three imaging modes that can be switched using the imaging mode switch 12. In other words, the Pri-setting mode is a mode for custom imaging. Here, the camera main body 1 is a small wearable device, and thus an operation switch, a setting screen, and the like used for changing the detailed settings thereof are not disposed in the camera main body 1, and change of detailed settings of the camera main body 1 is performed by an external device such as the display device 800.

For example, a case in which imaging is desired to be continued with an angle of view of 90° and an angle of view of 110° also in capturing of the same moving image will be considered. Since an angle of view of 90° is set in a normal moving image mode, in a case in which such imaging is performed, it is necessary to end capturing of a moving image once after imaging in the normal moving image mode first, change the display device 800 to a setting screen of the camera main body 1, and perform an operation of switching the angle of view to 110°. However, even during any event, such an operation on the display device 800 is burdensome.

On the other hand, when the Pri-setting mode is set to a mode in which moving image capturing is performed with an angle of view of 110° in advance, after the moving image capturing with an angle of view of 90° is completed, only sliding the imaging mode switch 12 to "Pri", change to moving image capturing with an angle of view of 110° can be instantaneously performed. In other words, a user does not need to stop the current action and perform the burdensome operation described above.

In details set in the Pri-setting mode, not only an angle of view but also an image stabilization level designated as "strong", "intermediate", or "off" and a setting of voice recognition not described in this embodiment, and the like may be included.

In Step S108, various settings of the Pri-setting mode are read from the built-in nonvolatile memory 102 and are stored in the primary memory 103, and then, the process proceeds to Step S109. Here, in the various settings of the Pri-setting mode, an angle of view setting value ang and an image stabilization level designated as "strong", "intermediate", or "off" are included.

In Step S109, after an operation of the imaging driver 41 starts for the Pri-setting mode, the process exits from this subroutine.

Here, various settings of the moving image mode read in Step S103 will be described with reference to FIG. 13.

Figure 13:
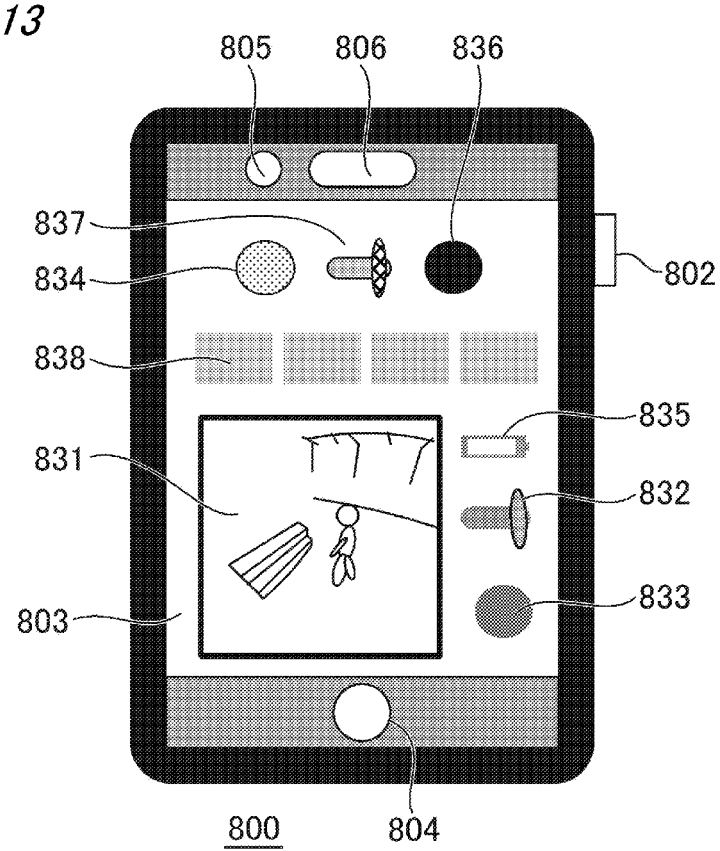
FIG. 13 is a diagram illustrating a menu screen for various settings of a moving image mode displayed in a display unit of a display device before imaging is performed in the camera main body.

FIG. 13 is a diagram illustrating a menu screen for various settings of the moving image mode displayed in the display unit 803 of the display device 800 before imaging is performed by the camera main body 1. The same reference signs will be used for the same parts as those of FIG. 1D, and description thereof will be omitted. The display unit 803 has a touch panel function and will be described to function in accordance with a touch operation including a swiping operation and the like.

Referring to FIG. 13, the menu screen includes a preview screen 831, a zoom lever 832, a recording start/stop button 833, a switch 834, a battery remaining amount display 835, a button 836, a lever 837, and an icon display unit 838.

The preview screen 831 can be used for checking a video captured by the camera main body 1 and can be used for checking an amount of zoom and an angle of view.

The zoom lever 832 is an operation unit that can be used for setting zoom by shifting it to the left side or the right side. In this embodiment, although a case in which four values of 45°, 90°, 110°, and 130° can be set as the angle of view setting value ang is described, values other than such values may be configured to be able to be set as the angle of view setting value ang by zoom lever 832.

The recording start/stop button 833 is a toggle switch having both functions of a start switch 14 and a stop switch 15.

The switch 834 is a switch for performing switching between "off" and "on".

The battery remaining amount display 835 displays a battery remaining amount of the camera main body 1.

The button 836 is a button used for entering the other modes.

The lever 837 is a lever that sets an image stabilization intensity. In this embodiment, although only "strong" and "intermediate" can be set as the image stabilization intensity, another image stabilization intensity, for example, "weak" or the like may be configured to be able to be set. In addition, the image stabilization intensity may be configured to be able to be set in a non-stepped manner.

The icon display unit 838 displays a plurality of thumbnail icons for previews.

Figure 7C:
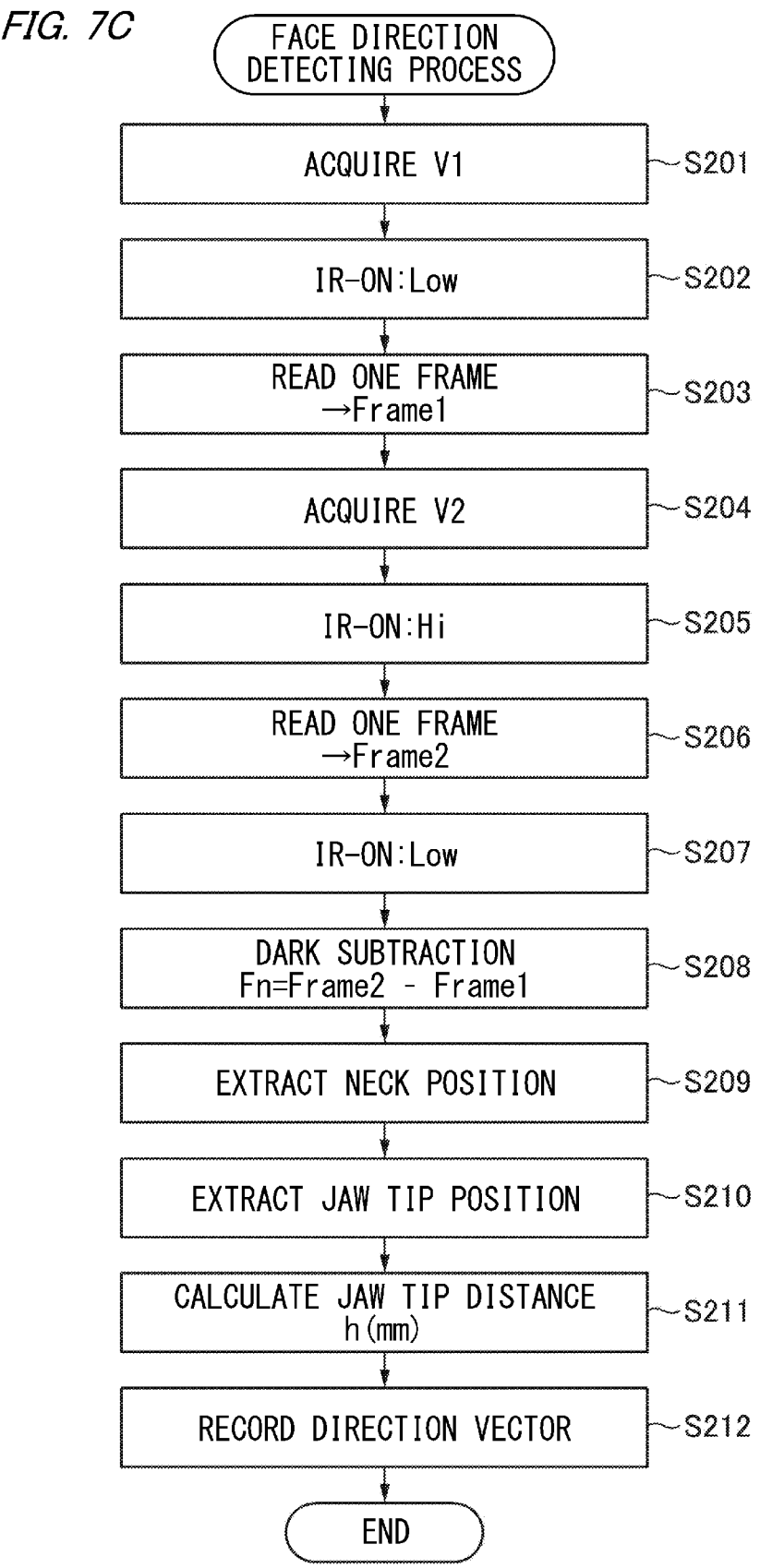
FIG. 7C is a flowchart of a subroutine of a face direction detecting process of Step S200, which is illustrated in FIG. 7A, according to Embodiment 1.

FIG. 7C is a flowchart of a subroutine of the face direction detecting process of Step S200 illustrated in FIG. 7A. Before description of details of this process, a method of detecting a face direction using infrared ray projection will be described with reference to FIGS. 8A to 8K.

Figure 8A:
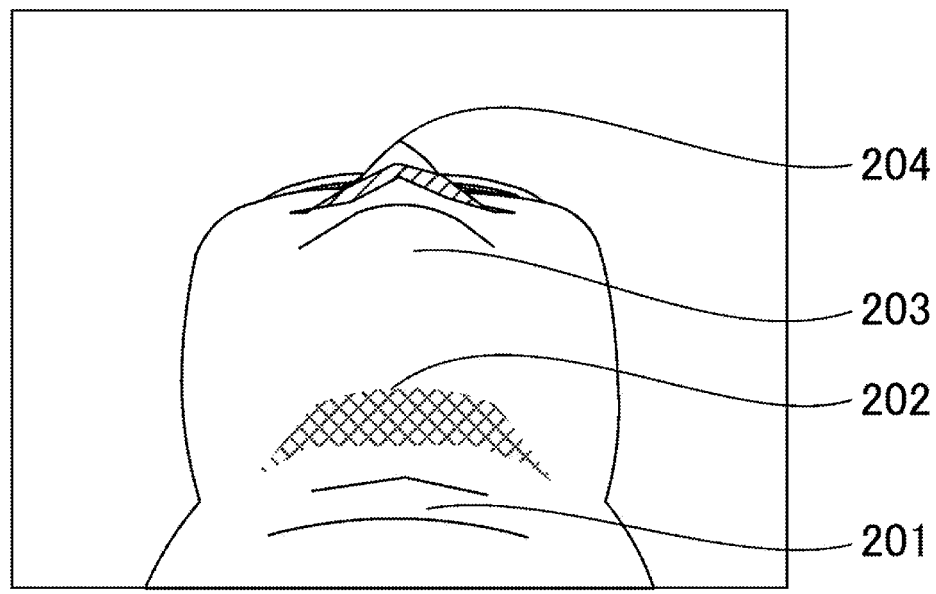
FIG. 8A is a diagram illustrating a video of a user seen from the face direction detecting window.

FIG. 8A is a diagram illustrating a video of a user seen from the face direction detecting window 13.

In a case in which there is no visible light cutoff filter component in the face direction detecting window 13, visible light is sufficiently transmitted, and the infrared detection processing device 27 is an imaging element for visible light, the video illustrated in FIG. 8A is the same as a video captured by the imaging element for visible light.

In the video illustrated in FIG. 8A, a face 204 including a neck front part 201 above the clavicle of a user, a base 202 of the jaw, a jaw tip 203, and the nose are shown.

Figure 8B:
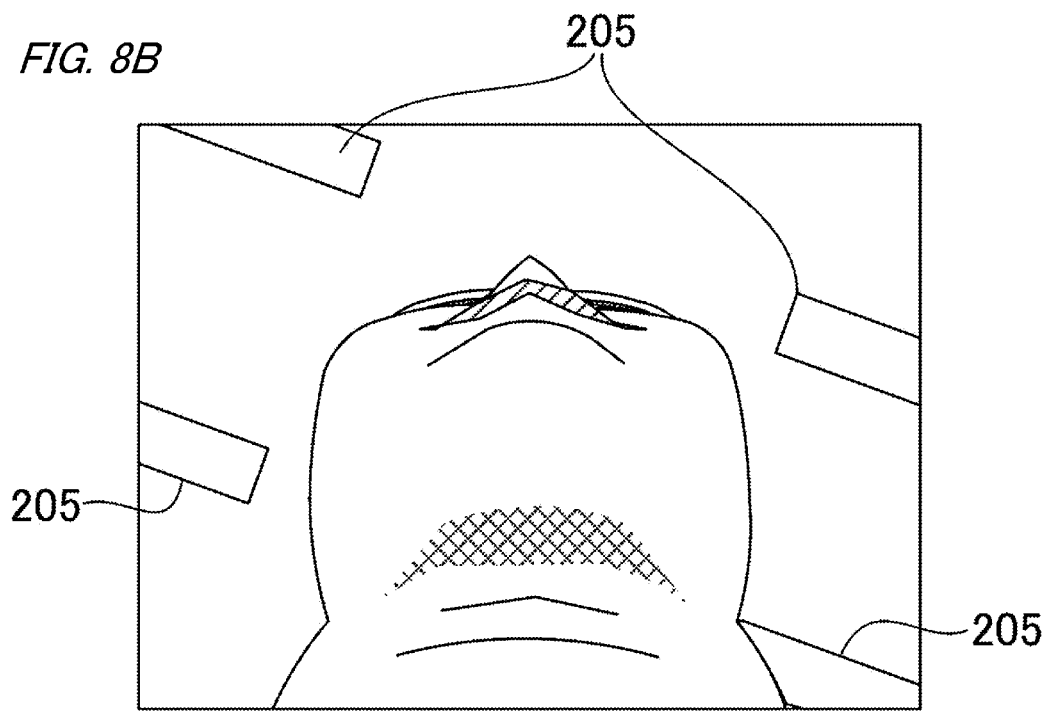
FIG. 8B is a diagram illustrating a case in which a fluorescent lamp present in an indoor place is shown as a background in a video of a user seen from the face direction detecting window.

FIG. 8B is a diagram illustrating a case in which fluorescent lamps present at an indoor place are shown in a video of a user seen from the face direction detecting window 13 as a background.

In the video illustrated in FIG. 8B, a plurality of fluorescent lamps 205 present in the vicinity of the user are shown. In this way, in accordance with use conditions, various backgrounds and the like are shown in the infrared detection processing device 27, and thus it is difficult for the face direction detecting unit 20 and the overall control CPU 101 to separate a video of a face part from sensor data supplied from the infrared detection processing device 27. Recently, while there are technologies for separating such a video using AI or the like, the overall control CPU 101 is required to have a high capability, and thus such technologies are not appropriate for the camera main body 1 that is a portable device.

Actually, the face direction detecting window 13 is configured using a visible light cutoff filter and hardly transmits visible light, and thus a video of the infrared detection processing device 27 is not like the videos illustrated in FIGS. 8A and 8B.

Figure 8C:
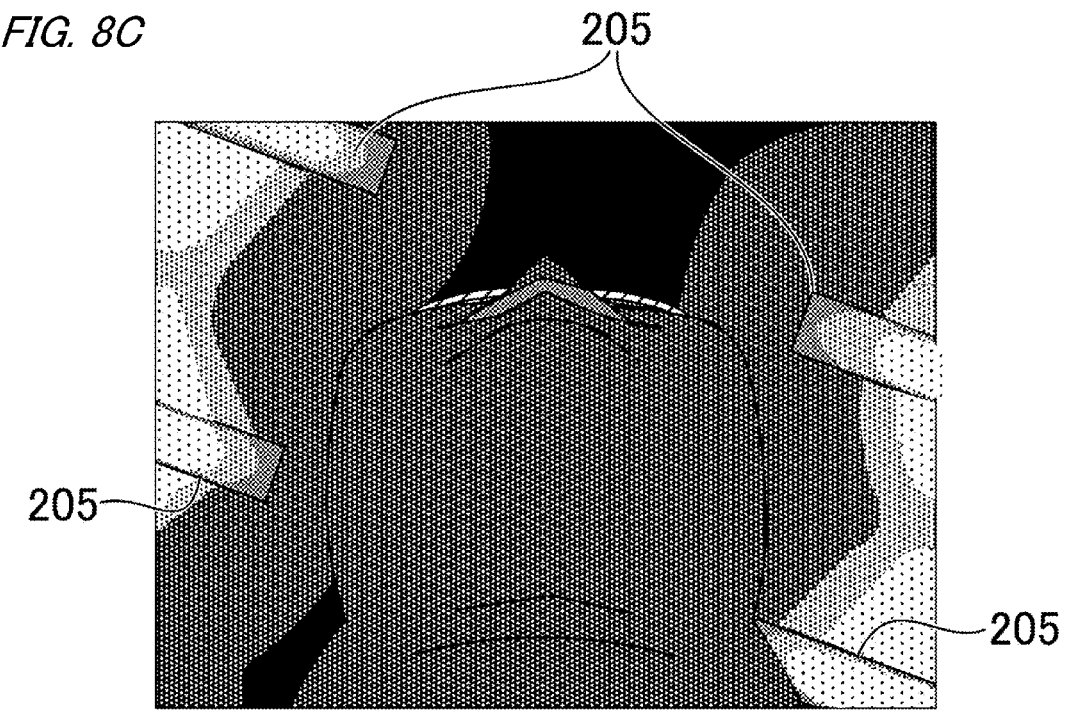
FIG. 8C is a diagram illustrating a video acquired in a case in which the user and the fluorescent lamp as the background thereof illustrated in FIG. 8B are formed as an image, in a state in which an infrared LED of the infrared detection processing device is not turned on, using a sensor of the infrared detection processing device through the face direction detecting window.

FIG. 8C is a diagram illustrating a video acquired in a case in which the user and the fluorescent lamps as a background thereof illustrated in FIG. 8B are formed as an image by a sensor of the infrared detection processing device 27 through the face direction detecting window 13 in a state in which the infrared LED 22 is not turned on.

In the video illustrated in FIG. 8C, the neck and the jaw of the user are darkened. On the other hand, the fluorescent lamp 205 has not only visible light but also an infrared ray component and thus is shown to be slightly bright.

Figure 8D:
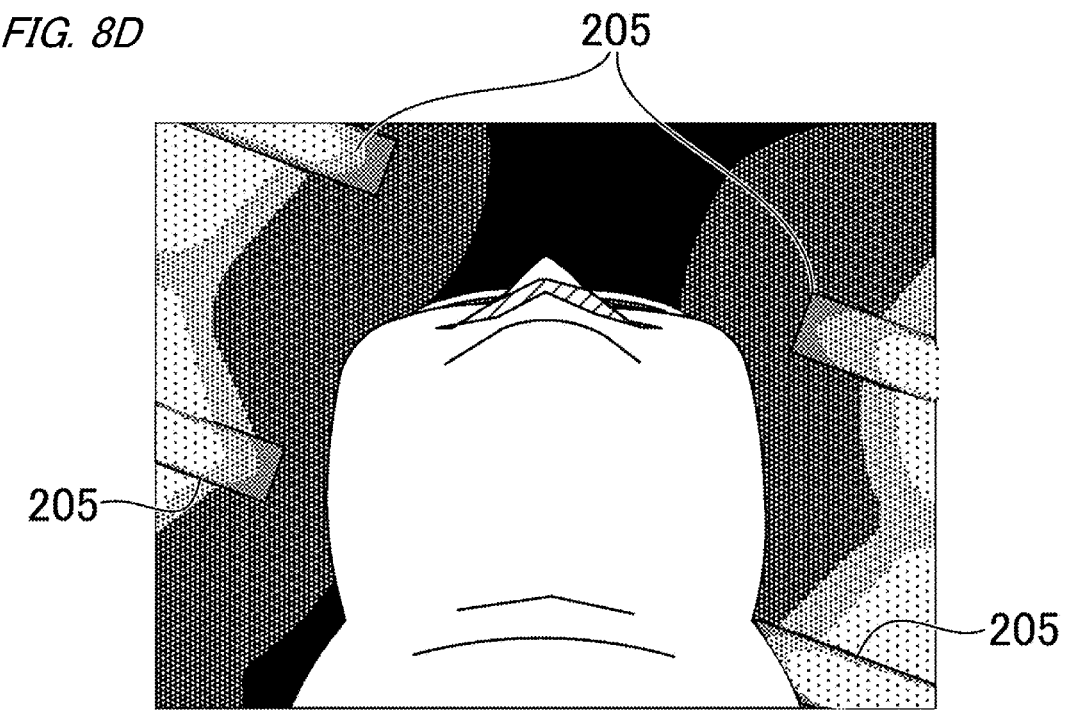
FIG. 8D is a diagram illustrating a video acquired in a case in which the user and fluorescent lamp as a background thereof illustrated in FIG. 8B are formed as an image in a state, in which an infrared LED is turned on, using a sensor of the infrared detection processing device through the face direction detecting window.

FIG. 8D is a diagram illustrating a video acquired in a case in which the user and the fluorescent lamps as a background thereof illustrated in FIG. 8B are formed as an image using a sensor of the infrared detection processing device 27 through the face direction detecting window 13 in a state in which the infrared LED 22 is turned on.

In the video illustrated in FIG. 8D, the neck and the jaw of the user is brightened, unlike in FIG. 8C. On the other hand, there is no change in the brightness of the vicinity of the fluorescent lamp 205 and the like.

Figure 8E:
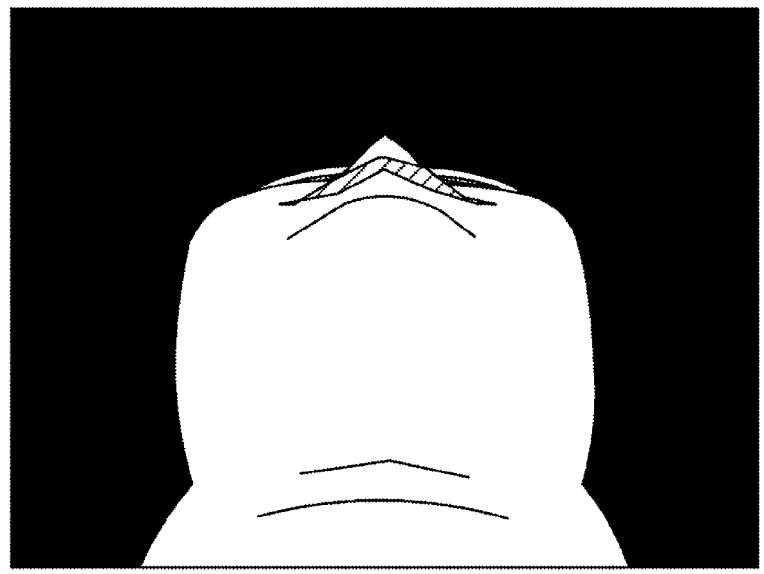
FIG. 8E is a diagram illustrating a differential video calculated from the videos illustrated in FIGS. 8C and 8D.

FIG. 8E is a diagram illustrating a differential video calculated from the videos illustrated in FIGS. 8C and 8D. It can be understood that the face of the user has risen.

In this way, by calculating a difference between videos imaged by the sensor of the infrared detection processing device 27 at the time of turning-on and at the time of turning-off of the infrared LED 22, the overall control CPU 101 (a video acquiring unit) acquires a differential video (hereinafter, also referred to as a face video) in which a face of the user is extracted.

The face direction detecting unit 20 according to this embodiment employs a system in which a face video is acquired by extracting an infrared ray reflection intensity as a two-dimensional image using the infrared detection processing device 27. The sensor of the infrared detection processing device 27 employs a structure that is similar to that of a general imaging element and acquires one frame of a face image at each time. A vertical synchronization signal (hereinafter, referred to as a signal V) taking the frame synchronization is generated by the infrared detection processing device 27 and is output to the overall control CPU 101.

FIGS. 9A to 9E are timing diagrams illustrating turn-on/turn-off timings of the infrared LED 22.

FIG. 9A illustrates a timing at which the signal V is generated by the infrared detection processing device 27. In accordance with the signal V becoming Hi, timings of frame synchronization and turn-on/turn-off of the infrared LED 22 are measured.

In FIG. 9A, t1 represents a face image acquisition period of a first time, and t2 represents a face image acquisition period of a second time. In FIGS. 9A to 9D, time axes of the horizontal axes thereof are represented as being the same.

In FIG. 9B, a position H of an image signal output from the sensor of the infrared detection processing device 27 is represented in the vertical axis. The infrared detection processing device 27 performs control of movement of the sensor such that, as illustrated in FIG. 9B, the position H of the image signal is synchronized with a signal V. The sensor of the infrared detection processing device 27 employs a structure similar to that of a general imaging element as described above, and the movement thereof is known, and thus description of detailed control will be omitted.

FIG. 9C illustrates high/low level switching timings of a signal IR-ON output from the overall control CPU 101 to the infrared LED lighting circuit 21. The high/low level switching of the signal IR-ON, as illustrated in FIG. 9C, is controlled by the overall control CPU 101 such that it is synchronized with the signal V. More specifically, the overall control CPU 101 outputs a signal IR-ON of the low level to the infrared LED lighting circuit 21 during a period of t1 and outputs a signal IR-ON of the high level to the infrared LED lighting circuit 21 during a period of t2.

Here, during the period of the signal IR-ON being high, the infrared LED lighting circuit 21 turns on the infrared LED 22, and an infrared ray 23 is projected to a user. On the other hand, during the period of the signal IR-ON being low, the infrared LED lighting circuit 21 turns off the infrared LED 22.

FIG. 9D is captured image data output from the sensor of the infrared detection processing device 27 to the overall control CPU 101. A vertical direction represents a signal intensity and represents a light reception amount of the reflected light beam 25. In other words, during the period of t1, the infrared LED 22 is turned off, and thus a state in which there is no reflected light beam 25 transmitted from the face part of the user is formed, and captured image data as illustrated in FIG. 8C is acquired. On the other hand, during the period of t2, the infrared LED 22 is turned on, and thus a state in which there is a reflected light beam 25 transmitted from the face part of the user is formed, and captured image data as illustrated in FIG. 8D is acquired. For this reason, as illustrated in FIG. 9D, a signal intensity during the period of t2 rises from the signal intensity during the period of t1 by the reflected light beam 25 transmitted from the face part of the user.

FIG. 9E is acquired by taking a difference between captured image data during the period of t1 and captured image data during the period of t2 illustrated in FIG. 9D, and, as illustrated in FIG. 8E, captured image data acquired by extracting only a component of the reflected light beam 25 transmitted from the face of the user is acquired.

The face direction detecting process of Step S200 is illustrated in FIG. 7C in a state in which the operations described with reference to FIGS. 8C to 8E and FIGS. 9A to 9E are included.

First, in Step S201, when it becomes a timing V1 at which the period of t1 starts in the signal V output from the infrared detection processing device 27, the process proceeds to Step S202.

Next, in Step S202, the signal IR-ON is set to a low level and is output to the infrared LED lighting circuit 21. In accordance with this, the infrared LED 22 is turned off.

In Step S203, captured image data corresponding to one frame that is output from the infrared detection processing device 27 during the period of t1 is read, and the read data is temporarily stored in the primary memory 103 as Frame1.

In Step S204, when it becomes a timing V2 at which the period of t2 starts in the signal V output from the infrared detection processing device 27, the process proceeds to Step S205.

In Step S205, the signal IR-ON is set to the high level and is output to the infrared LED lighting circuit 21. In accordance with this, the infrared LED 22 is turned on.

In Step S206, captured image data corresponding to one frame that is output from the infrared detection processing device 27 during the period of t2 is read, and the read data is temporarily stored in the primary memory 103 as Frame2.

In Step S207, the signal IR-ON is set to the low level and is output to the infrared LED lighting circuit 21. In accordance with this, the infrared LED 22 is turned off.

In Step S208, Frame1 and Frame2 are read from the primary memory 103, and an optical intensity Fn of the component of the reflected light beam 25 of the user illustrated in FIG. 9E that is a difference acquired by subtracting Frame1 from Frame2 is calculated (this is a process generally called dark subtraction).

In Step S209, a neck position (a neck rotation center) is extracted from the optical intensity Fn.

First, the overall control CPU 101 (a dividing unit) divides a face video into a plurality of distance areas to be described with reference to FIG. 8F on the basis of the optical intensity Fn.

Figure 8F:
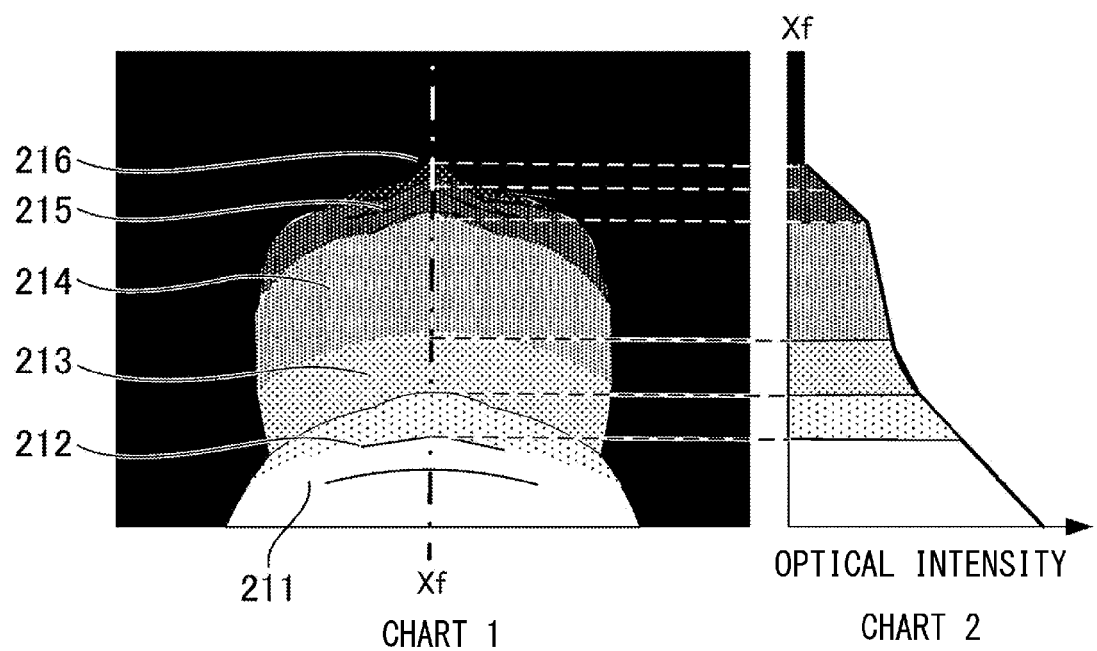
FIG. 8F is a diagram illustrating a case in which shading of the differential video illustrated in FIG. 8E is adjusted in scale to an optical intensity of a reflected light beam of an infrared ray projected to the face and the neck of a user.

FIG. 8F is a diagram illustrating a case in which shading of the differential video illustrated in FIG. 8E is adjusted in scale to the optical intensity of the reflected light beam 25 of the infrared ray 23 projected to the face and the neck of the user for viewing the distribution of optical amounts at respective positions of the face and the neck of the user.

CHART 1 of FIG. 8F is a diagram, for simplification of description, acquired by dividing a distribution of the optical intensity of the reflected light beam 25 in the face video illustrated in FIG. 8E into areas and illustrated in grey levels. An Xf axis is taken in a direction from a center part of the neck of a user to the jaw tip for description.

In CHART 2 of FIG. 8F, a horizontal axis represents the optical intensity on the Xf axis of CHART 1 of FIG. 8F, and a horizontal axis represents the Xf axis. In the horizontal axis, the optical intensity becomes stronger toward the right side.

In CHART 1 of FIG. 8F, a face video is divided into six areas (distance areas) 211 to 216 according to the optical intensity.

The area 211 is an area in which an optical intensity is the strongest and is represented in white as a grey level.

The area 212 is an area of which an optical intensity is slightly lower than that of the area 211 and is represented in quite bright grey as a grey level.

The area 213 is an area of which an optical intensity is further lower than that of the area 212 and is represented in bright grey as a grey level.

The area 214 is an area of which an optical intensity is further lower than that of the area 213 and is represented in intermediate grey as a grey level.

The area 215 is an area of which an optical intensity is further lower than that of the area 214 and is represented in slightly dark grey as a grey level.

The area 216 is an area of which an optical intensity is the weakest and is represented in the darkest grey as a grey level. An upper side of the area 216 is in black having no optical intensity.

Hereinafter, such an optical intensity will be described in detail with reference to FIGS. 10A to 10D.

FIGS. 10A to 10D are diagrams illustrating movement of a user's face in a vertical direction and represent states observed from a left horizontal direction of the user.

Figure 10A:
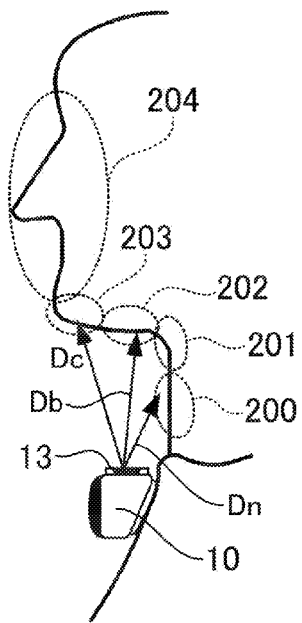
FIGS. 10A to 10D are diagrams illustrating movement of a user's face in a vertical direction.

FIG. 10A is a diagram illustrating an appearance in which a user faces the front face. The imaging/detecting unit 10 is present in front of the clavicle of a user. In addition, an infrared ray 23 of the infrared LED 22 is emitted from the face direction detecting window 13 disposed in an upper part of the imaging/detecting unit 10 to a lower part of a user head part. When a distance from the face direction detecting window 13 to a base 200 of the neck on the clavicle of the user is denoted by Dn, a distance from the face direction detecting window 13 to a base 202 of the jaw is denoted by Db, and a distance from the face direction detecting window 13 to the jaw tip 203 is denoted by Dc, it can be understood that the distances are long in order of Dn, Db, and Dc. Since an optical intensity is inversely proportional to the square of the distance, an optical intensity acquired when the reflected light beam 25 transmitted from the infrared ray emission surface 24 is formed in the sensor of the infrared detection processing device 27 as an image is weak in order of the base 200 of the neck, the base 202 of the jaw, and the jaw tip 203. In addition, the optical intensity of the face 204 including the nose that is located at a position to which the distance from the face direction detecting window 13 is longer than Dc is further darkened. In other words, in the case as illustrated in FIG. 10A, a video having a distribution of optical intensities illustrated in FIG. 8F is acquired.

The configuration of the face direction detecting unit 20 is not limited to the configuration illustrated in this embodiment as long as a face direction of a user can be detected. For example, an infrared ray pattern may be emitted from an infrared LED 22 (an infrared ray pattern emitting unit), and the infrared ray pattern reflected from an emission target may be detected by a sensor (an infrared ray pattern detecting unit) of the infrared detection processing device 27. In such a case, it is preferable that the sensor of the infrared detection processing device 27 be a structured optical sensor. In addition, the sensor of the infrared detection processing device 27 may be a sensor (an infrared ray phase comparing unit) that compares phases of the infrared ray 23 and the reflected light beam 25 with each other, for example, a Tof sensor.

Next, extraction of a neck position in Step S209 illustrated in FIG. 7C will be described with reference to FIG. 8G.

Figure 8G:
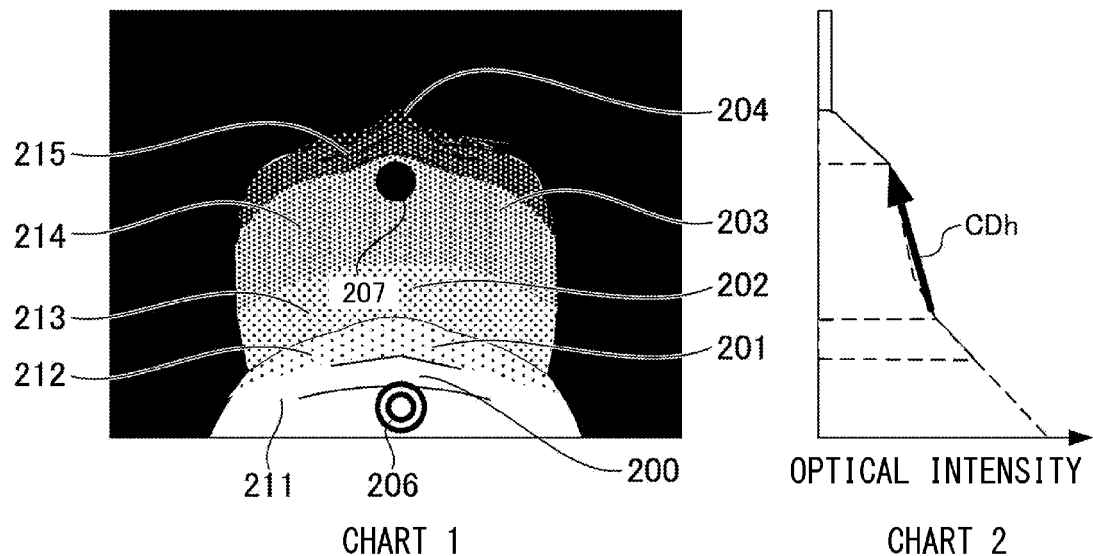
FIG. 8G is a diagram in which signs representing parts of the body of a user and signs of a double circle and a black circle respectively representing a neck position and a jaw tip position are superimposed on FIG. 8F.

CHART 1 of FIG. 8G is a diagram in which reference signs representing parts of the body of the user illustrated in FIG. 10A and signs of a double circle and a black circle respectively representing a neck position and a jaw tip position are superimposed in FIG. 8F.

A white area 211 corresponds to the base 200 of the neck (FIG. 10A), a quite bright grey area 212 corresponds to the neck front part 201 (FIG. 10A), and a bright grey area 213 corresponds to the base 202 of the jaw (FIG. 10A). In addition, an intermediate grey area 214 corresponds to the jaw tip 203 (FIG. 10A), and a slightly dark grey area 215 corresponds to lips positioned in a lower part of the face 204 (FIG. 10A) and a face lower part present in the vicinity thereof. Furthermore, a dark grey area 216 corresponds to a nose positioned at the center of the face 204 (FIG. 10A) and a face upper part present in the vicinity thereof.

As illustrated in FIG. 10A, a difference between the distances Db and Dc is small with respect to a distance from the face direction detecting window 13 to the other parts of the user, and thus a difference in the reflected optical intensity between the bright grey area 213 and the intermediate grey area 214 is small as well.

On the other hand, as illustrated in FIG. 10A, the distance Dn is the shortest distance among distances from the face direction detecting window 13 to parts of the user, and thus the white area 211 corresponding to the base 200 of the neck is a place at which the reflection intensity is the strongest.

Thus, the overall control CPU 101 (a setting unit) sets a position 206 denoted by the double circle in CHART 1 of FIG. 8G that is closest to the imaging/detecting unit 10 at the horizontal center of the area 211, which is in the vicinity of the base 200 of the neck of the area 211, as a position of the center of neck rotation (hereinafter, referred to as a neck position 206). The process until now represents details performed in Step S209 illustrated in FIG. 7C.

Next, extraction of a jaw tip position of Step S210 illustrated in FIG. 7C will be described with reference to FIG. 8G.

An intermediate grey area 214 that is brighter than an area 215 corresponding to a face lower part including lips in the face 204 illustrated in CHART 1 of FIG. 8G is an area including a jaw tip. As can be understood from CHART 2 of FIG. 8G, in the area 215 that is in contact with the area 214, the optical intensity drastically falls, and a distance change from the face direction detecting window 13 increases. The overall control CPU 101 determines the area 214 in front of the area 215 in which there is a drastic falloff of the optical intensity to be a jaw tip area. In addition, the overall control CPU 101 calculates (extracts) a position that is the farthest from the neck position 206 (a position represented using a black circle in CHART 1 of FIG. 8G) at the horizontal center of the area 214 as a jaw tip position 207.

Figure 8H:
FIG. 8H is a diagram illustrating a differential video calculated using a method similar to that of FIG. 8E when a user's face is directed toward a right side.
Figure 8I:
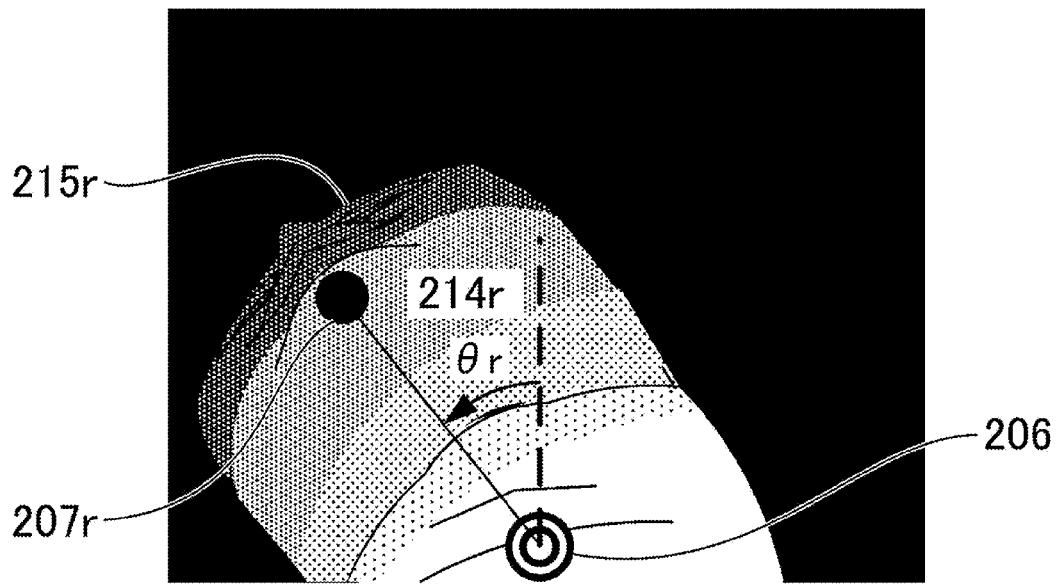
FIG. 8I is a diagram in which signs of a double circle and a black circle representing a neck position and a jaw tip position are superimposed in FIG. 8H.

For example, FIGS. 8H and 8I illustrate changes acquired when the face faces a right side.

FIG. 8H is a diagram illustrating a differential video calculated using a method similar to that illustrated in FIG. 8E when the face of the user faces the right side. FIG. 8I is a diagram acquired by superimposing signs of a double circle and a black circle respectively representing the neck position 206 and the jaw tip position 207r that are center positions of a neck operation in FIG. 8H.

Since the user faces the right side, the area 214 moves to an area 214r, which is represented in FIG. 8I, that is present in a leftward direction when upwardly seen from the imaging/detecting unit 10 side. The area 215 corresponding to the face lower part including lips in the face 204 also moves to an area 215r that is present in a leftward direction when upwardly seen from the imaging/detecting unit 10 side.

Thus, the overall control CPU 101 determines an area 214r present in front of the area 215r in which there is a drastic falloff of the optical intensity as a jaw tip area. In addition, the overall control CPU 101 calculates (extracts) a position farther from the neck position 206 at the horizontal center of the area 214r (a position denoted by a black circle in FIG. 8I) as a jaw tip position 207r.

Thereafter, the overall control CPU 101 acquires a movement angle θr representing the amount of movement of the jaw tip position 207r illustrated in FIG. 8I from the jaw tip position 207 of CHART 1 of FIG. 8G to the right side with respect to the neck position 206 as a center. As illustrated in FIG. 8I, the movement angle θr is an angle of the horizontal direction of the face of the user.

By using the method described above, in Step S210, a jaw tip position and an angle of the horizontal direction of the face of the user are detected by the infrared detection processing device 27 of the face direction detecting unit 20 (a three-dimensional detection sensor).

Next, detection of an upward direction of the face will be described.

Figure 10B:
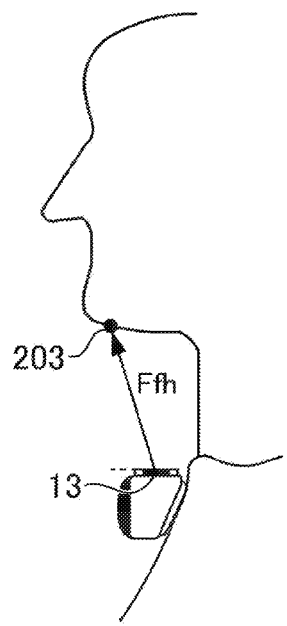
Figure 10C:
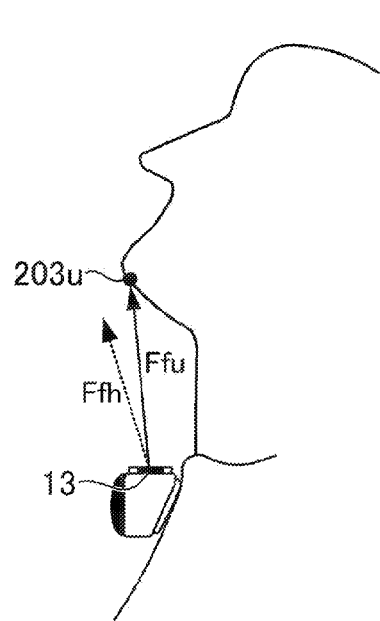

FIG. 10B is a diagram illustrating an appearance in which a user directs his or her face in a horizontal direction, and FIG. 10C is a diagram illustrating an appearance in which a user directs his or her face upwardly from the horizontal direction by 33°.

In FIG. 10B, a distance from the face direction detecting window 13 to a jaw tip 203 is denoted by Ffh, and, in FIG. 10C, a distance from the face direction detecting window 13 to a jaw tip 203u is denoted by Ffu.

As illustrated in FIG. 10C, the jaw tip 203u also moves upward together with the face, and thus it can be understood that the distance Ffu is longer than the distance Ffh.

Figure 8J:
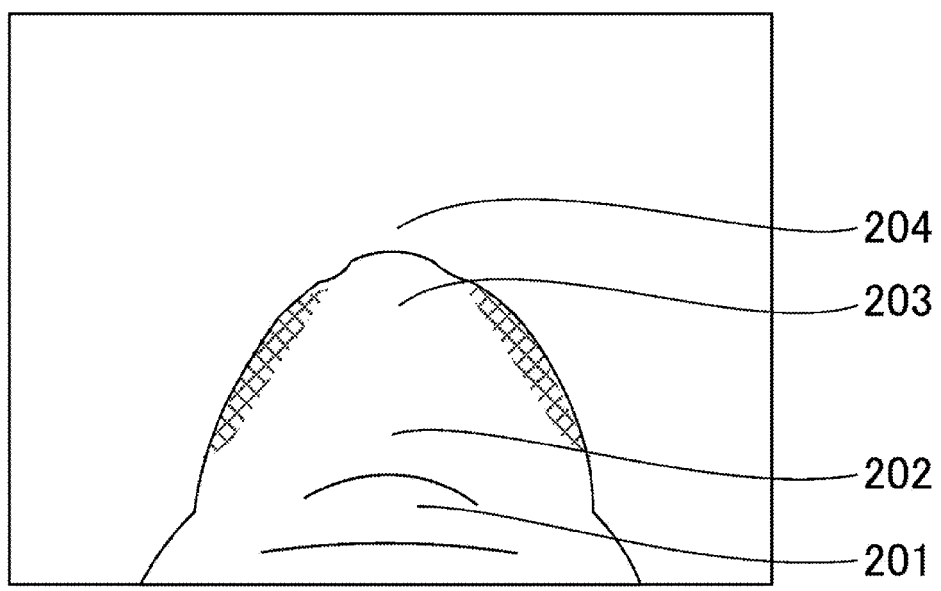
FIG. 8J is a diagram illustrating a video of a user seen from a face direction detecting window when the user has his or her face directed to a side upper than the horizontal side by 33°.

FIG. 8J is a diagram illustrating a video of a user seen from the face direction detecting window 13 when a user directs his or her face upward from the horizontal direction by 33°. As illustrated in FIG. 10C, the user faces upward, and thus, from the face direction detecting window 13 positioned below the jaw of the user, a face 204 including lips and a noise is not seen, and up to the jaw tip 203 is seen. At this time, the distribution of the optical intensity of a reflected light beam 25 acquired when an infrared ray 23 is emitted to a user is illustrated in FIG. 8K. FIG. 8K is a diagram in which signs of a double circle and a black circle respectively representing the neck position 206 and the jaw tip position 207u are superimposed in a differential video calculated using a method similar to that illustrated in FIG. 8E.

6 areas 211u to 216u corresponding to the optical intensity illustrated in FIG. 8K are areas denoted by attaching "u" to areas of the same optical intensities as those of the areas illustrated in FIG. 8F. It can be understood that, although the optical intensity of the jaw tip 203 of the user is present in the intermediate grey area 214 in FIG. 8F, it is shifted to the grey side in FIG. 8K and is present in the slightly dark grey area 215u. In this way, as illustrated in FIG. 10C, it can be detected by the infrared detection processing device 27 that, the distance Ffu is longer than the distance Ffh, and as a result, the optical intensity of the reflected light beam 25 of the jaw tip 203 of the user becomes weaker to be in inverse proportion to the square of the distance.

Next, detection of a lower direction of a face will be described.

Figure 10D:
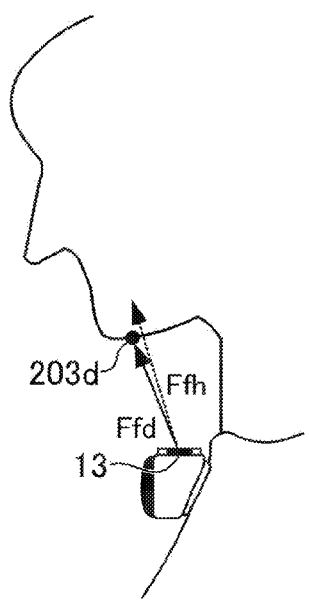

FIG. 10D is a diagram illustrating an appearance in which a user directs his or her face in a direction lower than the horizontal direction by 22°.

In FIG. 10D, a distance from the face direction detecting window 13 to the jaw tip 203d is denoted by Ffd.

As illustrated in FIG. 10D, the jaw tip 203d also moves downward together with the face, and thus it can be understood that the distance Ffd is shorter than the distance Ffh, and the optical intensity of the reflected light beam 25 of the jaw tip 203 becomes strong.

Referring back to FIG. 7C, in Step S211, the overall control CPU 101 (a distance calculating unit) calculates a distance from the jaw tip position to the face direction detecting window 13 using the optical intensity of the jaw tip position detected by the infrared detection processing device 27 of the face direction detecting unit 20 (a three-dimensional detection sensor). On the basis of this, an angle of the vertical direction of the face is also calculated.

In Step S212, angles of a horizontal direction (a first detection direction) of the face and a vertical direction (a second detection direction) perpendicular to this acquired in Steps S210 and S211 are stored in the primary memory 103 as a three-dimensional observation direction vi of the user (here, i is an arbitrary sign). For example, an observation direction vo of a case in which a user is observing a front face center part becomes vector information of [0°, 0°] due to the horizontal direction θh being 0° and the vertical direction θv being 0°. In addition, an observation direction vr of a case in which a user is observing a 45° right side becomes vector information of [45°, 0°].

In Step S211, although an angle of the vertical direction of a face is calculated by detecting a distance from the face direction detecting window 13, the calculation method is not limited thereto. For example, by comparing a variation level of the optical intensity of the jaw tip 203, an angle change may be calculated. In other words, for a gradient CDh of the reflected optical intensity of the jaw tip 203 from the base 202 of the jaw of CHART 2 of FIG. 8G, an angle change of the jaw may be calculated on the basis of a gradient change of a gradient CDu of the reflected optical intensity of the jaw tip 203 from the base 202 of the jaw of CHART 3 of FIG. 8K.

FIG. 7D is a flowchart of a subroutine of recording direction/range determining process of Step S300 illustrated in FIG. 7A. Before details of this process are described, first, a super-wide angle video that is a target of which a recording direction and a recording range according to this embodiment are determined will be described with reference to FIG. 11A.

In the camera main body 1 according to this embodiment, the imaging unit 40 performs capturing of a super-wide angle video of the vicinity of the imaging/detecting unit 10 using the imaging lens 16 having a super-wide angle and cuts a part thereof, whereby acquisition of a video of an observation direction is achieved.

Figure 11A:
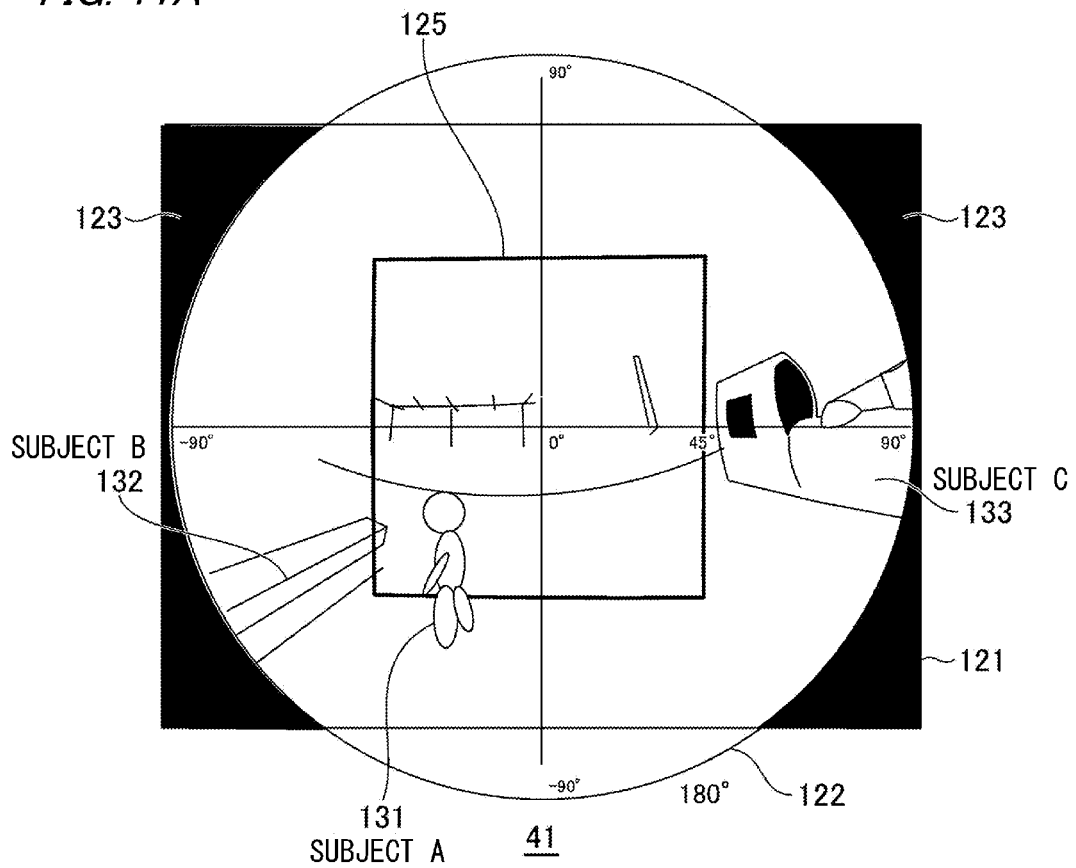
FIG. 11A is a diagram illustrating a target visual field in a super-wide angle video captured by an imaging unit of the camera main body in a case in which a user is directed toward a front side.

FIG. 11A is a diagram illustrating a target visual field 125 of a super-wide angle video captured by the imaging unit 40 in a case in which a user faces a front face.

As illustrated in FIG. 11A, a pixel area 121 that can be imaged by the solid-state imaging element 42 is a rectangular area. An effective projection section 122 (a predetermined area) is an area in which a circular semi-celestial sphere video that is fish-eye projected to the solid-state imaging element 42 is displayed by the imaging lens 16. The imaging lens 16 is adjusted such that the center of the pixel area 121 and the center of the effective projection section 122 coincide with each other.

An outermost periphery of the effective projection section 122 having a circular shape represents a position of a field of view (FOV) angle 180°. In a case in which a user is seeing the horizontal and vertical center, an angle of a target visual field 125 that is an area imaged and recorded from the center of the effective projection section 122 is 90° that is a half angle thereof. The imaging lens 16 according to this embodiment also can introduce a light beam of the outer side of the effective projection section 122 and can perform fish-eye projection of a light beam up to about a maximum FOV angle of 192° for the solid-state imaging element 42. However, when the effective projection section 122 is exceeded, the resolution power extremely deteriorates, the optical amount decreases, the distortion becomes strong, or the optical performance greatly deteriorates. This, in this embodiment, an example in which, in a recording area, a video of an observation direction is cut out only from the inside of a video projected to the pixel area 121 (hereinafter, simply referred to as a super-wide angle video) in the semi celestial sphere video displayed in the effective projection section 122 will be described.

In this embodiment, since a size of the effective projection section 122 in the vertical direction is larger than a size of a short side of the pixel area 121, a video of the upper and lower ends of the effective projection section 122 deviates from the pixel area 121, but the configuration is not limited thereto. For example, by changing the configuration of the imaging lens 16, all the effective projection section 122 may be designed to enter the inside of the pixel area 121.

An ineffective pixel area 123 is a pixel area that is not included in the effective projection section 122 in the pixel area 121.

The target visual field 125 is an area representing a range in which a video of an observation direction of a user is cut out from a super-wide angle image and is defined using vertical and horizontal angles of view (here, 45°, FOV angle) 90°, which are set in advance, having then observation direction as its center. In the example illustrated in FIG. 11A, the user faces the front face, and thus the center of the target visual field 125 is in the observation direction vo that is the center of the effective projection section 122.

In the super-wide angle video illustrated in FIG. 11A, a subject A131 that is a child, a subject B132 that is stairs to be stepped up by the child who is the subject A, and a subject C133 that is a play tool in the form of a train are included.

Next, the recording direction/range determining process of Step S300 that is performed for acquiring a video of the observation direction from the super-wide angle video described with reference to FIG. 11A described above is illustrated in FIG. 7D. Hereinafter, this process will be described with reference to FIGS. 12A to 12G that are specific examples of the target visual field 125.

In Step S301, an angle of view setting value ang set in advance is acquired by reading it from the primary memory 103.

In this embodiment, all the angles of view of 45°, 90°, 110°, and 130° with which a video of an observation direction can be cut out from a super-wide angle image by the image cutting-out/developing processing unit 50 are stored in the built-in nonvolatile memory 102 as angles of view setting value ang. In addition, in one of Steps S103, S106, and S108, one of angles of view setting value ang stored in the built-in nonvolatile memory 102 is set and is stored in the primary memory 103.

In addition, in Step S301, the observation direction vi determined in Step S212 is determined as a recording direction, and a video of a target visual field 125 cut out from the super-wide angle image with the angle of view setting value ang, which are acquired as above, having the determined direction as its center is stored in the primary memory 103.

For example, in a case in which the angle of view setting value ang is 90°, and an observation direction vo (vector information [0°, 0°]) is detected in the face direction detecting process (FIG. 7C), a range of horizontal 45° and vertical 45° having the center O of the effective projection section 122 as its center is set as a target visual field 125 (FIG. 11A). In other words, the overall control CPU 101 (a relative position setting unit) sets the angle of the face direction detected by the face direction detecting unit 20 as an observation direction vi that is vector information representing a relative position with respect to the super-wide angle video.

Here, in the case of the observation direction vo, most of the influence of an optical distortion according to the imaging lens 16 can be ignored, and thus the shape of the set target visual field 125 becomes a shape of a target visual field 1250 (FIG. 12A) after distortion conversion of Step S303 to be described below as it is. Here, a target visual field 125 after distortion conversion in the case of the observation direction vi will be referred to as a target visual field 125i.

Next, in Step S302, an image stabilization level set in advance is acquired by reading it from the primary memory 103.

In this embodiment, as described above, in one of Steps S103, S106, and S108, an image stabilization level is set and is stored in the primary memory 103.

In addition, in Step S302, a preliminary pixel quantity Pis for image stabilization is set on the basis of the acquired image stabilization level described above.

In an image stabilization process, in accordance with an amount of deviation of the imaging/detecting unit 10, a video according to a video of a direction opposite to the direction of deviation is acquired. For this reason, in this embodiment, a preliminary area required for image stabilization is provided in the vicinity of the target visual field 125i.

In addition, in this embodiment, a table in which a value of image-stabilization preliminary pixel number Pis is stored in association with each image stabilization level is stored in the built-in nonvolatile memory 102. For example, in a case in which the image stabilization level is "intermediate", a preliminary pixel area of 100 pixels that is an image-stabilization preliminary pixel number Pis read from the table described above is set as a preliminary area.

Figure 12A:
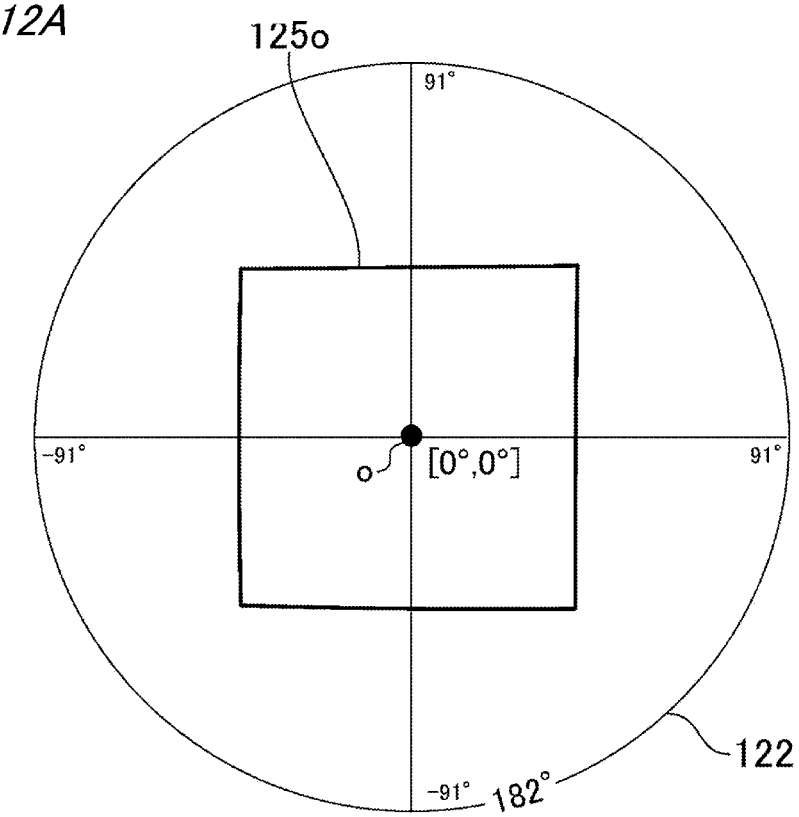
FIG. 12A is a diagram illustrating an example of a target visual field in a super-wide angle video.
Figure 12B:
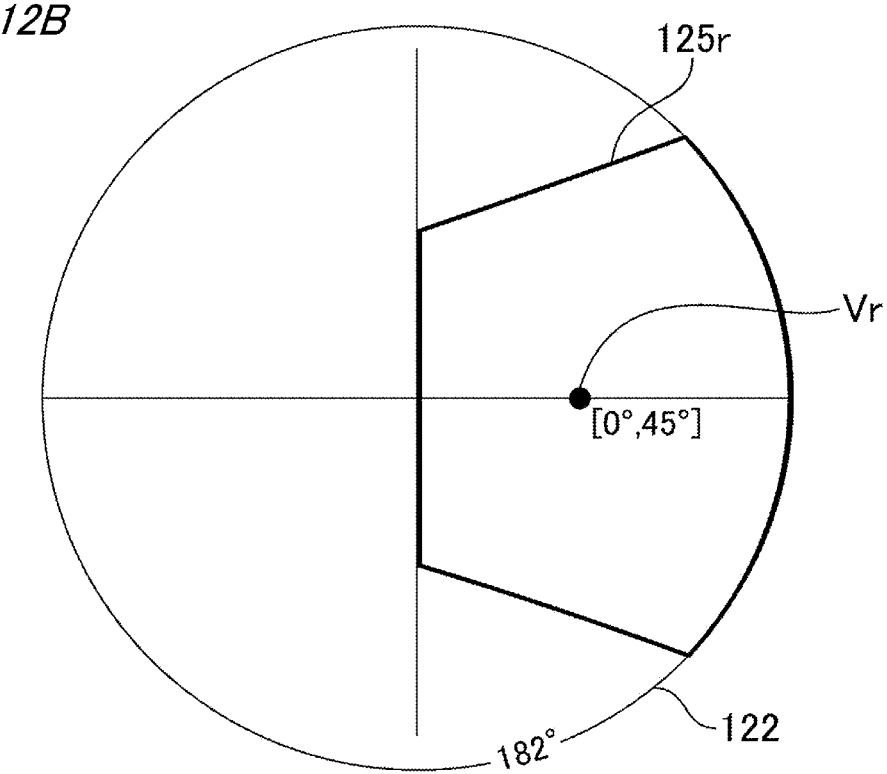
FIG. 12B is a diagram illustrating an example of a target visual field of which an angle of view setting value is the same as that of the target visual field illustrated in FIG. 12A and an observation direction is different from that thereof in a super-wide angle video.
Figure 12C:
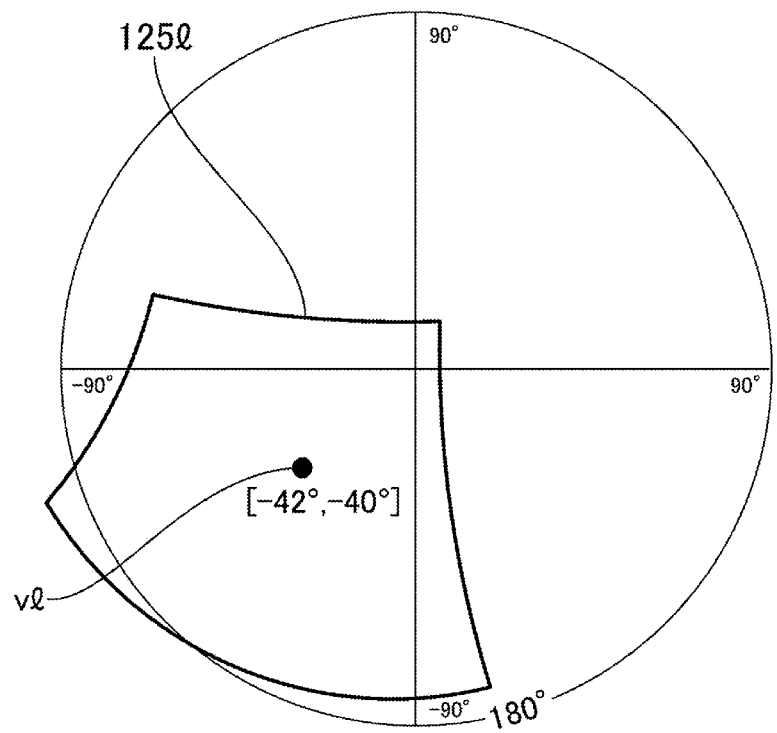
FIG. 12C is a diagram illustrating another example of a target visual field of which an angle of view setting value is the same as that of the target visual field illustrated in FIG. 12A and an observation direction is different from that thereof in a super-wide angle video.
Figure 12D:
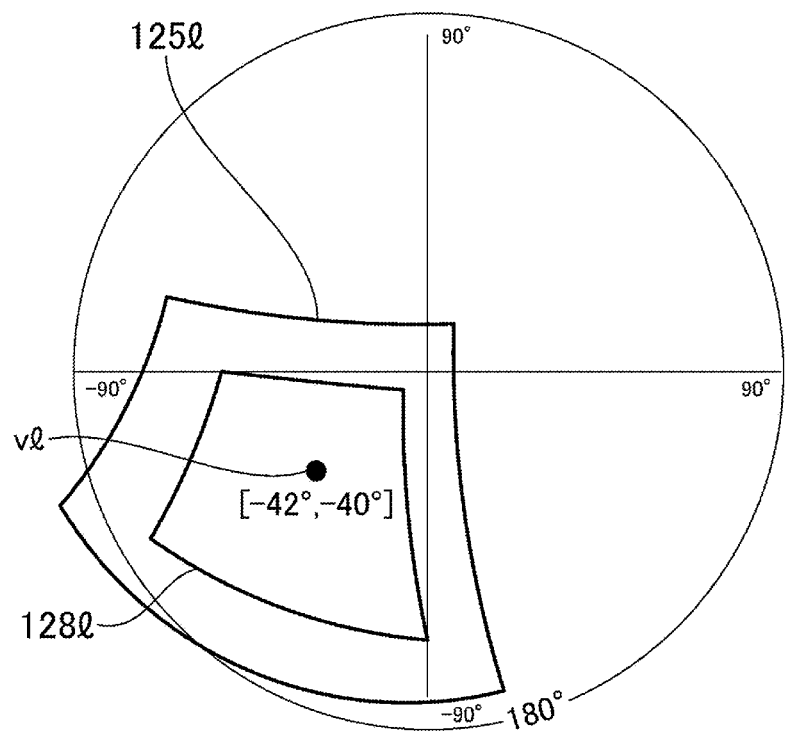
FIG. 12D is a diagram illustrating an example of a target visual field of which an observation direction is the same as the target visual field illustrated in FIG. 12C and an angle of view setting value is smaller than that thereof in a super-wide angle video.
Figure 12E:
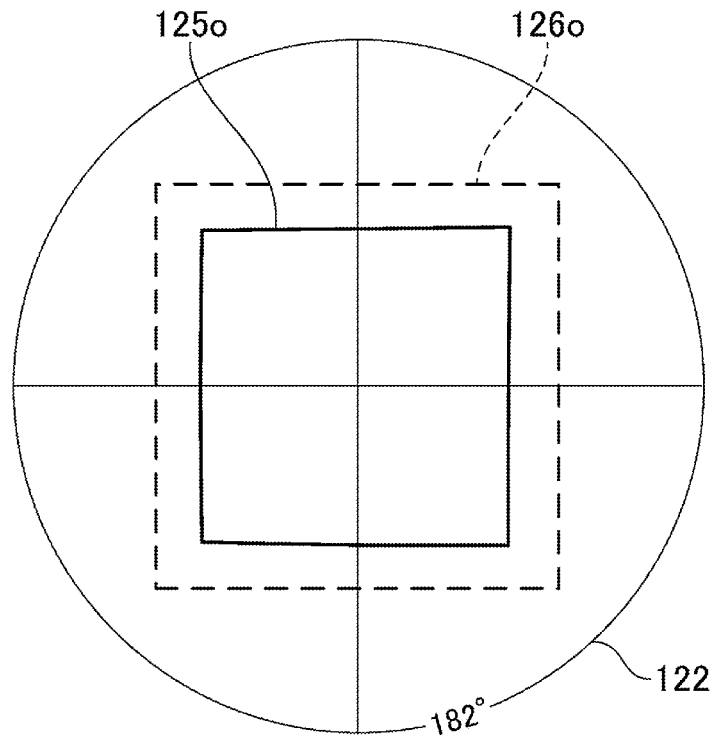
FIG. 12E is a diagram illustrating an example in which a preliminary area is assigned in the vicinity of the target visual field illustrated in FIG. 12A.

FIG. 12E is a diagram illustrating an example in which a preliminary area is assigned in the vicinity of the target visual field 1250 illustrated in FIG. 12A. Here, a case in which the image stabilization level is "intermediate", in other words, the image stabilization preliminary pixel quantity Pis is 100 pixels will be described.

As illustrated in FIG. 12E, a dotted-line part having a margin (preliminary area) of 100 pixels that is the image stabilization preliminary pixel quantity Pis on upper, lower, left, and right sides for the target visual field 1250 becomes an image stabilization preliminary pixel frame 1260.

In FIGS. 12A and 12E, for simplification of description, a case in which the observation direction vi coincides with the center O of the effective projection section 122 (the center of the optical axis of the imaging lens 16) has been described. However, as described in the following steps, in a case in which the observation direction vi is a peripheral part of the effective projection section 122, there is an influence of optical distortion, and thus conversion is necessary.

In Step S303, the shape of the target visual field 125 set in Step S301 is corrected (distortion conversion) in consideration of the observation direction vi and optical characteristics of the imaging lens 16, and a target visual field 125i is generated. Similarly, the preliminary pixel number Pis for image stabilization set in Step S302 is also corrected in consideration of the observation direction vi and the optical characteristics of the imaging lens 16.

For example, it is assumed that the angle of view setting value ang is 90°, and a user is observing a 45° right side from the center o. In this case, the observation direction vi determined in Step S212 is an observation direction vr (vector information [45°, 0°]), and a range of horizontal 45° and vertical 45° having the observation direction vr as its center becomes a target visual field 125. However, in consideration of optical characteristics of the imaging lens 16, the target visual field 125 is corrected to a target visual field 125r illustrated in FIG. 12B.

As illustrated in FIG. 12B, the target visual field 125r is widened toward the peripheral part of the effective projection section 122, and the position of the observation direction vr is also on a slightly inner side of the center of the target visual field 125*r*. The reason for this is that, in this embodiment, an optical design close to a stereoscopic projection fish-eye is performed for the imaging lens 16. In a case in which the imaging lens 16 is designed in accordance with an equal-distance projection fisheye, an equal-solid angle projection fisheye, an orthogonal projection fisheye, or the like, the relation is changed, and correction according to the optical characteristics is performed for the target visual field 125.

Figure 12F:
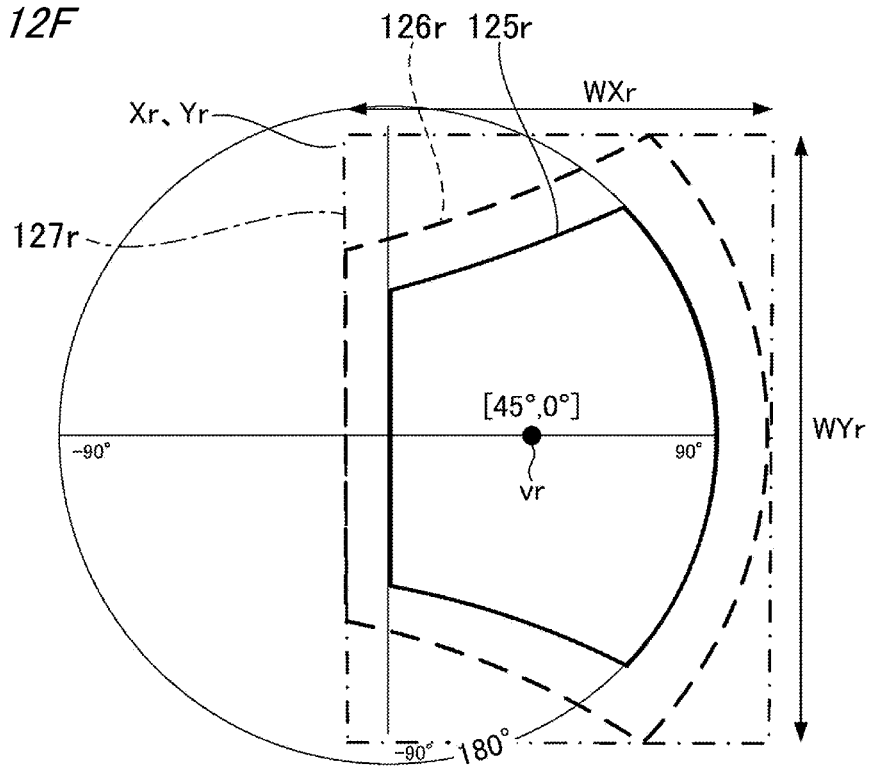
FIG. 12F is a diagram illustrating an example in which a preliminary area of the same image stabilization level as that of the preliminary area illustrated in FIG. 12E is assigned in the vicinity of the target visual field illustrated in FIG. 12B.

FIG. 12F is a diagram illustrating an example in which a preliminary area having the same image stabilization level of "intermediate" as that of the preliminary area illustrated in FIG. 12E is assigned in the vicinity of the target visual field 125*r* illustrated in FIG. 12B.

In the image stabilization preliminary pixel frame 126*i* (FIG. 12E), a margin of 100 pixels corresponding to the image-stabilization preliminary pixel number Pis is set to each of upper, lower, left, and right sides of the target visual field 125*i*. In contrast to this, in a preliminary pixel frame 126*r* (FIG. 12F) for image stabilization, the image-stabilization preliminary pixel number Pis is corrected to be increased toward the peripheral part of the effective projection section 122.

In this way, as illustrated in the preliminary pixel frame 126*r* for image stabilization illustrated in FIG. 12F, similar to the shape of the target visual field 125*r*, the shape of a preliminary area required for image stabilization disposed in the vicinity thereof also has a correction amount that becomes larger toward the peripheral part of the effective projection section 122. The reason for this is that, in this embodiment, an optical design close to a stereoscopic projection fisheye is performed for the imaging lens 16. In a case in which the imaging lens 16 is designed in accordance with an equal-distance projection fisheye, an equal-solid angle projection fisheye, an orthogonal projection fisheye, or the like, the relation is changed, and correction according to the optical characteristics is performed for the preliminary pixel frame 126*r* for image stabilization.

The process of sequentially switching of the target visual field 125 and the shape of the preliminary area in consideration of the optical characteristics of the imaging lens 16, which is performed in Step S303, is a complicated process. For this reason, in this embodiment, the process of Step S303 is performed using a table, in which a target visual field 125*i* for each observation direction vi and a shape of a preliminary area thereof are stored, present inside the built-in nonvolatile memory 102. Depending on the optical design of the imaging lens 16 provided in advance, by including a calculation equation inside the overall control CPU 101, and an optical distortion value may be calculated using the calculation equation.

In Step S304, a position and a size of a video recording range are calculated.

As described above, in Step S303, a preliminary area required for image stabilization is disposed in the vicinity of the target visual field 125*i*, and this is calculated as a preliminary pixel frame 126*i* for image stabilization. However, according to the position of the observation direction vi, for example, like the preliminary pixel frame 126*r* for image stabilization, the shape becomes quite special.

The overall control CPU 101 performs a process of developing only a range of such a special shape, whereby a video can be cut out. However, it is not general to use a video having a non-rectangular shape when the video is recorded as video data in Step S600 or the video is transmitted to the display device 800 in Step S700. Thus, in Step S304, a position and a size of a video recording frame 127*i* of a rectangular shape including this entire preliminary pixel frame 126*i* for image stabilization are calculated.

FIG. 12F illustrates a video recording frame 127*r*, which is denoted by a dashed line, calculated in Step S304 for the preliminary pixel frame 126*r* for image stabilization.

In Step S305, the position and the size of the video recording frame 127*i* calculated in Step S304 are recorded in the primary memory 103.

In this embodiment, coordinates Xi and Yi of the upper left side of the video recording frame 127*i* in a super-wide angle video are recorded as the position of the video recording frame 127*i*, and a horizontal width WXi and a vertical width WYi of the video recording frame 127*i* acquired from the coordinates Xi and Yi are recorded as the size of the video recording frame 127*i*. For example, for the video recording frame 127*r* illustrated in FIG. 12F, coordinates Xr and Yr, a horizontal width WXr, and a vertical width WYr illustrated in the drawing are recorded in Step S305. The coordinates Xi and Yi are XY coordinates having a predetermined reference point, more specifically, an optical center of the imaging lens 16 as its origin.

In this way, when the preliminary pixel frame 126*i* for image stabilization and the video recording frame 127*i* are determined, the process exits from this subroutine of Step S300 illustrated in FIG. 7D.

In the description presented until now, for simplification of description of complex optical distortion conversion, as an example of the observation direction vi, an observation direction including horizontal 0°, that is, the observation direction vo (vector information [0°, 0°]) and the observation direction vr (vector information [45°, 0°]) have been used for description. However, actually, observation directions vi of the user are various directions. Thus, hereinafter, the recording range developing process performed in such a case will be described.

For example, a target visual field 125*l* of a case in which the angle of view setting value ang is 90°, and the observation direction vl is [−42°, −40°] is as illustrated in FIG. 12C.

Figure 12G:
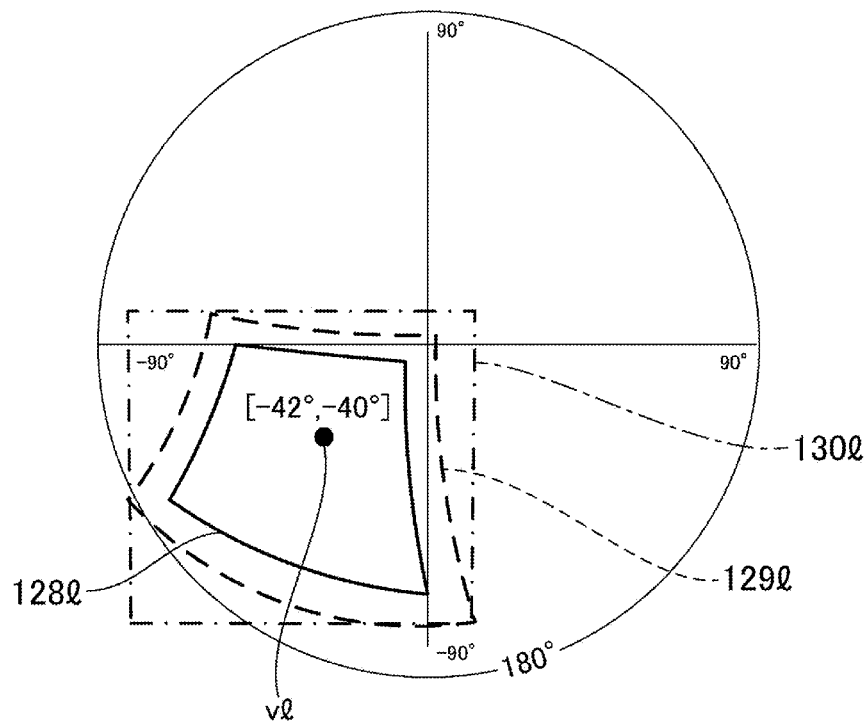
FIG. 12G is a diagram illustrating an example in which a preliminary area of the same image stabilization level as that of the preliminary area illustrated in FIG. 12E is assigned in the vicinity of the target visual field illustrated in FIG. 12D.

In addition, also in the case of the observation direction vl (vector information [−42°, −40°]) that is the same as the target visual field 125*l*, when the angle of view setting value ang is 45°, as illustrated in FIG. 12D, a target visual field 128*l* that is much smaller than the target visual field 125*l* is formed. Furthermore, for the target visual field 128*l*, as illustrated in FIG. 12G, a preliminary pixel frame 129*l* for image stabilization and a video recording frame 130*l* are set.

Step S400 is a basic operation of imaging, the imaging unit 40 uses a general sequence, and thus other literatures may be referred to for details, and here, description thereof will be omitted. In this embodiment, the imaging signal processing circuit 43 disposed in the imaging unit 40 also performs a process of correcting a signal in a unique output form (examples of specifications: MIPI and SLVS) that is output from the solid-state imaging element 42 to captured image data of a general sensor reading system.

In a case in which a mode selected by the imaging mode switch 12 is the moving image mode, the imaging unit 40 starts recording in accordance with press of the start switch 14. Thereafter, when the stop switch 15 is pressed, recording ends. On the other hand, in a case in which a mode selected by the imaging mode switch 12 is the still image mode, every time when there is press of the start switch 14, the imaging unit 40 captures a still image.

Figure 7E:
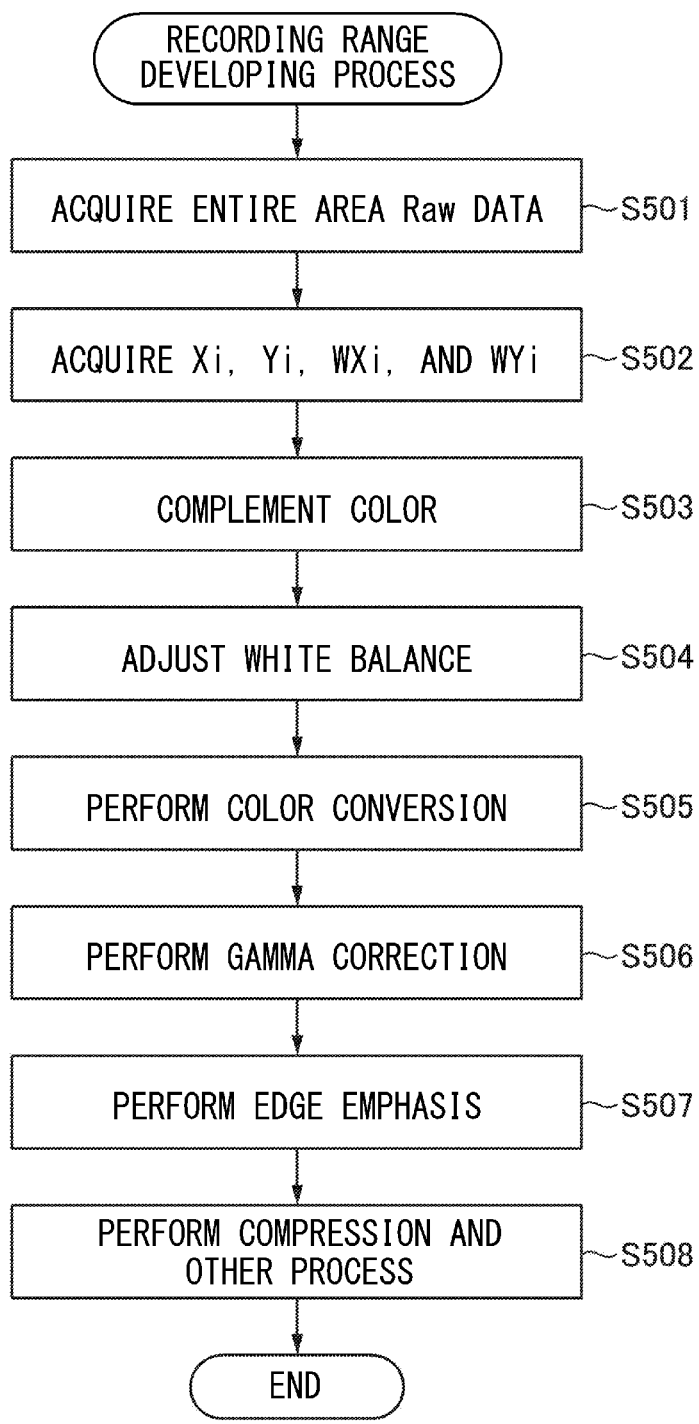
FIG. 7E is a flowchart of a subroutine of a recording range developing process of Step S500, which is illustrated in FIG. 7A, according to Embodiment 1.

FIG. 7E is a flowchart of a subroutine of the recording range developing process of Step S500 illustrated in FIG. 7A.

In Step S501, raw data of the entire area of captured image data (a super-wide angle video) generated by the imaging unit 40 in Step S400 is acquired and is input to a video capturing unit called a head part, which is not illustrated in the drawing, of the overall control CPU 101.

Next, in Step S502, a part of the video recording frame 127i is cut out from the super-wide angle video acquired in Step S501 on the basis of the coordinates Xi and Yi, the horizontal width WXi, and the vertical width WYi recorded in the primary memory 103 in Step S305. After this cutting-out, only for pixels inside the preliminary pixel frame 126i for image stabilization, a crop developing process (FIG. 7F) formed from Steps S503 to S508 that are performed hereinafter starts. In accordance with this, compared to a case in which a developing process is performed for the entire area of the super-wide angle video read in Step S501, the amount of calculation can be significantly reduced, and a calculation time and electric power can be reduced.

Figure 7F:
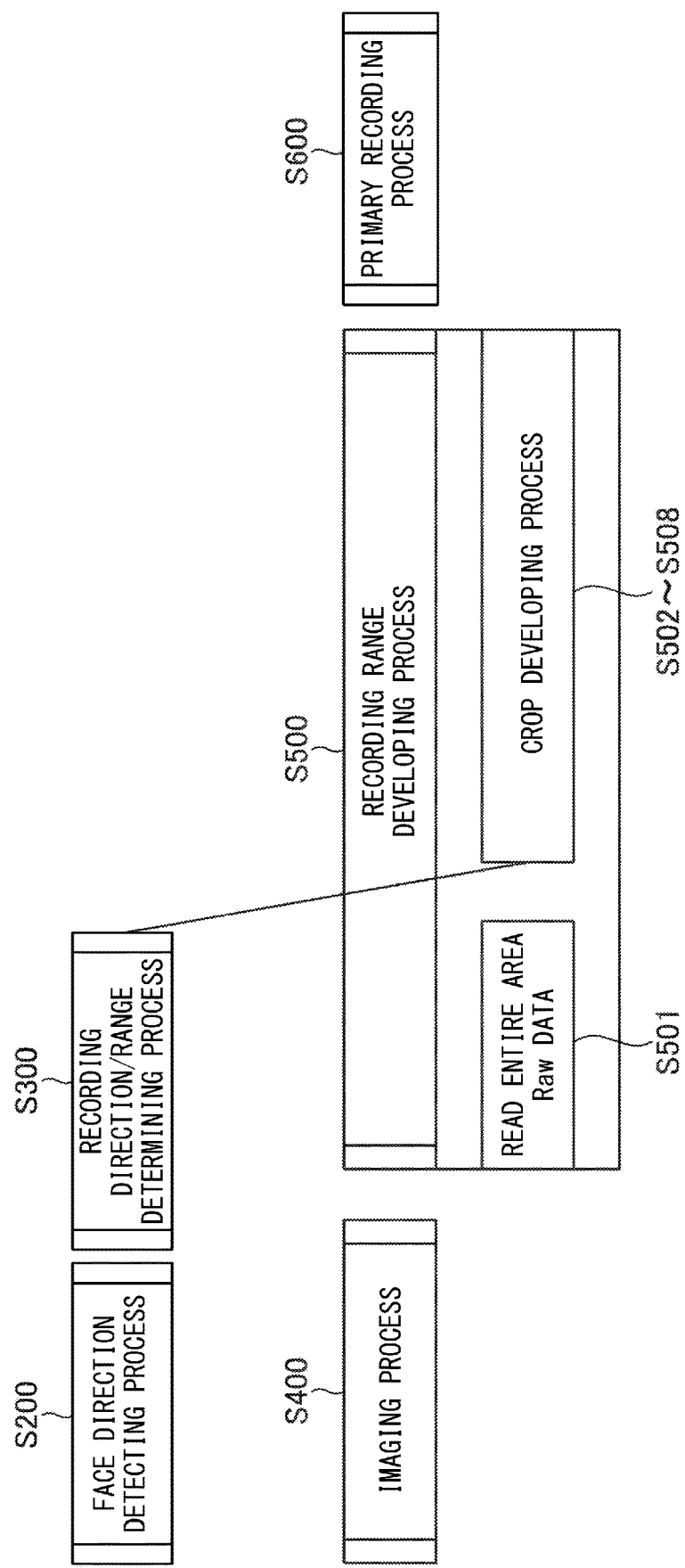
FIG. 7F is a diagram illustrating processes of Steps S200 to S500, which is illustrated in FIG. 7A, in a moving image mode.

As illustrated in FIG. 7F, in a case in which a mode selected by the imaging mode switch 12 is the moving image mode, processes of Steps S200 and S300 and a process of S400 are performed in parallel with the same frame rate or different frame rates. In other words, every time when raw data of the entire area corresponding to one frame generated by the imaging unit 40 is acquired, the crop developing process is performed on the basis of the coordinates Xi and Yi, the horizontal width WXi, and the vertical width WYi recorded in the primary memory 103 at the time point.

When the crop developing process for pixels inside the preliminary pixel frame 126i for image stabilization starts, first, color complementation for complementing color pixel information arranged in a Bayer array is performed in Step S503.

Thereafter, after adjustment of a white balance is performed in Step S504, color conversion is performed in Step S505.

In Step S506, a gamma correction for correcting gray scales in accordance with a gamma correction value set in advance is performed.

In Step S507, edge emphasis according to an image size is performed.

In Step S508, by performing processing other than compression, the data is converted into a data form that can be primarily stored and is recorded in the primary memory 103, and then, the process exits from this subroutine. Details of the data form that can be primarily stored will be described below.

The order of the crop developing process performed in Steps S503 to S508 and presence/absence of processing may be performed in accordance with the camera system and do not limit the present disclosure.

In addition, in a case in which the moving image mode is selected, the processes of Steps S200 to S500 are repeatedly performed until recording ends.

According to this process, compared to a case in which a developing process is performed for the entire area read in Step S501, the amount of calculation can be significantly reduced. For this reason, a microcomputer having low power consumption can be used at low cost as the overall control CPU 101, heat generation of the overall control CPU 101 can be inhibited, and the durability of the battery 94 is improved as well.

In addition, in this embodiment, in order to reduce a control load of the overall control CPU 101, an optical correction process (Step S800 illustrated in FIG. 7A) and an image stabilization process (Step S900 illustrated in FIG. 7A) for a video are not performed by the camera main body 1 but are performed by the display device control unit 801 after the video is transmitted to the display device 800. For this reason, if only data of a video that is partially cut out from a projected super-wide angle video is transmitted to the display device 800, the optical correction process and the image stabilization process cannot be performed. In other words, by using only data of the cut video, there is no position information that is used for a substitution into an equation at the time of performing the optical correction process or for a reference from a correction table at the time of performing the image stabilization process, and thus such processes cannot be correctly performed in the display device 800. For this reason, in this embodiment, not only data of a cut video but also correction data including information of a cutout position from a super-wide angle video of the video and the like is transmitted from the camera main body 1 to the display device 800.

Here, in a case in which the cut video is a still image video, also when data of the still image video and correction data are separately transmitted to the display device 800, there is a one-to-one correspondence between the data of the still image video and the correction data, and thus the optical correction process and the image stabilization process can be correctly performed in the display device 800. On the other hand, in a case in which the cut video is a moving image video, when data of the moving image video and correction data are separately transmitted to the display device 800, it is difficult to determine the transmitted correction data to be correction data of a certain frame of the moving image video. Particularly, when a clock rate of the overall control CPU 101 inside the camera main body 1 and a clock rate of the display device control unit 801 inside the display device 800 are subtly different, synchronization between the overall control CPU 101 and the display device control unit 801 is not taken in moving image capturing for several minutes. As a result, there are problems in that the display device control unit 801 corrects a frame to be processed using correction data different from correction data corresponding thereto and the like.

Thus, in this embodiment, in transmitting data of a cut moving image video from the camera main body 1 to the display device 800, correction data is appropriately assigned for the data of the moving image video. Hereinafter, a method thereof will be described.

Figure 14:
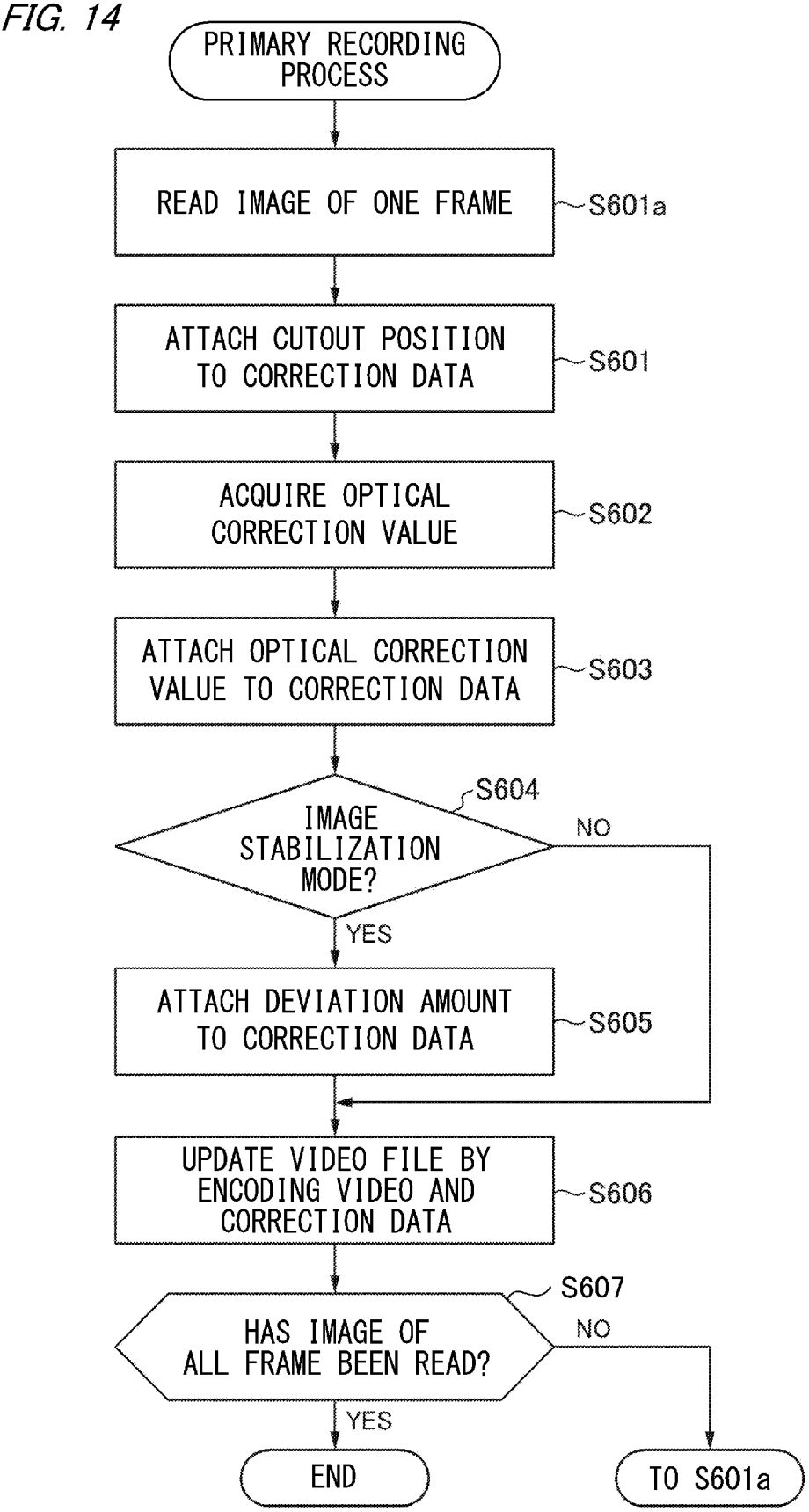
FIG. 14 is a flowchart of a subroutine of a primary recording process of Step S600 illustrated in FIG. 7A.

FIG. 14 is a flowchart of a subroutine of the primary recording process of Step S600 illustrated in FIG. 7A. Hereinafter, this process will be described with reference to FIG. 15. FIG. 14 illustrates processes performed in a case in which a mode selected by the imaging mode switch 12 is the moving image mode. In a case in which the selected mode is the still image mode, this process starts from a process of Step S601, and when a process of Step S606 ends, this process ends.

In Step S601a, the overall control CPU 101 reads an image of one frame for which processes of Steps S601 to S606 have not been processed from a moving image video developed in the recording range developing process (FIG. 7E). In addition, the overall control CPU 101 (a metadata generating unit) generates correction data that is metadata of the read frame.

In Step S601, the overall control CPU 101 attaches information of a cutout position of the image of the frame read in Step S600 to the correction data. The information attached here is coordinates Xi and Yi of the video recording frame 127*i* acquired in Step S305. The information attached here may be referred to as vector information representing the observation direction vi.

In Step S602, the overall control CPU 101 (an optical correction value acquiring unit) acquires an optical correction value. The optical correction value is an optical distortion value set in Step S303. Alternatively, the optical correction value may be a correction value according to lens optical characteristics such as a peripheral light quantity correction value and a diffraction correction.

In Step S603, the overall control CPU 101 attaches the optical correction value used for the distortion conversion of Step S303, which is acquired in Step S602, to the correction data.

In Step S604, the overall control CPU 101 determines whether or not the current mode is the image stabilization mode. More specifically, in a case in which the image stabilization mode set in advance is "intermediate" or "strong", the image stabilization mode is determined, and the process proceeds to Step S605. On the other hand, the image stabilization mode set in advance is "off", it is determined that the current mode is not the image stabilization mode, and the process proceeds to Step S606. Here, the reason for skipping Step S605 in a case in which the image stabilization mode is "off" is that a calculation data amount of the overall control CPU 101 and an amount of data at the time of wireless transmission can be reduced in accordance with the skip, and power reduction and heat generation reduction of the camera main body 1 can be performed. Here, although reduction of data used in the image stabilization process has been described, data reduction may be performed for a peripheral light quantity correction value included in the optical correction value acquired in Step S602 and presence/absence of analysis correction.

In this embodiment, although the image stabilization mode is set in advance in accordance with a user's operation using the display device 800, the image stabilization mode may be set as an initial setting of the camera main body 1. In addition, in a case in which a camera system in which presence/absence of the image stabilization process is switched after transmission of a video to the display device 800 is formed, Step S604 is eliminated, and the process directly proceeds from Step S603 to Step S605.

In Step S605, the overall control CPU 101 (a movement amount detecting unit) attaches the image stabilization mode acquired in Step S302 and gyro data during moving image capturing that is associated with the frame, which is present in the primary memory 813, read in Step S600 to the correction data.

In Step S606, a video file 1000 (FIG. 15) is updated with data of the image of the frame read in Step S600 and data acquired by encoding the correction data to which various kinds of data is attached in Steps S601 to S605. In a case in which a first frame of the moving image video is read in Step S601*a*, a video file 1000 is generated in Step S606.

In Step S607, it is determined whether or not reading of images of all the frames of the moving image video developed in the recording range developing process (FIG. 7E) has ended, and, in a case in which the reading has not ended, the process is returned to Step S601*a*. On the other hand, in a case in which the reading has ended, the process exits from this subroutine. The generated video file 1000 is stored in the built-in nonvolatile memory 102. The video file may be stored not only in the primary memory 813 and the built-in nonvolatile memory 102 described above but also in the large-capacity nonvolatile memory 51. In addition, a transmission process for the display device 800 (Step S700 illustrated in FIG. 7A) may be immediately performed on the generated video file 1000, and, after the transmission of the video file to the display device 800, the video file may be stored in the primary memory 813.

Here, in this embodiment, although encoding represents combining of video data and correction data into one file, at this time, the video data may be compressed, or the video data and the correction data may be combined and then compressed.

Figure 15:
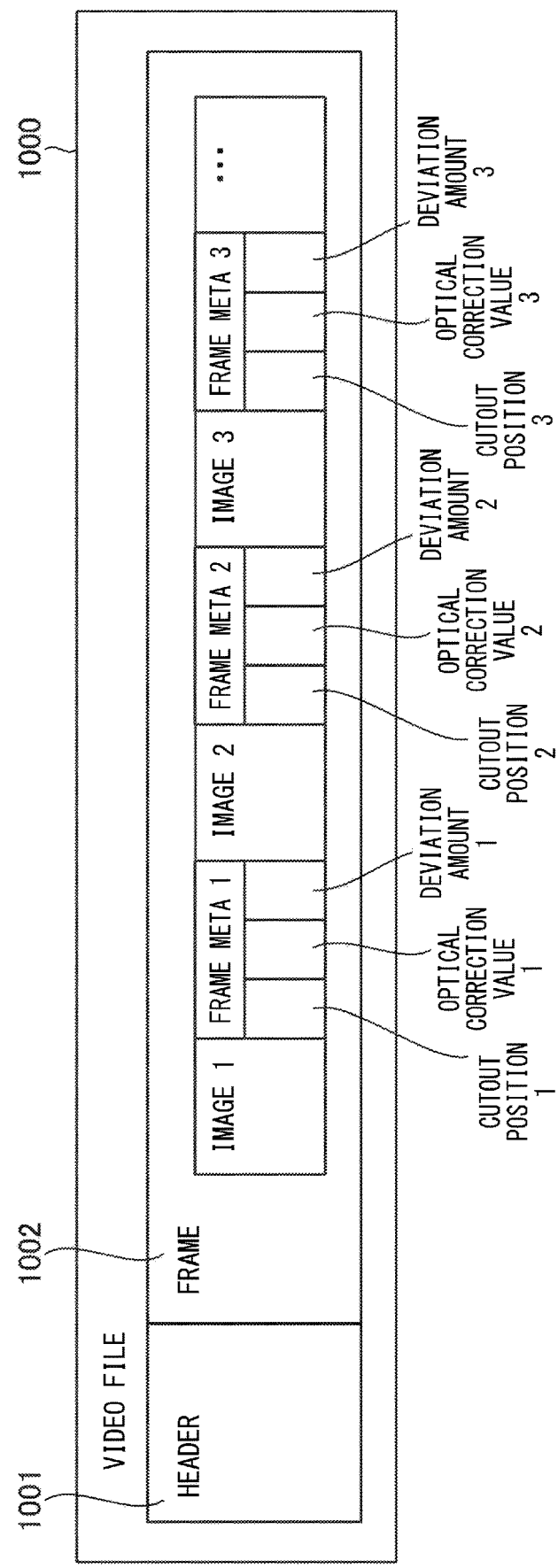
FIG. 15 is a diagram illustrating a data structure of a video file generated using a primary recording process.

FIG. 15 is a diagram illustrating a data structure of the video file 1000.

The video file 1000 is composed of a header 1001 and a frame 1002. The frame 1002 is composed of frame data sets in which an image of each frame composing a moving image video and frame meta corresponding thereto are formed as a set. In other words, in the frame 1002, frame data sets corresponding to a total number of frames of a moving image video are present.

In this embodiment, although frame meta is information in which correction data, to which a cutout position (position information inside a video), an optical correction value, and gyro data are attached as necessary, is encoded, the frame meta is not limited thereto. For example, an information amount of frame meta may be changed by attaching other information to the frame meta in accordance with an imaging mode selected by the imaging mode switch 12, deleting information present in the frame meta, or the like.

In the header 1001, an offset value of each frame to a frame data set or a start address of each frame is recorded. Alternatively, metadata such as a time and a size corresponding to the video file 1000 may be stored.

In this way, in the primary recording process (FIG. 14), a video file 1000 in which each frame of a moving image video developed in the recording range developing process (FIG. 7E) and metadata thereof are formed as a set is transmitted to the display device 800. Thus, even in a case in which the clock rate of the overall control CPU 101 of the camera main body 1 and the clock rate of the display device control unit 801 of the display device 800 are subtly different from each other, the display device control unit 801 can reliably perform a correction process on the moving image video developed by the camera main body 1.

In this embodiment, although an optical correction value is included in frame meta, an optical correction value may be assigned to the entire video.

Figure 16:
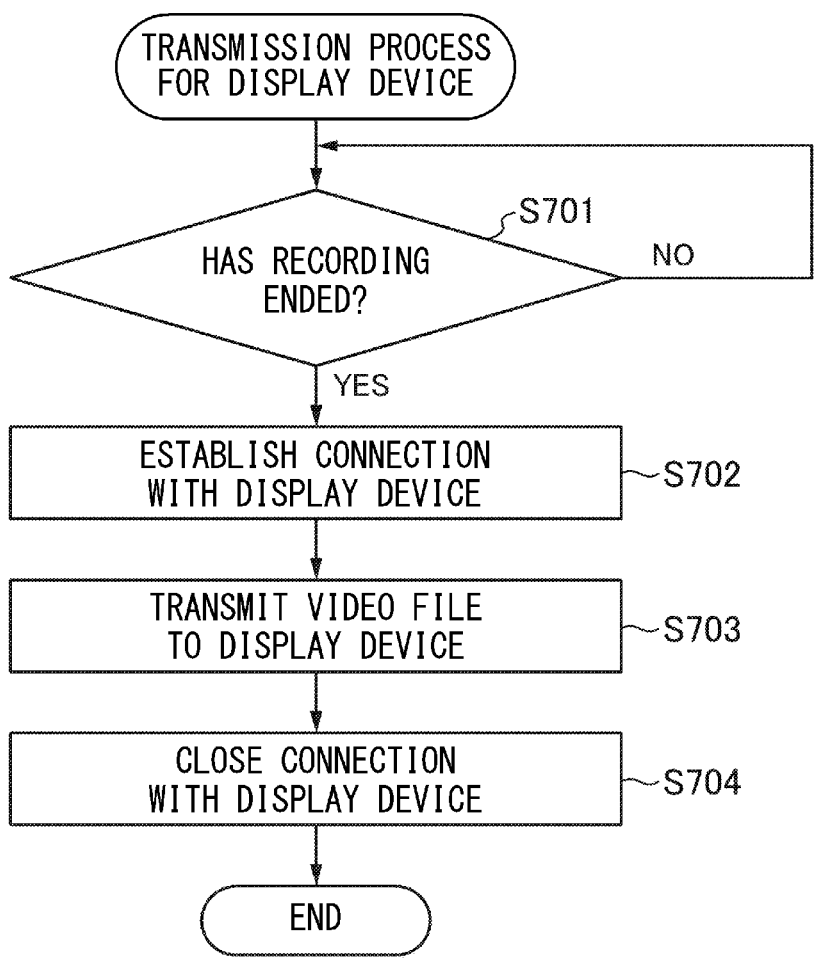
FIG. 16 is a flowchart of a subroutine of a transmission process for a display device that is performed in Step S700 illustrated in FIG. 7A.

FIG. 16 is a flowchart of a subroutine of the transmission process of Step S700 illustrated in FIG. 7A for the display device 800. In FIG. 16, a process performed in a case in which a mode selected by the imaging mode switch 12 is the moving image mode is illustrated. In a case in which the selected mode is the still image mode, this process starts from a process of Step S702.

In Step S701, it is determined whether recording of a moving image video using the imaging unit 40 (Step S400) has ended and whether or not recording is being performed. Here, in a case in which a moving image video is being recorded (during moving image capturing), a state in which the recording range developing process for each frame (Step S500) and update of the video file 1000 in the primary recording process (Step S600) (S606) are sequentially performed is formed. A power load of wireless transmission is large, and thus, when wireless transmission is performed in parallel during recording, a large battery capacity of the battery 94 is required, or a countermeasure for heat generation needs to be additionally performed. In addition, also from the viewpoint of a calculation capability, when wireless transmission is performed in parallel during recording, the calculation load becomes large, and thus the overall control CPU 101 having a high specification needs to be prepared, and the cost increases as well. In this embodiment, in consideration of these, after waiting for the end of recording of a moving image video (Yes in Step S701), the process proceeds to Step S702, and a connection to the display device 800 is established. However, in a case in which the camera system according to this embodiment has a margin in electric power supplied from the battery 94, and a separate countermeasure for heat generation is unnecessary, at the time of starting the camera main body 1, before start of recording, or the like, a connection to the display device 800 may be made in advance.

In Step S702, in order to transmit a video file 1000 of which a data amount is large to the display device 800, a connection to the display device 800 is established through the high-speed wireless unit 72. Although the small power radio unit 71 is used for transmission of a low-resolution video (or a video) for checking an angle of view for the display device 800 and transmission/reception of various setting values to/from the display device 800, it requires a time for transmission and thus is not used for transmission of the video file 1000.

In Step S703, the video file 1000 is transmitted to the display device 800 through the high-speed wireless unit 72, the process proceeds to Step S704 at a time point at which the transmission ends, and after the connection to the display device 800 is closed, the process exits from this subroutine.

Up to now, although a case in which one video file including images of all frames of one moving image video is transmitted has been described, in the case of a moving image video of a long time over several minutes, a plurality of video files divided in time units may be transmitted. In the case of a video file having the data structure illustrated in FIG. 15, even when one moving image video is transmitted to the display device 800 as a plurality of video files, the moving image video can be corrected without having the timing to deviate from correction data in the display device 800.

Figure 17:
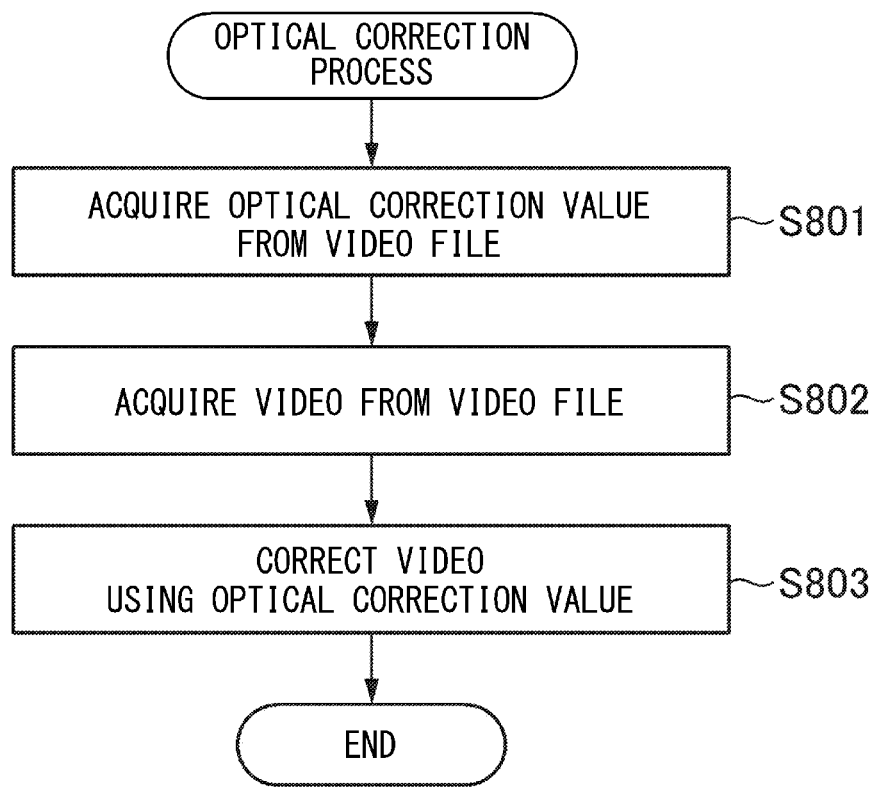
FIG. 17 is a flowchart of a subroutine of an optical correction process of Step S800 illustrated in FIG. 7A.

FIG. 17 is a flowchart of a subroutine of the optical correction process of Step S800 illustrated in FIG. 7A. Hereinafter, this process will be described with reference to FIGS. 18A to 18F. As described above, this process is a process that is performed by the display device control unit 801 of the display device 800.

In Step S801, first, the display device control unit 801 (a video file receiving unit) receives a video file 1000 from the camera main body 1 that is transmitted in the transmission process for the display device 800 (Step S700). Thereafter, the display device control unit 801 (a first extraction unit) acquires an optical correction value extracted from the received video file 1000.

Subsequently, in Step S802, the display device control unit 801 (a second extraction unit) acquires a video (an image of one frame acquired by moving image capturing) from the video file 1000.

In Step S803, the display device control unit 801 (a frame video correcting unit) performs an optical correction of the video acquired in Step S802 using the optical correction value acquired in Step S801 and stores the corrected video in the primary memory 813. When an optical correction is performed, in a case in which cutting-out from the video acquired in Step S802 is performed, a cutting-out process is performed in a range of an image narrower than the developing range (the target visual field 125*i*) determined in Step S303 (a cutout developing area).

FIGS. 18A to 18F are diagrams illustrating a case in which a distortion aberration correction is performed in Step S803 illustrated in FIG. 17.

Figure 18C:
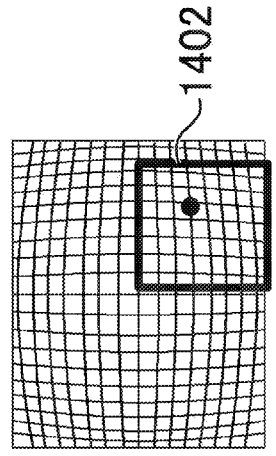
FIGS. 18A to 18F are diagrams illustrating a case in which a distortion aberration correction is performed in Step S803 illustrated in FIG. 17.
Figure 18B:
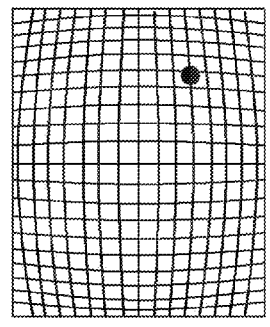
Figure 18A:
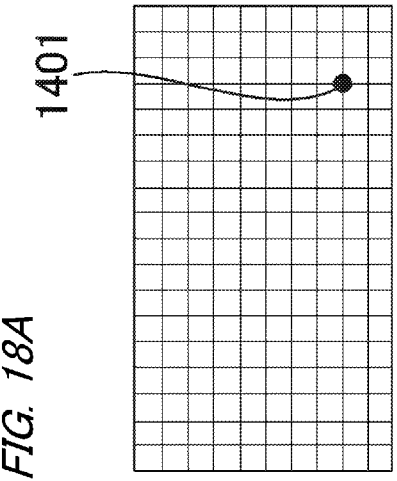

FIG. 18A is a diagram illustrating a position of a subject 1401 seen by a user through naked eyes at the time of imaging, and FIG. 18B is a diagram illustrating an image in which the subject 1401 is shown on the solid-state imaging element 42.

FIG. 18C is a diagram illustrating a developing area 1402 on the image illustrated in FIG. 18B. Here, the developing area 1402 is the cutout developing area described above.

Figure 18F:
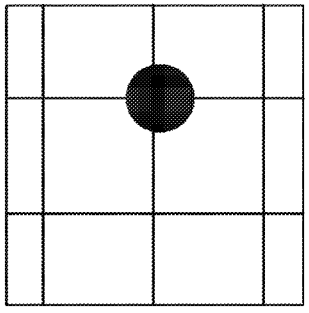
Figure 18E:
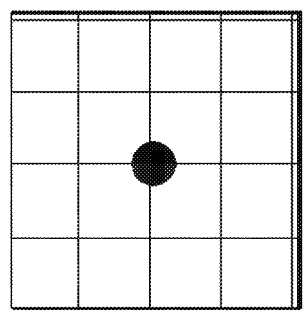
Figure 18D:
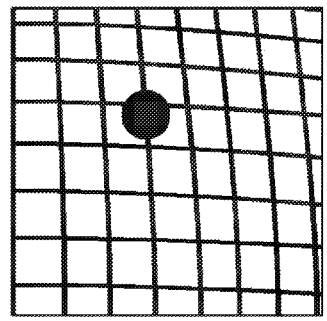

FIG. 18D is a diagram illustrating a cutout developing area in which an image of the developing area 1402 is cut out, and FIG. 18E is a diagram illustrating a video acquired by performing a distortion correction of the cutout developing area illustrated in FIG. 18D. A cutting-out process is performed at the time of performing a distortion correction of a cutout developing video, and thus the angle of view of the video illustrated in FIG. 18E is smaller than that of the cutout developing area illustrated in FIG. 18D.

Figure 19:
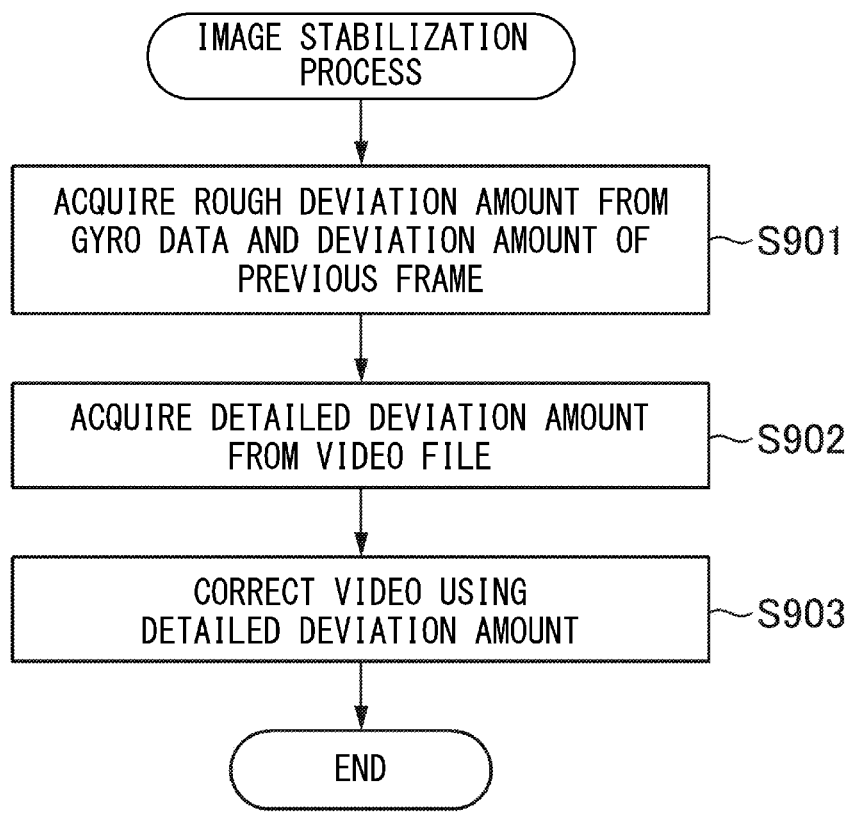
FIG. 19 is a flowchart of a subroutine of an image stabilization process of Step S900 illustrated in FIG. 7A.

FIG. 19 is a flowchart of a subroutine of the image stabilization process of Step S900 illustrated in FIG. 7A. Hereinafter, this process will be described with reference to FIGS. 25A and 25B. As described above, this process is a process that is performed by the display device control unit 801 of the display device 800.

In Step S901, from frame meta of the video file 1000, gyro data of the current frame and the previous frame, and a deviation amount $V_{n-1}^{Det}$ calculated with respect to the previous frame in Step S902 is acquired. Thereafter, an approximate deviation amount $V_n^{Pre}$ is calculated from such information. In this embodiment, the current frame is a frame that is currently being process, and the previous frame is a frame that is one frame before the current frame.

In Step S902, a detailed deviation amount $V_n^{Det}$ is acquired from the video. Detection of the deviation amount is performed by calculating a degree of movement of feature points of an image of the current frame from those of the previous frame.

For extraction of feature points, a known method may be employed. For example, a luminance information image acquired by extracting only luminance information of an image of a frame is generated, an image acquired by shifting the luminance information image by one to several pixels is subtracted from the original image, and pixels of which absolute values are equal to or more than a threshold may be extracted as feature points. In addition, edges extracted by subtracting an image acquired by applying a high-pass filter to the luminance information image described above from the original luminance information image may be extracted as feature points.

A difference is calculated several times while luminance information images of the current frame and the previous frame are shifted by one to several pixels each time, and a position at which a difference between pixels of feature points is small is calculated, whereby a movement amount is calculated.

As will be described below, a plurality of feature points are necessary, and thus it is preferable to extract feature points by dividing each of images of the current frame and the previous frame into a plurality of blocks. The block division may be also on the basis of the number of pixels or an aspect ratio of an image, and generally, 12 blocks of 4×3 to 96×64 blocks are preferable. When the number of blocks is small, a trapezoid, rotation in an optical axis direction, and the like according to excitation of the imaging unit 40 of the camera main body 1 cannot be correctly corrected. On the other hand, when the number of blocks is too large, the size of one block is small, feature points are close to each other, and thus error may be included. From these, an optimal number of blocks is appropriately selected in accordance with the number of pixels, easiness in finding feature points, an angle of view of a subject, and the like.

In calculation of a movement amount, a difference needs to be calculated several times by shifting luminance information images of the current frame and the previous frame by one to several pixels each time, and thus an amount of calculation becomes large. Thus, in order to calculate the number of shifted pixels from the deviation amount $V_n^{Pre}$, by calculating differences only in the vicinity thereof, the amount of calculation of an actual movement amount can be significantly reduced.

Next, in Step S903, an image stabilization correction is performed using the detailed deviation amount $V_n^{Det}$ acquired in Step S902, and then the process exits from this subroutine.

As methods used in the image stabilization process, a Euclidean transformation capable of rotation and parallel movement, an affine transformation capable of performing those, a projection transformation capable of further performing a trapezoidal correction, and the like are conventionally known.

Movement and rotation toward an X axis and a Y axis can be corrected using the Euclidean transformation, as deviations occurring in a case in which imaging is actually performed by the imaging unit 40 of the camera main body 1, there are hand shakes in the forward/backward directions and pan/tilt directions and the like. Thus, in this embodiment, an image stabilization correction is performed using the affine transformation capable of correcting enlargement, a skew, and the like. In a case in which coordinates (x, y) of a feature point serving as a reference move to coordinates (x', y'), the affine transformation can be represented using the following Equation 100.

[Math. 1]

$$\begin{pmatrix} x' \\ y' \\ 1 \end{pmatrix} = \begin{pmatrix} a & b & c \\ d & e & f \\ 0 & 0 & 1 \end{pmatrix} \begin{pmatrix} x \\ y \\ 1 \end{pmatrix} \quad \text{(Equation 100)}$$

Affine coefficients of a 3×3 matrix represented in Equation 100 can be calculated as long as deviations of at least three feature points can be detected. However, in a case in which detected feature points are present at a short distance or are disposed on a straight line, an image stabilization correction of a position far from a feature point and a position far from the straight line becomes inaccurate. Thus, it is preferable that detected feature points that are present at a long distance and are not disposed on a straight line be selected. Thus, in a case in which a plurality of feature points are detected, feature points close to each other are omitted, and the remaining feature points are normalized using a least-squares method.

FIG. 18F is a diagram illustrating a video acquired by performing the image stabilization correction of Step S903 for a video for which the distortion correction illustrated in FIG. 18E has been performed. Since a cutting-out process is performed at the time of performing the image stabilization correction, the angle of view of the video illustrated in FIG. 18F is smaller than that of the video illustrated in FIG. 18E.

By performing such an image stabilization process, a video having good quality of which a deviation has been corrected can be acquired.

As above, a series of operations performed by the camera main body 1 and the display device 800 included in the camera system according to this embodiment have been described.

Figure 11B:
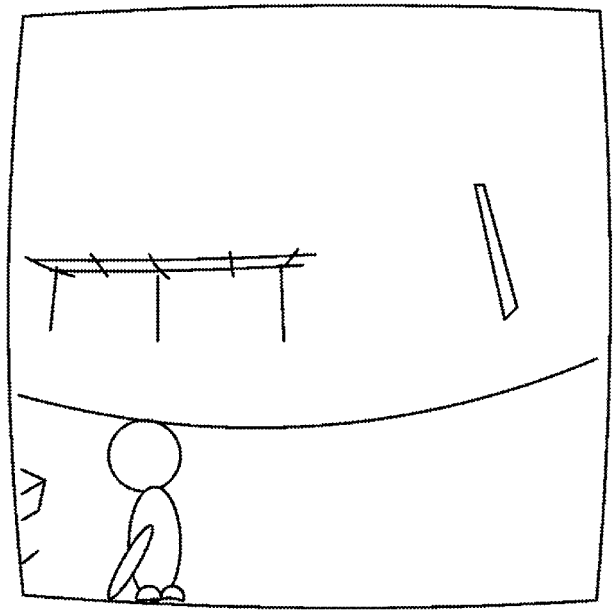
FIG. 11B is a diagram illustrating a video of a target visual field in FIG. 11A that is cut out from a super-wide angle video.

After turning on the power switch 11, in a case in which a user selects the moving image mode using the imaging mode switch 12 and observes just the front face without having his or her face directed in upward/downward/leftward/rightward directions, first, the face direction detecting unit 20 detects an observation direction vo (vector information [0°, 0°]) (FIG. 12A). Thereafter, the recording direction/angle of view determining unit 30 cuts outs a video (FIG. 11B) of a target visual field 1250 illustrated in FIG. 12A from a super-wide angle video projected to the solid-state imaging element 42.

Figure 11C:
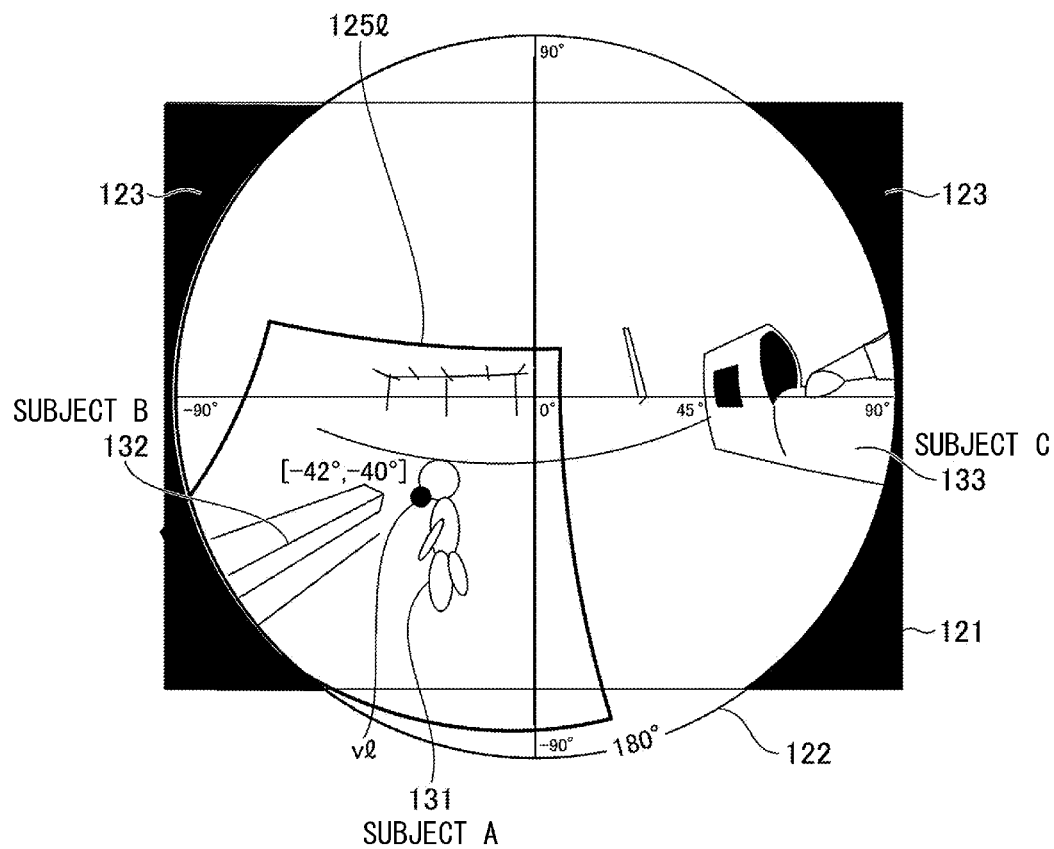
FIG. 11C is a diagram illustrating a target visual field in a super-wide angle video acquired in a case in which a user is observing a subject A.

Thereafter, for example, when the user starts to observe the child (subject A131) illustrated in FIG. 11A without operating the camera main body 1, first, the face direction detecting unit 20 detects an observation direction vl (vector information [−42°, −40°]) (FIG. 11C). Thereafter, the recording direction/angle of view determining unit 30 cuts out a video (FIG. 11C) of a target visual field 125*l* from the super-wide angle video captured by the imaging unit 40.

Figure 11D:
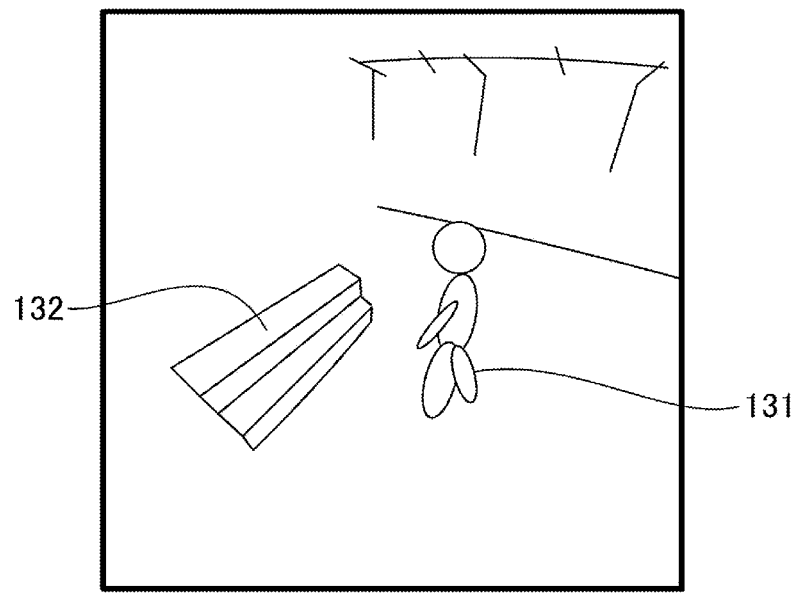
FIG. 11D is a diagram illustrating a video acquired by correcting distortion and swinging of the video of the target visual field illustrated in FIG. 11C cut out from a super-wide angle video.

In this way, in accordance with an observation direction, the optical correction process and the image stabilization process for videos cut out in various shapes are performed in Steps S800 and S900 in the display device 800. In accordance with this, also when the overall control CPU 101 of the camera main body 1 has low specifications, even in a case in which a video having a large distortion, for example, of a target visual field 125*l* (FIG. 11C) is cut out, as illustrated in FIG. 11D, a video of which the distortion and shake have been corrected having the child (subject A131) as its center can be acquired. In other words, a user can acquire a video in which his or her observation direction is imaged without touching the camera main body 1 other than turning on the power switch 11 and selecting a mode using the imaging mode switch 12.

Here, the Pri-setting mode will be described. As described above, since the camera main body 1 is a small-size wearable device, an operation switch, a setting screen, and the like used for changing detailed settings thereof are not provided in the camera main body 1. For this reason, changes of the detailed settings of the camera main body 1 are performed by an external device (in this embodiment, a setting screen of the display device 800 (FIG. 13)) such as the display device 800.

For example, in the same moving image capturing, a case in which capturing with an angle of view of 90° and an angle of view of 45° is desired to be continued will be considered. In a normal moving image mode, an angle of view of 90° is set, and thus in a case in which such imaging is performed, first, after imaging in the normal moving image mode, moving image capturing is ended once, and operations of changing the display device 800 to the setting screen of the camera main body 1 and switching the angle of view to 45° are necessary. However, during continuous imaging, such operations on the display device 800 are burdensome, and capturing of a video desired to be recorded may be missed.

On the other hand, when the Pri-setting mode is set to a mode for moving image capturing with an angle of view of 45° in advance, after moving image capturing with an angle of view of 90° ends, only by sliding the imaging mode switch 12 to "Pri", the moving image capturing can be instantaneously changed to zoom-up moving image capturing of an angle of view of 45°. In other words, the user does not need to stop the current imaging action and perform the burdensome operations described above.

As details set in the Pri-setting mode, not only a change of the angle of view but also an image stabilization level designated as "strong", "intermediate", "off", or the like and a setting change of speech recognition and the like not described in this embodiment may be included.

Figure 11E:
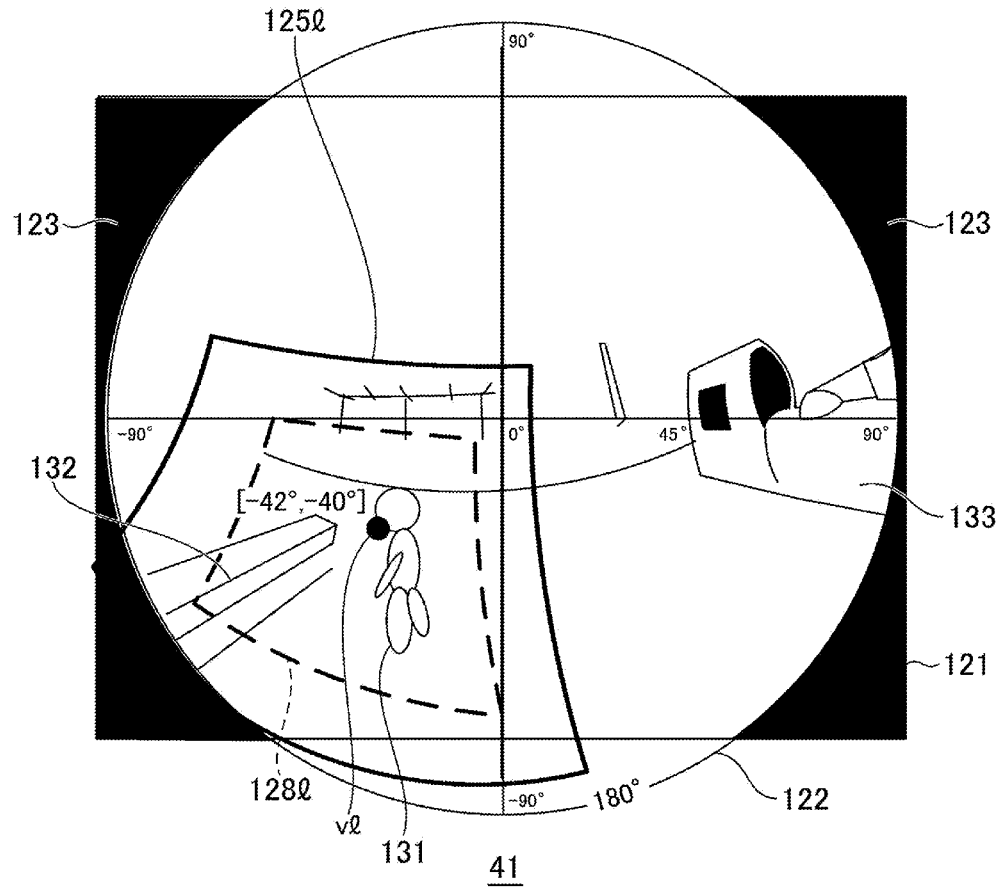
FIG. 11E is a diagram illustrating a target visual field in a super-wide angle video acquired in a case in which a user is observing a subject A using an angle of view setting value smaller than that of FIG. 11C.

For example, when a user switches from the moving image mode to the Pri-setting mode using the imaging mode switch 12 with observation of the child (subject A131) being continued in a situation of previous imaging, the angle of view setting value ang is changed from 90° to 45°. In this case, the recording direction/angle of view determining unit 30 cuts out a video of a target visual field 128*l* denoted by a dotted-line frame illustrated in FIG. 11E from the super-wide angle video captured by the imaging unit 40.

Figure 11F:
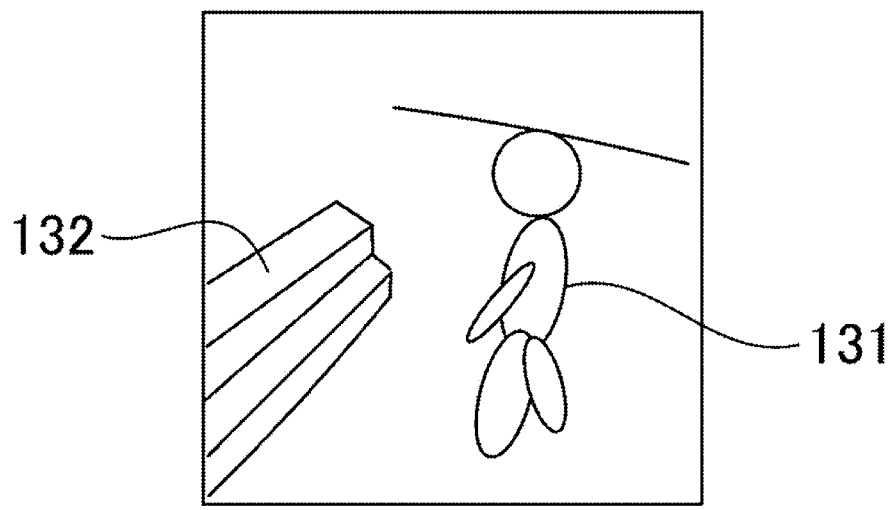
FIG. 11F is a diagram illustrating a video acquired by correcting distortion and swinging of the video of the target visual field in FIG. 11E cut out from a super-wide angle video.

Also in the Pri-setting mode, the optical correction process and the image stabilization process are performed in Steps S800 and S900 in the display device 800. In accordance with this, even when the overall control CPU 101 of the camera main body 1 has low specifications, as illustrated in FIG. 11F, a video, of which zoomed distortion and shake have been corrected, having the child (subject A131) as its center can be acquired. Although an example in which the angle of view setting value ang is changed from 90° to 45° in the moving image mode has been described, the description can be similarly applied also to the still image mode. In addition, the description can be similarly applied also to a case in which the angle of view setting value ang of a moving image is 90°, and the angle of view setting value ang of a still image is 45°.

In this way, only by performing mode switching using the imaging mode switch 12 for the camera main body 1, a user can acquire a zoomed video in which his or her observation direction is imaged.

In this embodiment, although a case in which the face direction detecting unit 20 and the imaging unit 40 are integrally configured in the camera main body 1 has been described, the configuration is not limited thereto as long as the face direction detecting unit 20 is mounted on the body of the user other than the head, and the imaging unit 40 is mounted on the user's body. For example, the imaging/detecting unit 10 according to this embodiment may be installed on the shoulder or the abdomen. However, in the case of installation on the shoulder, when the imaging unit 40 is installed on the right shoulder, a subject disposed on the left side may be assumed to be blocked by the head, and thus a configuration in which a plurality of imaging units of the left shoulder and the like are installed to be complemented is preferable. In addition, in the case of the abdomen, a parallax spatially occurs between the imaging unit 40 and the head, and thus, as in Embodiment 3, it is preferable to perform correction/calculation of an observation direction for correcting the parallax.

Embodiment 2

In Embodiment 2, a method for calibrating an individual difference/an adjustment difference of a user wearing the camera main body 1 will be described in detail with reference to FIGS. 20A, 20B, 21, 22A to 22F, and 23A to 23E.

Basically, this embodiment will be described as a derivation from Embodiment 1. For this reason, the same reference signs will be used for components that are the same as the components of the camera system according to Embodiment 1 among components of a camera system according to Embodiment 2, duplicate description will be omitted, and other components will be described in detail with additional notes as necessary.

A user in whom the camera main body 1 is mounted has individual differences and adjustment differences represented by a physical constitution, an inclination and an angle of the periphery of the neck to which the camera main body 1 is attached, a clothing state represented by a collar at the time of mounting, adjustment remainders of the band parts 82L and 82R, and the like. For this reason, generally, an optical axis center of the imaging lens 16 of the camera main body 1 and a visual field center in a state in which a user faces the front face (hereinafter, referred to as a natural state of the user) do not coincide with each other. It is preferable that a user does not set an optical axis center of the imaging lens 16 of the camera main body 1 as a center of a recording area (the target visual field 125) for cutting out a video as it is but sets a visual field center in the posture or the operation of the user as a center of the recording area.

In addition, there are individual differences not only in the visual field center in the natural state of a user but in a visual field center of a case in which the user directs his or her neck in each direction including vertical and horizontal inclinations and a movable area of the neck. For this reason, there are individual differences also in a relationship between a face direction (an observation direction) detected by the face direction detecting unit 20 and a center position of the target visual field 125 (hereinafter, referred to as a visual field center position) set in accordance with the observation direction. Thus, a calibration operation for associating a face direction and a visual field center position is necessary.

Generally, it is preferable that a calibration operation be performed as a part of a preparation operation process (Step S100) illustrated in FIG. 7A. Generally, although it is assumed to perform a calibration operation at the time of starting the camera main body 1 for the first time, in addition thereto, the calibration operation may be performed in a case in which a predetermined time has elapsed after calibration and a case in which the camera main body 1 causes a positional deviation for a user from the time of the previous calibration. Also in a case in which the face direction detecting unit 20 cannot detect a face of a user, the calibration operation may be performed. In addition, in a case in which it is detected that a user has worn or taken off the camera main body 1, the calibration operation may be performed in a scene in which the user wears the camera main body 1 again. In this way, it is preferable to appropriately perform the calibration operation at a timing determined to be necessary for appropriate use of the camera main body 1.

Figure 20A:
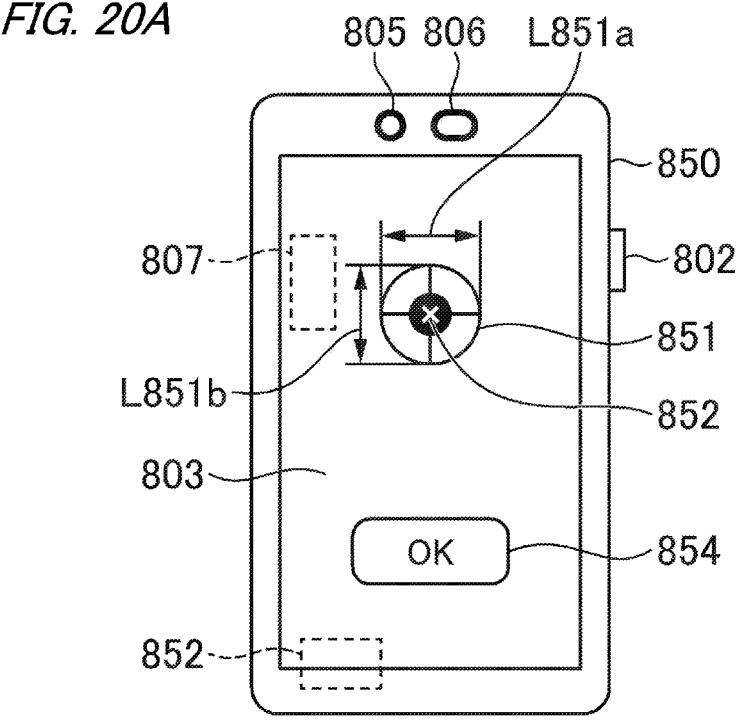
FIGS. 20A and 20B are diagrams illustrating details of a calibrator used in a calibration process according to Embodiment 2.
Figure 20B:
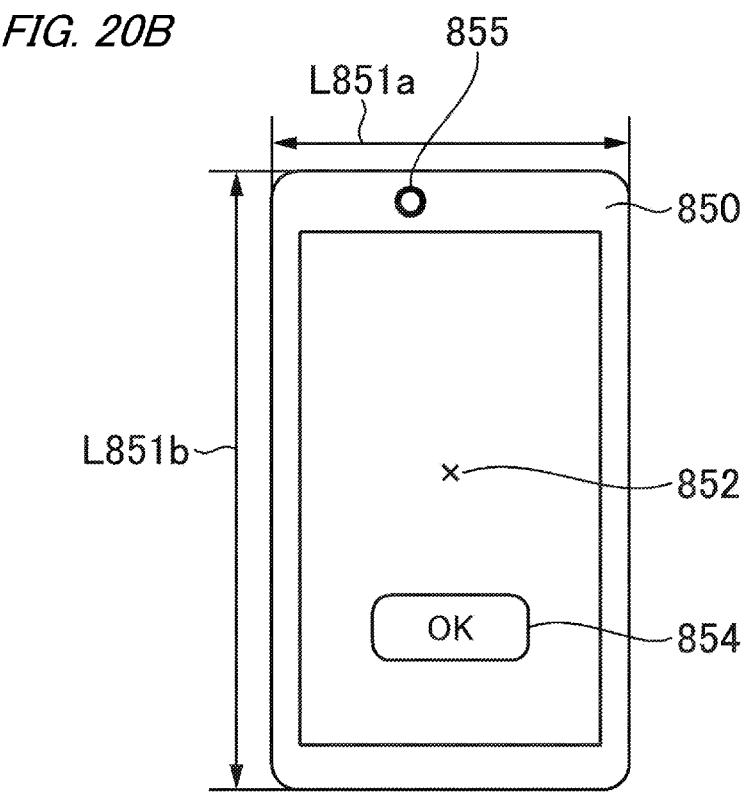

FIGS. 20A and 20B are diagrams details of the calibrator 850 used in the calibration process according to Embodiment 2. In this embodiment, a case in which the calibrator 850 is used also as the display device 800 will be described.

The calibrator 850 includes a position determination indicator 851 and a calibration button 854 in addition to the button A802, the display unit 803, the in-camera 805, the face sensor 806, and the angular velocity sensor 807 that are constituent elements of the display device 800 illustrated in FIG. 7D. The button B804 according to Embodiment 1 is not used in this embodiment and, as will be described below, can be replaced with the calibration button 854 and thus is not illustrated here.

FIG. 20A illustrates a case in which the position determination indicator 851 is a specific pattern displayed in the display unit 803, and FIG. 20B illustrates a case in which an external view of the calibrator 850 is used in the position determination indicator 851. In this case, a position determination indicator center 852 to be described below is calculated from information of the external shape of the calibrator 850.

The position determination indicator 851 is not limited to the examples illustrated in FIGS. 20A and 20B and, for example, may be configured separately from the calibrator 850. The position determination indicator 851 may be any as long as it satisfies conditions that the size can be easily measured, and the shape can be easily caused to face a face direction position of a user. For example, the position determination indicator may be a lens cap of the imaging lens 16 or a charging unit of the camera main body 1. In any case, a basic concept of the calibration operation is the same, and thus, hereinafter, the calibrator 850 illustrated in FIG. 20A will be mainly used in description.

Although described also in Embodiment 1, the function of the calibrator 850 may be included in the display device 800. In addition, similar to the display device 800, the calibrator 850 may be a dedicated device or, for example, may be a general smartphone or a tablet terminal other than that.

The position determination indicator 851 is an indicator displayed in the display unit 803 of the calibrator 850 and is a figure that enables calculation of a horizontal width L851$a$ of the position determination indicator, a vertical width L851$b$ of the position determination indicator, and a position determination indicator center 852. In a calibration process to be described below, a user causes a face direction to be directed to near a center portion of the position determination indicator 851, and thus it is preferable that the position determination indicator 851 have a shape that can be easily perceived as a visual field center. In FIG. 20A, although a circular shape in which a black circle is disposed at the center of a cross is illustrated, the position determination indicator is not particularly limited to this shape. Other than that, the position determination indicator may be a figure of a rectangle, a triangle, or a star shape or, for example, may be an illustration of a character.

The position determination indicator 851 is imaged by the imaging unit 40 of the camera main body 1. On the basis of a captured video, the display device control unit 801 (a position calculating unit/a distance calculating unit) calculates a distance between the imaging/detecting unit 10 and the calibrator 850 and position coordinates of the position determination indicator 851 shown on an image range. In this embodiment, although such calculation is performed by the display device 800 integrated with the calibrator 850, in a case in which the calibrator 850 or the position determination indicator 851 are configured separately from the display device 800, such calculation is performed by the overall control CPU 101 of the camera main body 1 side.

The angular velocity sensor 807 can measure movement of the calibrator 850. On the basis of a measured value acquired by the angular velocity sensor 807, the display device control unit 801 calculates movement information that represents a position and a posture of the calibrator 850 to be described below.

The calibration button 854 is a button to be pressed when a user has a face direction to be directed to near a center portion of the position determination indicator 851 in the calibration process to be described below. In FIG. 20A, although the calibration button 854 is a touch button displayed in the display unit 803 of a touch panel type, the button A802 and the button B804 may be configured to function as the calibration button 854.

Next, the calibration process that is performed when a video is cut out from a super-wide angle image captured by the imaging unit 40 in accordance with a face direction of a user, and image processing of the video is performed, which has been described in Embodiment 1, will be described in detail with reference to a flowchart illustrated in FIG. 21.

Figure 21:
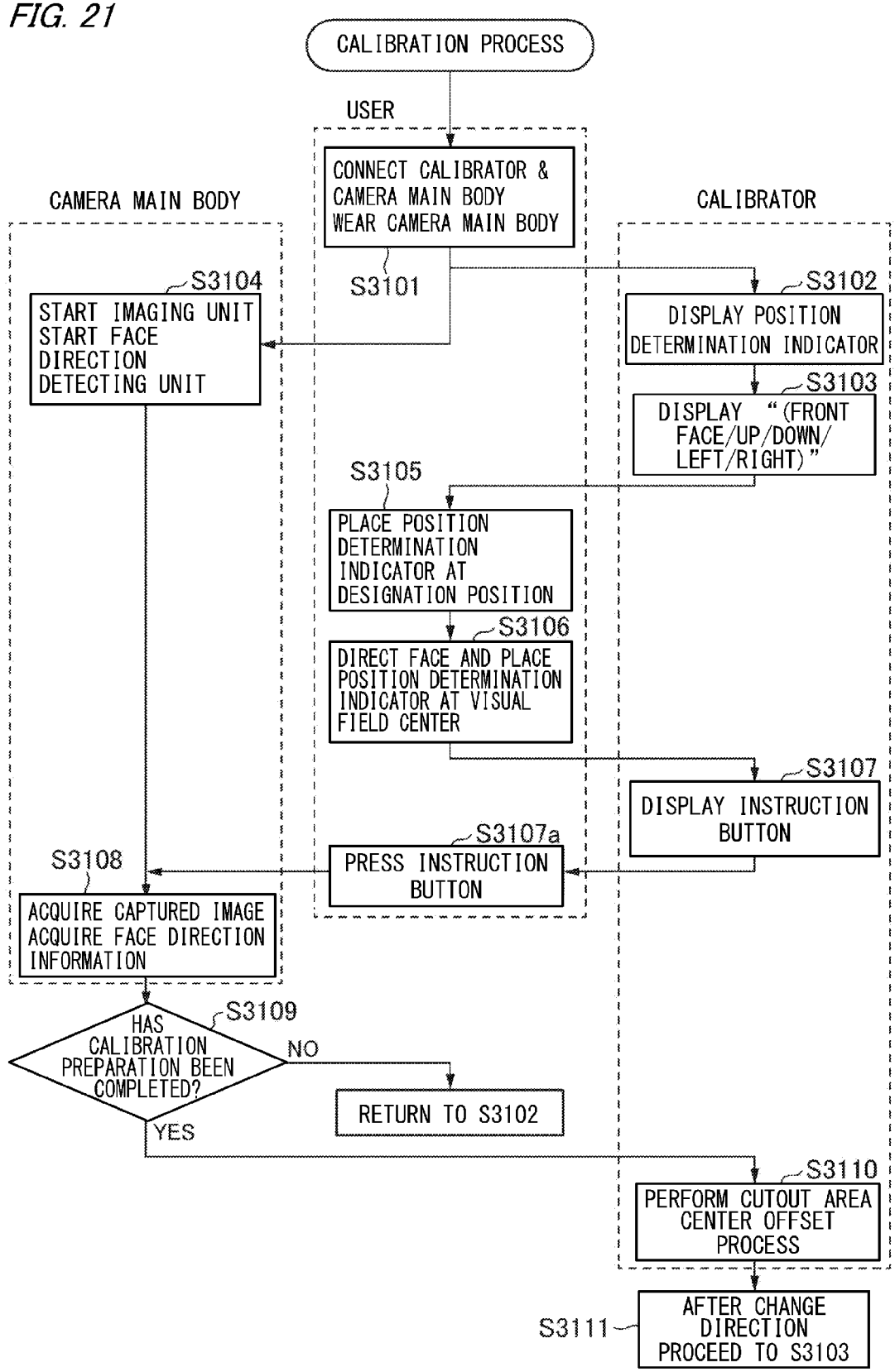
FIG. 21 is a flowchart of a calibration process according to Embodiment 2 that is performed in the camera main body and the calibrator.

FIG. 21 is a flowchart of the calibration process according to this embodiment that is performed by the camera main body 1 (a first calibration unit) and the calibrator 850.

As an aid for description, in FIG. 21, steps in which the camera main body 1 and the calibrator 850 accept a user's operation are inserted into a frame in which an operation subject is the user. In addition, in FIG. 21, a step that is performed by the display device control unit 801 of the calibrator 850 by receiving an operation of the user described above is inserted into a frame in which an operation subject is the calibrator 850. Similarly, in FIG. 21, a step that is performed by the overall control CPU 101 of the camera main body 1 by receiving an operation of the user described above is inserted into a frame in which an operation subject is the camera main body 1.

More specifically, in Steps S3104 and S3108 illustrated in FIG. 21, the camera main body 1 is an operation subject, and, in Steps S3101, S3105, and S3106, the user is an operation subject. In addition, in Steps S3102, S3103, S3107, and S3110, the calibrator 850 is an operation subject.

When this process starts, first, in Step S3101, in a case in which the power of the calibrator 850 is not on, the user turns on the power of the calibrator 850 by operating the button A802. Similarly, in a case in which the power of the camera main body 1 is not on, the user turns on the power of the camera main body 1 by switching the power switch 11 to on. Thereafter, the user establishes connection between the calibrator 850 and the camera main body 1. When this connection is established, each of the display device control unit 801 and the overall control CPU 101 enters a calibration mode.

In addition, in Step S3101, the user wears the camera main body 1, performs adjustment of lengths of the band parts 82L and 82R, an angle of the camera main body 1, and the like, and disposes the camera main body 1 at an appropriate position, thereby forming a state in which the imaging/detecting unit 10 can perform imaging.

In Step S3102, the display device control unit 801 (a first display unit) displays the position determination indicator 851 in the display unit 803.

Next, in Step S3103, the display device control unit 801 instructs the user of a position to be shaded by the calibrator 850 (each designation position) in an instruction display 855. In this embodiment, 5 positions including a front face position, an upper right position, a lower right position, an upper left position, and a lower left position are sequentially directed as designation positions. However, designation positions are not limited to these, as long as calibration can be performed.

In Step S3104, the overall control CPU 101 starts the imaging unit 40 to be in an imagable state and starts the face direction detecting unit 20 to be in a state in which a face direction of the user can be detected.

In Step S3105, the user shades a designated position directed in Step S3103 with the calibrator 850.

Next, in Step S3106, the user has his or her face directed in the direction of the position determination indicator 851 and puts a visual field center of the user at the position determination indicator 851 with the position of the calibrator 850 maintained at the designated position.

In Step S3107, the display device control unit 801 (a second display unit) notifies the user of an indication representing start of calibration of the designated position in the instruction display 855 and displays the calibration button 854. The process of Step S3107 is performed when the display device control unit 801 determines that the user has seen the position determination indicator center 852 of the position determination indicator 851 on the front face of the visual field.

In Step S3107a, when the user presses the calibration button 854, the display device control unit 801 transmits a calibration instruction to the camera main body 1.

In Step S3108, the overall control CPU 101 (an acquisition/detection unit), in accordance with a calibration instruction from the calibrator 850, acquires a super-wide angle image in which the position determination indicator 851 is shown in accordance with imaging performed by the imaging unit 40 and detects a face direction using the face direction detecting unit 20. Thereafter, the overall control CPU 101 (a generation unit) calculates position coordinates information of the position determination indicator center 852 in the super-wide angle image acquired here and generates information representing a relation between the calculated position coordinates information and the face direction detected here.

Details of the processes of Steps S3103 to S3108 will be described below with reference to FIGS. 22A to 22F.

FIGS. 22A to 22F are diagrams illustrating calibration operations for a front face direction of a user. In accordance with this, a visual field center position in the natural state of the user and a center position of the target visual field 125 of the video perceived by the imaging unit 40 of the camera main body 1 are caused to coincide with each other.

FIG. 22A is a diagram illustrating a screen displayed in the display unit 803 of the calibrator 850 in Step S3103 illustrated in FIG. 21 at the time of performing a calibration operation for the front face direction of the user.

As illustrated in FIG. 22A, in the display unit 803 of the calibrator 850, a position determination indicator 851 and an instruction display 855 representing a position at which the user is desired to place the position determination indicator 851 are displayed.

In the instruction display 855, an instruction is written using characters such that the position determination indicator 851 is disposed at the visual field center acquired when the face is caused to face the front side. The instruction displayed in the instruction display 855 is not limited to an instruction using characters and, for example, may be an instruction using another method such as an illustration, a photograph, or a moving image.

In addition, an instruction display 855 like a so-called general tutorial may be displayed, and thereafter, the position determination indicator 851 may be displayed.

FIG. 22B is a perspective view illustrating an appearance in which a user shades the front side with the calibrator in accordance with the instruction display illustrated in FIG. 22A.

The user shades the front side with the calibrator 850 in accordance with the instruction represented in the instruction display 855 illustrated in FIG. 22A and disposes the calibrator 850 such that the position determination indicator 851 is the visual field center at the time of the face facing the front side (Steps S3105 and S3106). Thereafter, the user presses the calibration button 854 (FIG. 22A). Determination of Step S3107 is performed in accordance with press of this calibration button 854. A specific order of this determination method will be described below.

Thereafter, after checking that the instruction display 855 illustrated in FIG. 22A has been changed to a notification of "Calibration of Front Face Direction Starts!", the user presses the calibration button 854 (Step S3107a).

In accordance with press of this calibration button 854, the imaging unit 40 acquires a captured video in Step S3108.

Figure 22C:
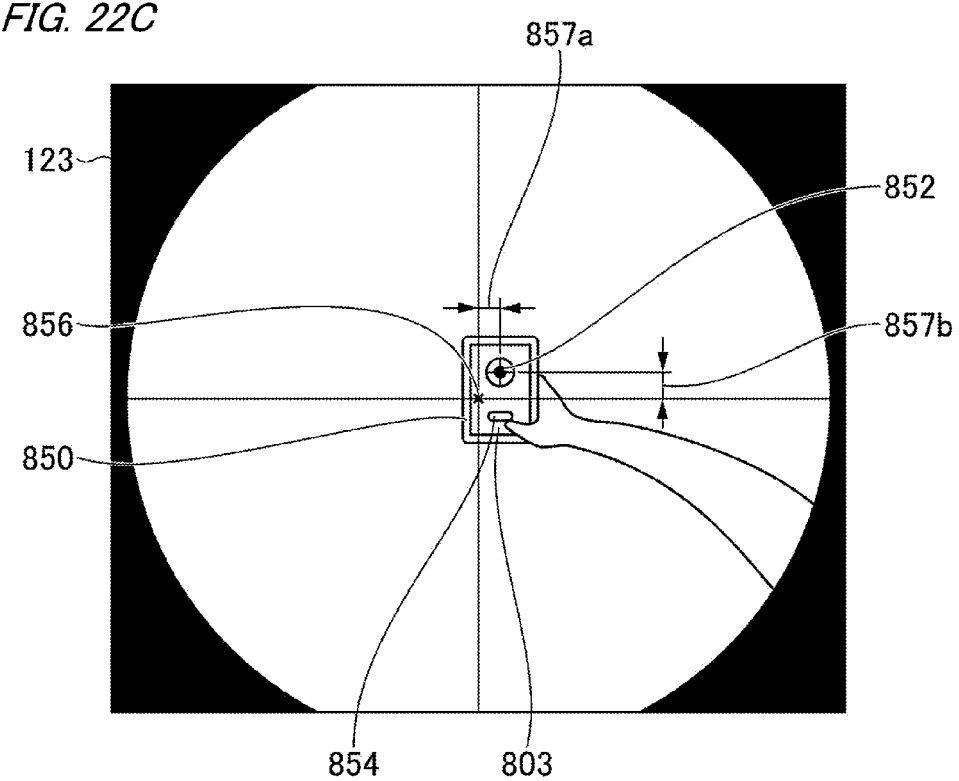
FIG. 22C is a schematic diagram illustrating an entire super-wide angle image perceived by an imaging lens in the state illustrated in FIG. 22B.
Figure 22D:
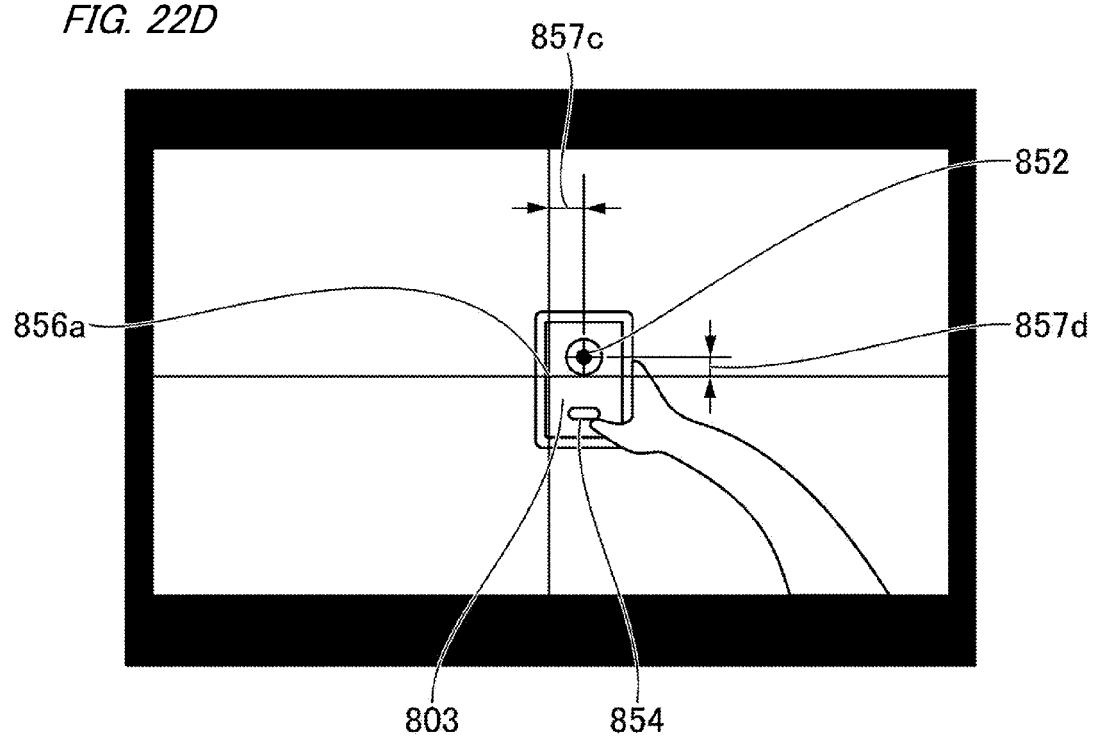
FIG. 22D is a schematic diagram illustrating an image acquired by correcting an aberration of the super-wide angle image illustrated in FIG. 22C.

FIG. 22C is a schematic diagram illustrating the entire super-wide angle image perceived by the imaging lens 16 in the state illustrated in FIG. 22B, and FIG. 22D is a schematic diagram illustrating an image acquired by correcting the aberration of the super-wide angle image illustrated in FIG. 22C.

In accordance with user's press of the calibration button 854 in the state illustrated in FIG. 22B, the face direction detecting unit 20 acquires a face direction in Step S3108.

Figure 22E:
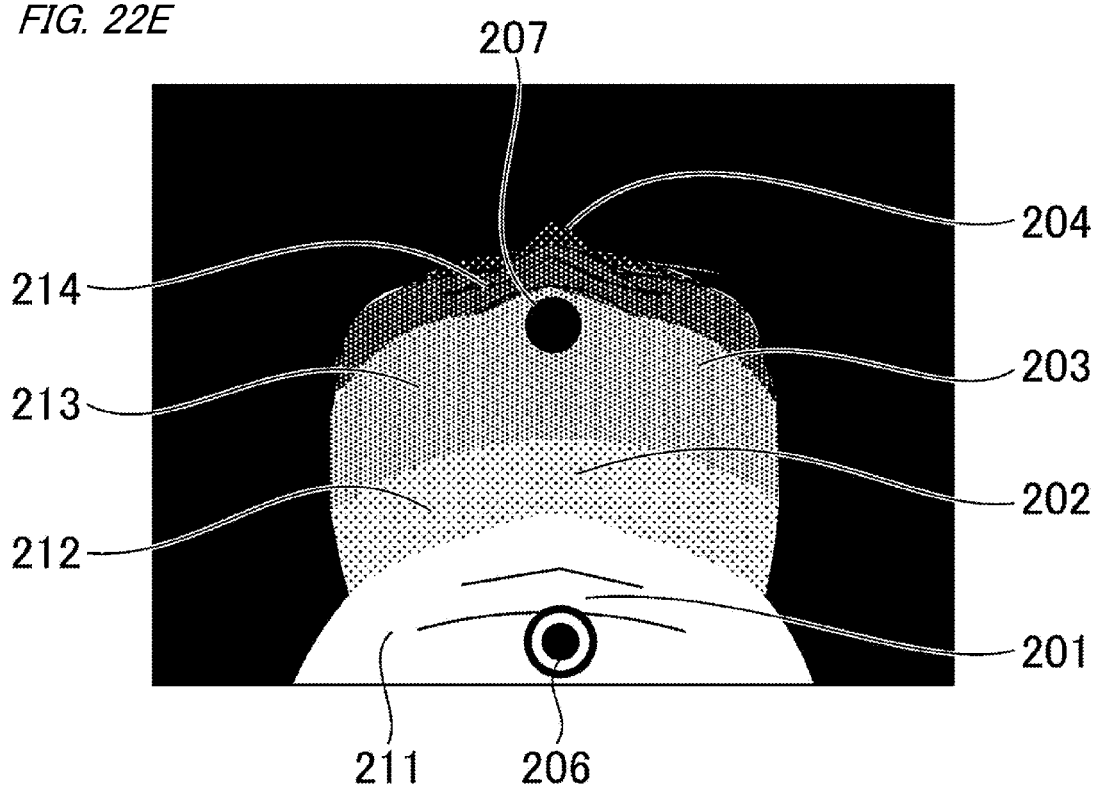
FIG. 22E is a schematic diagram illustrating a face direction image recorded by a face direction detecting unit in Step S3108 illustrated in FIG. 21 when a calibration operation for a front-face direction of a user is performed.

FIG. 22E is a schematic diagram illustrating a face direction image recorded by the face direction detecting unit 20 in Step S3108 illustrated in FIG. 21 at the time of a user's calibration operation for a front face direction.

As premised using FIGS. 8G to 8K in Embodiment 1, the face direction detecting unit 20 calculates angles of the face of the horizontal/vertical directions using distances and angles between the jaw tip positions 207, 207r, 207u, and the like and the neck position 206. However, similar to the image center, the distances and the angle values between the jaw tip positions 207, 207r, 207u, and the like and the neck position 206 have individual differences and adjustment differences represented by the physical constitution and the like of a user described above and are not constant. For this reason, in this embodiment, a relation between the jaw tip position and the neck position 206 at a time point at which the calibration button 854 is pressed is defined as a value at the time of the user having the front face as a visual field center. In accordance with this, without depending on an individual difference and an adjustment difference, the relation can be used as information for accurately calculating the face direction of the user.

Referring back to FIG. 21, in Step S3109, the overall control CPU 101 determines whether or not preparation of calibration for the front face direction has been completed. In other words, it is determined whether or not information required for calculating the jaw tip position 207, the neck position 206, and the position determination indicator center 852 has been acquired.

At this time, in a case in which the required information has not been acquired, it is determined that preparation of calibration for the front face direction has not been completed (No in Step S3109), operations from Step S3102 are repeated such that insufficient information out of the required information can be acquired again. In a case in which required information has not been acquired, apparently, all the operations from Step S3102 do not need to be performed, and only operations that are necessary for acquiring insufficient information again may be performed again.

Here, the determination of Step S3107 is performed using the face sensor 806 or the in-camera 805 mounted in the calibrator 850. Here, a specific order of this determination method will be described for a case in which a calibration operation for the front face direction of the user is performed using the in-camera 805 as an example. For a case in which the face sensor 806 is used, although there is a difference between two dimensional information and three dimensional information, the basic idea is the same and description thereof will be omitted. However, in a case in which the face sensor 806 is used in the determination of Step S3107, during a period in which the infrared ray 823 is projected from the face sensor 806 to the user, the face direction detecting unit 20 of the camera main body 1 does not perform face detection through projection of the infrared ray 23 to the user. The reason for this is for preventing the infrared rays 23 and 823 to interfere with each other.

First, when a user presses the calibration button 854 illustrated in FIG. 22A in Step S3106, the display device control unit 801 performs imaging using the in-camera 805 (a face detecting unit) and acquires an in-camera video 858 (FIG. 22F) in which the user is shown. In addition, from the acquired in-camera video 858, the display device control unit 801 detects a face 204 including the neck front part 201, the jaw tip 203, and the noise of the user and position information of the imaging/detecting unit 10 (the imaging unit 40).

Determination of whether the user is seeing the position determination indicator center 852 of the position determination indicator 851 on the visual field front face is performed by the display device control unit 801 (a determination unit) using each piece of position information detected by this in-camera video 858.

As a result of this determination, in a case in which it is determined that the user is seeing in a different direction, the display device control unit 801 displays information indicating that accurate information cannot be acquired in the instruction display 855. In accordance with this, an instruction can be given to the user to perform the calibration operation again.

There are cases in which the display device control unit 801 can determine a state in which an accurate calibration operation cannot be performed such as a state in which the imaging/detecting unit 10 is inclined by a predetermined amount or more, or the face direction detecting window 13 becomes blocked or dirty using the in-camera video 858. Also in such a case, the display device control unit 801 may display information indicating that accurate information acquisition cannot be performed in the instruction display 855.

In addition, by using the in-camera video 858 acquired in this Step S3107 and the super-wide angle image acquired in Step S3108, information required for parallax correction to be described below in Embodiment 5 can be acquired.

More specifically, before the position determination indicator 851 is imaged by the imaging unit 40 in Step S3108, information of a size (the horizontal width L851a and the vertical width L851b) of the position determination indicator 851 is transmitted from the display device 800 to the camera main body 1 in advance. In accordance with this, the overall control CPU 101 can calculate a distance between the imaging/detecting unit 10 and the position determination indicator 851 using the information of the size of the position determination indicator 851 and a video of the position determination indicator 851 shown in the super-wide angle image acquired in Step S3108. The position determination indicator 851 is disposed in the calibrator 850 that is the same casing as that of the in-camera 805, and the calibrator 850 approximately faces the user approximately on the front face in FIG. 22B, and thus it can be understood that the in-camera 805 and the imaging/detecting unit 10 are at the same distance.

Figure 22F:
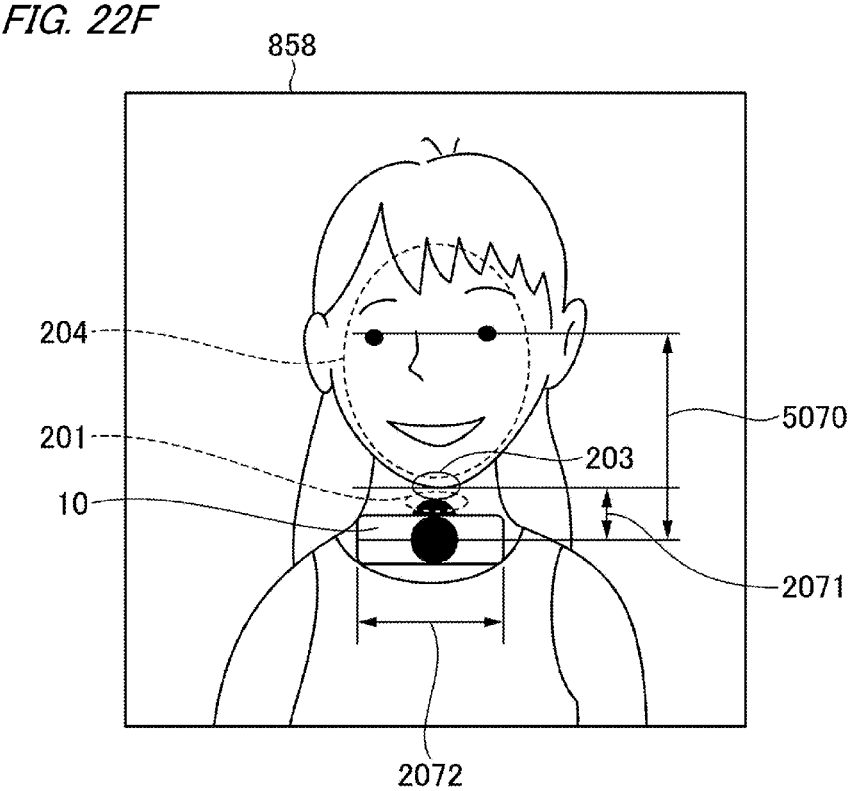
FIG. 22F is a schematic diagram illustrating a determination method used in Step S3107 illustrated in FIG. 21.

Similarly, before an in-camera video illustrated in FIG. 22F is captured by the in-camera 805 in Step S3107a, information of a size of the imaging/detecting unit 10 is transmitted from the camera main body 1 to the display device 800 in advance. In accordance with this, the display device control unit 801 (a vertical distance calculating unit) can estimate a vertical distance 5070 between the optical axis center of the imaging lens 16 and the visual point position of the user using the information of the size of the imaging/detecting unit 10 and the video of the imaging/detecting unit 10 shown in the in-camera video 858 illustrated in FIG. 22F. In addition, the display device control unit 801 can estimate a distance 2071 between the imaging lens 16 and the jaw tip 203 of the user as well. The distance 2071 may be a distance between the face direction detecting window 13 and the jaw tip 203.

Here, in order for the face direction detecting unit 20 to calculate the neck position 206 and the jaw tip position of the user, in accordance with a design purpose of the face direction detecting unit 20, it is necessary for the face of the user to be away from the face direction detecting window 13 by a predetermined distance or more. Thus, this estimation result can be set as one of determination conditions at the time of determining whether the face direction detecting unit 20 can accurately detect the face direction.

Referring back to FIG. 21, by using the method described above, in Step S3109, the overall control CPU 101 can acquire necessary information, and, in a case in which it is determined that calibration preparation of the front face direction has been completed, the process proceeds to Step S3110.

In Step S3110, the display device control unit 801 (a first calibration unit) calculates necessary information for offsetting the cutout center position such that an individual difference and an adjustment difference are absorbed and offsets the cutout center position on the basis of the information.

A specific description of the calculation performed in Step S3110 is as below.

When a user is in an ideal state according to design values and ideally wears the camera main body 1, positions of the center 856 of the super-wide angle image acquired in Step S3108 illustrated in FIG. 22C and the position determination indicator center 852 shown in the super-wide angle image approximately coincide with each other. However, actually, there are individual differences and adjustment differences as represented in the physical constitution and the like of the user described above, and thus, generally, the positions of the center 856 of the super-wide angle image and the position determination indicator center 852 do not coincide with each other.

For a user, it is preferable that the cutout center position be not a position of an image center indicated by the camera main body 1, that is, the center 856 but a position of a visual field center in the posture and the operation of the user, in other words, a position of the position determination indicator center 852 in the super-wide angle image.

For this reason, a deviation amount 857 between the position determination indicator center 852 in the super-wide angle image and the center 856 is measured, and the cutout center position is offset not to the center 856 of the camera main body 1 but to a value with reference to the position determination indicator center 852. In addition, the face direction detected by the face direction detecting unit 20 at that time is offset using a similar method.

As a specific offsetting method, the deviation amount 857 is measured for the super-wide angle image as illustrated in FIG. 22C, this deviation amount is divided into a deviation amount 857a of the horizontal direction and a deviation amount 857b of the vertical direction, and, after an appropriate conversion process is performed in accordance with a method of projecting the entire angle of view, an offset amount may be determined.

In addition, as illustrated in FIG. 22D, after an appropriate conversion process is performed on the super-wide angle image in accordance with a projection method, an offset amount may be determined. In other words, a deviation amount 857a (not illustrated in FIG. 22D) between the center 856a in the super-wide angle image after conversion and the position determination indicator center 852a is measured, and an offset amount may be determined by dividing the deviation amount 857a into the deviation amount 857c of the horizontal direction and the deviation amount 857d of the vertical direction.

Which one of the offsetting methods illustrated in FIGS. 22C and 22D is to be taken may be arbitrarily determined in consideration of a processing load and a purpose of the camera system.

By performing the calibration operation of the front face direction described above, regardless of individual differences, adjustment differences, and the like, a face direction of each user at the time of mounting, a visual field center in the face direction inside the super-wide angle image, and a face direction of the face direction detecting unit 20 can be appropriately associated with each other.

Until now, although the calibration operation of the front face direction among five directions of the front face, the upper right, the lower right, the upper left, and the lower left has been described, a similar calibration operation needs to be performed also for four directions of the upper right, the lower right, the upper left, and the lower left.

Thus, in FIG. 21, when the process of Step S3110 ends, the process proceeds to Step S3111.

In Step S3111, in a case in which it is determined that there is a direction for which a calibration operation has not been performed among five directions of the front face, the upper right, the lower right, the upper left, and the lower left, a direction for which the calibration operation is to be performed is changed to the one direction, and the process returns to Step S3103. In accordance with this, for the remaining directions other than the front face direction for which the calibration operation has already ended, similarly, a calibration operation is repeated.

Although not illustrated in FIG. 21, in Step S3111, in a case in which it is determined that there is no direction for which the calibration operation has not been performed, this process directly ends.

FIGS. 23A to 23E are diagrams illustrating a calibration operation for an upward direction of the right hand of a user (an upper right direction in a super-wide angle image). FIGS. 23A to 23E respectively correspond to FIGS. 22A to 22E, and a basic operation is the same, and thus common description will be omitted.

Figure 23A:
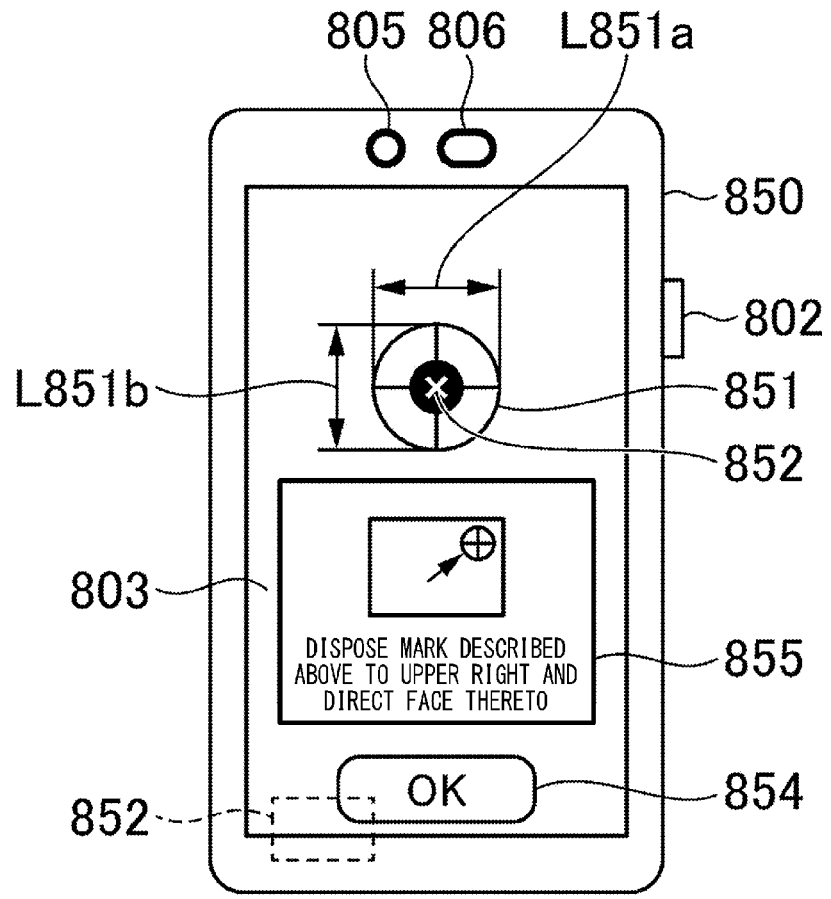
FIG. 23A is a diagram illustrating a screen displayed in the display unit of the calibrator in Step S3103 illustrated in FIG. 21 when a calibration operation in an upper direction of a right hand of a user is performed.

Here, as illustrated in FIG. 23A, in the instruction display 855, an instruction using characters is written such that the position determination indicator 851 is disposed to have a visual field at the time of the face facing an upper right side as its center.

Figure 23B:
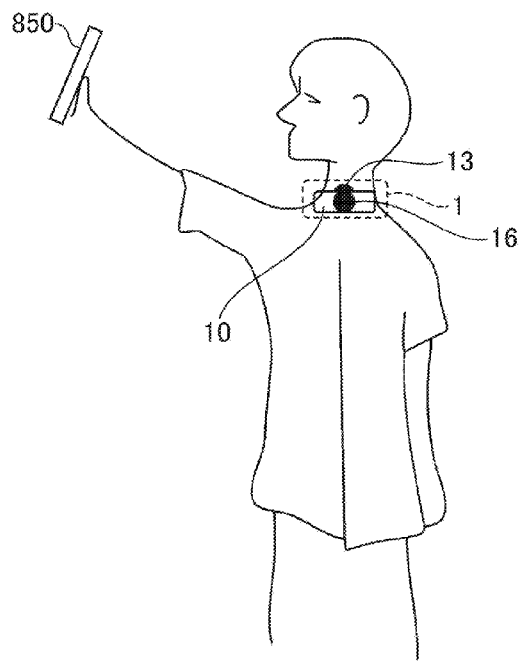
FIG. 23B is a perspective view illustrating an appearance in which a user holds up the calibrator to an upper right side in accordance with an instruction represented in an instruction display illustrated in FIG. 23A.

FIG. 23B illustrates a perspective view of an appearance in which a user shades an upper right side with the calibrator 850 in accordance with an instruction represented in the instruction display 855 illustrated in FIG. 23A.

Figure 23C:
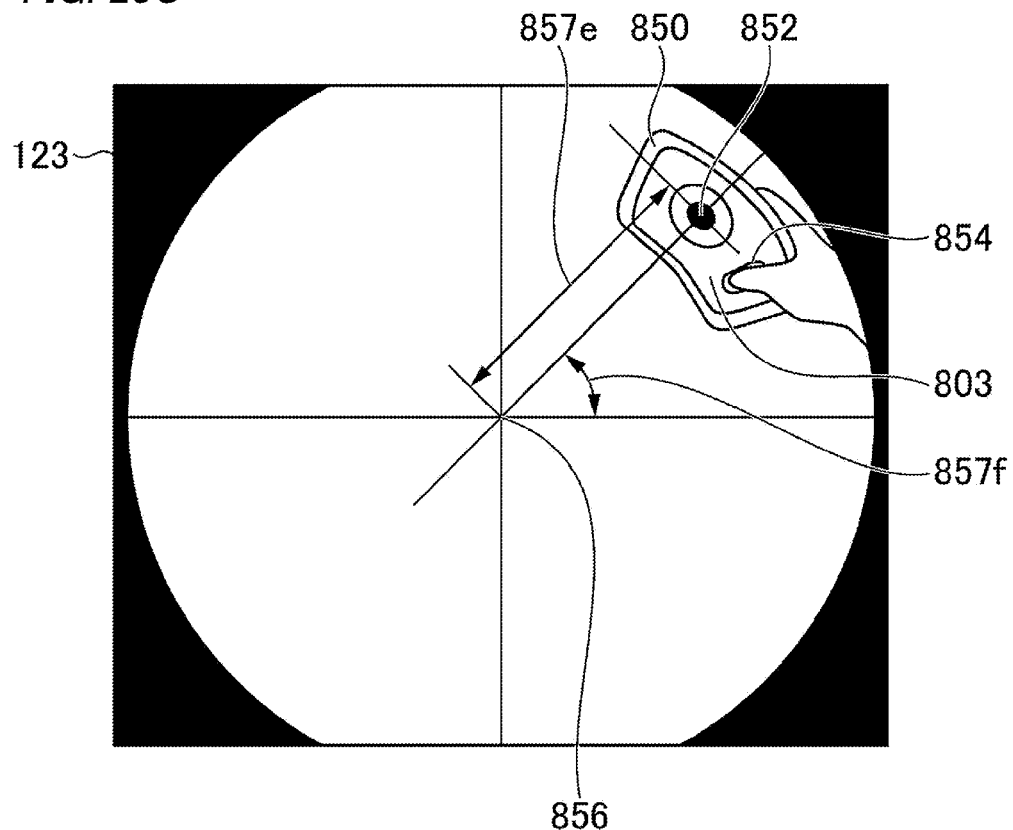
FIG. 23C is a schematic diagram illustrating an entire super-wide angle image perceived by the imaging lens in the state illustrated in FIG. 23B.

FIG. 23C is a schematic diagram illustrating an entire super-wide angle image perceived by the imaging lens 16 in the state illustrated in FIG. 23B.

As illustrated in FIG. 23C, as a specific offsetting method, first, a deviation amount 857 between a center 856 of a super-wide angle image and a position of the position determination indicator center 852 is measured. Thereafter, the measured deviation amount 857 is divided into a deviation amount 857e of a radial direction and a deviation amount 857f of an angular direction, and an offset amount may be determined after an appropriate conversion process is performed in accordance with a projection method of the entire angle of view.

Figure 23D:
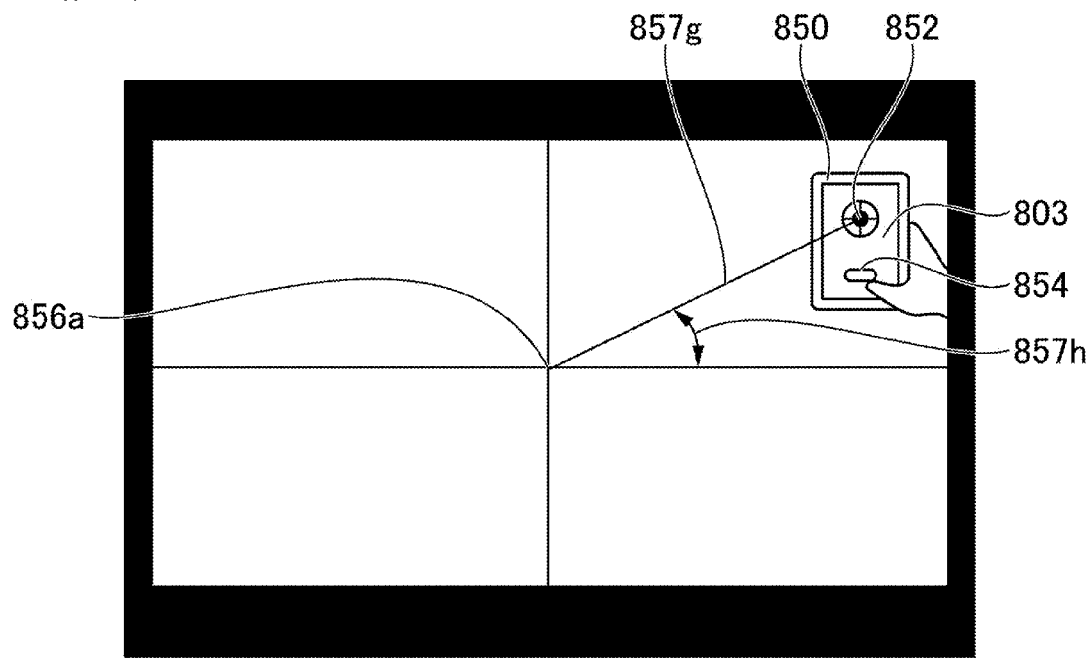
FIG. 23D is a schematic diagram illustrating an image acquired by correcting an aberration of the super-wide angle image illustrated in FIG. 23C.

In addition, other than that, as illustrated in FIG. 23D, after an appropriate conversion process is performed on the super-wide angle image in accordance with a projection method, an offset amount may be determined. In other words, a deviation amount 857a (not illustrated in FIG. 23D) between a center 856a of the super-wide angle image after conversion and a position determination indicator center 852a is measured, and an offset amount may be determined by dividing the deviation amount 857a into a deviation amount 857g of the radial direction and a deviation amount 857h in the angular direction.

In the determination of offset amounts described with reference to FIGS. 22A to 22E, a method in which a deviation amount is divided into a vertical direction and a horizontal direction is used. In contrast to this, in the determination of offset amounts described with reference to FIGS. 23A to 23D, a method in which a deviation amount is divided into a radial direction and an angular direction is used. However, a difference in the methods is only for the convenience of description, and any method may be used.

Figure 23E:
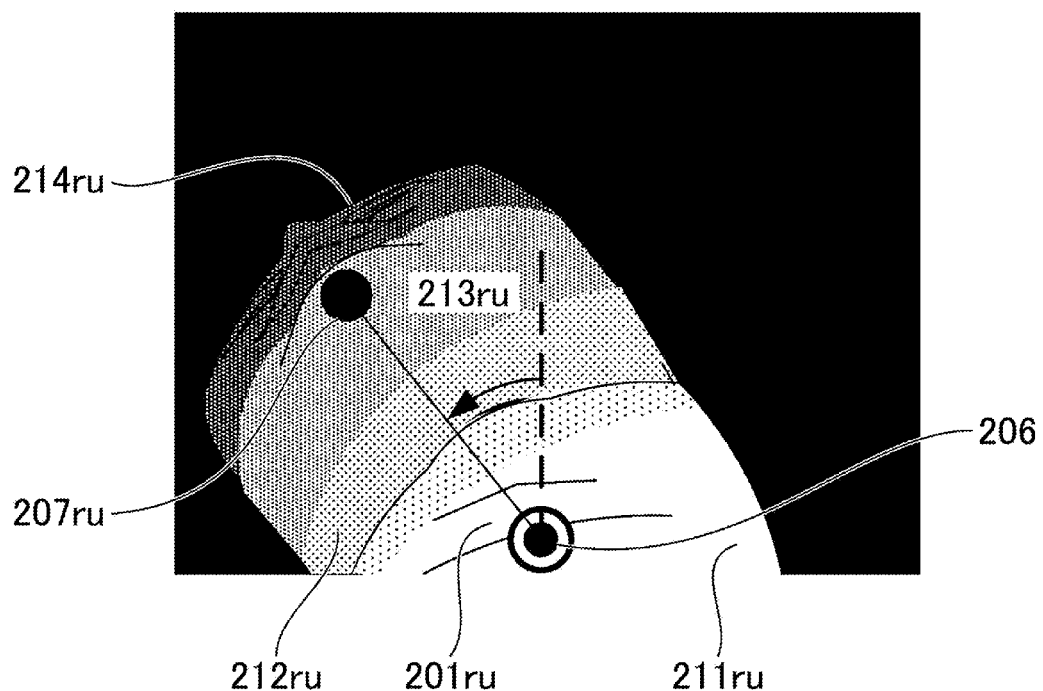
FIG. 23E is a schematic diagram illustrating a face direction image recorded by the face direction detecting unit in Step S3108 illustrated in FIG. 21 when a calibration operation for an upper direction of a right hand of a user is performed.

In addition, at this time, as illustrated in FIG. 23E, the neck position 206 and the jaw tip position 207ru that are necessary for calculating a face direction at the time of the user facing in an upper right direction are acquired by the face direction detecting unit 20. For this reason, regardless of an individual difference and an adjustment difference of a user, a face direction formed when the user sees the direction of the position determination indicator center 852 (in this case, the upper right direction) can be accurately measured.

As above, in the calibration process illustrated in FIG. 21, the calibration operation is performed not only for the front face direction but also for each of directions of the upper right, the lower right, the upper left, and the lower left. In accordance with this, in a case in which a user waggles the head in one of upward, downward, leftward, and rightward directions, the face direction detecting unit 20 can accurately measure a direction in which the user faces, and thus the camera main body 1 can be appropriately used regardless of an individual difference and an adjustment difference.

In the description presented above, for the simplification, a method in which the calibration operation is repeatedly performed explicitly for 5 directions of the front face, the upper right, the lower right, the upper left, and the lower left has been described.

However, the calibration operation is not limited to this method. For example, a method in which a user continuously moves the calibrator 850 in a shape such as a letter Z shape, a spiral shape, a polygonal shape, or the like in accordance with the instruction display 855, and the position determination indicator 851 displayed in the calibrator 850 is continuously perceived as a visual field center may be employed. In this method, while the calibrator 850 is moving in accordance with this method, the display device control unit 801 transmits a calibration instruction to the camera main body 1 several times. Every time when a calibration instruction is received, the overall control CPU 101 acquires a face direction detected by the face direction detecting unit 20 and position coordinates information of the position determination indicator center 852 in the super-wide angle image captured by the imaging unit 40 and stores them as history information. Thereafter, the overall control CPU 101 combines information extracted from the acquired history information and calculates a relationship between a cutout center position of the video and the face direction of the user. In addition, by using information of the in-camera 805 and the face sensor 806 acquired on the calibrator 850 side during movement of the calibrator 850 according to this method, information extracted from the history information may be set to only information of a state in which the user is seeing the position determination indicator 851. In accordance with this, for example, information of a state in which a user is looking aside is not extracted from the history information, and thus accuracy of calculation of the relationship can be improved.

In addition, the display device control unit 801 may be configured to transmit also a measured value acquired by the angular velocity sensor 807 to the camera main body 1 at the time of a calibration instruction. In this case, the overall control CPU 101 acquires a user's movement method of the calibrator 850 and movement information representing a position and a posture of the calibrator 850 from the transmitted measured value acquired by the angular velocity sensor 807 and also stores this as the history information. In accordance with this, a calibration operation can be performed simply, easily, and accurately from the movement information based on the measured value acquired by the angular velocity sensor 807, the face direction detected by the face direction detecting unit 20, and the position coordinates information of the position determination indicator center 852 in the super-wide angle image captured by the imaging unit 40.

However, in this case, movement information based on the measured value acquired by the angular velocity sensor 807 and movement information based on the position coordinates information of the position determination indicator 851 need to coincide with each other. For this reason, in a case in which a measured value acquired by the angular velocity sensor 807 is used, communication between the camera main body 1 and calibrator 850 needs to be synchronized with each other.

As above, in Embodiment 2, a calibration method associating a face direction of a user and a center position of a target visual field 125 in a super-wide angle image even in the case of an individual difference and an adjustment difference being present has been described. However, the present disclosure is not limited to various forms illustrated in Embodiment 2, and various modifications and changes can be made within the range of the concept thereof.

Embodiment 3

In Embodiment 3, a method of preventing video sickness according to secondarily recorded video will be described with reference to FIGS. 24A to 24C, 25A, 25B, and 26.

Basically, this embodiment will be described as a derivation from Embodiment 1. For this reason, the same reference signs will be used for components that are the same as the components of the camera system according to Embodiment 1 among components of a camera system according to Embodiment 3, duplicate description will be omitted, and other components will be described in detail with additional notes as necessary.

In accordance with progress of video technologies, CG like a real picture and a powerful three-dimensional video can be conveniently enjoyed.

On the other hand, in a case in which such a three-dimensional video is a video having dynamic movement of a VR or the like or video having much hand shaking, when the three-dimensional video is seen, video sickness may easily occur. Video sickness may cause a symptom such as motion sickness, and thus interest in a safety measure therefor increases.

When a video of a direction in which a user's face faces is cut out and developed as it is in the recording range developing process (Step S500), in a case in which the user's face quickly moves at the time of imaging using the imaging unit 40 (Step S400), a video scene is switched at a high speed as well.

Although a user who is moving his or her face quickly at the time of imaging using the imaging unit 40 has no sickness, in a case in which such a video scene is included in a completed video that has been secondarily recorded in Step S1000, there is a likelihood of a viewer viewing such a video having video sickness.

Also in Japanese Patent Application No. 2007-74033 and Japanese Patent Application No. 2017-60078 in which a video is formed in a direction in which a user is facing, there is no description of a measure for such video sickness.

Thus, in this embodiment, a camera system that, even in a case in which a user quickly moves his or her face at the time of imaging using the imaging unit 40, performs control such that a video scene switched at a high speed is not included in a completed video and prevents a viewer from having video sickness is provided.

The same reference signs will be used for components that are the same as the components of the camera system according to Embodiments 1 and 2 among components of a camera system according to Embodiment 3, duplicate description will be omitted, and other components will be described in detail with additional notes as necessary.

As described with reference to FIGS. 8H to 8K and FIGS. 10B to 10D, when imaging is performed using the imaging unit 40, a user's face rotates in vertical and horizontal directions.

Thus, hereinafter, a direction and a speed with which a user's face is moving is represented by an angular velocity $\omega$, and a movement distance thereof will be represented by an angle $\theta$.

The angular velocity $\omega$ is calculated by dividing an angle $\theta$ detected by the face direction detecting unit 20 by a detection interval.

Here, examples of operations of a person quickly moving his or her face include looking back, glancing look, observation of a moving object, and the like.

The looking back is, for example, a vigorously looking back operation in a case in which a large sound is generated on the back.

The glancing look is an operation of returning to the original position of a face due to no much interest after seeing a change that may be interesting occurred in a visual field.

The observation of a moving object is an operation of observing a bird actively flying in the sky, kite flying, and the like.

In a case in which such an operation has occurred at the time of imaging using the imaging unit 40, when a video of a direction in which a user's face faces is cut out and developed as it is in the recording range developing process, as described above, there is a likelihood of a viewer of the finished video having video sickness.

Thus, in a case in which an angular velocity $\omega$ equal to or higher than a threshold $\omega 0$ is calculated for a predetermined time or more (a first predetermined time or more), the overall control CPU 101 determines that a user's operation of quickly moving his or her face (one of looking back, glancing look, and observation of a moving object) has occurred. In addition, in a case in which it is determined that an operation that has occurred is neither glancing look nor observation of a moving object using a method to be described below with reference to FIGS. 25A and 25B, the overall control CPU 101 determines that the operation is looking back. In this case, instead of cutting out a video of a direction in which a user's face faces as it is in the recording range developing process, the overall control CPU 101 performs delayed cutout in which cutting out with a delay is performed for movement of the user's face.

Here, in this embodiment, the threshold ω0 is set to π/8 rad/s. This is a speed at which the face moves from the front face of 0 degrees to the side of 90 degrees in four seconds. However, the threshold ω0 is not limited to π/8 rad/s. For example, on the basis of a frame rate n fps, the threshold ω0 may be set to (n×π)/x rad/s (here, x is an arbitrary value) or the like.

As an angular velocity ω, the angular velocity $ω_n$ can be acquired using the following equation from an angle $θ_n$ acquired from an image of this frame n and an acquisition time $t_n$ thereof and an angle $θ_{n-1}$ acquired from an image of a previous frame n−1 and an acquisition time $t_{n-1}$ thereof.

$$ω_n=(θ_n-θ_{n-1})/(t_n-t_{n-1})$$

Here, the angular velocity ω may be an arithmetic mean of $w_{n-x}$ to $w_n$.

In addition, in this embodiment, the predetermined time is 0.2 seconds but is not limited to this value.

Figure 24A:
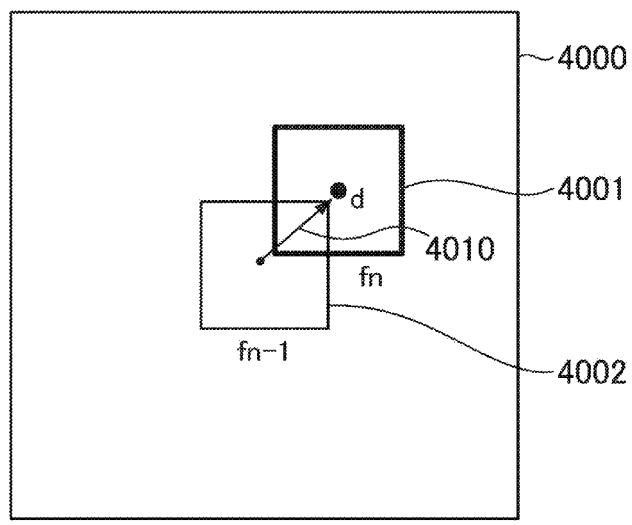
FIGS. 24A to 24C are diagrams illustrating a delayed cutout of an image according to Embodiment 3.
Figure 24B:
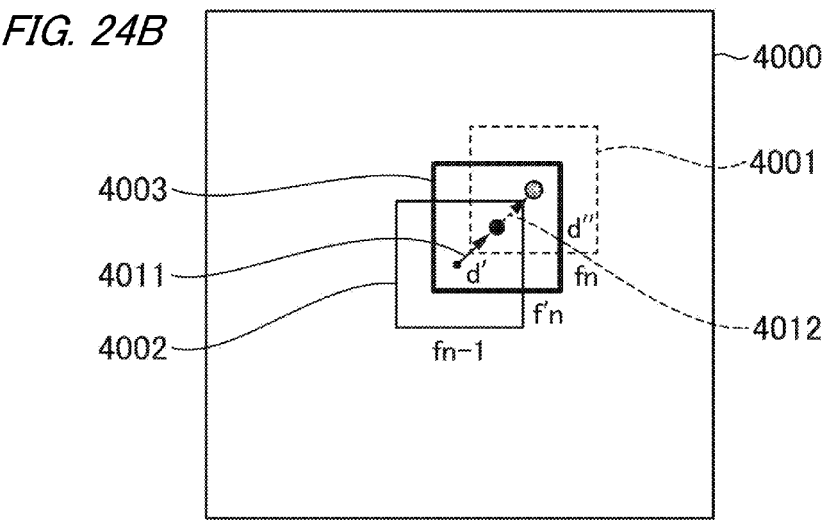
Figure 24C:
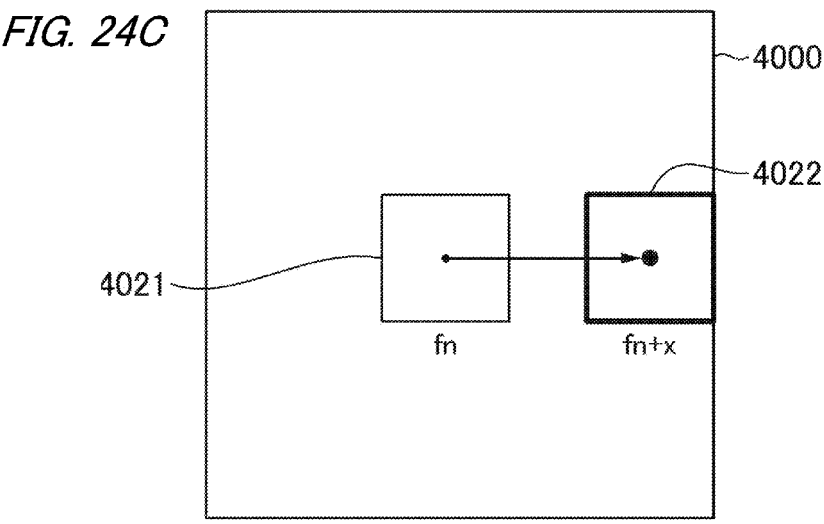

Hereinafter, delayed cutout in a case in which the user looks back will be described with reference to FIGS. 24A to 24C.

Although the description of Embodiment 1 with reference to FIGS. 11A to 11F and 12A to 12G is description with distortion of the imaging lens 16 taken into account, in this embodiment, for simplification of description, the distortion of the imaging lens 16 will not be taken into account. In addition, the calibration process according to Embodiment 2 is performed for an image of a frame, and a center of an image of each frame is assumed to coincide with a visual field center of a user at the time of imaging the image in description. Furthermore, in order to describe a case in which a face faces the side, a case in which a light beam of which a maximum FOV angle is up to about 192° is projected to a solid-state imaging element 42 will be described as an example.

An area 4000 represents a pixel area that can be imaged by the solid-state imaging element 42.

An image 4001 (FIG. 24A) and an image 4022 (FIG. 24C) are images of a frame $f_n$ cut out in a direction in which the face currently faces as a target visual field 125.

An image 4002 (FIG. 24A) and an image 4021 (FIG. 24C) are images of a frame $f_{n-1}$ cut out in a direction in which the face faces in the previous time as a target visual field 125.

A distance 4010 (FIG. 24A) is a distance from a center of the image 4002 of a frame $f_{n-1}$ to a center of the image 4001 of the frame $f_n$. Hereinafter, a value of a distance from the center of the image of the frame $f_{n-1}$ to the center of the image of the frame $f_n$ is denoted by d.

An image 4003 (FIG. 24B) is an image that is cut out from a video projected into the area 4000 as an image of a delay cutout frame $f'_n$ in a case in which the angular velocity ω of the face based on a face direction detected by the face direction detecting unit 20 is equal to or higher than a threshold ω0.

A distance 4011 is a distance from a center of the image 4002 of the frame $f_{n-1}$ to a center of the image 4003 of the delay cutout frame $f'_n$. Hereinafter, a value of the distance from the center of the image of the frame $f_{n-1}$ to the center of the image of the delay cutout frame $f'_n$ will be denoted by d'.

A delay distance 4012 is a distance from the center of the image 4001 of the frame $f_n$ to the center of the image 4003 of the frame $f'_n$, and, hereinafter, a value thereof will be denoted by d".

At this time, when the value d of the distance 4010 and the value d' of the distance 4011 are compared with each other, d>d'.

Next, an example of a method for determining the value d' will be described with reference to FIG. 24C.

Here, a case in which a user quickly moves his or her face from the front face (an observation direction vo (vector information [0°, 0°])) in a rightward direction to the side of 90 degrees will be described. In this case, after a frame $f_n$ in which the face faces the front face (an observation direction vo (vector information [0°, 0°])) is acquired, when a short time elapses, an image 4022 of a frame $f_{n+x}$ in which the face faces from the front face in a rightward direction to the side 90° is acquired.

When it is necessary to move to the side 90° for t seconds (for example, 4 seconds) or more from the front face in a rightward direction to the side 90° for preventing video sickness, in a case in which a frame rate of the video is n fps (for example, 30 fps), d'=$(f_{n+x}-f_n)$/(n fps×t seconds).

On the other hand, when the distance d" from the frame $f_n$ to the frame $f'_n$ increases, a direction in which the face faces is not a recording direction, and thus there is a likelihood of a subject, which is being seen by the user, being not shown in the frame $f_n$.

Thus, in a case in which a delay time becomes a predetermined time $Th_{delay}$ (a second predetermined time) or more, delayed cutout stops, and cutout of a direction in which the face is currently facing is performed.

Here, the delay time is a difference between a time t0 at which occurrence of a delay starts (Step S4211 illustrated in FIG. 26) and a current time $t_n$ (Step S4213 illustrated in FIG. 26) at which the face continues to move.

The predetermined value $Th_{delay}$ is set to one second in this embodiment but is not limited thereto. For example, the predetermined value $Th_{delay}$ may be set to 20/n seconds on the basis of the frame rate n fps. In a case in which the predetermined value $Th_{delay}$ is 20/n seconds, the higher the frame rate, the shorter the predetermined value $Th_{delay}$. The reason for this is that the higher the frame rate, the lower the likelihood of video sickness, and thus return to the cutout process of the direction in which the face is currently facing may be performed in a short delay time.

On the other hand, delayed cutout stops, and return to cutout of the direction in which the face is currently facing is performed, a video scene is suddenly switched. Such a sudden switching of a video scene is felt unnaturally by the user, and thus fade-out, fade-in, or any other video effects may be taken in.

In addition, a locus of the face is stored such that cutout of the direction in which the face is currently facing can be restarted.

Here, the locus of the face that is stored in a case in which it is determined that the user is glance looking with reference to FIG. 25A will be described as an example.

The process of stopping delayed cutout and returning to cutout of the direction in which the face is currently facing, as described above, is performed not only in a case in which the delay time becomes the predetermined value $Th_{delay}$ or more but also in the case of glance looking, in other words, a case in the face faces in the original direction immediately after seeing in a specific direction.

Figure 25A:
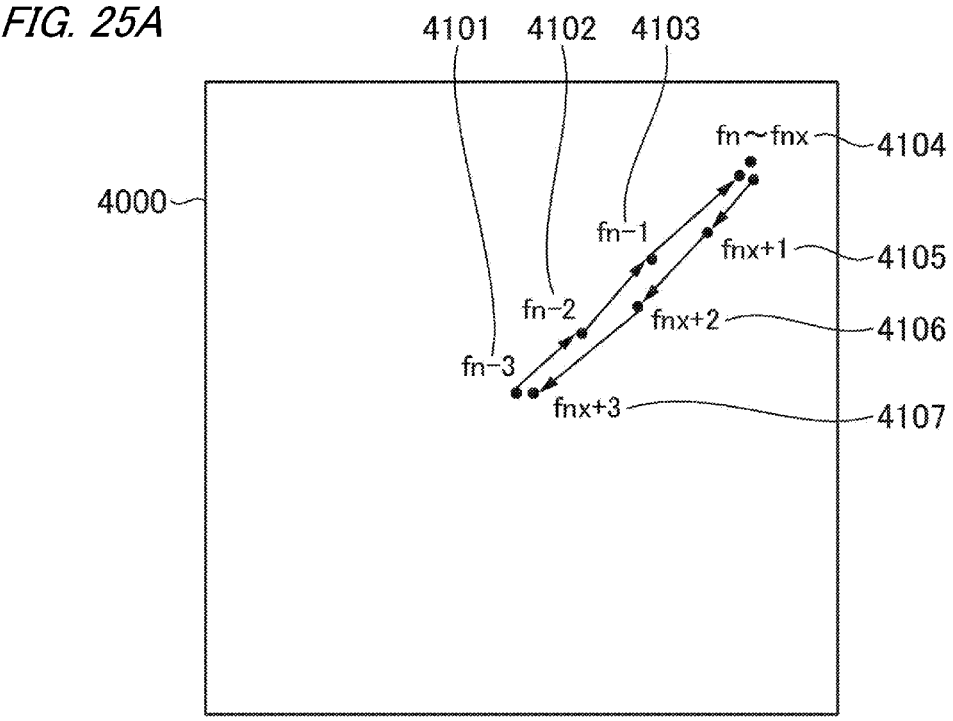
FIGS. 25A and 25B are diagrams illustrating a locus of a face that is stored in Embodiment 3.

FIG. 25A is a diagram illustrating an example of a locus of a face in which a user is during glance looking.

A position 4101 that is the center of the image of the frame $f_{n-3}$ coincides with a visual field center of the user at the time of starting to move the face. Thereafter, the visual field center of the user moves to positions 4102, 4103, and 4104 that are centers of images of the frames $f_{n-2}$, $f_{n-1}$, and $f_n$. Hereinafter, such movement of the visual field center of the user will be referred to as a movement vector of the face.

Thereafter, the movement vector of the face stays at the position 4104 for the time being, moves to positions 4105, 4106, and 4107 that are centers of images of frames $f_{nx+1}$, $f_{nx+2}$, and $f_{nx+3}$, and stops at a position 4107 that is the center of the image of the frame $f_{nx+3}$.

In other words, the movement vectors of the face of the positions 4101 to 4104 and the movement vectors of the face of the positions 4104 to 4107 are opposite to each other.

In a case in which a frame group in which movement vectors of the face coincide with each other in the opposite direction as illustrated in FIG. 25A is detected, the overall control CPU 101 determines that the frame group is a frame group during glance looking.

In this case, the overall control CPU 101 performs delayed cutout from the position 4101 at which the face has started to move to the position 4104 at which the movement vector of the face has started to oppositely move. The reason for this is that the position 4104 is assumed to be a position at which a subject for which the user desires to perform glance looking is shown.

On the other hand, after delayed cutout has started up to the position 4104, return to cutout in the direction in which the face is currently facing, in other words, cutout at the position 4107 at which the movement of the face has stopped is performed.

In addition, the overall control CPU 101, when the face of the user is moving, detects an object present near the center in the face direction and, in a case in which the detected object continues to be present at the center in the face direction, determines that the user is observing a moving object. In such a case, delayed cutout is not performed in this embodiment.

Figure 25B:
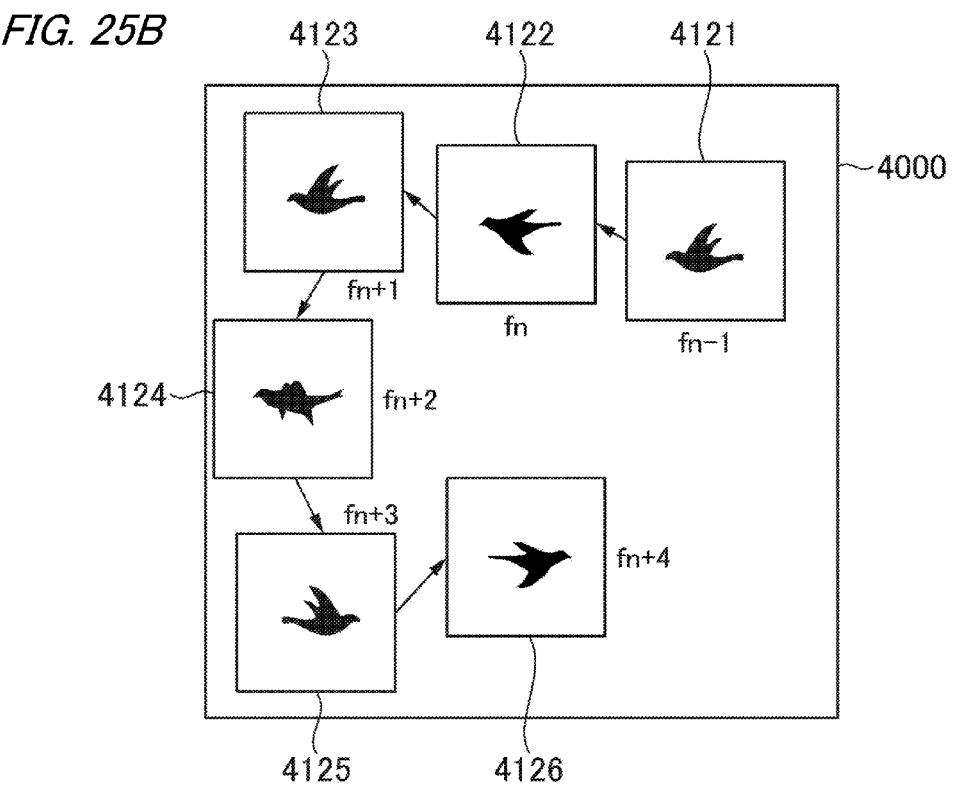

FIG. 25B is a diagram illustrating an example of an image of each frame in a case in which a user is observing a moving object.

A position that is a center of an image 4121 of the frame $f_{n-1}$ coincides with a visual field center of the user at the time of the face starting to move. Thereafter, the visual field center of the user moves to positions that are centers of images 4122 to 4126 of frames $f_n$, $f_{n+1}$, $f_{n+2}$, $f_{n+3}$, and $f_{n+4}$.

A bird that is the same subject is continuously present near the centers of the images 4121 to 4126 of the respective frames.

In a case in which a continuous frame group in which the same subject is present near centers of images, as illustrated in FIG. 25B, is detected, the overall control CPU 101 determines the frame group as a frame group during observation of a moving object.

In this case, the overall control CPU 101 does not perform delayed cutout.

The reason for this is that, in a case in which delayed cutout is performed at the time of observing a moving object, there is a high likelihood of the subject not being shown in the video.

In addition, when a viewer views videos acquired by cutting out the images 4121 to 4126 in accordance with quick movement of the face of the user at the time of observing a moving object, there is a likelihood of causing video sickness. Thus, the overall control CPU 101 does not perform cutout of an image for a frame group during observation of a moving object and records an image of the entire pixel area that can be imaged by the solid-state imaging element 42, that is, the area 4000.

Each of the threshold $\omega 0$, the predetermined time, and the predetermined value $Th_{delay}$ may have a width called a dead zone.

Figure 26:
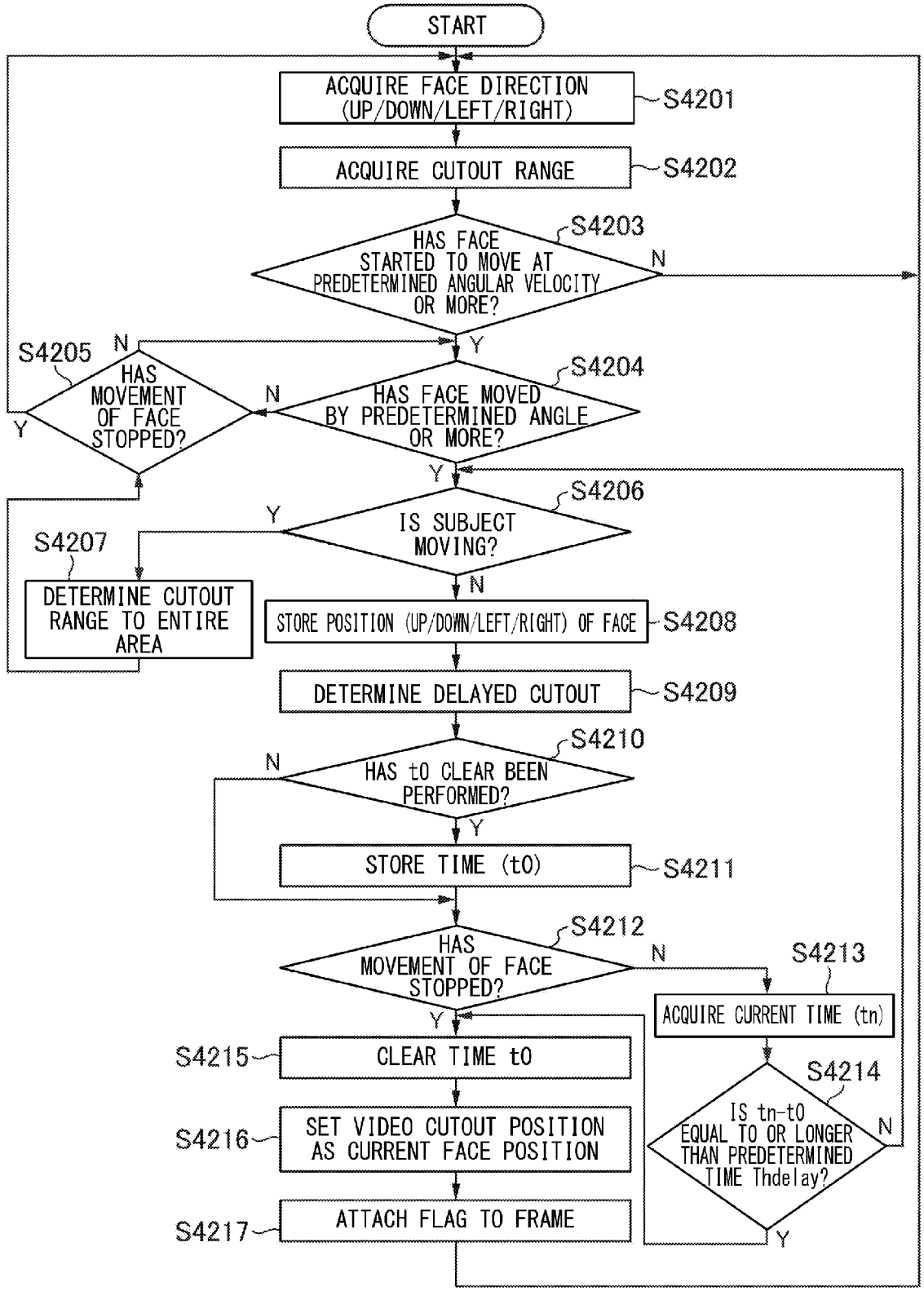
FIG. 26 is a flowchart of a visually-induced video sickness preventing process according to Embodiment 3.

Next, a video sickness preventing process according to this embodiment will be described using a flowchart illustrated in FIG. 26. The process is performed every time frame capturing of Step S400 is performed during moving image capturing using the imaging unit 40.

In Step S4201, the overall control CPU 101 acquires a face direction (an observation direction) recorded in the primary memory 103 in the face direction detecting process performed for frame capturing of this time.

In Step S4202, the overall control CPU 101 acquires a position and a size (a cutout range) of a video recording frame recorded in the primary memory 103 in the recording direction/range determining process performed for frame capturing of this time.

In Step S4203, the overall control CPU 101 (an arithmetic operation unit) calculates an angular velocity $\omega$ of the face on the basis of the face direction at the time of frame capturing of this time acquired in Step S4201, the face direction at the time of frame capturing of the previous time stored in the primary memory 103, and the frame rate. Thereafter, the overall control CPU 101 determines whether or not the face has started to move at an angular velocity $\omega$ that is a threshold $\omega 0$ or more. More specifically, when the face of the user moves at an angular velocity $\omega$ that is equal to or higher than the threshold $\omega 0$ for a predetermined time (0.2 seconds) or more, it is determined that the face has started to move at the angular velocity $\omega$ that is equal to or higher than the threshold $\omega 0$. In a case in which it is determined that the face has started to move, the process proceeds to Step S4204, and in a case in which it is determined otherwise, the process returns to Step S4201. In other words, even in a case in which the face of the user has moved at the angular velocity $\omega$ that is equal to or higher than the threshold $\omega 0$, in a case in which the time is less than a predetermined time (less than a predetermined first time), the process returns to Step S4201. In addition, also in a case in which a face direction at the time of frame capturing of the previous time is not stored in the primary memory 103, and an angular velocity of the face cannot be calculated in Step S4203, the process returns to Step S4201.

In Step S4204, the overall control CPU 101 determines whether or not the face has moved by a predetermined angle or more on the basis of the angular velocity $\omega$ of the face calculated in Step S4203. In a case in which it is determined that the face has moved, the process proceeds to Step S4206, and in a case in which it is determined otherwise, the process proceeds to Step S4205. In Step S4204, it may be determined whether or not the face has moved at a predetermined angular velocity or more (Yes in Step S4203) for a predetermined time (0.2 seconds) or more.

In Step S4205, the overall control CPU 101 determines whether or not movement of the face has stopped on the basis of the angular velocity $\omega$ of the face calculated in Step S4203. In a case in which it is determined that the face is stopped, the process returns to Step S4201 and, in a case in which it is determined otherwise, the process returns to Step S4204.

In Step S4206, the overall control CPU 101 determines whether or not a subject that is being imaged is moving (whether the user is observing a moving object). In a case in which it is determined that the subject is moving, the process proceeds to Step S4207, and in a case in which it is determined otherwise, the process proceeds to Step S4208.

In Step S4207, the overall control CPU 101, in the recording range developing process of this frame, does not perform the crop developing process and determines to perform a process of developing entire area raw data acquired from the entire solid-state imaging element 42, and the process proceeds to Step S4205.

In Step S4208, the overall control CPU 101 stores a face direction at the time of frame capturing of this time acquired in Step S4201 in the primary memory 103 as a face direction at the time of frame capturing of the previous time, and the process proceeds to Step S4209.

In Step S4209, the overall control CPU 101 (a delaying unit), in the recording range developing process of this frame, determines to perform the crop developing process for a cutout range having a position deviating from the face direction of the previous frame by a distance d as its center (delayed cutout). Thereafter, the process proceeds to Step S4210.

In Step S4210, the overall control CPU 101 determines whether or not a start time t0 of the delay time stored in the primary memory 103 has been cleared. In a case in which it is determined that the delay time has cleared, the process proceeds to Step S4211, and in a case in which it is determined otherwise, the process proceeds to Step S4212.

In Step S4211, the overall control CPU 101 stores a current time in the primary memory 103 as a start time t0, and the process proceeds to Step S4212.

In Step S4212, the overall control CPU 101 determines whether or not movement of the face has stopped in a stage before the delay time becomes over the predetermined value $Th_{delay}$ on the basis of the angular velocity ω of the face calculated in Step S4203. In a case in which it is determined that the movement has stopped, the process proceeds to Step S4215, and in a case in which it is determined otherwise, the process proceeds to Step S4213.

In Step S4213, the overall control CPU 101 stores the current time in the primary memory 103 as a time tn, and the process proceeds to Step S4214.

In Step S4214, the overall control CPU 101 calculates a delay time that is a difference between the time tn stored in the primary memory 103 and the start time to and determines whether or not the delay time is equal to or longer than the predetermined time $Th_{delay}$. In a case in which the delay time is equal to or longer than the predetermined time $Th_{delay}$, the process proceeds to Step S4215, and otherwise, the process proceeds to Step S4206.

In Step S4215, the overall control CPU 101 clears the start time to stored in the primary memory 103, and the process proceeds to Step S4216.

In Step S4216, the overall control CPU 101 determines a recording direction and an angle of view using the recording direction/angle of view determining unit 30 on the basis of the face direction detected by the face direction detecting unit 20, and the process proceeds to Step S4217.

In Step S4217, the overall control CPU 101 records a flag of metadata of this frame, and the process proceeds to Step S4201. The flag of the metadata attached here is used as a timing for applying a video effect (a fade effect) such as fade-in and fade-out described above at the time of secondary recording described in Step S1000 according to Embodiment 1.

As above, in this embodiment, in a case in which the angular velocity ω of the face becomes the threshold ω0 or more, a frame of the direction in which the face faces is not cut out as it is but is cut out in accordance with movement of the face, and thus there is an effect of reducing video sickness.

Embodiment 4

In Embodiment 4, a method of correcting a cutout range of a video in accordance with a movement speed of orientation of a face of a user will be described with reference to FIGS. 27A to 27F, 28A and 28B.

Basically, this embodiment will be described as a derivation from Embodiment 1. For this reason, the same reference signs will be used for components that are the same as the components of the camera system according to Embodiment 1 among components of a camera system according to Embodiment 4, duplicate description will be omitted, and other components will be described in detail with additional notes as necessary.

First, an operation of a person changing an observation direction will be described. Generally, in a case in which a person finds an interesting thing on the corner of a visual field deviating from the center of the visual field and directs the observation direction to that side, first, his or her face moves, and, when the amount of movement becomes a certain degree or more, the body follows the face with a delay.

In other words, in such a case, the direction of the imaging lens 16 on the imaging/detecting unit 10 (FIG. 10A) present in front of the clavicle does not move when only the face changes the orientation in initial movement. Thereafter, when the user changes the orientation in the entire body, the direction of the imaging lens 16 of the camera main body 1 moves as well. On the basis of such characteristics of human behaviors, hereinafter, description will be presented.

In addition, in a case in which a face direction is detected by the face direction detecting unit 20, a deviation according to detection error occurs. When a cutout position of a video is calculated on the basis of a result of detection of the face direction in which such a deviation is included, a deviation such as a hand shake of general moving image occurs in a moving image that is secondarily recorded in Step S1000, and the appearance becomes bad. Thus, in order to correct detection of small shake, a small deviation is eliminated by applying a lowpass filter to the result of detection of the face direction.

In addition, when a face direction is detected by also following instantaneous movement of the face such as left/right side checking at the time of walking on a public road, the moving image that has been secondarily recorded in Step S1000 becomes a moving image that may easily cause video sickness. For this reason, in this embodiment, a process of eliminating (smoothing) a micromotion component of the face direction detected by following an instantaneous movement of the face for about 1 second to two seconds is performed. In accordance with this, the moving image that has been secondarily recorded in Step S1000 can be formed as a moving image having a good appearance.

Next, an overview of the cutout range correcting process according to this embodiment will be described with reference to FIGS. 27A to 27F.

In graphs illustrated in FIGS. 27A to 27F, horizontal axes represent time, and vertical axes respectively represent angles of an actual observation center (FIG. 27A), face directions (FIGS. 27B and 27C), a direction of the imaging lens 16 (FIG. 27D), and cutout positions (FIGS. 27E and 27F). In the vertical axis, an upward direction represents rightward direction.

FIG. 27A is a graph representing movement of an actual observation center. An angle in the vertical axis of FIG. 27A does not represent an angle representing a face direction detected by the face direction detecting unit 20 but represents a face position of a user from a fixed position (with reference to a ground surface) such as a ground surface or the like. In other words, the graph illustrated in FIG. 27A represents that, first, a user faces a front face and starts to face the right side about one second.

FIG. 27B is a graph representing a detection result (an observation direction vi) acquired by the face direction detecting unit 20. The reason for a line representing the detection result illustrated in FIG. 27B not being smooth is that, as described above, there is a deviation according to detection error in the detection result. Thus, in this embodiment, a lowpass filter is applied to the detection result acquired by the face direction detecting unit 20.

Although not detected in FIG. 27B, a process of eliminating (smoothing) a face direction detected by following instantaneous movement of the face is performed.

FIG. 27C is a graph illustrating a case in which a detection result acquired by the face direction detecting unit 20 illustrated in FIG. 27B is smoothed through a lowpass filter. As illustrated in FIG. 27C, a line representing the detection result illustrated in FIG. 27B becomes a smooth line by passing through the lowpass filter. However, by passing though such a filter, in FIG. 27C, movement from the front face of a detected face direction to a right side starts from about 2 seconds, and thus a delay (a time lag) occurs from FIG. 27B in which relating movement starts almost simultaneously with that of the case illustrated in FIG. 27A. Angles of the vertical axes illustrated in FIGS. 27B and 27C are angles from a direction of the imaging lens 16 (with reference to the camera main body 1) that is different from the ground surface reference of FIG. 27A.

In addition, in FIG. 27B, compared with FIG. 27A, the inclination becomes gentle from about 4 seconds. This represents that, as illustrated in FIG. 27D, since the camera main body 1 (in the direction of the imaging lens 16) starts to move together with the body of the user from about 4 seconds, a movement speed of the face direction detected by the face direction detecting unit 20 is relatively lowered.

Thus, conventionally, a position acquired by adding a movement amount (FIG. 27D) of the camera main body to the face direction detection result (FIG. 27C) smoothed through a lowpass filter is calculated as a cutout position illustrated in FIG. 27E, that is, an observation direction that is the center of a target visual field 125. However, when a cutout position is calculated using a conventional method, a crop position does not follow movement of an actual observation center, and a video completed through secondary recording becomes a video in which panning is abruptly accelerated from near 4.5 seconds at which the movement of the body starts.

In other words, in order to eliminate strangeness of movement of an actual observation center, as illustrated in FIG. 27F, it is preferable that a cutout position (an expectation value) be calculated such that panning is approximately constant.

Thus, in this embodiment, a cutout position is calculated such that panning is not seen to have been abruptly accelerated like FIG. 27E. In a case in which there are two types of movement speeds of a cutout position including 0°/second and 10°/second as in FIGS. 27A to 27F, by adding the movement amount of the camera main body 1 illustrated in FIG. 27D before the time lag described above (before one second in this embodiment) to the face direction detection result illustrated in FIG. 27C, an expectation value illustrated in FIG. 27F can be calculated. However, actually, although the movement speed of the cutout position is not limited to only the two types described above, in other words, the observation direction being abruptly accelerated and abruptly stopping, and deceleration is slowly applied, in the calculation method described above, a deceleration curve in which the expectation value slowly changes is not drawn. Thus, in this embodiment, in a case in which movement of the camera main body 1 stops, by assigning movement speeds from start of movement of the observation direction until now or movement speeds of the cutout position of a predetermined period in the past to several frames, the expectation value is caused to draw a deceleration curve.

Hereinafter, a cutout range correcting process according to this embodiment will be sequentially described with reference to flowcharts illustrated in FIGS. 28A and 28B.

Hereinafter, description of parts common to Embodiments 1 to 3 that have been described will be simplified or omitted in description.

Figure 28B:
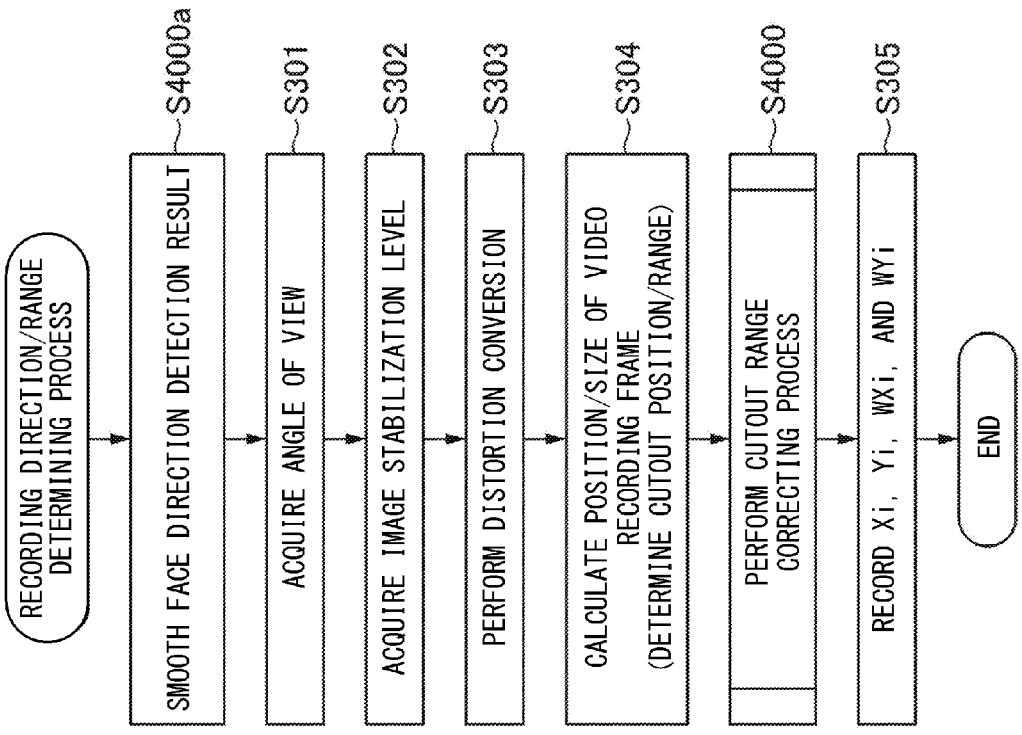
FIGS. 28A and 28B are flowcharts of a cutout range correcting process according to Embodiment 4.
Figure 28A:
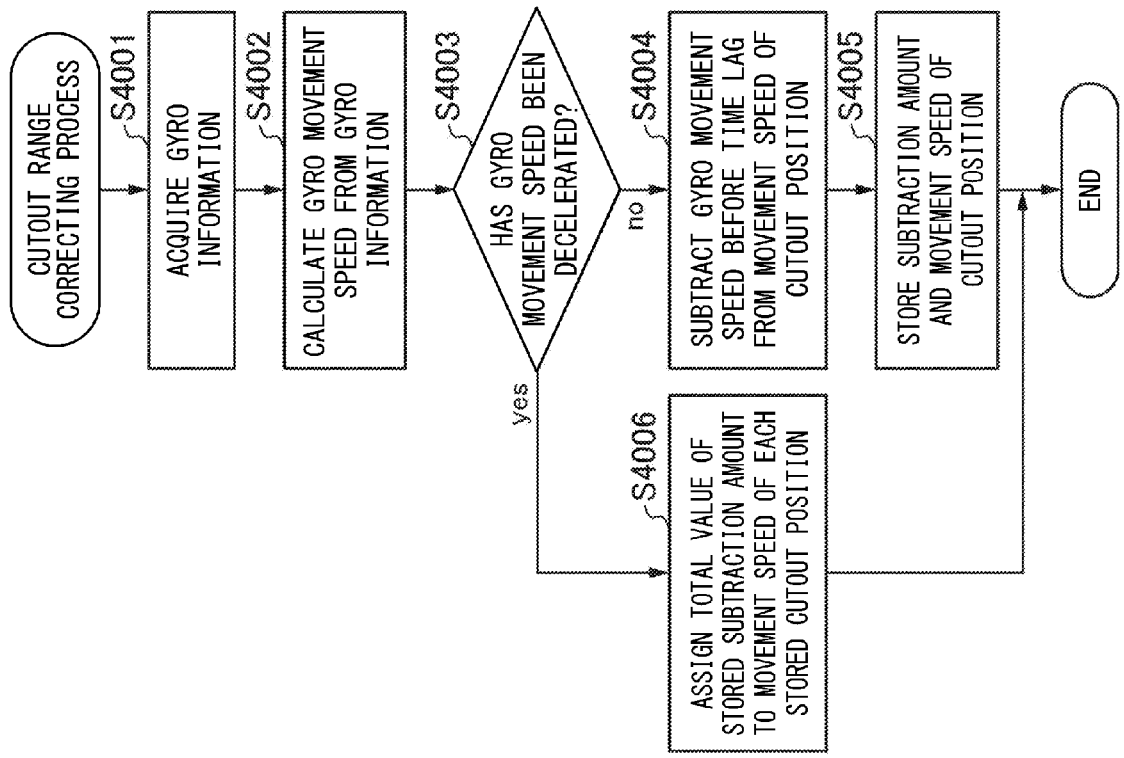

FIG. 28A is a flowchart of a subroutine of the recording direction/range determining process of Step S300 according to this embodiment illustrated in FIG. 7A.

In Step S4000a, the observation direction vi acquired in the face direction detecting process of Step S200 is smoothed using a lowpass filter (a smoothing unit). As described above with reference to FIG. 27B, the reason for this is that there is a deviation in the observation direction vi according to slight detection error. As the lowpass filter, a method of taking a sampling moving average of several observation directions in the past, for example, five to ten observation directions can be simply used. However, at this time, as the number of times an average is taken increases, following at the time of movement of the orientation of the face is delayed. In addition, in a case in which, after being directed to the right side, then immediately the user changes his or her orientation to the left side, there is also a problem in that an observation direction vi at a time the user being directed to the rightmost side cannot be detected.

Furthermore, a mixing state of detection error differs in accordance with a detection method, and thus it is also preferable to appropriately change the method in accordance with the detection method. In addition, a method of applying a lowpass filter may be configured to be different for the vertical direction and the horizontal direction.

In addition, as described above, in many cases, instantaneous movement of the face is not appropriate for the purpose of the present disclosure of remaining user's experience as a video, and, for example, there are cases in which the face is moved inevitably for checking safety of the left and right sides during walking described above and the like. Thus, in this embodiment, also an observation direction vi acquired in a case in which the face returns to the original direction in about two seconds is also smoothed in Step S4000a.

Furthermore, although safety needs to be checked further in the horizontal direction and the downward direction, safety does not need to be checked much in an upward direction, and thus a lowpass filter may be configured not to be applied to the upward direction.

When the cutout range is determined using the processes (FIG. 7D) of Steps S301 to S304, the process proceeds to Step S4000, and the overall control CPU 101 (a second calibration unit) performs a cutout range correcting process.

Thereafter, in Step S305, after a cutout range after correction is recorded, the process exits from this subroutine. The cutout range correcting process will be described with reference to a flowchart illustrated in FIG. 28B.

FIG. 28B is a flowchart of the cutout range correcting process of Step S4000.

In FIG. 28B, first, in Step S4001, the overall control CPU 101 (a movement speed calculating unit) acquires gyro information, that is, movement of the camera main body 1 (a gyro movement amount) in this frame, from the angular velocity sensor 107.

In this embodiment, although the angular velocity sensor 107 is used, the sensor is not limited thereto as long as the movement of the camera main body 1 can be detected. For example, a magnetic sensor that measures a magnitude/a direction of a magnetic field not illustrated in the drawing may be used, or the acceleration sensor 108 that detects an acceleration may be used. In addition, a method in which a movement amount of the camera main body 1 is calculated by extracting feature points and detecting a movement vector by calculating a degree of movement of the feature points may be used. For extraction of feature points, a known method may be employed. For example, a movement amount can be calculated by extracting edges by applying a bandpass filter to an image acquired by extracting only luminance information of two images, subtracting a plurality of edge images in a shifted state, and calculating a position at which the difference is small. According to this method, although the calculation amount increases, hardware such as the angular velocity sensor 107 and the like are unnecessary, and thus a light weight of the camera main body 1 can be implemented, which is one of preferred forms.

Hereinafter, the description will be continued using a case in which gyro information is acquired from the angular velocity sensor 107 as an example.

In Step S4002, a movement speed (gyro movement speed) of the camera main body 1 is calculated from the gyro information acquired in Step S4001 and gyro information acquired in the past.

In Step S4003, it is determined whether the gyro movement speed calculated in Step S4002 is being decelerated. In a case in which the movement speed is not being decelerated (No in Step S4003), the process proceeds to Step S4004. Otherwise, the process proceeds to Step S4006.

In Step S4004, the overall control CPU 101 (second calibration unit/observation direction correcting unit) calculates a movement speed of the cutout position from the cutout position determined in Step S304 and the cutout position acquired in the past. Next, a subtraction amount acquired by subtracting the gyro movement speed acquired before a time lag, which occurs by applying the lowpass filter, ago from the calculated movement speed of the cutout position is acquired.

In Step S4005, the movement speed of the cutout position and the subtraction amount acquired in Step S4004 are stored in the primary memory 103, and the process exits from this subroutine.

In Step S4006, a sum of subtraction amounts stored in the primary memory 103 is assigned and an expectation value is calculated such that a change of the movement speed of each cutout position stored in the same primary memory 103 for a predetermined period in the past becomes constant, and the process exits from this subroutine. The predetermined period in the past may be a period until now after the cutout position actually starts to move or a period until now after the angular velocity sensor 107 detects movement of the camera main body 1. In addition, in order to simplify the process, the predetermined period may be a period set to about 0.5 seconds to 3 seconds. An expectation value before the predetermined period in the past is set to the movement speed of the cutout position acquired in Step S4004.

Table 1 represented below illustrates displacements (speeds) of data formed as graphs in FIGS. 27A to 27F. In other words, a movement speed of the cutout position determined in Step S304 is illustrated in (c) of Table 1, and a gyro movement speed calculated in Step S4002 is illustrated in (d) of Table 1. In addition, an expectation value calculated in Step S4006 is illustrated in (e) of Table 1.

TABLE 1

|  | 0-1 seconds | 1-2 seconds | 2-3 seconds | 3-4 seconds | 4-5 seconds | 5-6 seconds |
| --- | --- | --- | --- | --- | --- | --- |
| (a) MOVEMENT OF OBSERVATION CENTER | 0°/sec | 10°/sec | 10°/sec | 10°/sec | 10°/sec | 10°/sec |
| (b) FACE DIRECTION DETECTION RESULT | 0°/sec | 10°/sec | 10°/sec | 10°/sec | 0°/sec | 0°/sec |
| (c) AFTER SMOOTHING OF FACE DIRECTION DETECTION RESULT | 0°/sec | 0°/sec | 10°/sec | 10°/sec | 10°/sec | 0°/sec |
| (d) MOVEMENT AMOUNT OF CAMERA | 0°/sec | 0°/sec | 0°/sec | 0°/sec | 10°/sec | 10°/sec |
| (e) CUTOUT POSITION OF CONVENTIONAL CASE (c)+(d) | 0°/sec | 0°/sec | 10°/sec | 10°/sec | 20°/sec | 10°/sec |
| (f) EXPECTATION VALUE (EMBODIMENT 4) | 0°/sec | 0°/sec | 10°/sec | 10°/sec | 10°/sec | 10°/sec |

A subroutine of the cutout range correcting process illustrated in FIG. 28B, as illustrated in Table 1, will be described in a case in which a user first stops on the front face and slowly sees the right side as an example.

First, the user is seeing the front side (the front face), and thus the gyro movement speed calculated in Step S4002 is almost 0°/second. In other words, in Step S4003, it is determined that the gyro movement speed is not being decelerated, and the process proceeds to Step S4004. In this case, the position of the face does not change, and thus the movement speed of a cutout position is 0°/second as well. In addition, a subtraction amount calculated in Step S4004 is 0°/second as well.

Although the user starts to face the right side from about one second, due to a time lag according to the lowpass filter, as illustrated in FIG. 27C, the movement speed of the cutout position is still 0°/second. On the other hand, as illustrated in FIG. 27D, the camera main body 1 is not still moving, in other words, the gyro movement speed is almost 0°/second. Thus, similar to a time when the user still stops on the front face, the subtraction amount calculated in Step S4004 is 0°/second as well.

When the user faces the right side further, and it is about 2 seconds, as illustrated in FIG. 27C, the movement speed of the cutout position becomes 10°/second. On the other hand, as illustrated in FIG. 27D, the camera main body 1 is not still moving, in other words, the gyro movement speed is still almost 0°/second. Thus, the subtraction amount calculated in Step S4004 is 10°/second.

When the user further faces the right side, and it becomes about four seconds, the body of the user also starts to face the right side. In other words, as illustrated in FIG. 27D, since the orientation of the camera main body 1 is changing, the gyro movement speed becomes 10°/second. As the body starts to rotate, as illustrated in FIG. 27B, although the actual angular velocity speed of the face is decelerated by a relative speed between the camera main body 1 and the face direction, due to a time lag according to the lowpass filter, the movement speed of the cutout position illustrated in FIG. 27C is still 10°/second at this time point. Thus, in consideration of this time lag, the subtraction amount calculated in Step S4004 becomes 10°/second.

The user faces a further right side, and although the gyro movement speed is continuously 10°/second (FIG. 27D) from about 5 seconds, the movement speed of the cutout position illustrated in FIG. 27C is decelerated and becomes 0°/second. Thus, the subtraction amount calculated in Step S4004 becomes −10°/second.

Although not illustrated in FIGS. 27A to 27F, when the user ends the operation of facing the right side at about 6 seconds, the gyro movement speed becomes 0°/second, and, in this case, the process proceeds to Step S4006 for the first time. In this case, a total of subtraction amounts calculated and stored in the primary memory 103 until now becomes +10°/second. This total of the subtraction amounts is assigned such that a change of the movement speed of each cutout position for a predetermined period in the past stored in the primary memory 103 is constant, and an expectation value is calculated. Here, the movement speed of the cutout position illustrated in FIG. 27C is, up to a period (2 to 6 seconds) until now after start of acceleration, as illustrated in Table 1, 10°/second, 10°/second, 10°/second, and 0°/second. Thus, in order to cause the change of the movement speed of each cutout position during this period to be constant (here, no change), all the expectation values of the period of 2 to 6 seconds are set to 10°/second.

In this embodiment, for simplification of description, although description has been presented for the interval of one second, generally, the frame rate of moving image capturing is 24 to 60 fps. On the other hand, in many cases, face direction detection and detection of gyro does not need to be performed 60 times per second, and thus it is preferable that a timing at which the face direction detecting process and the cutout range correcting process are performed be changed from the imaging timing. For example, although the imaging is performed with 60 fps, a timing at which the face direction detecting process and the cutout range correcting process are performed may be set to 10 fps and may be appropriately changed in consideration of the use, the power consumption, and the like.

In this embodiment as described above, an example in which, when the observation direction is greatly moved, at a time point at which movement of the face and movement of the body (the camera main body) are combined, the movement amount of the observation direction can be caused to be constant such that a moving image of which an appearance is bad is not formed due to a change of the visual line movement speed as a moving image has been illustrated.

In this embodiment, although an example in which a super-wide angle image is cropped in accordance with the observation direction has been illustrated, the configuration is not limited thereto. For example, the overall control CPU 101 (an imaging direction changing unit) may be configured to change the imaging direction of the imaging unit 40 in accordance with the observation direction. However, in this case, a mechanism (a drive unit) that mechanically drives the imaging direction of the imaging unit 40, more specifically, the orientation of the imaging lens 16 and the solid-state imaging element 42 in a yaw direction and a pitch direction using a method not illustrated in the drawing needs to be disposed in the camera main body 1.

In addition, in this embodiment, although smoothing of the face direction detection results has been illustrated as an example, also in a case in which the overall control CPU 101 (an image stabilization unit) performs the image stabilization control described in Embodiment 1, it is preferable that a similar process for delaying the following of the face direction be performed.

Embodiment 5

In Embodiment 5, a method of reducing a difference between a visual field of a user and a video (hereinafter, referred to as a "recorded video") that is secondarily recorded due to a parallax deviation according to a positional difference between the position of the eye of the user and a mounting position of the imaging/detecting unit 10 will be described with reference to FIGS. 29A, 29B, 30, 31, 32A, 32B, 33A, 33B, and 34A to 34C.

Basically, this embodiment will be described as a derivation from Embodiment 1. For this reason, the same reference signs will be used for components that are the same as the components of the camera system according to Embodiment 1 among components of a camera system according to Embodiment 5, duplicate description will be omitted, and other components will be described in detail with additional notes as necessary.

First, for easy understanding, a difference between a visual field of a user and a recorded video that occurs in Embodiment 1 will be described.

Figure 29A:
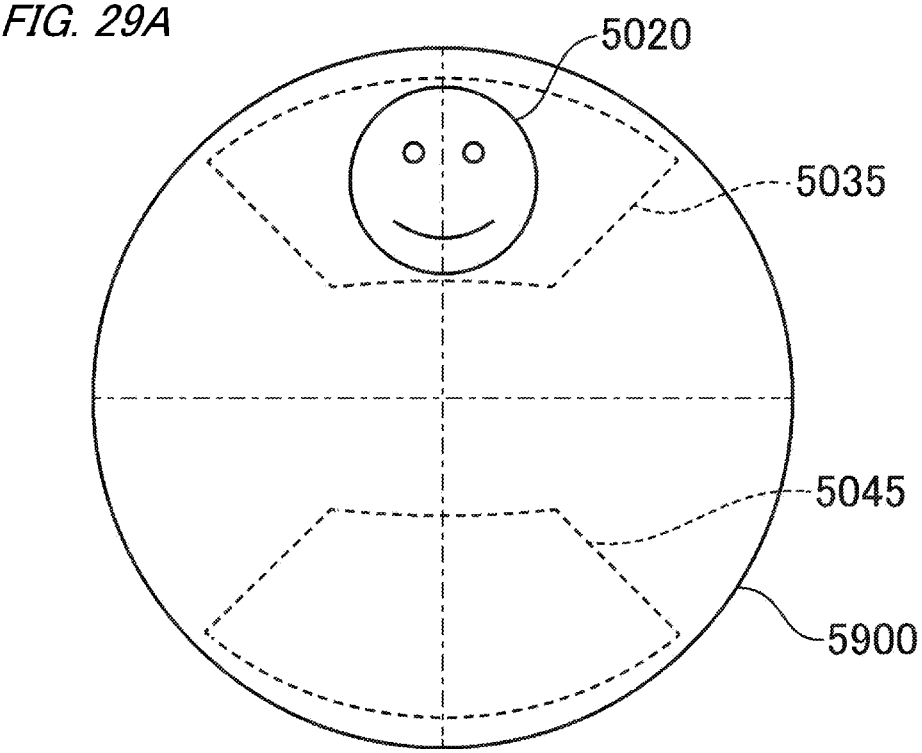
FIGS. 29A and 29B are schematic diagrams illustrating a relation between a visual field of a user and a target visual field in a case in which a subject present at a short distance is set as an observation target in Embodiment 1.
Figure 29B:
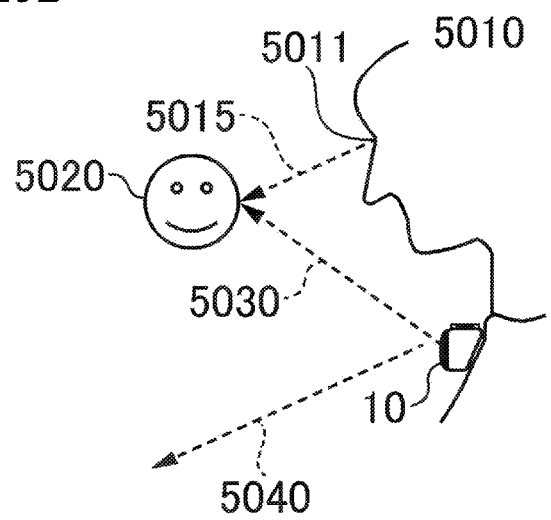

FIGS. 29A and 29B are schematic diagrams illustrating a relation between a visual field of a user 5010 and a target visual field in a case in which a subject located at a short distance is set as an observation target 5020 in Embodiment 1.

FIG. 29A is a schematic diagram illustrating a video 5900 including an observation target 5020 shown in the solid-state imaging element 42, and FIG. 29B is a schematic diagram illustrating a positional relation between the user 5010 and the observation target 5020.

As illustrated in FIG. 29B, in a case in which the observation target 5020 is present below the height of the eye 5011 of the user, the face direction 5015 of the user 5010 face the lower side. At this time, in the visual field of the user 5010, the observation target 5020 on the background of a floor and the like not illustrated in the drawing is shown.

In the case of Embodiment 1, the observation direction 5040 (FIG. 29B) parallel to the face direction 5015 of the user that is detected by the face direction detecting unit 20 is set as a recording direction. For this reason, as illustrated in FIG. 29B, in a case in which a subject located at a short distance is the observation target 5020, there is a problem in that an area not including the observation target 5020 is set as a target visual field 5045.

In such a case, a background (a ceiling and the like not illustrated in the drawing) difference from a background (a floor and the like not illustrated in the drawing) shown in the visual field of the user 5010 is formed, and the recording direction needs to be set not to the observation direction 5040 but to a direction 5030 to be a target visual field 5035 including the observation target 5020.

The problem described above is caused by a parallax deviation according to a positional difference between the position of the eye 5011 of the user 5010 and a mounting position of the imaging/detecting unit 10. Thus, in this embodiment, a parallax correcting process in which a recording direction set on the basis of the face direction of the user 5010 is appropriately adjusted in accordance with a parallax deviation is performed.

Figure 31:
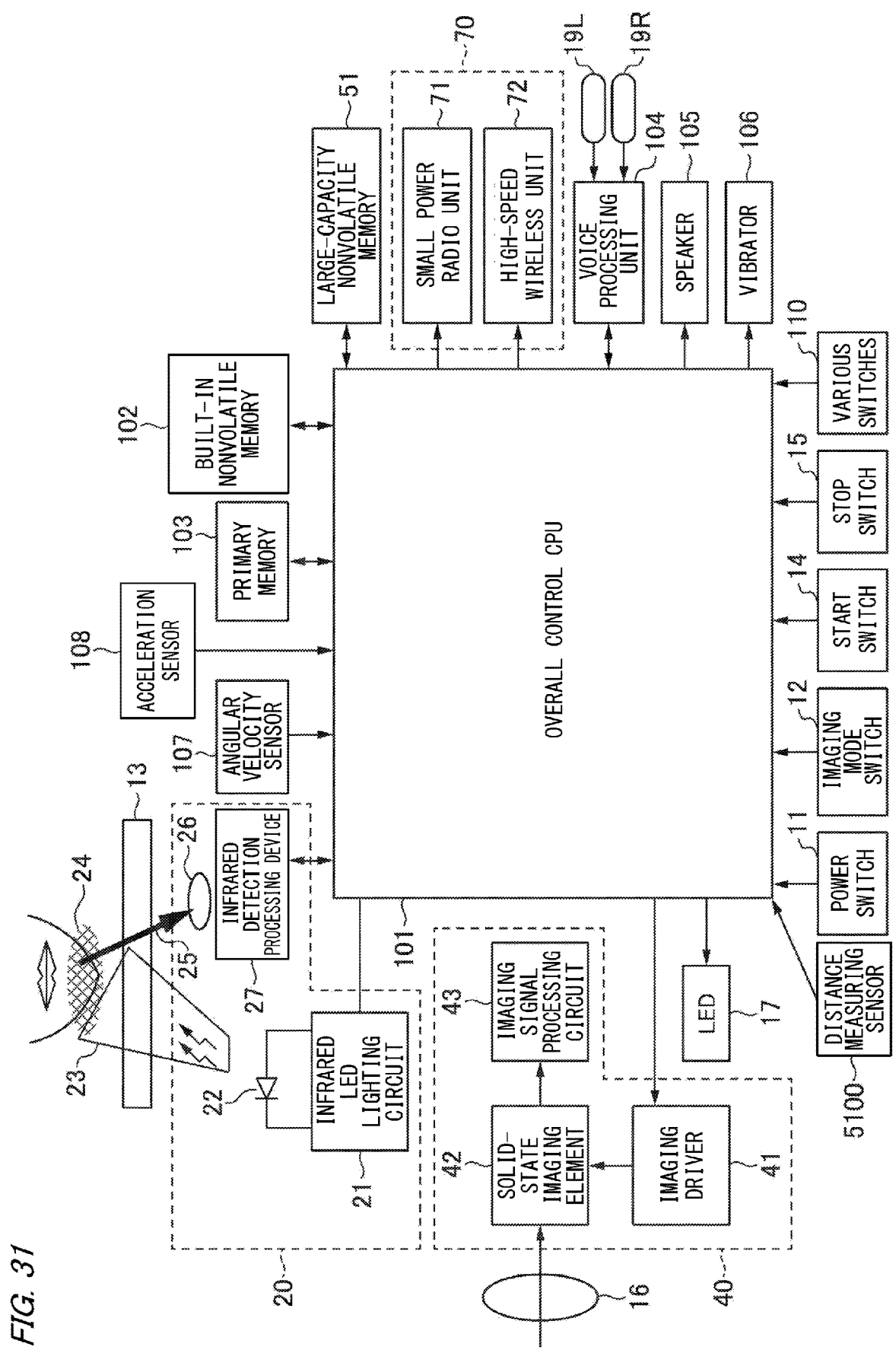
FIG. 31 is a block diagram illustrating a hardware configuration of the camera main body according to Embodiment 5.

FIG. 31 is a block diagram illustrating a hardware configuration of a camera main body 1 according to this embodiment.

Figure 30:
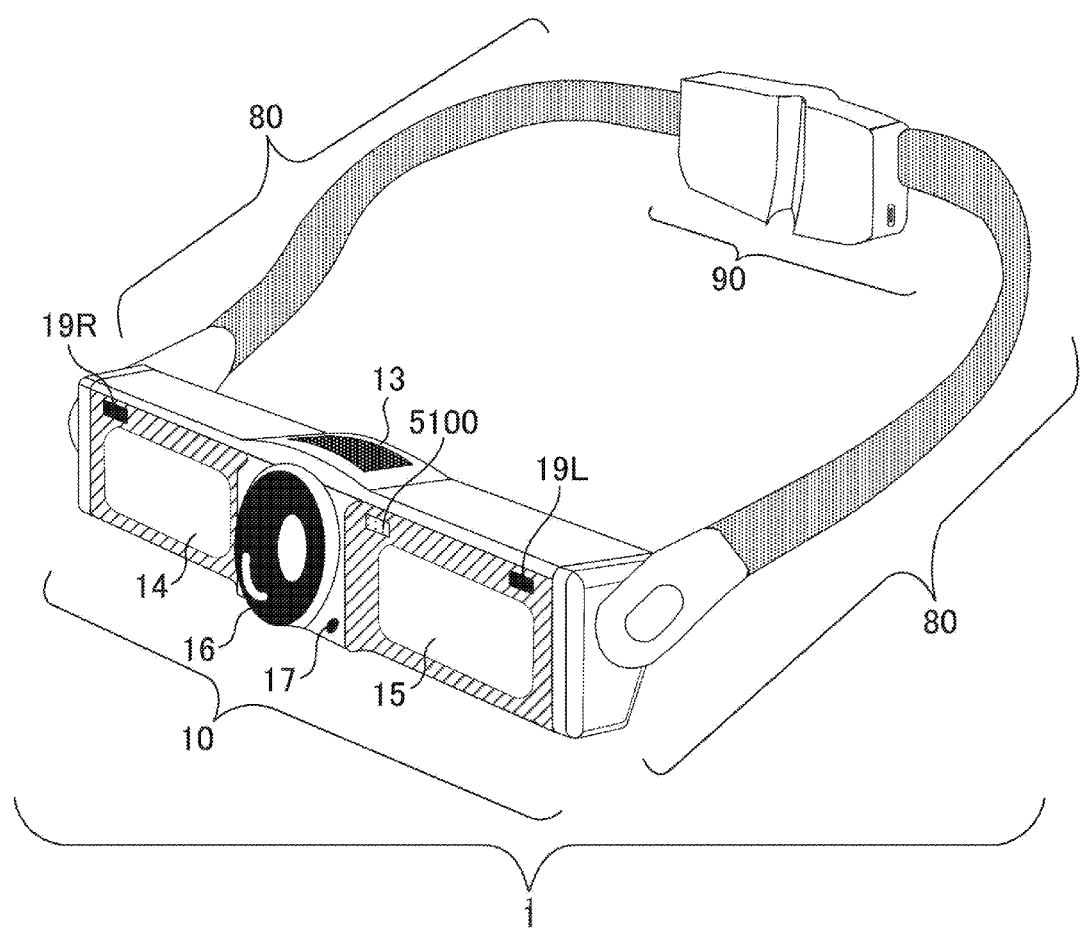
FIG. 30 is an external view of a camera main body as an imaging apparatus according to Embodiment 5.

The hardware configuration of the camera main body 1 according to this embodiment is only different from that of the camera main body 1 according to Embodiment 1 illustrated in FIG. 5 in that a distance measuring sensor 5100 is present. Although the arrangement position of the distance measuring sensor 5100 in the camera main body 1 is not particularly limited, in this embodiment, as illustrated in FIG. 30, the distance measuring sensor 5100 is disposed in an outer frame part of a stop switch 15.

The distance measuring sensor 5100 is a sensor that measures a distance to an object. The configuration of the distance measuring sensor 5100 is not particularly limited. For example, the distance measuring sensor 5100 may be an active-type sensor that projects an infrared ray, a laser beam, a millimeter wave, or the like onto an object and measures a distance to the object in accordance with reflection thereof. In addition, the distance measuring sensor 5100 may be a passive-type sensor that measures a distance to an object on the basis of a phase difference of a light beam transmitted an imaging lens 16.

The distance measuring sensor 5100 is connected to an overall control CPU 101 and is controlled by the overall control CPU 101.

Figure 32A:
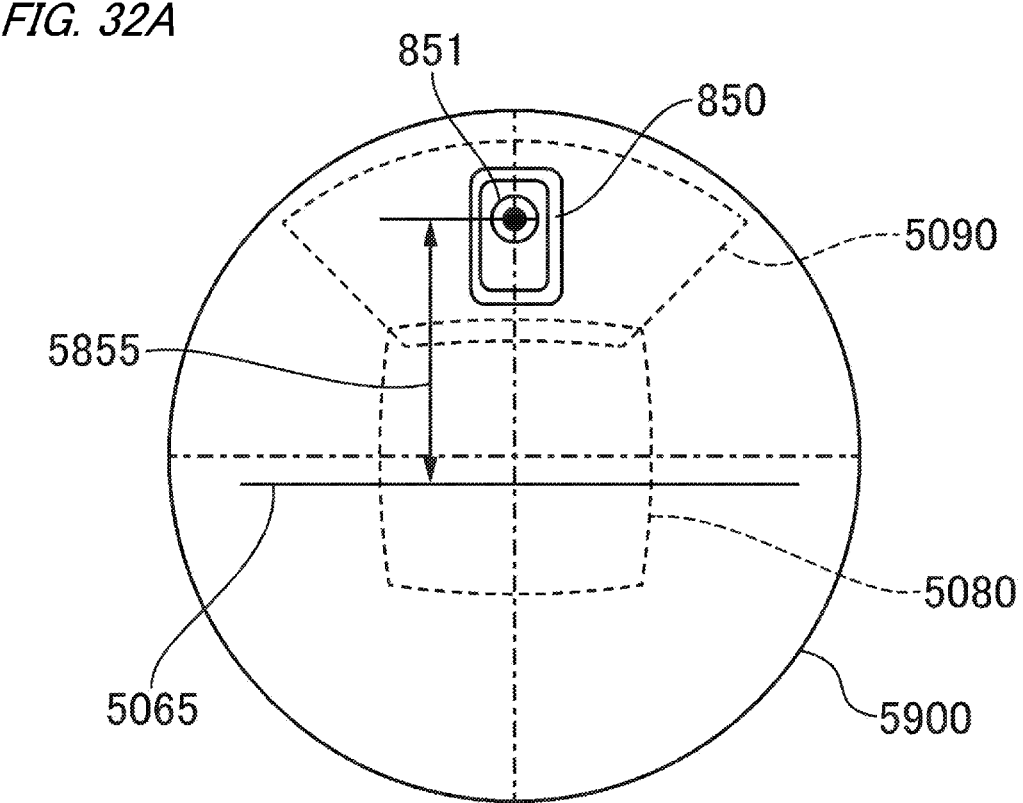
FIGS. 32A and 32B are schematic diagrams illustrating a relation between a user, a calibrator, and a target visual field at the time of calibration including a parallax correcting process according to Embodiment 5.
Figure 32B:
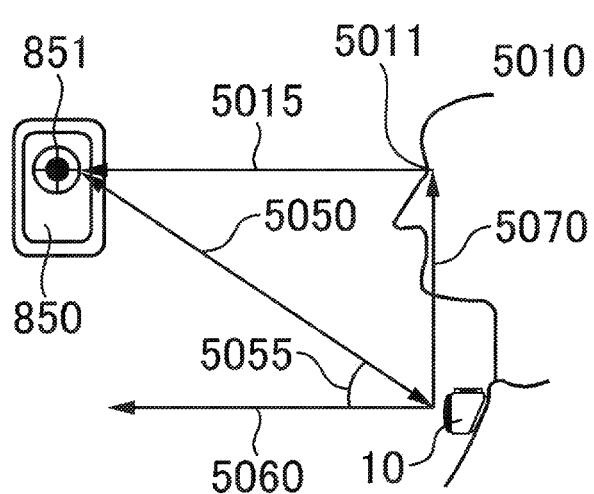

FIGS. 32A and 32B are schematic diagrams of a relation among a user, a calibrator 850, and a target visual field 5080 at the time of performing calibration including the parallax correcting process according to this embodiment.

FIG. 32A is a schematic diagram illustrating a video 5900 including the calibrator 850 shown in a solid-state imaging element 42, and FIG. 32B is a schematic diagram illustrating a positional relation between a user 5010 and the calibrator 850.

A target visual field 5080 illustrated in FIG. 32A is a target visual field in a case in which calibration including the parallax correcting process to be described below is not performed, and a face direction 5015 detected by a face direction detecting unit 20 is a front face direction.

On the other hand, a target visual field 5090 illustrated in FIG. 32A is a target visual field in a case in which the calibration including the parallax correcting process to be described below is performed, and a face direction 5015 detected by the face direction detecting unit 20 is a front face direction.

Figure 33A:
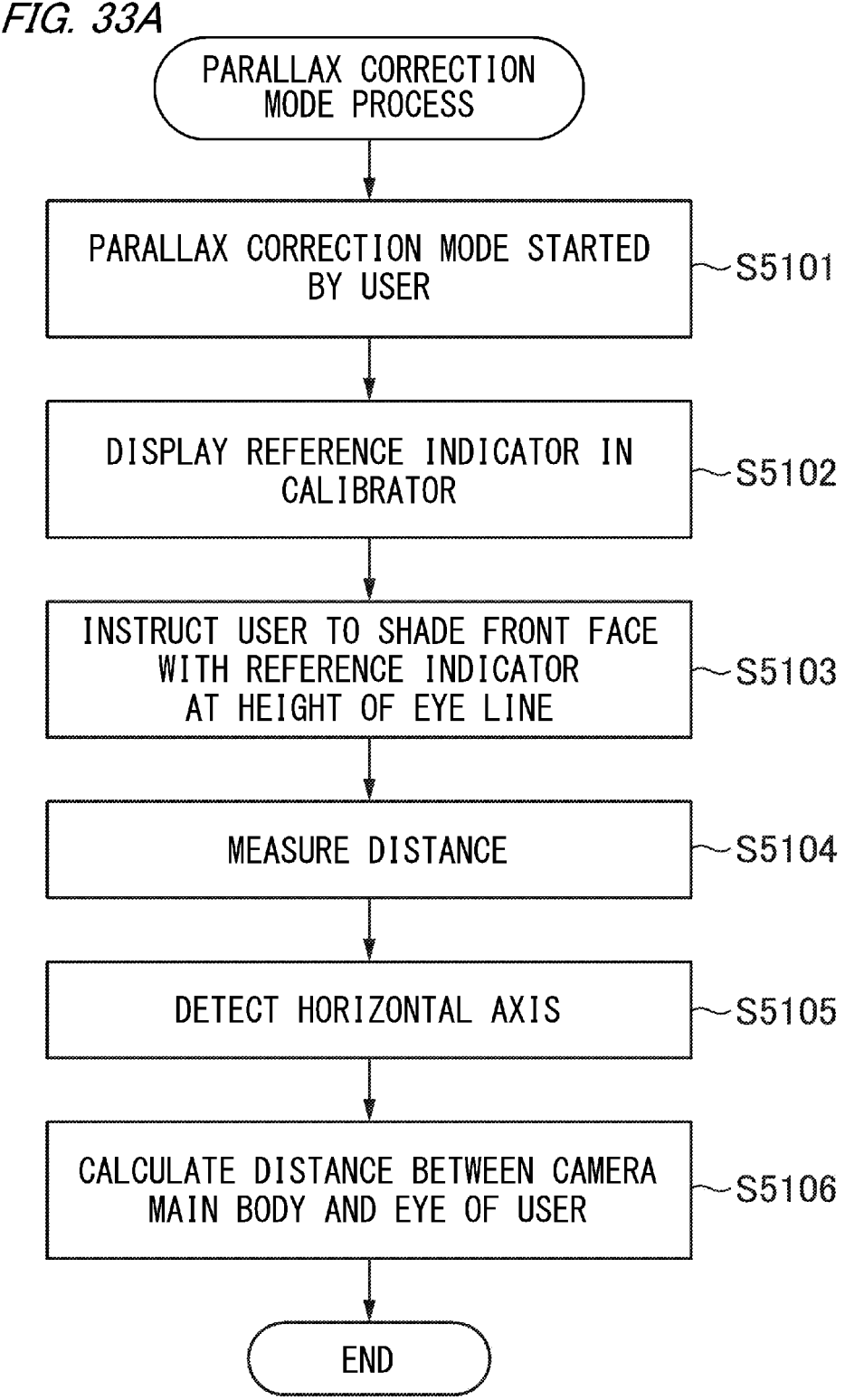
FIG. 33A is a flowchart of a parallax correction mode process that is a part of a preparation process of Step S100 illustrated in FIG. 7A according to Embodiment 5.

FIG. 33A is a flowchart of a parallax correction mode process that is a part of a preparation process of Step S100 according to this embodiment illustrated in FIG. 7A. Hereinafter, details of this process will be described also with reference to FIGS. 32A and 32B.

In the preparation operation process of Step S100 according to this process illustrated in FIG. 7A, when a parallax correction mode starts in accordance with a user 5010's operation on the calibrator 850 (Step S5101), a display device control unit 801 displays a position determination indicator 851 (Step S5102).

Subsequently, the display device control unit 801 instructs a position (designation position) to shade the calibrator 850 for the user. More specifically, by performing an instruction display 855 as illustrated in FIG. 22A, the display device control unit 801 instructs the user 5010 to shade the position determination indicator 851 with a height of a visual line on the front face (Step S5103).

When the user 5010 performs the instruction display 855, the user 5010 shades the calibrator 850 at a designation position instructed in Step S5103 and faces the face direction 5015 in a direction of the position determination indicator 851 (the front side). At this time, the user 5010, the position determination indicator 851, and the imaging/detecting unit 10 have a positional relation as illustrated in FIG. 32B.

Thereafter, when it is determined that the user is seeing a position determination indicator center 852 on the visual field front face, the display device control unit 801 measures a distance 5050 (FIG. 32B) between the imaging/detecting unit 10 and the position determination indicator 851 using the distance measuring sensor 5100 (Step S5104).

Subsequently, the overall control CPU 101 detects a horizontal axis 5060 of the imaging/detecting unit 10 using an angular velocity sensor 107 (a posture detecting unit) (Step S5105). In accordance with this, a horizontal position 5065 of a video 5900 (FIG. 32A) shown in the solid-state imaging element 42 is specified.

In addition, in Step S5105, the overall control CPU 101 acquires a distance 5855 (FIG. 32A) between a center of the position determination indicator 851 and a horizontal position 5065 on the video 5900. Thereafter, the overall control CPU 101 (an angle calculating unit) calculates an angle 5055 (FIG. 32B) formed by the horizontal axis 5060 and a direction of the position determination indicator 851 seen from the imaging/detecting unit 10. This calculation is performed using the distance 5855 and information about an angle at which light imaged at a certain point on the video 5900 present in a memory (for example, the built-in nonvolatile memory 102) enters.

Thereafter, the overall control CPU 101 (a vertical distance calculating unit) calculates a vertical distance 5070 between the imaging/detecting unit 10 and the eye 5011 of the user 5010 using the distance 5050 and the angle 5055 calculated in Step S5105 (Step S5106), and the process exits from this subroutine.

Here, although a method of measuring the vertical distance 5070 between the imaging/detecting unit 10 and the eye 5011 of the user 5010 using a method different from that according to Embodiment 2 has been described, the method is not limited thereto. For example, the vertical distance 5070 between the imaging/detecting unit 10 and the eye 5011 of the user 5010 may be measured using the method described in Embodiment 2, and a user 5010 may be directly allowed to input a value of the vertical distance 5070.

The calibration process including the parallax correcting process according to this embodiment is basically the same as the processes of Steps S3101 to S3111 illustrated in FIG. 21 that are performed in Embodiment 2, and thus description thereof will be omitted.

However, in Step S3110, in addition to the processes described in Embodiment 2, a parallax correction based on the vertical distance 5070 (FIG. 32B) calculated in the parallax correction mode process illustrated in FIG. 33A is performed. In other words, calibration is performed such that the visual field of the user 5010 and the target visual field 125 coincide with each other at infinity.

Figure 33B:
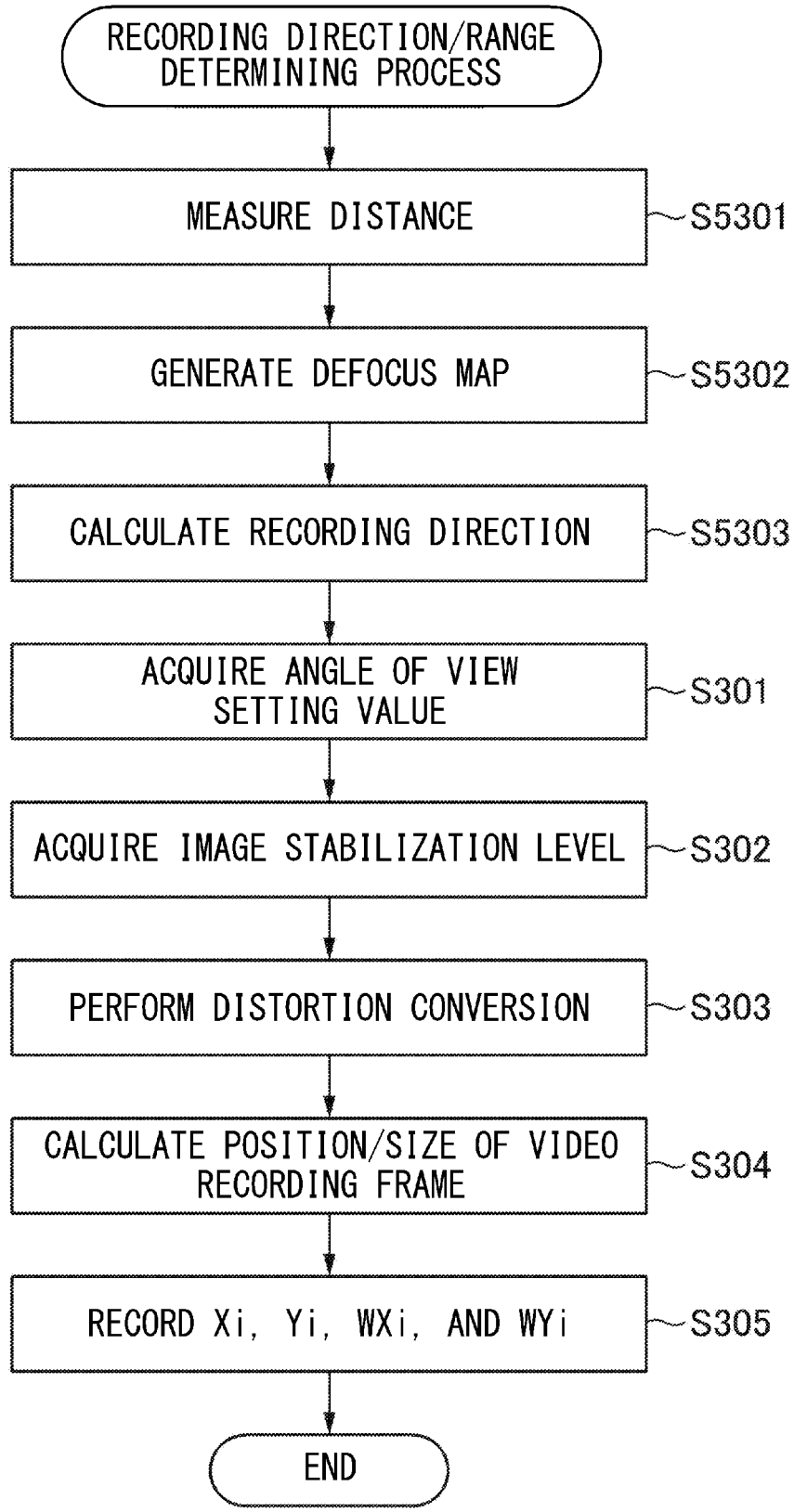
FIG. 33B is a flowchart of a subroutine of a recording direction/range determining process of S300 illustrated in FIG. 7A according to Embodiment 5.

FIG. 33B is a flowchart of a subroutine of the recording direction/range determining process of S300 according to this embodiment described with reference to FIG. 7A. This process will be described with reference to FIGS. 34A to 34C. In FIG. 33B, the same reference signs will be assigned to steps that are duplicate with those of FIG. 7D, and duplicate description thereof will be omitted.

In FIG. 33B, first, the overall control CPU 101 acquires distance information of a photographing possible range (imaging area) using the distance measuring sensor 5100 (a distance measuring unit) (Step S5301).

Next, the overall control CPU 101 (a generation unit) generates a defocus map 5950 (FIG. 34A; distance map information) on the basis of the distance information (a measurement result acquired by the distance measuring sensor 5100) acquired in Step S5301 (Step S5302).

Figure 34A:
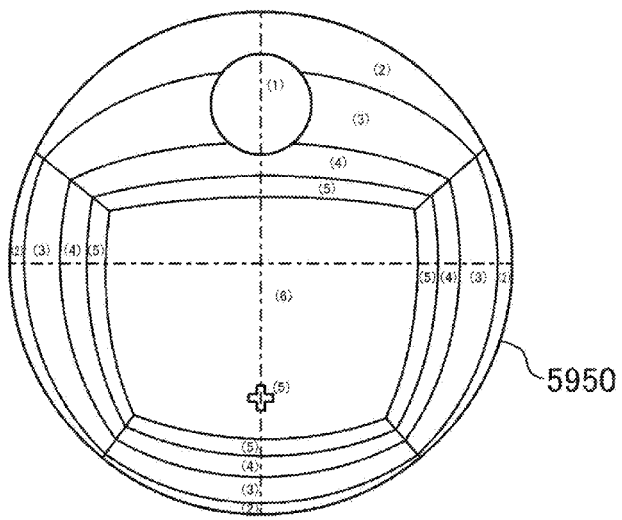
FIGS. 34A to 34C are schematic diagrams illustrating a relation between a defocus map generated in Step S5302 illustrated in FIG. 33B and a recording direction.
Figure 34B:
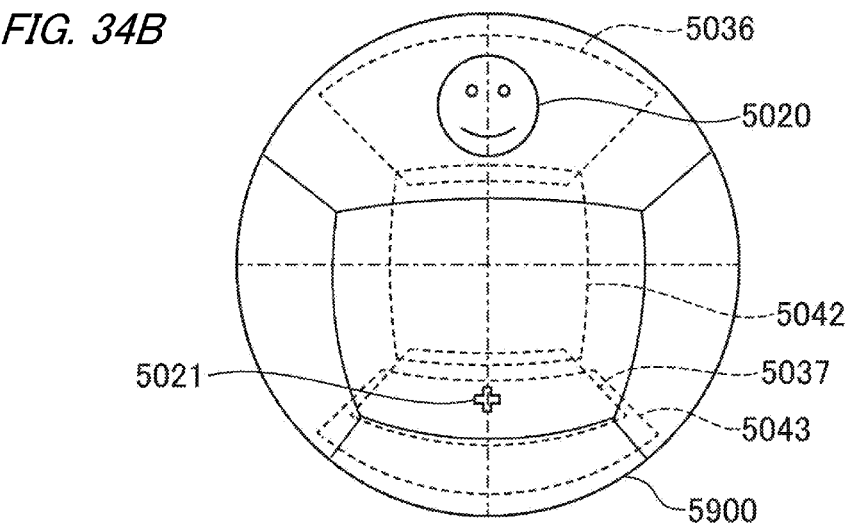
Figure 34C:
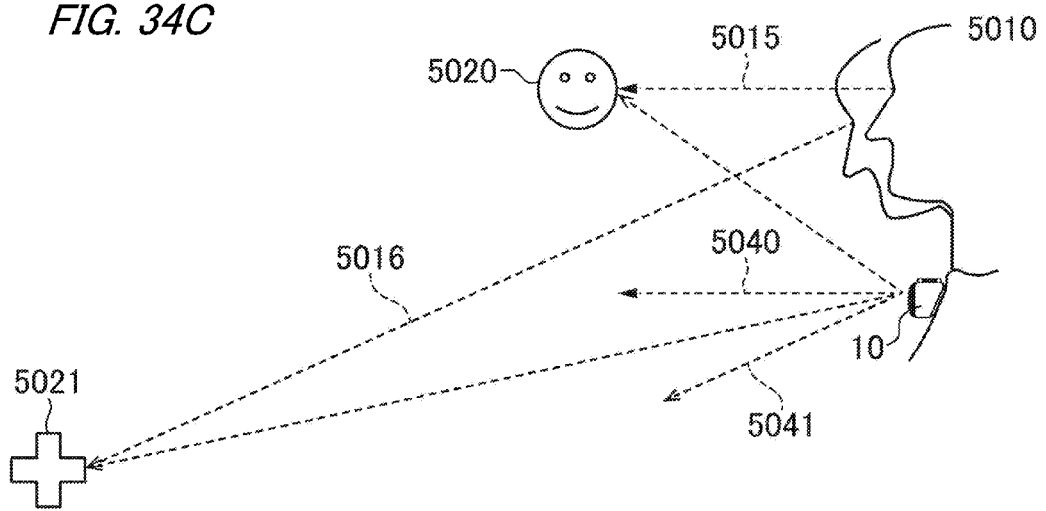

The defocus map 5950 illustrated in FIG. 34A represents a defocus map that is generated in a case in which a situation in which an observation target 5020 floats indoors illustrated in FIG. 34C is imaged. Here, in order to represent the distance information in the defocus map 5950 to be more easily understandable, the defocus map is expressed in stages being divided into 6 distance areas (1) to (6) from a side having a shortest distance from the imaging/detecting unit 10. However, actually, the defocus map 5950 may be generated without any stage.

Subsequently, the overall control CPU 101 calculates a direction of the observation target 5020 seen from the imaging/detecting unit 10 from the defocus map 5950, the face direction 5015, and the vertical distance 5070 (FIG. 32B) (Step S5303). In other words, a parallax correction is performed for the observation direction set on the basis of the face direction.

Thereafter, processes of S301 to S305 illustrated in FIG. 7D are performed, and the process exits from this subroutine.

By using the defocus map 5950 generated in this way and a detection result of the face direction 5015, a direction of the observation target 5020 seen from the imaging/detecting unit 10 can be calculated. Since there is a parallax deviation described with reference to FIGS. 29A and 29B, only a distance between the distance measuring sensor 5100 and the observation target 5020 cannot be measured without generation of the defocus map 5950.

A degree of an influence of a parallax deviation described in this embodiment differs in accordance with a distance between the user 5010 and the observation target. In other words, for an observation target of which a distance to the user 5010 is of a certain degree, the influence of a parallax deviation can be ignored, and thus, also in the recording direction/range determining process according to Embodiment 1, a video can be cut out in a target visual field including the observation target and recorded. For example, in a case in which the user 5010 has observed the observation target 5021 (FIG. 34C), the observation target 5021 is located at an intermediate distance area (5) away from the user 5010 by a certain degree or more, and thus a parallax correction of the recording direction may not be performed in Step S5303. The reason for this is that the observation target 5021 is also included in a target visual field 5043 (FIG. 34B) set in accordance with the recording direction 5041 (an observation direction) estimated on the basis of the face direction 5016 detected by the face direction detecting unit 20.

Meanwhile, according to this embodiment, a distance range between a user and an observation target in which the observation target of the user 5010 can enter the target visual field can be extended up to a closer side than Embodiment 1. For example, an observation target 5020 (FIG. 34A) located in a close distance area (1) of which a distance to the user 5010 is short is assumed to be observed by the user 5010. In this case, in Embodiment 1, an observation direction 5040 (a recording direction) is estimated on the basis of the face direction 5015 detected by the face direction detecting unit 20. The observation target 5020 is not included in the target visual field 5042 (FIG. 34B) set in accordance with this observation direction 5040. However, in this embodiment, a parallax correction for the observation direction 5040 is performed in Step S5303 illustrated in FIG. 33B, and a target visual field 5036 including the observation target 5020 is set in the recording direction after this parallax correction. For this reason, as in the case of the observation target 5020, an observation target of which a distance to the user 5010 is a close distance at which the influence of the parallax deviation cannot be ignored can be imaged well.

In addition, according to this embodiment, an observation target located in an intermediate distance area (5) can be recorded at a center more than that of the target visual field. For example, when the user 5010 is observing an observation target 5021 (FIG. 34A) located in an intermediate distance area (5), similar to Embodiment 1, in a case in which a parallax correction of the recording direction 5041 is not performed, a target visual field 5043 in which the observation target 5021 is positioned at an upper end is set. On the other hand, in this embodiment, a parallax correction for the recording direction 5041 is performed in Step S5303 illustrated in FIG. 33B, and a recording area 5037 in which the observation target 5021 is positioned at the center is generated in accordance with the recording direction after this parallax correction.

In this way, compared to Embodiment 1, in a case in which a parallax correction according to this embodiment is performed, an observation target can be perceived at the center of a cutout video.

In this embodiment, a parallax correction is performed also for calibration, and, after the visual field of the user and the recording area are caused to coincide with each other at the infinity, a parallax correction in which the shorter a distance between the user and the observation target at the time of imaging, the larger a difference in the recording direction between before and after the correction, is performed. However, for a subject at a finite position, for example, for a subject at a distance longer than that of the position of the calibrator 850 for the user in the calibration process according to Embodiment 2 or a subject at a distance shorter than that of the position, the parallax correction according to this embodiment may be performed.

Embodiment 6

In Embodiment 6, a method of determining a cutout range in a case in which calculation of an observation direction is unsuccessful will be described with reference to FIGS. 35, 36A, and 36B.

Basically, this embodiment will be described as a derivation from Embodiment 1. For this reason, the same reference signs will be used for components that are the same as the components of the camera system according to Embodiment 1 among components of a camera system according to Embodiment 6, duplicate description will be omitted, and other components will be described in detail with additional notes as necessary.

In Embodiment 1, as illustrated in FIG. 7A, a target visual field is set in the recording direction/range determining process of Step S300 on the basis of an observation direction calculated from the face direction detected by the face direction detecting unit 20 in Step S200. However, there are cases in which the face direction detecting unit 20 is covered with an obstacle such as a collar, a hair, or the like, the face direction detecting unit 20 is broken down, or the face direction detecting unit 20 becomes far away from the user. In such cases, the face direction of the user cannot be acquired. In such a case, a video of a target visual field that is desired to be captured by the user cannot be captured.

In Japanese Patent Application No. 2007-74033, in a case in which a second camera imaging a user cannot detect a user, no detection of a user is not stored in a history of observation information of a user and the like until now, and detection of a user is performed again. In addition, in a case in which imaging is performed by following the face direction, when detection of a face direction is unsuccessful, by determining an imaging direction in accordance with a situation, a video not deviating much from the user's intention is captured.

In contrast to this, in this embodiment, in a state in which a face direction of the user can be detected, similar to Embodiment 1, the face direction is detected by the face direction detecting unit 20, and a video of a target visual field of a recording direction based on an observation direction calculated on the basis of this is captured. On the other hand, in a state in which a face direction of the user cannot be detected, and in a case in which an observation direction of the user cannot be calculated, a video of a target visual field in which the user's intention is reflected is captured. In other words, in this embodiment, when the face direction detecting process ends in Step S200, before the recording direction/range determining process is performed in Step S300, an observation direction determining process is performed. In this process, in a case in which the face direction detecting unit 20 fails to detect a face direction of the user, the intention of the user is determined in accordance with the situation, and the observation direction is estimated. In other words, a video of a target visual field of a recording direction based on information other than the observation direction calculated from the face direction is captured.

Figure 35:
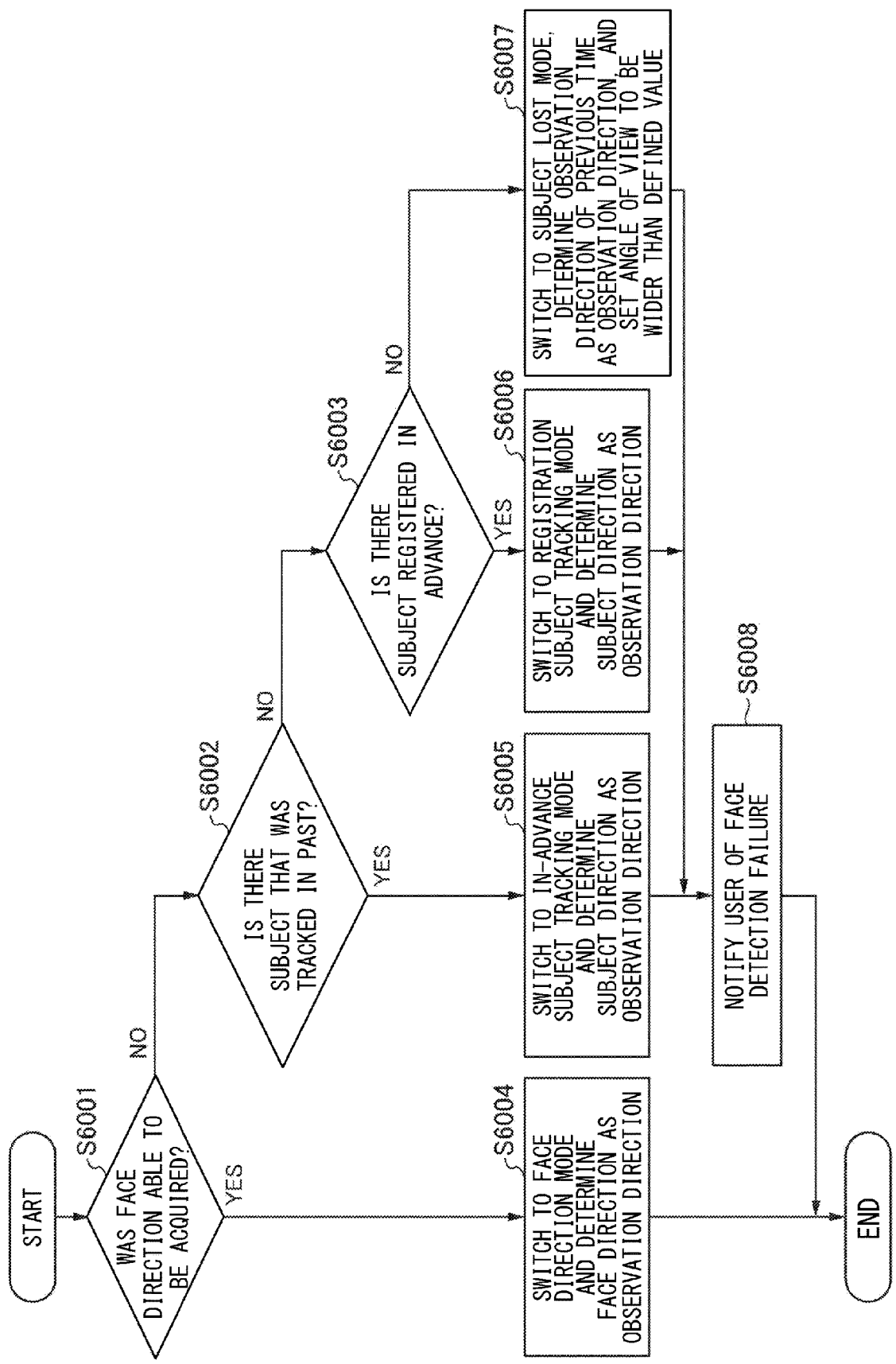
FIG. 35 is a flowchart of an observation direction determining process according to Embodiment 6.

FIG. 35 is a flowchart of an observation direction determining process according to this embodiment that is performed by the overall control CPU 101. Hereinafter, this process will be described with reference to FIGS. 36A and 36B.

First, in Step S6001, it is determined whether or not a face direction was able to be acquired by the face direction detecting unit 20. In a case in which the face direction was able to be acquired, the process proceeds to Step S6004, and the overall control CPU 101 (a mode transition unit) switches the mode of this process to a face direction mode (a first imaging mode) and determines an observation direction calculated from the face direction using the method described in Embodiment 1 as a recording direction. Thereafter, the process exits from this subroutine.

On the other hand, in a case in which the face direction was unable to be acquired (No in Step S6001), the overall control CPU 101 (a mode transition unit) causes the process to proceed to Step S6002 for a transition to another mode and determines whether or not there is a subject tracked in the past.

Here, a determination process of Step S6002 will be described with reference to FIG. 36A representing a relation between an observation direction detection state of a user and a captured video for each frame.

In FIG. 36A, n is a frame number of a video, θ is a movement angle of a face of a user in a horizontal direction, and a user state represents a positional relation between a user and an observation target in each frame. In addition, an entire video represents a super-wide angle video captured by the imaging unit 40 for each frame, and a captured video represents an image that is secondarily recorded for each frame.

FIG. 36A, as illustrated in each screen of the user state, illustrates a case in which a user is observing an object denoted by "□", which is present at a screen low position, as an observation target, and an observation target of the user was unable to be detected for n=5, that is, for the fifth frame.

In this embodiment, a current frame is set as a reference, and four frames from that in the past are set as a predetermined period. In a case in which a subject determined to be the same is included in a captured video three times or more during this predetermined period, it is determined that there is a subject tracked in the past.

As illustrated in FIG. 36A, for n=1 to 4, regardless of the movement angle θ changing by +10° each time, an object denoted by "□" determined as the same subject is included in a captured video. For this reason, for n=5, it is determined that there is a subject tracked in the past.

A determination criterion of Step S6002 may be changed in accordance with a detection period of the face direction and accuracy of the face direction detecting unit 20.

Referring to FIG. 35, in a case in which it is determined that there is a subject (same subject) tracked in a predetermined time in the past (Yes in Step S6002), the process proceeds to Step S6005.

In Step S6005, the mode of this process is switched to an in-advance subject tracking mode (a second imaging mode) in which an in-advance subject direction is set as a recording direction, and after the recording direction is determined such that a subject is tracked, the process proceeds to Step S6008. In this way, in this embodiment, in a case in which there is a subject tracked in the past even when a face direction cannot be detected, a recording direction is determined by transitioning to the in-advance subject tracking mode, and thus an intention of the previous user can be reflected on the video. A subject recognition technique and a subject tracking detecting technique for the inside of a captured video using the overall control CPU 101 (a subject recognizing unit) are known, and thus detailed description will be omitted.

On the other hand, in a case in which it is determined that there is no subject tracked in the past (No in Step S6002), the process proceeds to Step S6003.

In Step S6003, it is determined whether a subject registered in the built-in nonvolatile memory (a subject registering unit) in advance has been detected in a latest captured video.

In this embodiment, in-advance registration of a subject is performed by user's designating an image in which a person desired to be captured is shown from images stored in the display device 800, recognizing features of the selected person using the display device control unit 801, and transmitting it to the overall control CPU 101 inside the camera main body 1. A subject detected in Step S6003 is not limited thereto and, for example, may be a subject included in a captured video acquired at a read completion timing and at another detection timing. In addition, determination of coincidence between a subject registered in advance and a subject on a latest captured video is performed using a pattern matching technique. The pattern matching technique is known, and thus detailed description thereof will be omitted.

In a case in which it is determined that a subject registered in advance has been detected in the latest captured video (Yes in Step S6003), the process proceeds to Step S6006.

In Step S6006, the mode of this process is switched to a registration subject mode (a third imaging mode) in which the direction of a subject detected in Step S6003 is set as a recording direction, and the process proceeds to Step S6008.

On the other hand, in a case in which it is determined that a subject registered in advance has not been detected in the latest captured video (No in Step S6003), it is determined that a subject to be set as an observation target cannot be estimated, and the process proceeds to Step S6007.

In Step S6007, the overall control CPU 101 (an angle of view changing unit) switches the mode of this process to a subject lost mode (a fourth imaging mode) in which the recording direction before the failure of detection of the face direction remains as it is, and an angle of view with which imaging is performed is changed to a wide angle compared to the angle of view of the previous time. Thereafter, the process proceeds to Step S6008. In addition, a recording direction in the subject lost mode may be continuously moved with a change amount of the observation direction before the failure of detection of the face direction.

Here, the case of proceeding to Step S6007 in which the subject lost mode is formed will be described with reference to FIG. 36B.

Figure 36B:
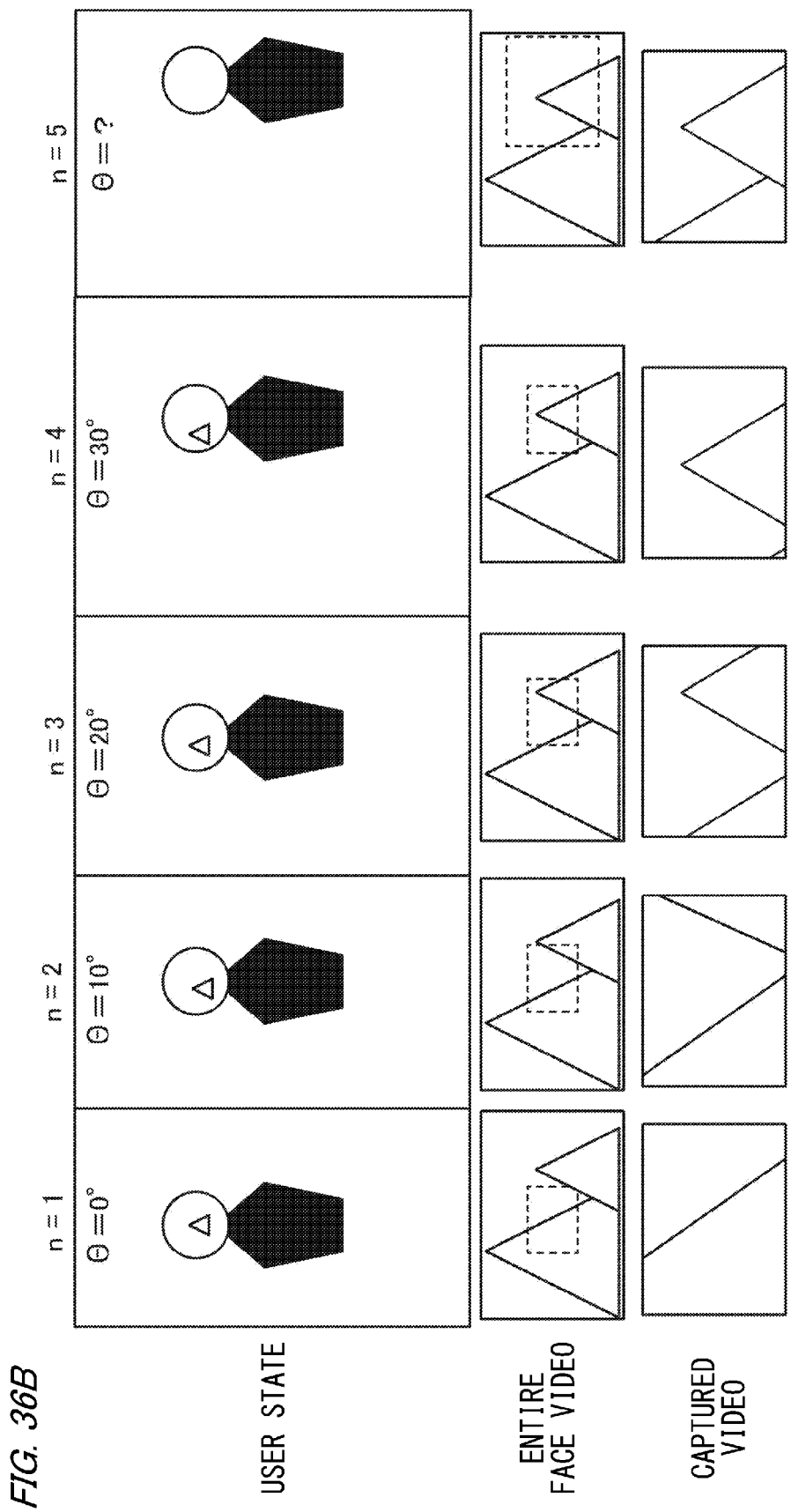
FIG. 36B is a diagram illustrating a relation between an observation direction detection state of a user and a captured video for each frame in a subject lost mode according to Embodiment 6.

In FIG. 36B, a case in which an observation target of a user was unable to be detected for n=5, that is, the fifth frame will be described as an example.

In the example illustrated in FIG. 36B, n=1 to 4, an important subject has not been found, and a subject registered in advance has not been found in a captured video of n=5. For this reason, the observation direction of n=5 is transitioned by adding an inertia to the rightward direction on the entire face video that is a movement direction of n=1 to 4. In addition, an angle of view with which a video is cut out from the entire face video will be changed to a wide angle.

In Step S6008, in a case in which a recording direction is determined from a direction other than the face direction in any one of Steps S6005 to S6007, the overall control CPU 101 (a notifying unit) notifies the user of error (detection error) indicating a failure of detection of the face direction. Thereafter, the process exits from this subroutine. In this embodiment, a warning is given to the user using the vibrator 106 illustrated in FIG. 5. However, the notification method used in Step S6008 is not limited to the method of this embodiment, and any other notification method such as a warning using the LED 17, a display using a terminal cooperating with the camera main body 1 such as a display device 800 or the like may be used.

As above, in this embodiment, in a case in which a face direction was unable to be detected, the recording direction and the angle of view are changed in accordance with the situation, and thus losing of capturing of a video of the target visual field that is originally desired by the user can be avoided.

In other words, in this embodiment, in a case in which a face direction was unable to be detected, and a subject tracked in the past or a subject registered in advance was able to be detected, following of the subject is performed. On the other hand, in a case in which such a subject was unable to be detected, in order to prevent imaging losing and allow re-detection of a subject to be easily performed, an angle of view is changed to a wide angle that is wider than a defined angle of view.

In accordance with this, a video not intended by a user can be prevented from being captured due to a failure of detection of a face direction.

While the processes of Steps S6001 to S6008 are performed for each frame, even after a transition to each mode, the mode can be transitioned on the basis of mode determination information representing whether a face direction has been acquired from the face direction detecting unit 20. For example, in this embodiment, in a case in which a subject registered in advance has been detected as a result of widening of the angle of view in accordance with the subject lost mode, a transition to a registered subject tracking mode in which the direction of the detected subject is set as an observation direction is performed. In this case, the widened angle of view is returned to the defined angle of view.

In addition, in this embodiment, although the mode is changed in accordance with determination performed once, a transition to a mode may be performed on the basis of results of determination of several times in accordance with a frame rate and a detection capability of a face direction.

Embodiment 7

In Embodiment 7, a method of determining an observation direction in accordance with accuracy (reliability) of face direction detection will be described with reference to FIGS. 37A to 37C and FIGS. 38 to 40.

Basically, this embodiment will be described as a derivation from Embodiment 1. For this reason, the same reference signs will be used for components that are the same as the components of the camera system according to Embodiment 1 among components of a camera system according to Embodiment 7, duplicate description will be omitted, and other components will be described in detail with additional notes as necessary.

In Embodiment 6, by switching a mode for determining an observation direction in accordance with whether or not a face direction was able to be detected, imaging of a recording direction not intended by a user is prevented. On the other hand, as in Japanese Patent Application Publication No. 2007-74033, in a case in which a face direction of a user cannot be stably detected constantly, there are cases in which imaging with an angle of view not intended by the user is performed. Here, as examples in which a face direction cannot be stably detected constantly, as illustrated in FIG. 1B, there are a case in which the imaging/detecting unit 10 of the camera main body 1 is mounted in a front part of the clavicle and a case in which detection accuracy of a face direction deteriorates due to the influence of a collar, a hair, and the like.

Figure 37A:
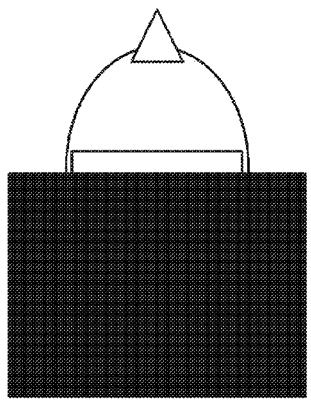
FIGS. 37A to 37C are diagrams illustrating a relation between an observation direction and a face area that can be used for detection of a face direction according to Embodiment 7.
Figure 37B:
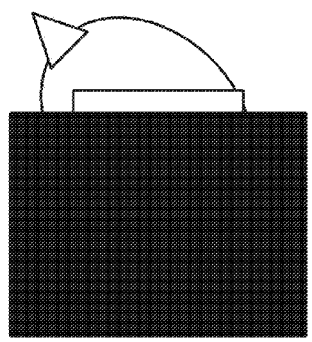
Figure 37C:
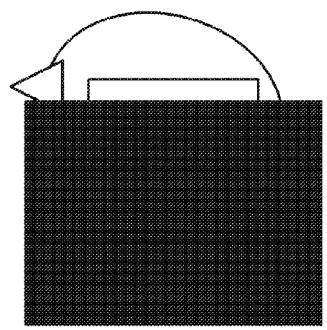

As illustrated in FIGS. 37A to 37C, in a case in which a user faces in a rightward direction (FIGS. 37B and 37C), an area in which the jaw and the chin are hidden by the body and the shoulder becomes larger than that of a case in which the user is in a front-face direction (FIG. 37A). In other words, there is a characteristic in which, depending on a face direction, a face area that can be used for detection of the face direction becomes narrow, and a likelihood of the detection accuracy being degraded becomes high in the camera main body 1. This characteristic largely depends on a user's mounting position of the camera main body 1.

Thus, in this embodiment, in accordance with a mounting position of the camera main body 1 and a detection result of the face direction, detection accuracy (reliability) of the face direction is calculated, in a case in which the reliability is high, the face direction is reflected much on the observation direction, and, in a case in which the reliability is low, other information is reflected much on the observation direction. In accordance with this, imaging can be performed with a user's intention reflected therein.

Figure 38:
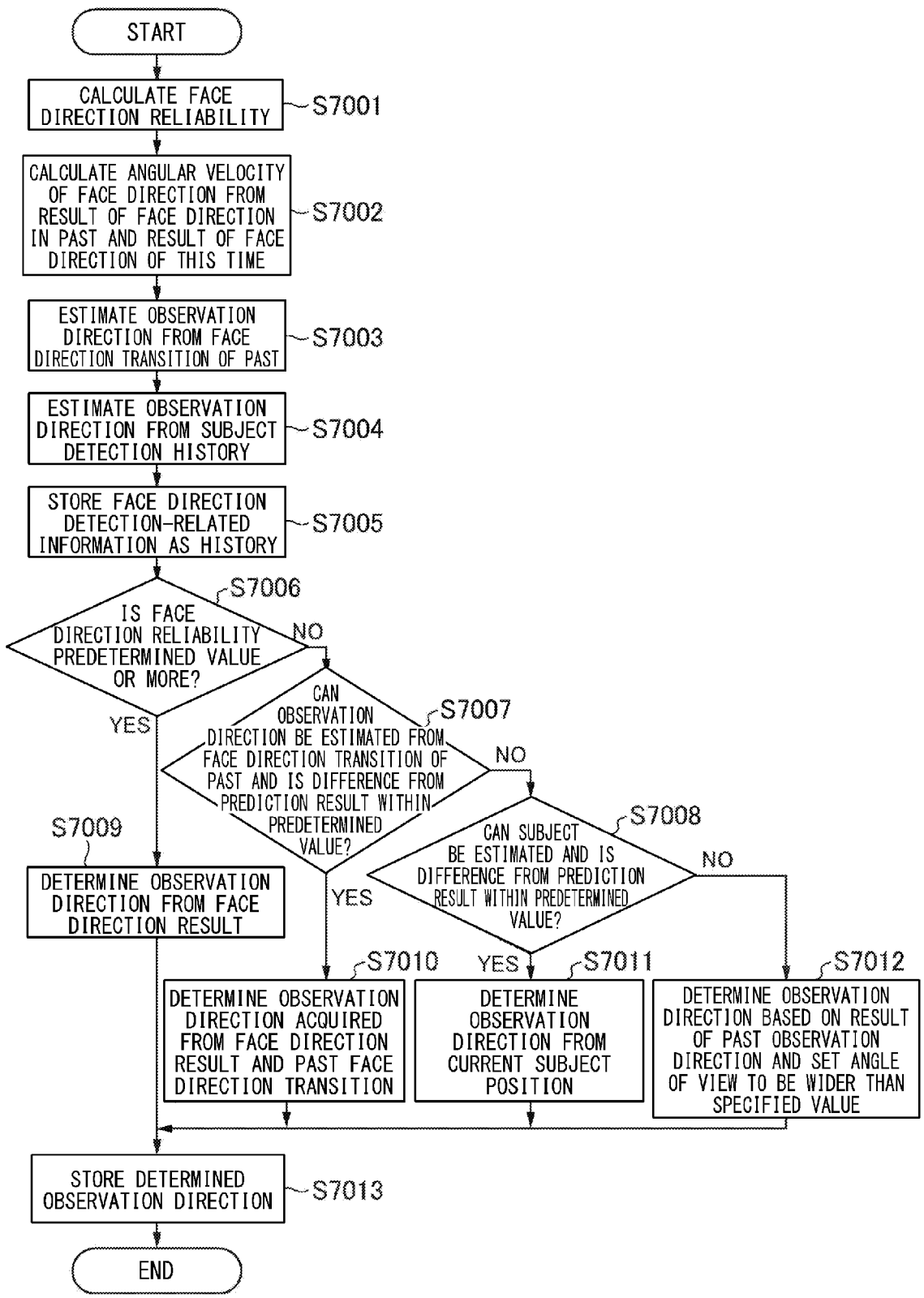
FIG. 38 is a flowchart of an observation direction determining process at the time of acquiring a face direction according to Embodiment 7 that is perform in place of the process of Step S6004 illustrated in FIG. 35.

FIG. 38 is a flowchart of an observation direction determining process at the time of acquiring a face direction according to this embodiment that is performed in place of the process of Step S6004 illustrated in FIG. 35. This process is performed by the overall control CPU 101 (an observation direction determining unit).

First, in Step S7001, the overall control CPU 101 (a first observation direction calculating unit, a reliability calculating unit) calculates a face direction reliability $T_n$ on the basis of a face direction $\theta_n$ (a first observation direction) acquired at the time of imaging of the n-th frame by the face direction detecting unit 20.

The face direction reliability $T_n$ is calculated as below.

First, the face direction $\theta_n$ is divided into three components including face directions $\theta_{yaw}$, $\theta_{pitch}$, and $\theta_{roll}$. Here, the face direction $\theta_{yaw}$ is a rotation component horizontally moving the face, the face direction $\theta_{pitch}$ is a rotation component vertically moving the face, and the face direction $\theta_{roll}$ is a rotation component moving to tilt the head.

In this embodiment, it is assumed that the camera main body 1 is mounted in the clavicle of a user, and a face direction is detected from below the face, and thus Tn (0≤Tn≤1) is acquired using the following Equation 701.

[Math. 2]

$$T_n = \frac{1}{1 + |\tan(2 \times \theta_{yaw})| \times |\tan(2 \times \theta_{pitch})| \times |\tan(2 \times \theta_{roll})|} \quad \text{(Equation 701)}$$

Figure 39:
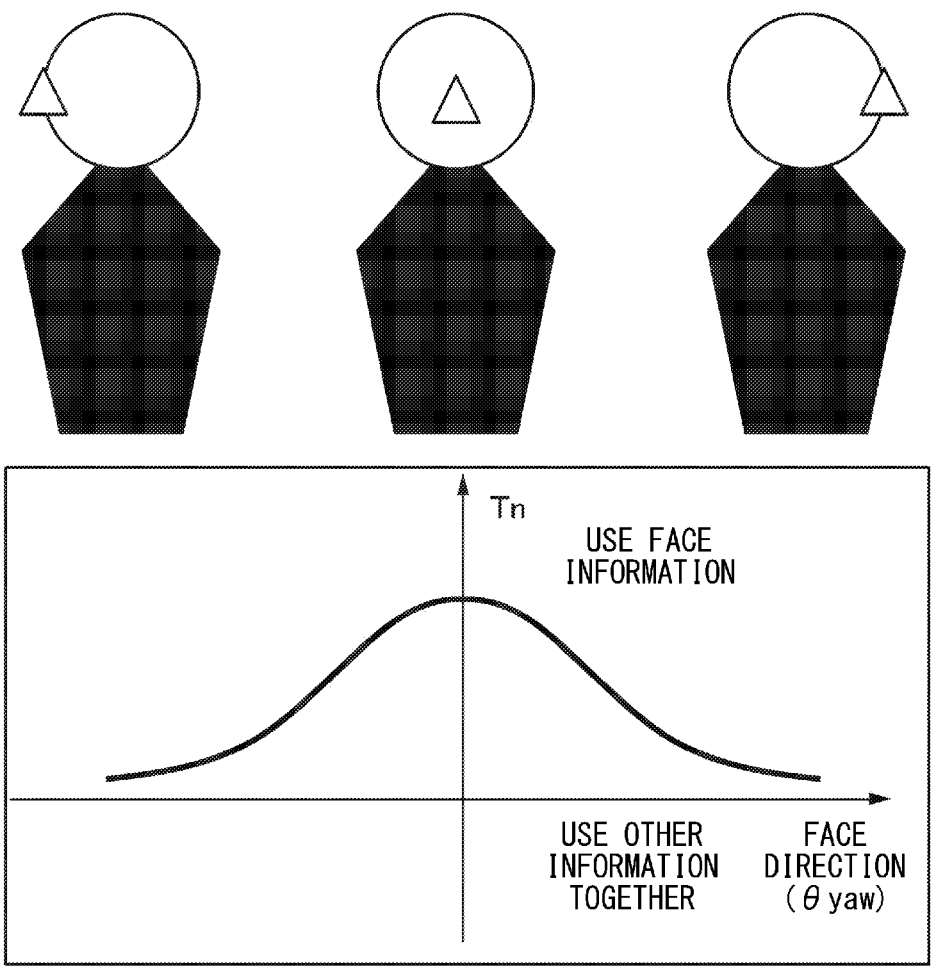
FIG. 39 is a diagram illustrating a relation between a face direction and face direction reliability according to Embodiment 7.
Figure 40:
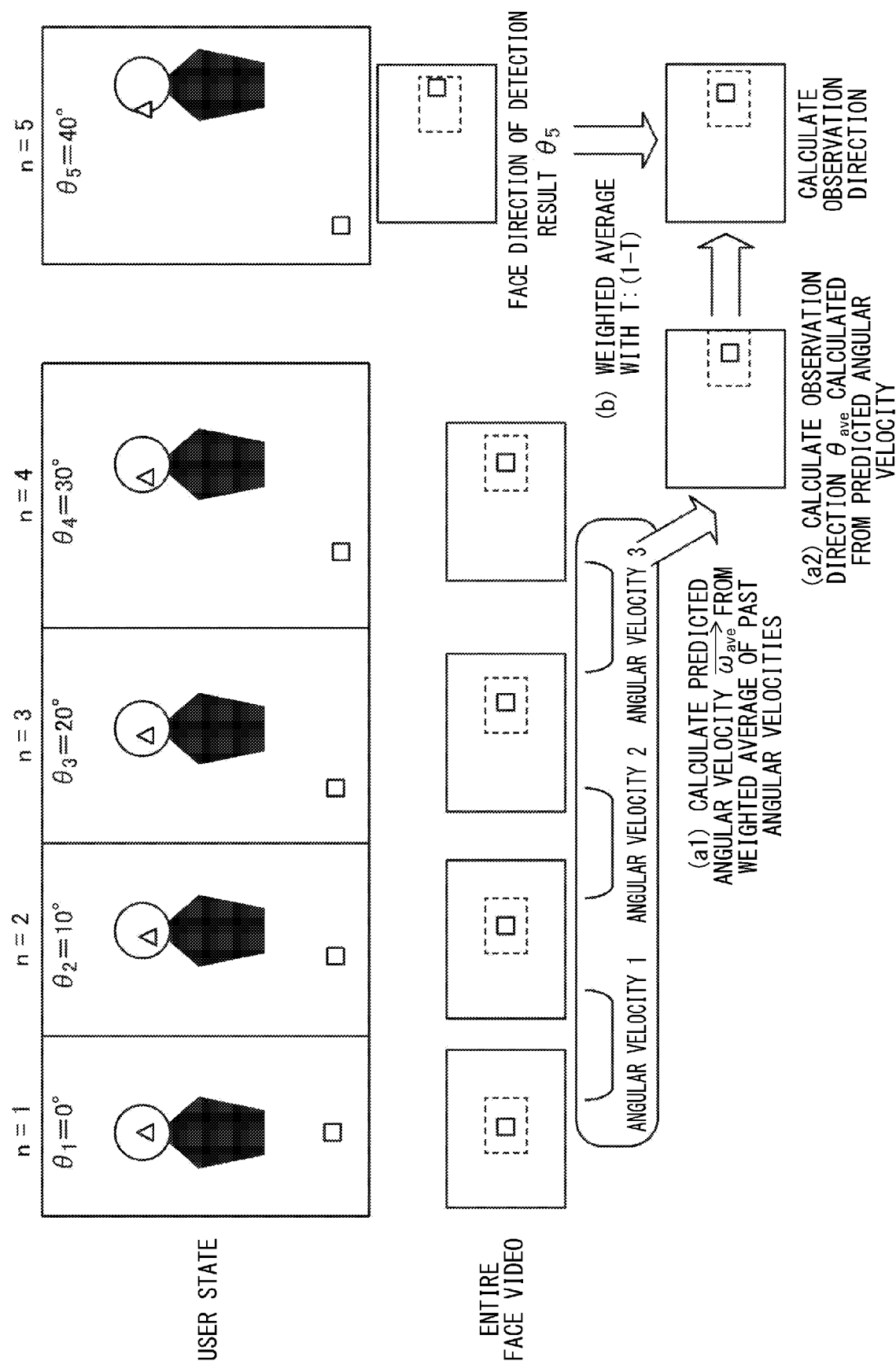
FIG. 40 is a conceptual diagram of an observation direction determining process at the time of acquiring a face direction according to Embodiment 7.

FIG. 39 illustrates the face direction $\theta_{yaw}$ and changes of the value of the face direction reliability $T_n$, and it is represented that the larger the face direction $\theta_{yaw}$ changes from the front face, the more the face direction reliability $T_n$ is degraded.

In this embodiment, although the face direction reliability $T_n$ is calculated using Equation 701, a weighted average of face direction reliabilities calculated by weighting face direction reliabilities calculated in the past in accordance with detection accuracy of the face direction using the face direction detecting unit 20, a frame rate of detection, and the like can be used. In addition, accuracy of pattern matching, a mounting position, and the like may be weighted at the time of calculating $T_n$.

In addition, in this embodiment, a reliability of prediction of a subject area is calculated using a determination coefficient acquired from Equation 701. However, the method of calculating the determination coefficient is not limited thereto. For example, a determination coefficient that has been adjusted in accordance with a mounting position that can be estimated through calibration according to Embodiment 2 may be used. In addition, in a case in which it is determined that the detection accuracy is low at the time of calibration, the determination coefficient may be change in accordance with the accuracy. Furthermore, in a case in which a face direction is detected using machine learning, the relevance ratio may be reflected in the determination coefficient.

In Step S7002, the overall control CPU 101 acquires an angular velocity A of a face direction as below. More specifically, the angular velocity A is acquired using the following Equation 702 from the face direction $\theta_n$ acquired at the time of imaging the n-th frame from the face direction detecting unit 20, a face direction acquisition time $t_n$, face direction information $\theta_{n-1}$, which is one frame before, stored in the primary memory 103, and an acquisition time $t_{n-1}$ thereof.

[Math. 3]

$$A = \vec{\omega_n} \quad \text{(Equation 702)}$$
$$\vec{\omega_n} = \frac{\theta_n - \theta_{n-1}}{c_n - c_{n-1}}$$

In this embodiment, although the angular velocity A is calculated using information of the current frame and a frame that is one frame before, the angular velocity may be acquired using one or more pieces of past information in accordance with the frame rate and the like.

In Step S7003, the overall control CPU 101 (an observation direction predicting unit) predicts a current face direction from transitions of face directions in the past stored in the primary memory 103. In this embodiment, the current frame serves as a reference, and past four frames thereof are set as a predetermined period, and, in a case in which the face direction is continuously displaced in a constant direction that can be determined to be the same three times or more in the four frames, it is determined that the observation direction can be predicted from the past face direction and the angular velocity. In addition, in a case in which this prediction is performed, a predicted angular velocity B that is a weighted average of angular velocities acquired from the past 4 frames is calculated using the following Equation 703, and a predicted face direction $\theta_{ave}$ (a second observation direction) is calculated using the following Equation 704. The calculation of Equations 703 and 704 respectively correspond to processes illustrated in (a1) and (a2) of FIG. 40.

A length of the predetermined period and a method applying a weighted average used in Step S7003 may be changed in accordance with the frame rate and the detection accuracy of the face direction detecting unit 20.

[Math. 4]

$$B = \overrightarrow{\omega_{ave}}$$ (Equation 703)

$$\overrightarrow{\omega_{ave}} = \frac{\sum_{t=1}^{3} \overrightarrow{\omega_{n-t}}}{3}$$

$$\theta_{ave} = \theta_{n-1} + (t_n - t_{n-1})\overrightarrow{\omega_{ave}}$$ (Equation 704)

In Step S7004, the overall control CPU 101 performs a prediction of the observation direction using internal information other than information supplied from the face direction detecting unit 20 in information stored in the primary memory 103. More specifically, in this embodiment, a state in which a subject is currently being tracked is determined from a subject detection history. In a case in which it is determined that the subject is being tracked, a predicted observation direction $\theta_{sub}$ (a second observation direction) based on movement of the subject is calculated. In this embodiment, the current frame serves as a reference, and past 4 frames thereof are set as a predetermined period, and, in a case in which subjects (the same subject) determined to be the same three or more times are detected from captured videos of the corresponding four frames, a state in which the subject is being tracked is determined. In subject tracking determination, a determination criterion may be changed in accordance with a detection period and detection accuracy according to the overall control CPU 101. A subject tracking detecting technique is known, and thus detailed description thereof will be omitted.

In this embodiment, although internal information used for a prediction of the observation direction of Step S7004 is the subject detection history, it is not limited thereto. For example, in accordance with a mounting position and a capability of the camera main body 1, a prediction of the observation direction may be performed using face information of a user shown in the imaging unit 40 and information relating to movement and a posture of the camera main body 1 detected by the angular velocity sensor 107 and the acceleration sensor 108. In addition, similar to Step S6006 of Embodiment 6, in a case in which there are subjects registered in advance, the overall control CPU 101 (a third observation direction predicting unit) may acquire a direction of a subject registered in advance on the latest captured video as a predicted observation direction $\theta_{sub}$.

In Step S7005, the overall control CPU 101 stores information relating to face direction detection in the primary memory 103 as a history. Here, the information relating to face direction detection is formed from the angular velocity A of the face direction generated in Step S7002, the face direction reliability $T_n$ calculated in Step S7001, the face direction $\theta_n$ detected by the face direction detecting unit 20, the face direction acquisition time $t_n$, and information representing generation time points of such information.

In Step S7006, in a case in which the face direction reliability $T_n$ calculated in Step S7001 is equal to or higher than a predetermined value, the overall control CPU 101 determines that the reliability of the face direction is high, and the process proceeds to Step S7009.

In Step S7009, the overall control CPU 101 determines the face direction as the current observation direction $\theta'_n$, and the process proceeds to Step S7013.

On the other hand, in a case in which the face direction reliability $T_n$ calculated in Step S7001 is lower than the predetermined value (No in Step S7006), the process proceeds to Step S7007.

In Step S7007, in a case in which the predicted face direction $\theta_{ave}$ can be estimated in Step S7003, and a condition of $|\theta_n - \theta_{ave}|$ being within a predetermined angle is satisfied, the process proceeds to Step S7010. In this embodiment, as the predetermined angle, $\pi/8$ is used for determination.

In Step S7010, the overall control CPU 101 (a first observation direction predicting unit) determines the current observation direction $\theta'_n$ using $\theta_n$ and $\theta_{ave}$ and the face direction reliability $T_n$. In this embodiment, the current observation direction $\theta'_n$ is acquired using the following Equation 705, and the process proceeds to Step S7013. The calculation of Equation 705 corresponds to a process illustrated in FIG. 40B. As illustrated in FIG. 39, the smaller the absolute value of the angle of the face direction $\theta_{yaw}$, the higher the face direction reliability $T_n$, and thus, as illustrated in Equation 705, the face direction $\theta_n$ is reflected much in the current observation direction $\theta'_n$. On the other hand, the larger the absolute value of the angle of the face direction $\theta_{yaw}$, the lower the face direction reliability $T_n$, and thus, as illustrated in Equation 705, other information (the predicted face direction $\theta_{ave}$) other than the face direction $\theta_{yaw}$ is reflected much in the current observation direction $\theta'_n$.

[Math. 5]

$$\theta'_n = T_n \times \theta_n + (1 - T_n) \times \theta_{ave}$$ (Equation 705)

In a case in which the condition is not satisfied in Step S7007, the process proceeds to Step S7008. In a case in which the predicted observation direction $\theta_{sub}$ can be estimated, and the condition of $|\theta_n - \theta_{sub}|$ being within the predetermined angle is satisfied, the process proceeds to Step S7011. As in Step S7010, in this embodiment, as the predetermined angle, $\pi/8$ is used for determination.

In Step S7011, the overall control CPU 101 (a second observation direction predicting unit) determines the current observation direction $\theta'_n$ using the face direction $\theta_n$, the predicted observation direction $\theta_{sub}$, and the face direction reliability $T_n$. In this embodiment, the current observation direction $\theta'_n$ is acquired using the following Equation 706, and the process proceeds to Step S7013. Similar to Step S7010, as illustrated in FIG. 39, the smaller the absolute value of the angle of the face direction $\theta_{yaw}$, the higher the face direction reliability $T_n$, and thus, as illustrated in Equation 706, the face direction $\theta_n$ is reflected much in the current observation direction $\theta'_n$. On the other hand, the larger the absolute value of the angle of the face direction $\theta_{yaw}$, the lower the face direction reliability $T_n$, and thus, as illustrated in Equation 706, other information (the predicted observation direction $\theta_{sub}$) other than the face direction $\theta_{yaw}$ is reflected much in the current observation direction $\theta'_n$.

[Math. 6]

$$\theta'_n = T_n \times \theta_n + (1 - T_n) \times \theta_{sub}$$ (Equation 706)

In a case in which the condition described above is not satisfied in Step S7008, it is determined that reliable acquisition of the observation direction cannot be made in the current situation, and the process proceeds to Step S7012.

In Step S7012, the current observation direction $\theta'_n$ is determined to be an observation direction acquired by moving the observation direction $\theta'_{n-1}$ of the previous time by adding inertia based on a displacement of the observation direction in the past thereto, an angle of view is set to be wider than a defined value, and the process proceeds to Step S7013. In accordance with this, a likelihood of having a loss of imaging of a subject intended by a user can be lowered.

In this embodiment, although the method of calculating the current observation direction $\theta'_n$ is switched in accordance with the face direction reliability $T_n$ and the detection state of a subject, the configuration is not limited thereto. For example, when each of the predicted face direction $\theta_{ave}$ and the predicted observation direction $\theta_{sub}$ is calculated, the reliability thereof (predicted direction reliability) is also calculated, and the calculated observation direction $\theta'_n$ may be corrected in accordance with such calculated reliability.

In addition, in a case in which the calculated reliability is equal to or lower than a predetermined value, a likelihood of having a loss of imaging of a subject intended by the user is considered to rise, and thus it is preferable that the angle of view be set to a wide angle wider than the defined angle of view. In addition, in that case, the process may proceed to Step S7012. Furthermore, thereafter, in a case in which one of the calculated reliabilities becomes larger than a predetermined value, it is preferable that the angle of view be returned to the defined angle of view.

In accordance with the process illustrated in FIG. 38, in a case in which the face direction reliability $T_n$ is high, the face direction $\theta_n$ is determined to be the current observation direction $\theta'_n$. On the other hand, in a case in which the face direction reliability $T_n$ is low, in accordance with a situation, by using information of a time point at which the face direction reliability $T_n$ is high and information other than the face direction, the current observation direction $\theta'_n$ (recording direction) is determined, and the angle of view is further widened in accordance with the situation.

In other words, in this embodiment, in a case in which the face direction reliability $T_n$ is low, and the accuracy of detection of the face direction is predicted to be low, by using the predicted face direction $\theta_{ave}$ and the predicted observation direction $\theta_{sub}$, a video not intended by a user can be prevented from being captured due to a failure of face direction detection.

Embodiment 8

In Embodiment 8, a method of mounting the camera main body 1 at a stable position will be described with reference to FIGS. 41A to 41C, 42A to 42C, 43A to 43C, 44A to 44C, and 45A to 45G.

Basically, this embodiment will be described as a derivation from Embodiment 1. For this reason, the same reference signs will be used for components that are the same as the components of the camera system according to Embodiment 1 among components of a camera system according to Embodiment 8, duplicate description will be omitted, and other components will be described in detail with additional notes as necessary.

First, angle adjustment of the connection unit 80 (a neck hooking unit) will be described.

Figure 41A:
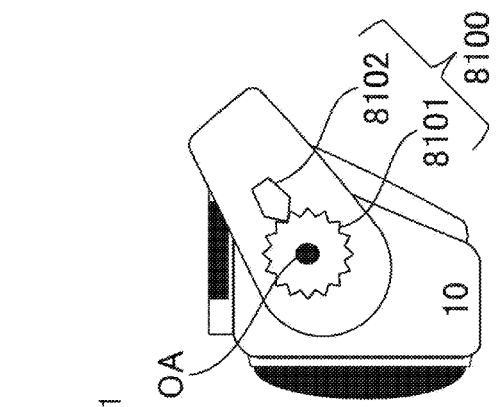
FIGS. 41A to 41C are enlarged diagrams illustrating appearances of an imaging/detecting unit seen from a side face.
Figure 41B:
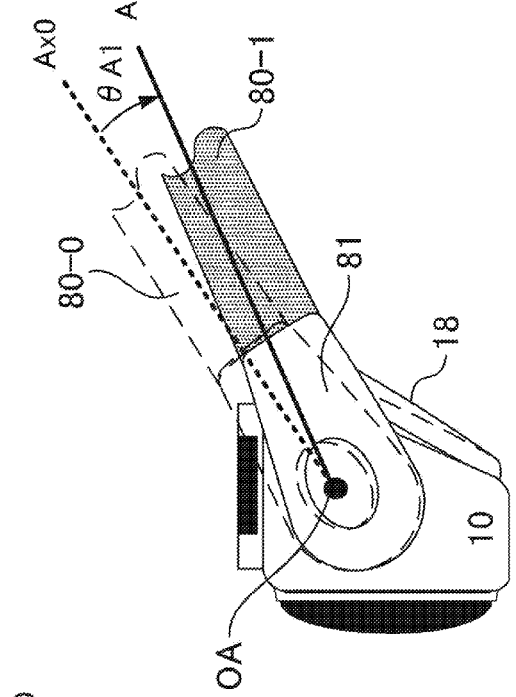
Figure 41C:
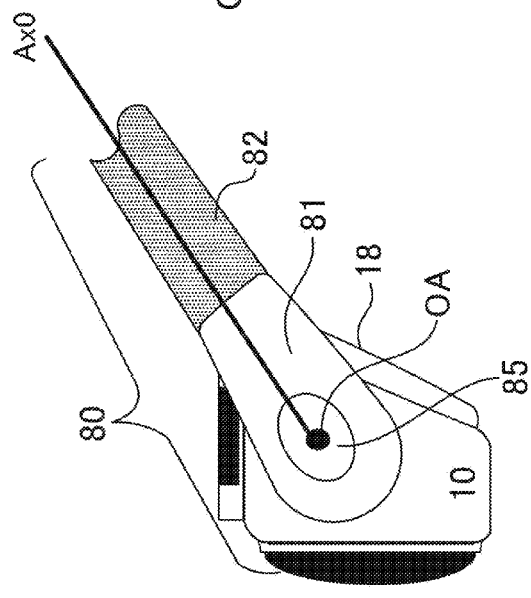

FIGS. 41A to 41C are enlarged diagrams illustrating appearances of the imaging/detecting unit 10 seen from the side face.

FIG. 41A is a diagram of a time when the connection unit 80 is present at a position Ax0 that is a standard position, and FIG. 41B is a diagram of a time when the connection unit 80 is present at a position Ax1 after rotating around a rotation axis OA by an angle θA1 with respect to the position Ax0. FIG. 41C is a schematic diagram illustrating an internal mechanism of the angle maintaining part 81 that can be seen in a case in which exterior of the angle maintaining part 81 is removed.

As illustrated in FIG. 41C, inside the angle maintaining part 81, an angle adjusting mechanism 8100 (a neck angle adjusting unit) is disposed.

The angle adjusting mechanism 8100 is formed from an angle adjustment cam 8101 that performs angle adjustment of the angle maintaining part 81 with respect to the imaging/detecting unit 10 and a locking member 8102 locking the angle adjustment cam 8101. OA represented in FIG. 41A is a center of rotation of the angle maintaining part 81 and is present at the center of the angle adjustment cam 8101.

The locking member 8102 is a member biased to the angle adjustment cam 8101 using a spring not illustrated in the drawing. While the angle adjustment button 85 (FIG. 2F) is pressed, the biasing is released, and the locking member 8102 is separated away from the angle adjustment cam 8101. In other words, only while the angle adjustment button 85 is pressed, the angle maintaining part 81 of the connection unit 80 is in a rotatable state with respect to the imaging/detecting unit 10.

By rotating the angle maintaining part 81 with respect to the imaging/detecting unit 10 while pressing the angle adjustment button 85, a user can adjust the position of the connection unit 80 from the position Ax0 (FIG. 41A) to the position Ax1 (FIG. 41B).

As a mechanism for maintaining the angle of the angle maintaining part 81 with respect to the imaging/detecting unit 10, in this embodiment, although a mechanism of stepped adjustment using the angle adjustment cam 8101 and the locking member 8102 is used, a mechanism enabling non-stepped adjustment using sliding resistance may be used.

In addition, in this embodiment, although a configuration in which a user rotates the angle maintaining part 81 while pressing the angle adjustment button 85 is employed, the configuration is not limited thereto. For example, a configuration not requiring the angle adjustment button 85 in which, when an external force equal to or more than a certain threshold is applied to the angle maintaining part 81, a balance for rotating the angle maintaining part 81 is taken, for example, a configuration in which a ball is used in place of the locking member 8102 or sliding resistance is used may be employed.

Figure 42A:
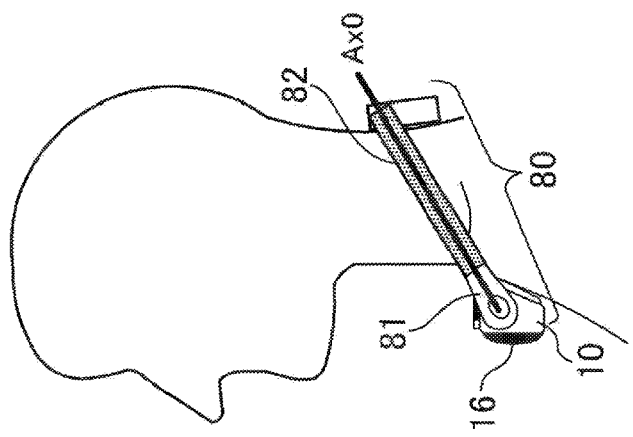
FIGS. 42A to 42C are side views representing appearances of a user wearing a camera main body.
Figure 42B:
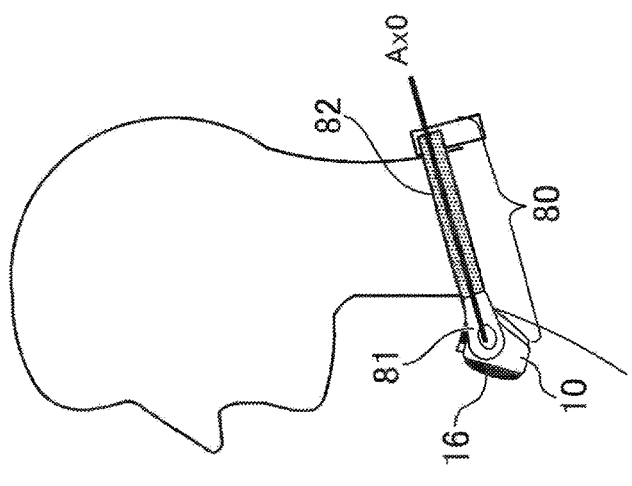
Figure 42C:
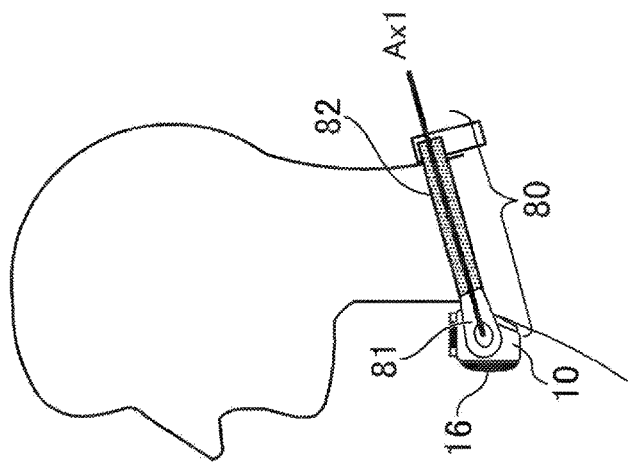

FIGS. 42A to 42C are side views illustrating appearances of a user wearing the camera main body 1.

FIG. 42A is a diagram illustrating a user wearing the camera main body 1 in a state in which the connection unit 80 is present at the position Ax0, and the band part 82 is adjusted to be long. FIG. 41B is a diagram illustrating a user wearing the camera main body 1 in a state in which the connection unit 80 is present at the position Ax0, and the band part 82 is adjusted to be short. FIG. 41C is a diagram illustrating a user wearing the camera main body 1 in a state in which the connection unit 80 is present at the position Ax1, and the band part 82 is adjusted to be short.

As illustrated in FIGS. 42A and 42C, when a relation between the position of the connection unit 80 and the length of the band part 82 is in a state appropriate for the user, the imaging lens 16 faces the front face of the user. On the other hand, as illustrated in FIG. 42B, when a relation between the position of the connection unit 80 and the length of the band part 82 is in a state not appropriate for the user, the imaging lens 16 does not face the front face of the user. In the case of this diagram 42B, the optical axis of the imaging lens 16 faces in an upward direction.

In this way, since the connection unit 80 is configured such that the position can be adjusted, a user can wear the camera main body 1 such that the optical axis of the imaging lens 16 is in a state of being approximately parallel to a visual line position in the natural state of the user. In addition, it is apparent that also in a case in which the mounting position of the camera main body 1 that is appropriate for the user is a position at which the optical axis of the imaging lens 16 is in the horizontal direction, similarly, appropriate mounting can be performed.

Next, angle adjustment of the chest connecting pad 18 will be described.

FIGS. 43A to 43C are enlarged diagrams illustrating appearances of the imaging/detecting unit 10 seen from the side face in a case in which the connection unit 80 is in a non-display state.

FIG. 43A is a diagram at a time when the chest connecting pad 18 is present at a position Bx0 that is a standard position, and FIG. 43B is a diagram at a time when the chest connecting pad 18 is present at a position Bx1 after rotating around a rotation axis OB by an angle θB1 with respect to the position Bx0. FIG. 43C is a schematic diagram illustrating an internal mechanism of the imaging/detecting unit 10 that can be seen in a case in which exterior of the imaging/detecting unit 10 is removed.

As illustrated in FIG. 43C, inside the imaging/detecting unit 10, an angle adjusting mechanism 8200 (a ground angle adjusting unit) is disposed.

The angle adjusting mechanism 8200 is formed from an angle adjustment cam 8201 that performs angle adjustment of the chest connecting pad 18 with respect to the imaging/detecting unit 10 and a locking member 8202 locking the angle adjustment cam 8201. OB represented in FIG. 43C is a rotation center of the chest connecting pad 18.

The locking member 8202 is a member biased to the angle adjustment cam 8201 using a spring not illustrated in the drawing. While the angle adjustment button 8203 is pressed, the biasing is released, and the locking member 8202 is separated away from the angle adjustment cam 8201. In other words, only while the angle adjustment button 8203 is pressed, the chest connecting pad 18 is in a rotatable state with respect to the imaging/detecting unit 10.

By rotating the chest connecting pad 18 with respect to the imaging/detecting unit 10 while pressing the angle adjustment button 8203, a user can adjust the position of the chest connecting pad 18 from the position Bx0 to the position Bx1.

As a mechanism for maintaining the angle of the chest connecting pad 18 with respect to the imaging/detecting unit 10, in this embodiment, although a mechanism of stepped adjustment using the angle adjustment cam 8201 and the locking member 8202 is used, a mechanism enabling non-stepped adjustment using sliding resistance may be used.

In addition, in this embodiment, although a configuration in which a user rotates the chest connecting pad 18 while pressing the angle adjustment button 8203 is employed, the configuration is not limited thereto. For example, a configuration not requiring the angle adjustment button 8203 in which, when an external force equal to or more than a certain threshold is applied to the chest connecting pad 18, a balance for rotating the chest connecting pad 18 is taken, for example, a configuration in which a ball is used in place of the locking member 8202 or sliding resistance is used may be employed.

Figure 44C:
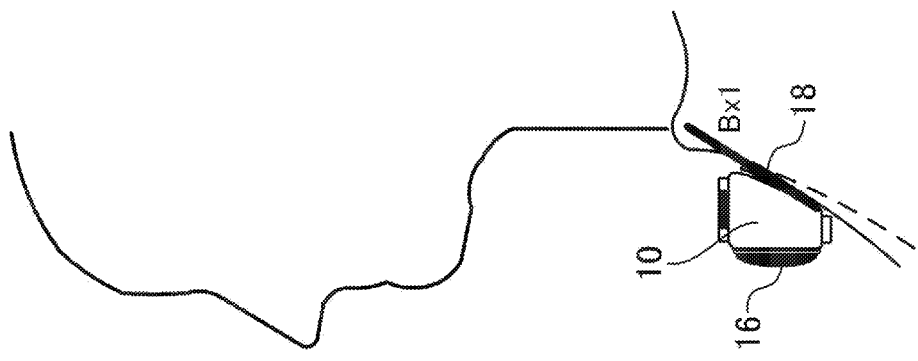
FIGS. 44A to 44C are side views illustrating appearances of a user wearing a camera main body when a connection unit is set as non-display.
Figure 44B:
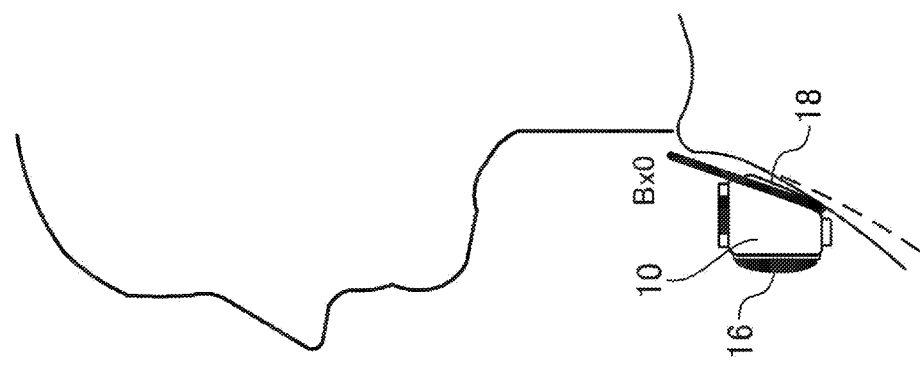
Figure 44A:
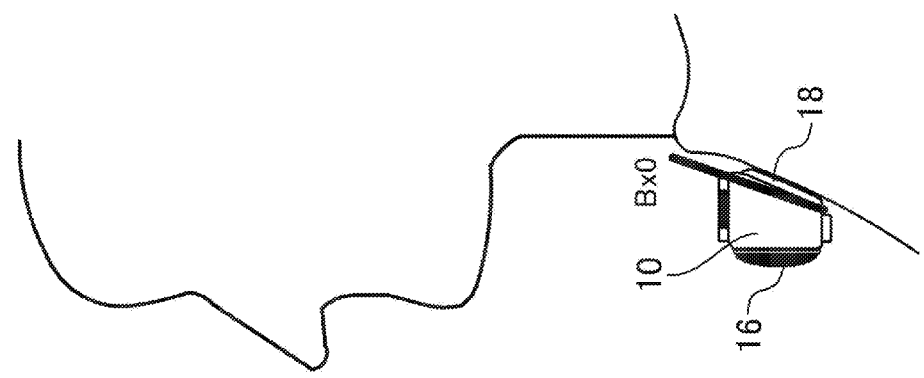

FIGS. 44A to 44C are side views illustrating appearances of a user wearing the camera main body 1 in a case in which the connection unit 80 is in a non-display state.

FIG. 44A is a diagram illustrating an appearance of a user whose chest is standing wearing the camera main body 1 in a state in which the chest connecting pad 18 is present at the position Bx0. FIG. 44B is a diagram illustrating an appearance of a user whose chest is sleeping wearing the camera main body 1 in a state in which the chest connecting pad 18 is present at the position Bx0. FIG. 44C is a diagram illustrating an appearance of a user whose chest is sleeping wearing the camera main body 1 in a state in which the chest connecting pad 18 is present at the position Bx1.

As illustrated in FIGS. 44A and 44C, when the position of the chest connecting pad 18 is in a state that is appropriate for the inclination of the chest of the user, the chest connecting pad 18 is grounded in a wide range to the chest of the user. On the other hand, as illustrated in FIGS. 44B, when the position of the chest connecting pad 18 is not in a state that is appropriate for the inclination of the chest of the user, the chest connecting pad 18 is not grounded in a slight range to the chest of the user. As illustrated in FIG. 44B, in a case in which a range in which the chest connecting pad 18 is grounded to the chest of the user is small, when the user moves his or her body, the imaging/detecting unit 10 easily moves with respect to the body of the user, and a captured video is largely shaken.

In this way, since the chest connecting pad 18 is configured to be able to adjust the angle, a user can wear the camera main body 1 such that the chest connecting pad 18 is installed in a wide range for his or her chest, and blurring of a captured video can be inhibited.

In this embodiment, although the chest connecting pad 18 is disposed in the imaging/detecting unit 10, the same effects can be acquired also in a case in which the chest connecting pad 18 is disposed in the connection unit 80. In such a case, for example, a mechanism similar to the angle adjusting mechanism 8100 illustrated in FIG. 41C is disposed inside the connection unit 80 as a mechanism performing angle adjustment of the chest connecting pad 18 with respect to the connection unit 80.

Next, configurations of the band part 82 and the electric cable 84 will be described in detail.

As described in Embodiment 1, the battery unit 90 (a power supply unit) and the imaging/detecting unit 10 of the camera main body 1 are separately configured modules electrically connected through the electric cable 84.

Here, in a case in which the electric cable 84 and the band part 82 are separately configured, it is not preferable from the appearance of the camera main body 1 and is not preferable also from an aspect that an operation at the time of a user wearing them around the neck become complicated. Thus, it is preferable that the band part 82 and the electric cable 84 be integrally configured, but the configuration is not limited to the configuration as illustrated in FIG. 2B.

FIGS. 45A to 45G are diagrams illustrating a connection face 83 that is a cutout face of the band part 82 and the electric cable 84 integrally configured therewith.

FIGS. 45A to 45C illustrate a case in which the electric cable 84 is configured using a flexible substrate (FPC), and FIGS. 45D to 45G illustrate a case in which the electric cable 84 is configured using a fine-wire cable.

In FIGS. 45A and 45D, the electric cable 84 is embedded inside the band part 82 when seen from the connection face 83. In this case, it is preferable that the material of the band part 82 be an elastic member that can be injected and molded, for example, silicon rubber, elastomer, rubber, or plastic. As a method for manufacturing a component in which the band part 82 and the electric cable 84 are integrally configured, there is a method in which the electric cable 84 is inserted at the time of injecting and molding the band part 82. Other than that, a manufacturing method in which the band part 82 is configured using two components, and the band parts 82 configured using two components are formed as an integrated component with the electric cable 84 disposed therebetween using a bonding agent or heat welding may be employed. However, as illustrated in FIGS. 45A and 45D, as long as a component in which the band part 82 and the electric cable 84 are integrally configured can be manufactured, a manufacturing method is not limited to the two manufacturing methods described above.

In FIGS. 45B, 45C, and 45E, the electric cable 84 is brought into contact with the outer side of the band part 82 when seen from the connection face 83.

In FIG. 45B, in the band part 82 when seen the connection face 83, a shape used for integration with the electric cable 84 is not particularly provided, a configuration in which the electric cable 84 is bonded to the surface of the band part 82 is employed, and thus manufacturing can be performed at low cost. However, when the electric cable 84 (in this case, the FPC) is present on the external view side, there are cases in which it is not preferable for the FPC to be exposed to the external view side from the appearance aspect. In this case, in order to remove exposure of the FPC, a process in which coating is applied to the exterior thereof, or the exterior may be covered with a film is required. In addition, in a case in which the electric cable is present on a neck contact side of the user, there are cases in which the wearing feeling becomes bad. In this case, in order to improve the wearing feeling, a process in which coating is applied to the exterior, or the exterior is covered with a film is required.

In FIGS. 45C and 45E, in the band part 82 when seen from the connection face 83, a concave shape 83$a$ is formed for integration with the electric cable 84, and the electric cable 84 is disposed inside the concave shape 83$a$. In this case, when the concave shape 83$a$ is provided on the neck contact side of the user, a good appearance of the camera main body 1 is secured, and, when the concave shape 83$a$ is provided such that the electric cable 84 is not directly in contact with the neck of the user, even in a case in which special processing is not performed, the wearing feeling of the user can be maintained to be good. In addition, in a case in which appropriate design is applied at the time of generating the band part 82, an additional cost is not required for formation of the concave shape 83$a$, and thus it is preferable also from the aspect of costs.

Also in FIGS. 45F and 45G, similar to FIGS. 45A and 45D described above, inside the band part 82 when seen from the connection face 83, the electric cable 84 is embedded. FIG. 45F illustrates a configuration of a case in which there is one electric cable 84, and FIG. 45G illustrates a configuration of a case in which there are a plurality of electric cables 84. Such a configuration is different from those illustrated in FIGS. 45A and 45D, and there is a feature of a cross-section area of the band part 82 being secured in the connection face 83. The cross-section area of the band part 82 on the connection face 83 has an influence on torsional rigidity and bending rigidity of the band part 82, and such rigidity has an influence on stability for the imaging/detecting unit 10 being continuously stable at a set position of the body when a user wears the camera main body 1. In other words, when the cross-section area of the band part 82 in the connection face 83 becomes larger, and the band part has stronger torsional rigidity and bending rigidity, the stability of such an imaging/detecting unit 10 is further improved. When the protruding side of the electric cable 84 faces the neck contact side of the user, a contact area between the user and the band part 82 becomes small, the wearing feeling deteriorates, and thus it is preferable that the protruding side of the electric cable 84 be positioned on the external view side. Thus, in the shapes illustrated in FIGS. 45F and 45G, a shape of the electric cable 84 protruding from the band part 82 is seen from the external view side, and thus the appearance of the camera main body 1 is not more preferable than other shapes illustrated in FIGS. 45A to 45G but is a shape that is appropriate from the viewpoint of securement of rigidity of the band part 82.

As described above, the shapes illustrated in FIGS. 45C and 45E are considered to be the most preferable from a balance between the appearance and the wearing feeling, and other than that, in a case in which the cost and the rigidity are important, other shapes illustrated in FIGS. 45A to 45G can be taken.

As above, while the preferred embodiments of the present disclosure have been described, the present disclosure is not limited to such embodiments, and various modifications and changes can be made within the range of the concept thereof.

Embodiment 9

In Embodiment 9, a modified example of the camera system including the camera main body 1 will be described with reference to FIGS. 46A and 46B.

Basically, this embodiment will be described as a derivation from Embodiment 1. For this reason, the same reference signs will be used for components that are the same as the components of the camera system according to Embodiment 1 among components of a camera system according to Embodiment 9, duplicate description will be omitted, and other components will be described in detail with additional notes as necessary.

In Embodiment 1, although a general smartphone is used in the display device 800, there are many smartphone manufacturers, and there are a wide variety of arithmetic operation capabilities thereof. For example, in Embodiment 1, when a video of a recording direction cut out from a super-wide angle image is transmitted to the display device 800, information required for an optical correction process and an image stabilization process is added to the video. While the display device 800 performs a distortion aberration correction and an image stabilization correction on the basis of this information, in a smartphone used as the display device 800 by a user, there are also cases in which the arithmetic operation capability is too low for performing such corrections.

Thus, a camera system according to this embodiment has a display device 9800 of which an arithmetic operation capability is lower than those of a camera main body 1' as an imaging apparatus and the display device 800.

In the camera main body 1', when the processes until a primary recording process of a video (Steps S100 to S600 illustrated in FIG. 7A) end, processes of Steps S800 and S900 are performed without performing a transmission process for the display device 9800. Thereafter, in the camera main body 1', a process of transmitting a video for which processes of Steps S800 and S900 have been completed to the display device 9800 is performed.

On the other hand, in the display device 9800, the video supplied from the camera main body 1' is secondarily recorded as it is without performing the processes of Steps S800 and S900.

Hereinafter, the camera system according to this embodiment will be more specifically described.

Figure 46A:
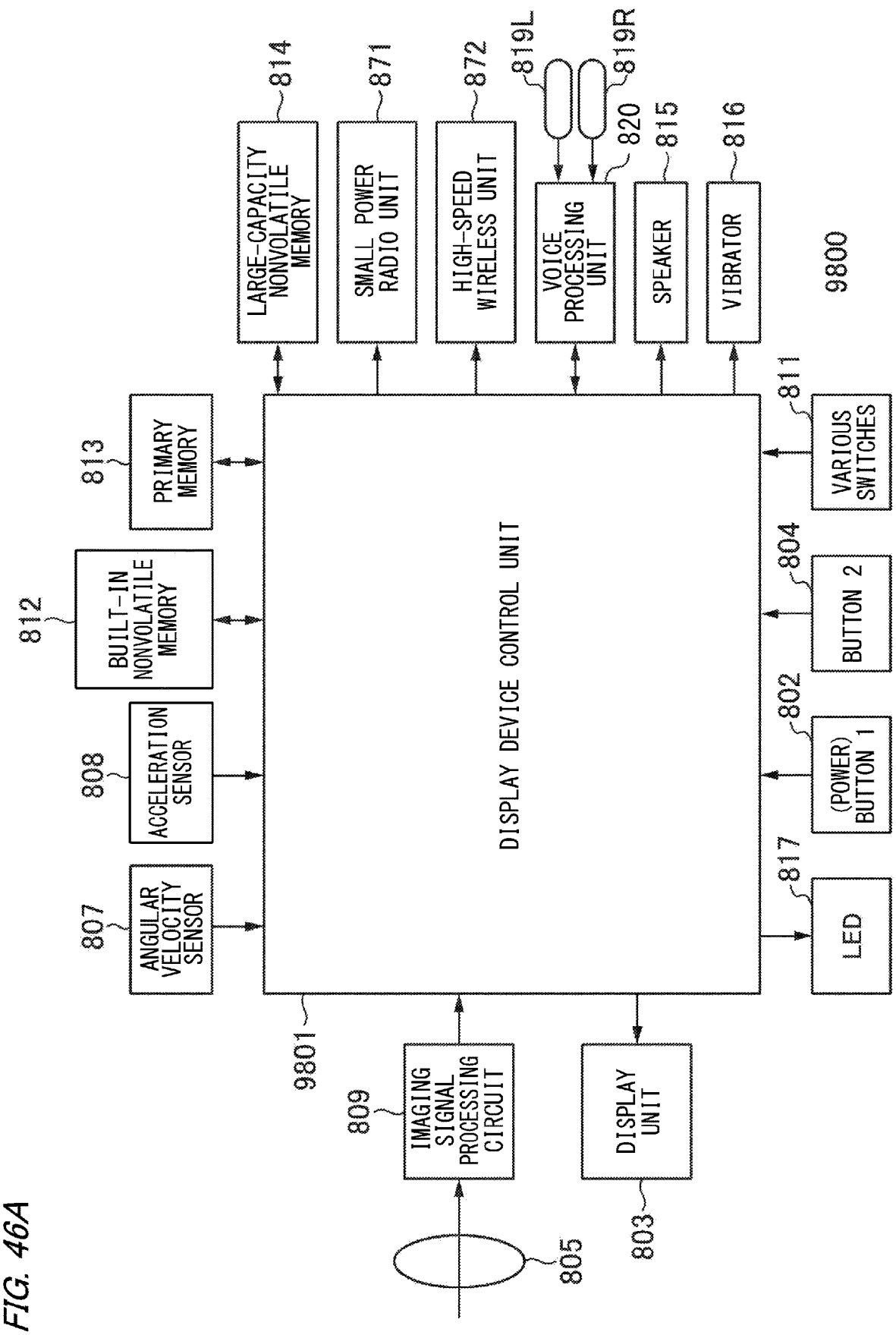
FIG. 46A is a block diagram illustrating a hardware configuration of a display device connected to a camera main body as an imaging apparatus according to Embodiment 9.

FIG. 46A is a block diagram illustrating a hardware configuration of a display device 9800 connected to the camera main body 1' as an imaging apparatus according to this embodiment.

In FIG. 46A, the same reference signs will be assigned to the same components as those of the hardware configuration of the display device 800 according to Embodiment 1 illustrated in FIG. 6, and duplicate description will be omitted.

The display device 9800 includes a display device control unit 9801 in place of the display device control unit 801 and does not include the face sensor 806, which is different from the display device 800.

The display device control unit 9801 is configured using a CPU of which an arithmetic operation capability is lower than the CPU configuring the display device control unit 801 (FIG. 6). In addition, the capabilities of a built-in nonvolatile memory 812 and a primary memory 813 may be lower than those according to Embodiment 1.

Figure 46B:
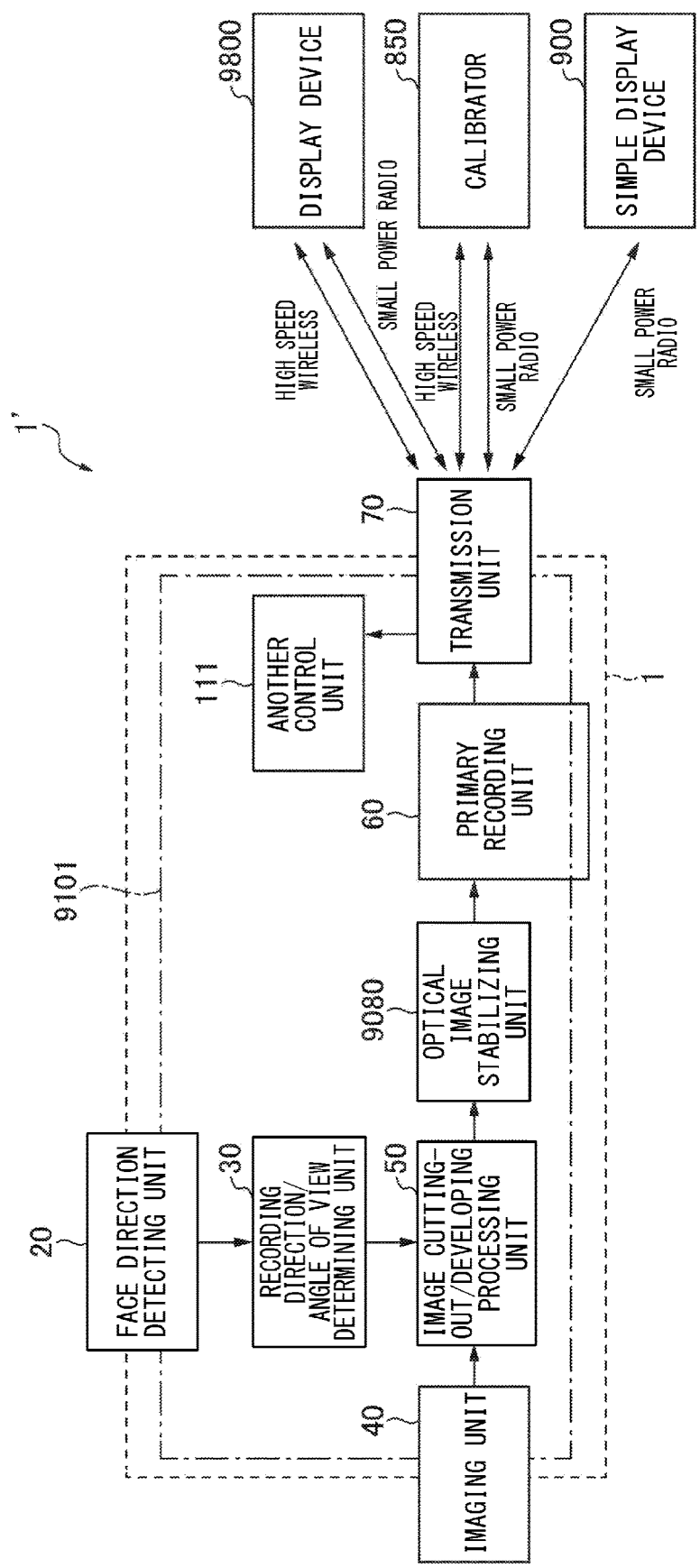
FIG. 46B is a functional block diagram of a camera main body according to Embodiment 9.
Figure 47A:
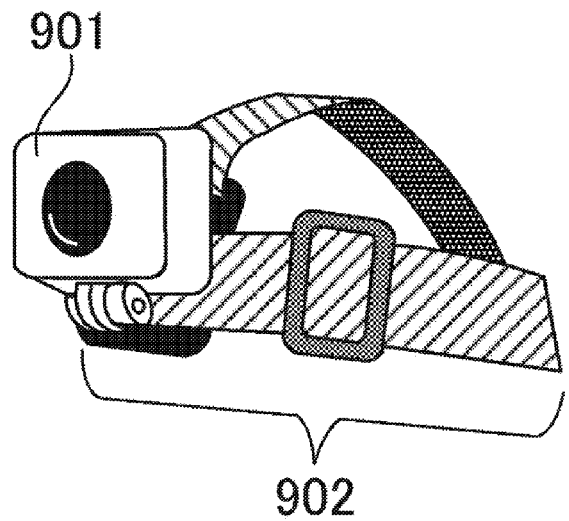
FIGS. 47A and 47B are diagrams illustrating configuration examples of a camera fixed to a head part using a head-part fixing accessory that is a conventional technology.
Figure 47B:
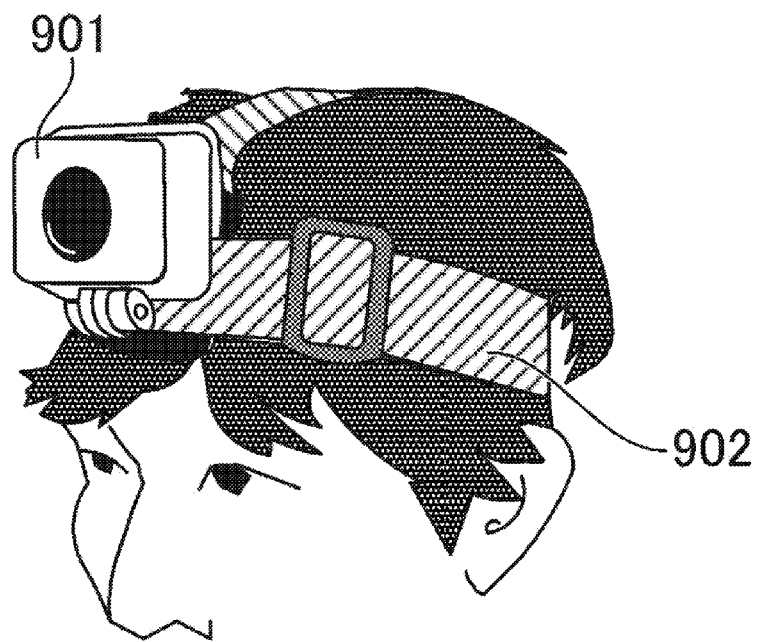
Figure 48:
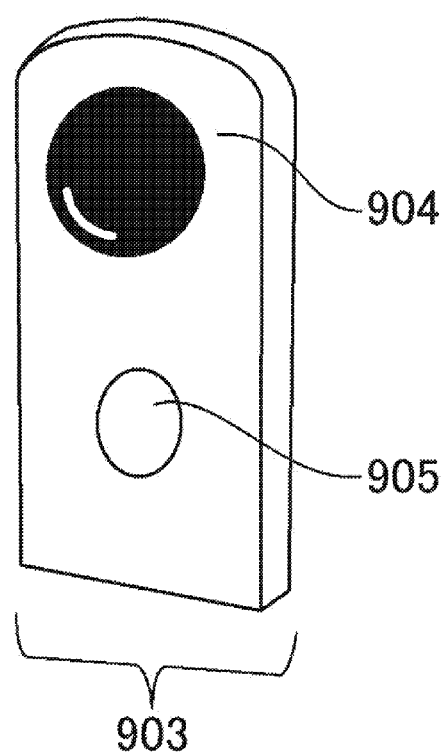
FIG. 48 is a diagram illustrating a configuration example of an entire celestial sphere-type imaging camera that is a conventional technology.

FIG. 46B is a functional block diagram of the camera main body 1'.

In FIG. 46B, the same reference signs will be assigned to the same functional blocks as those of the camera main body 1 according to Embodiment 1 illustrated in FIG. 4, and duplicate description will be omitted.

In the functional blocks illustrated in FIG. 46B, there is an optical image stabilizing unit 9080 that performs an optical correction process and an image stabilization process, and each functional block is executed not under the control of the overall control CPU 101 but the overall control CPU 9101, which is different from FIG. 4. In addition, one communication partner of the transmission unit 70 determined in advance is not the display device 800 but the display device 9800, which is also different.

In other words, in this embodiment, the optical image stabilizing unit 9080 of the overall control unit CPU 9101 performs an optical distortion correction and an image stabilization correction using an optical correction value and gyro data. For this reason, a data amount of a video file after the optical distortion correction and the image stabilization correction transmitted by the transmission unit 70 to the display device 9800 in this embodiment is smaller than that of the video file 1000 transmitted by the transmission unit 70 to the display device 800 in Embodiment 1.

In addition, in the display device 9800, the arithmetic operation capability can be suppressed to be lower than that of the display device 800 in accordance with not performing the processes of Steps S800 and S900. In addition, a video captured by the camera main body 1' can be read also by a simple display device 900 (viewer) configured using a smart watch or the like.

As above, the method of cutting out and recording a video of an area observed by a user using the camera main body 1 has been described. Hereinafter, an area cut out by the camera main body 1 will be referred to as a cutout area. In a case in which a user causes the direction of his or her face to deviate or the like, the cutout area may deviate from an area desired to be recorded by the user in a part of a moving image. Embodiments 10 and 11 are embodiments for a method of transmitting a moving image captured by the camera main body 1 to the display device 800 and correcting the cutout area.

Embodiment 10

FIGS. 50A to 50E are diagrams illustrating parts of cutout moving image. The display device 800 receives a moving image captured by a user in a moving image mode of the camera main body 1 and stores the received moving image in the large-capacity nonvolatile memory 814. FIGS. 50A to 50E illustrate examples in which, for 5 frames in a moving image, a cutout area 5000 determined by the camera main body 1 is displayed in the display device 800.

FIG. 50A illustrates an appearance in which a subject 131 desired to remain as a video by a user is shown at the center of the cutout area 5000. FIG. 50B illustrates an appearance in which the subject 131 moves to the corner of the cutout area 5000. FIG. 50C illustrates an appearance in which the subject 131 is cut out from the cutout area 5000. FIG. 50D illustrates an appearance in which the subject 131 returns to the center of the cutout area 5000. FIG. 50E illustrates an appearance in which the subject 131 has been able to return to the center of the cutout area 5000.

In a case in which a child is imaged as a subject 131, the face direction of the user may be assumed to deviate from the subject 131 in the middle in accordance with a user facing his or her face to a vehicle passing nearby or in a direction in which a sound is generated. In this case, as illustrated in FIG. 50C, there is a likelihood of the subject 131 being cut out from the cutout area.

In Embodiment 10, in order to enable the display device 800 to correct a cutout area of a moving image captured by the camera main body 1 after capturing, the camera main body 1 has an entire area moving image mode as an imaging mode in which a captured moving image is recorded without performing a cutout process.

Figure 51:
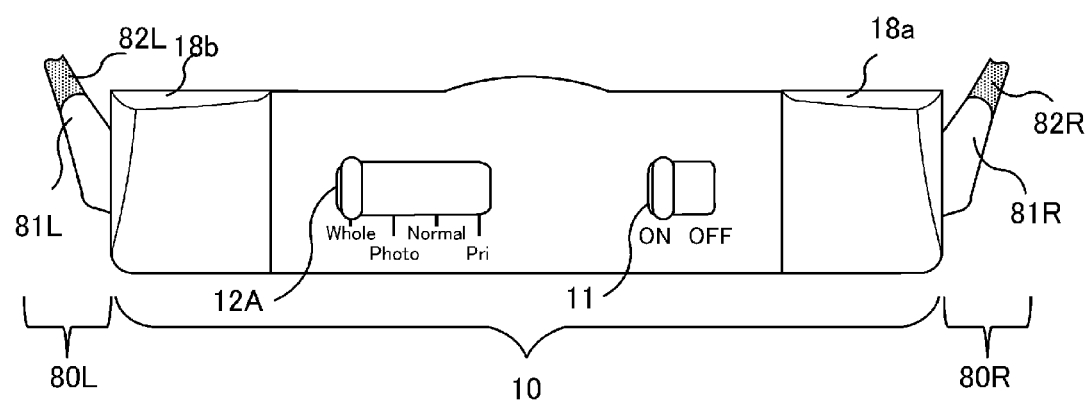
FIG. 51 is a diagram illustrating an imaging mode of the camera main body.

Referring to FIG. 51, the imaging mode of the camera main body 1 will be described. FIG. 51 is a diagram of the imaging/detecting unit 10 according to Embodiment 10 seen from the rear side (a side in contact with the user). A configuration other than an imaging mode switch 12A is similar to that illustrated in FIG. 2C, and thus description thereof will be omitted. The imaging mode switch 12A is a switch in the form or a slide lever that can be used for selecting "Whole" corresponding to the entire area moving image mode in addition to imaging modes of "Photo", "Normal", and "Pri" that are the same as those illustrated in FIG. 2C.

With reference to FIGS. 52A to 52D, a process of recording a moving image of the entire area and transmitting the moving image to the display device 800 without performing cutout of an area from the moving image captured by the camera main body 1 will be described. Processes illustrated in FIGS. 52A to 52D correspond to processes according to Embodiment 1 illustrated in FIGS. 7A, 7B, 7E, and 14, the same reference signs will be assigned to the same processes, and detailed description thereof will be omitted.

In Embodiment 10, the imaging mode switch 12A is set to "Whole", and the camera main body 1 performs imaging in the entire area moving image mode. The camera main body 1 records a moving image of the entire area without performing cutting-out and transmits the recorded moving image to the display device 800.

Figure 52A:
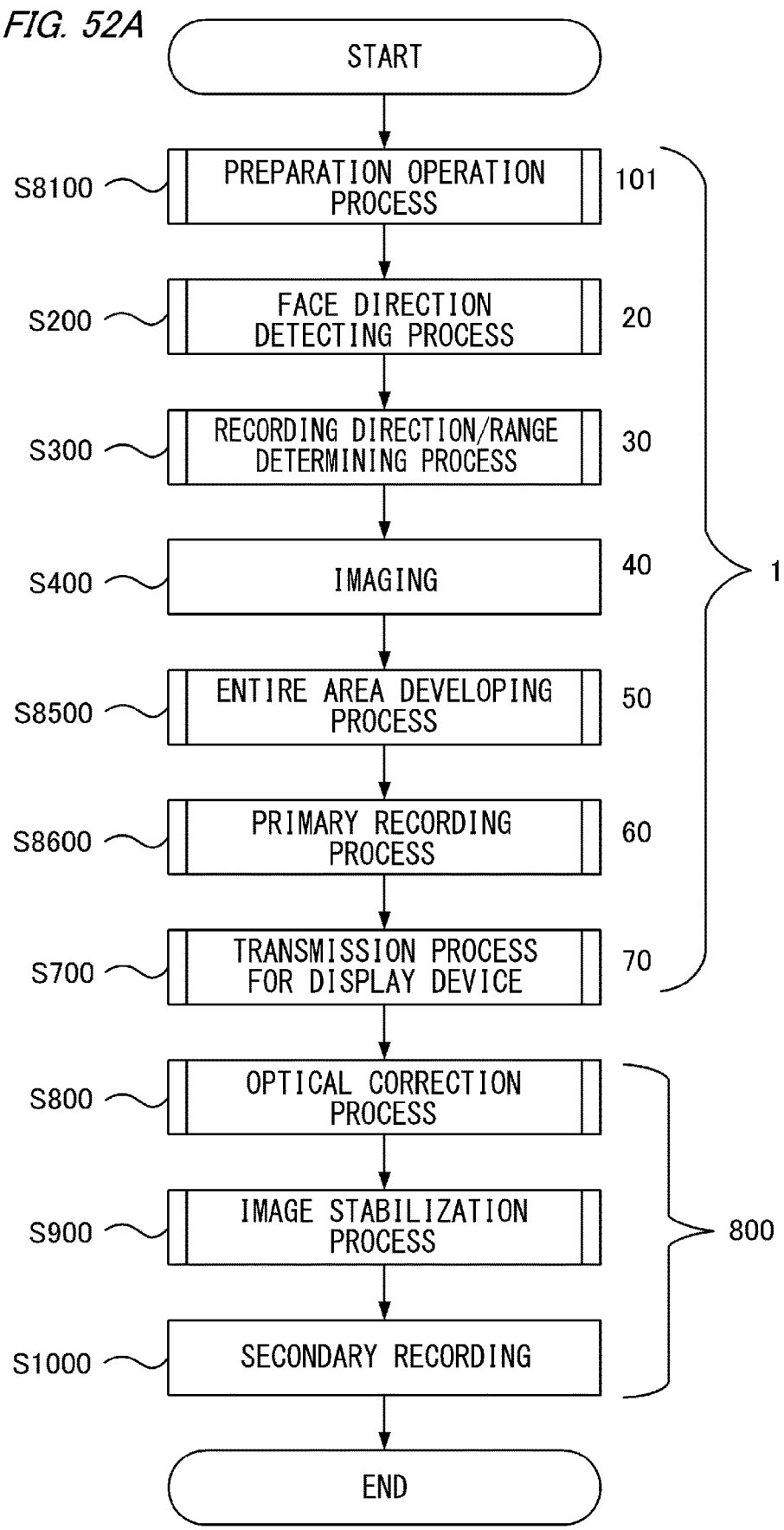
FIG. 52A is a flowchart representing an overview of an imaging recording process according to Embodiment 10.
Figure 52B:
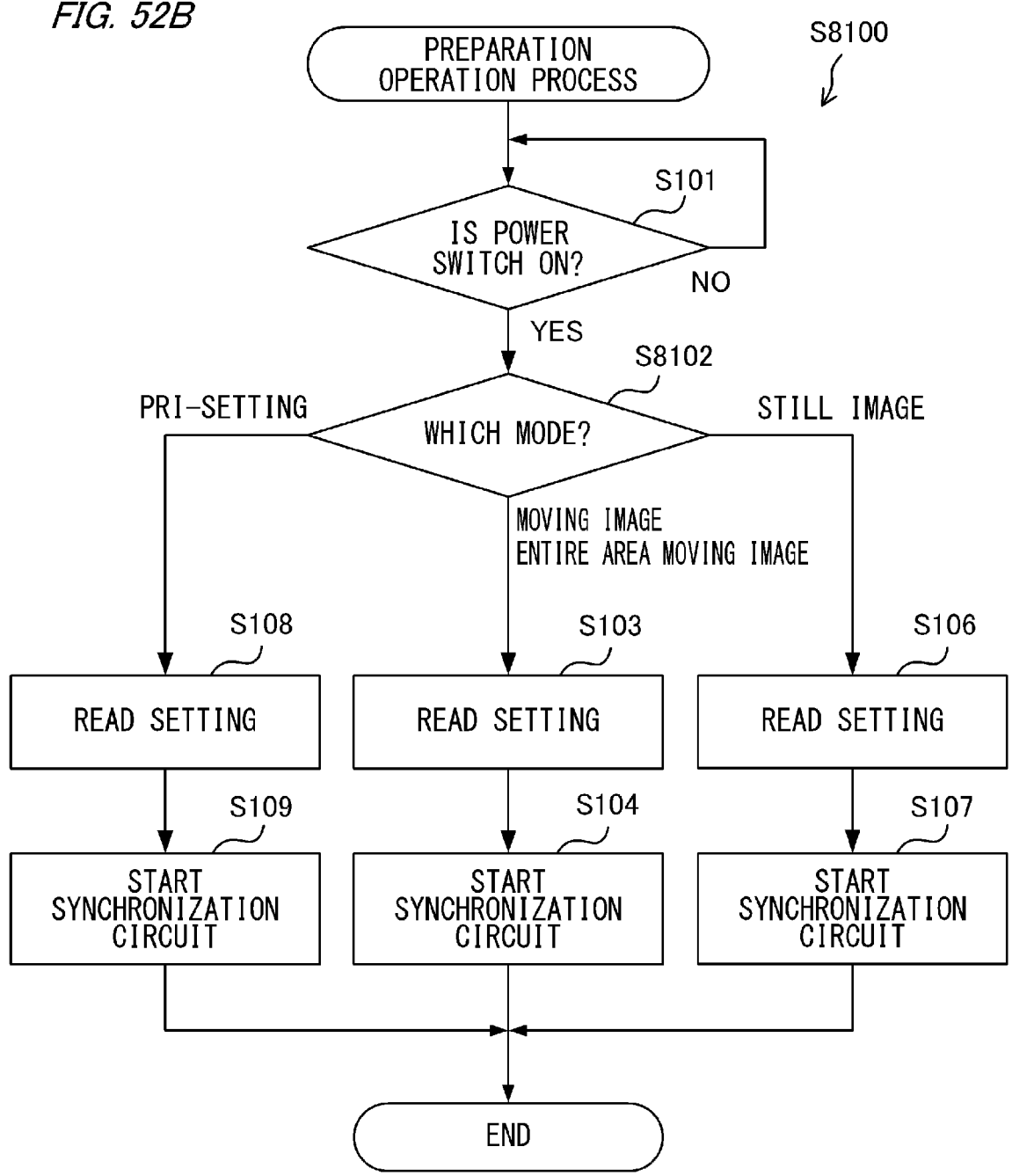
FIG. 52B is a flowchart of a preparation operation process.

In Step S8100 illustrated in FIG. 52A, the overall control CPU 101 performs a preparation operation process corresponding to Step S100 illustrated in FIG. 7A. FIG. 52B is a flowchart of a subroutine of the preparation operation process of Step S8100. In the preparation operation process illustrated in FIG. 52B, in Step S8102, in a case in which the mode selected using the imaging mode switch 12A is the entire area moving image mode, similar to a case in which the moving image mode is selected, the process proceeds to Step S103.

In Step S103, the overall control CPU 101 reads various settings of the entire area moving image mode from the built-in nonvolatile memory 102 and stores the read various settings in the primary memory 103. The various settings of the entire area moving image mode includes settings of an image stabilization level and the like. In Step S104, the overall control CPU 101 starts an operation of the imaging driver 41 for the entire area moving image mode and ends the preparation operation process.

In Steps S200 to S400 illustrated in FIG. 52A, the overall control CPU 101 performs processes similar to those of Steps S200 to S400 illustrated in FIG. 7A. In Step S400, the imaging unit 40 performs imaging and generates captured image data.

In Step S8500, the image cutting-out/developing processing unit 50 performs a developing process for the entire area of the captured image data generated in Step S400. FIG. 52C is a flowchart of a subroutine of the entire area developing process of Step S8500. The entire area developing process illustrated in FIG. 52C is a process acquired by excluding a cutout process of an area (Step S502) from the flow according to Embodiment 1 illustrated in FIG. 7E.

In Step S501, similar to Step S501 illustrated in FIG. 7E, the image cutting-out/developing processing unit 50 acquires raw data of the entire area. In Steps S8503 to S8508, the image cutting-out/developing processing unit 50 performs processes similar to those of Steps S503 to S508 illustrated in FIG. 7E for the entire area.

Figure 52D:
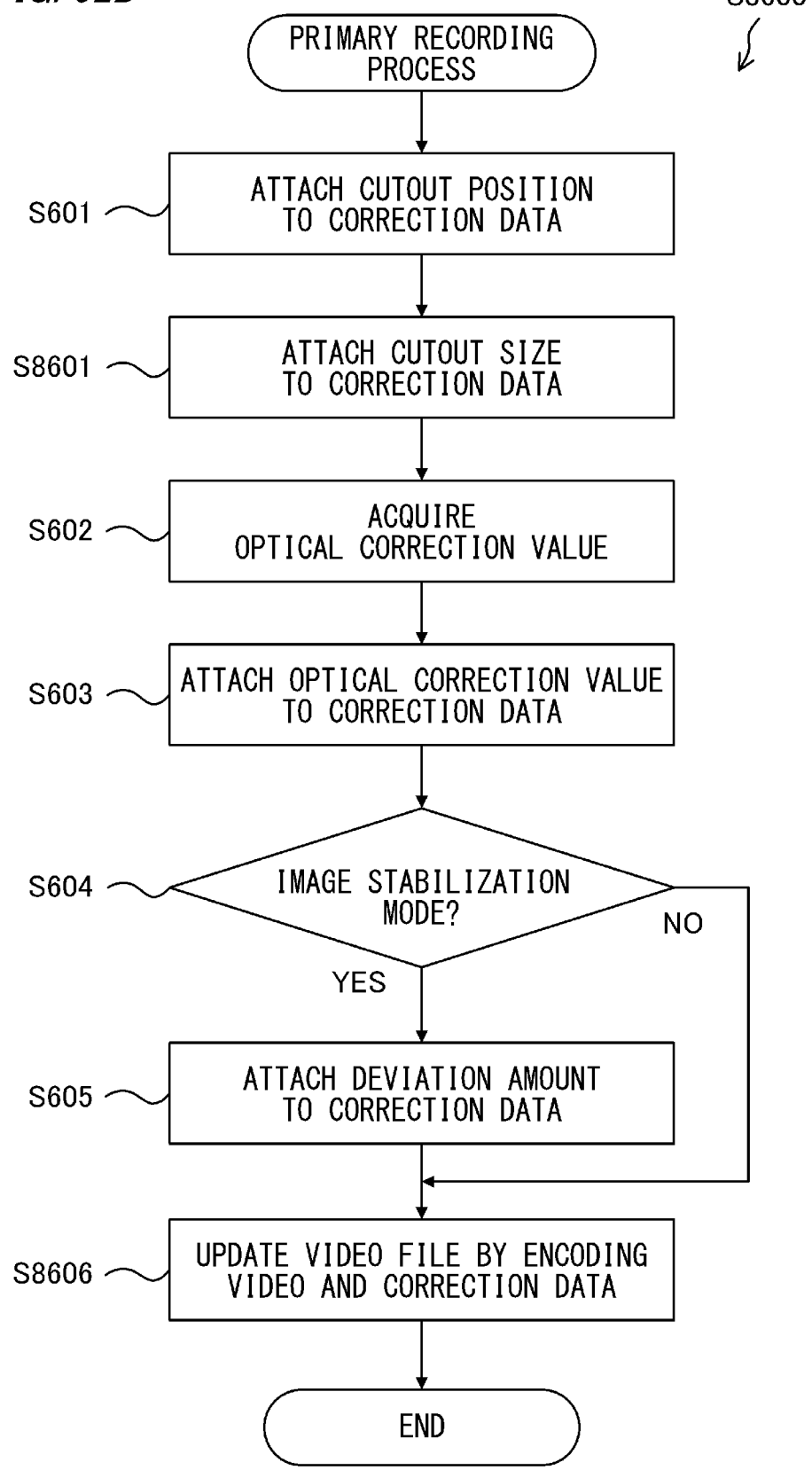
FIG. 52D is a flowchart of a primary recording process.

In Step S8600 illustrated in FIG. 52A, the overall control CPU 101 stores a video of the entire area developed in Step S8500 in the primary recording unit 60. FIG. 52D is a flowchart of a subroutine of the primary recording process of Step S8600. In the primary recording process illustrated in FIG. 52D, points different from the primary recording process according to Embodiment 1 illustrated in FIG. 14 will be described. The primary recording process illustrated in FIG. 52D is a process corresponding to Steps S601 to S606 illustrated in FIG. 14 and is performed for each frame of the video developed in Step S8500. In FIG. 52D, a frame that is a processing target will be referred to as a current frame.

In Step S601 illustrated in FIG. 52D, the overall control CPU 101, similar to Step S601 illustrated in FIG. 14, attaches (adds) information of a cutout position (a position of a cutout area) of an image of the current frame to correction data that is metadata for the current frame. For example, the added information of the cutout position is coordinates Xi, Yi of a video recording frame 127i recorded in Step S305 illustrated in FIG. 7D.

In Step S8601, the overall control CPU 101 also attaches (adds) a cutout size (a size of the cutout area) of the image of the current frame to correction data. For example, the attached information of the cutout position is a horizontal width WXi and a vertical width WYi of a video recording frame 127i recorded in Step S305 illustrated in FIG. 7D.

Processes of Steps S602 to S605 are similar to the processes illustrated in FIG. 14 to which the same reference signs are assigned. In Step S8606, correction data (frame metadata) for the current frame not only includes the position of the cutout area but also a size of the cutout area. The overall control CPU 101 performs the process illustrated in FIG. 52D for each frame of the video developed in Step S8500, thereby generating a video file used for transmission for the display device 800. By including a position and a size of a cutout area of each frame in a video file, the display device 800 can perform a cutout process for a video file received from the camera main body 1.

Figure 53:
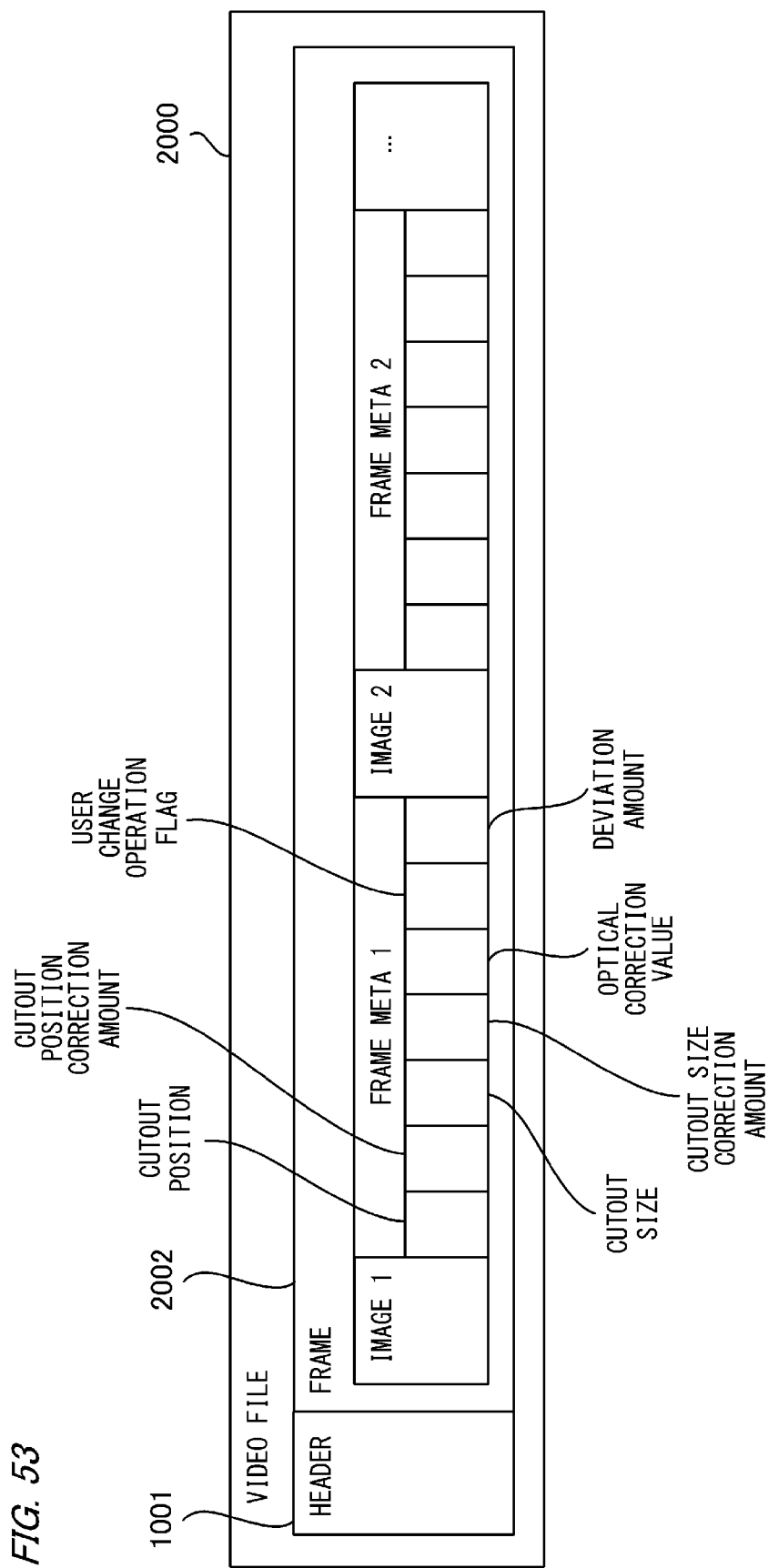
FIG. 53 is a diagram illustrating a data structure of a video file according to Embodiment 10.

Referring to FIG. 53, a data structure (format) of a video file will be described. The video file 2000 (moving image data) illustrated in FIG. 53, similar to the video file 1000 illustrated in FIG. 15, includes a header 1001 and a frame 2002. The frame 2002 is composed of frame data sets, in which an image of each frame composing a moving image and frame metadata corresponding thereto are formed as a set, corresponding to a total number of frames of the moving image. An image of each frame of the video file 2000 is an entire area image.

The frame metadata of each frame includes information of a cutout size attached as correction data in Step S8601. In addition, the frame metadata of the video file 2000 includes three parameters of a cutout position correction amount, a cutout size correction amount, and a user change operation flag in addition to the parameters described with reference to FIG. 15. The added three parameters are used by a process of correcting a cutout area of a moving image using the display device 800.

The user change operation flag is a flag that indicates whether or not the cutout area has been corrected in accordance with a user operation. The cutout position correction amount is a correction amount of the position of the cutout area corrected by a user operation. The cutout size correction amount is a correction amount of the size of the cutout area corrected by a user operation.

In the primary recording process of Step S8600, the cutout position correction amount and the cutout size correction amount are set to 0 for all the frames. As the user change operation flag, a value indicating on is set for a first frame and a last frame of a moving image, and a value indicating off is set for the other frames. The first frame and the last frame of the moving image are used for acquiring (calculating) a correction amount of a cutout area of a frame for which a user has not performed a correction operation of the cutout area, and thus the user change operation flag thereof is set to on.

In addition, frames for which the user change operation flag is set to on are not limited to the first frame and the last frame of the moving image. In a case in which a moving image includes a plurality of scenes, the user change operation flag may be set to on in a last frame before a change of a scene and a first frame after a change of a scene. For example, in a case in which a subject changes in accordance with an analysis of a moving image, a case in which a difference in the pixel value between frames is a threshold or more, or the like, the display device control unit 801 can detect a change in a scene using various methods.

Also in a case in which a subject changes before/after a change of a scene, the display device control unit 801 can correct a cutout area on the basis of the first frame and the last frame of a scene in which a frame that is a correction target is included. In accordance with this, the display device control unit 801 can generate a cutout moving image in which a subject is appropriately cut out in accordance with the scene.

Processes of Steps S700 to S1000 illustrated in FIG. 52A are processes similar to those of Steps S700 to S1000 illustrated in FIG. 7A. A video file 2000 (moving image data) that has been primarily recorded in Step S8600 is transmitted to the display device 800 in Step S700. The display device control unit (an acquisition unit) of the display device 800 performs an optical correction process and an image stabilization process for the video file 2000 received (acquired) from the camera main body 1 in Steps S800 and S900. The display device control unit 801 stores the video file 2000 in the large-capacity nonvolatile memory 814. In accordance with the process illustrated in FIG. 52A, the moving image data of the entire area captured by the camera main body 1 is stored in the large-capacity nonvolatile memory 814 of the display device 800.

Figure 54:
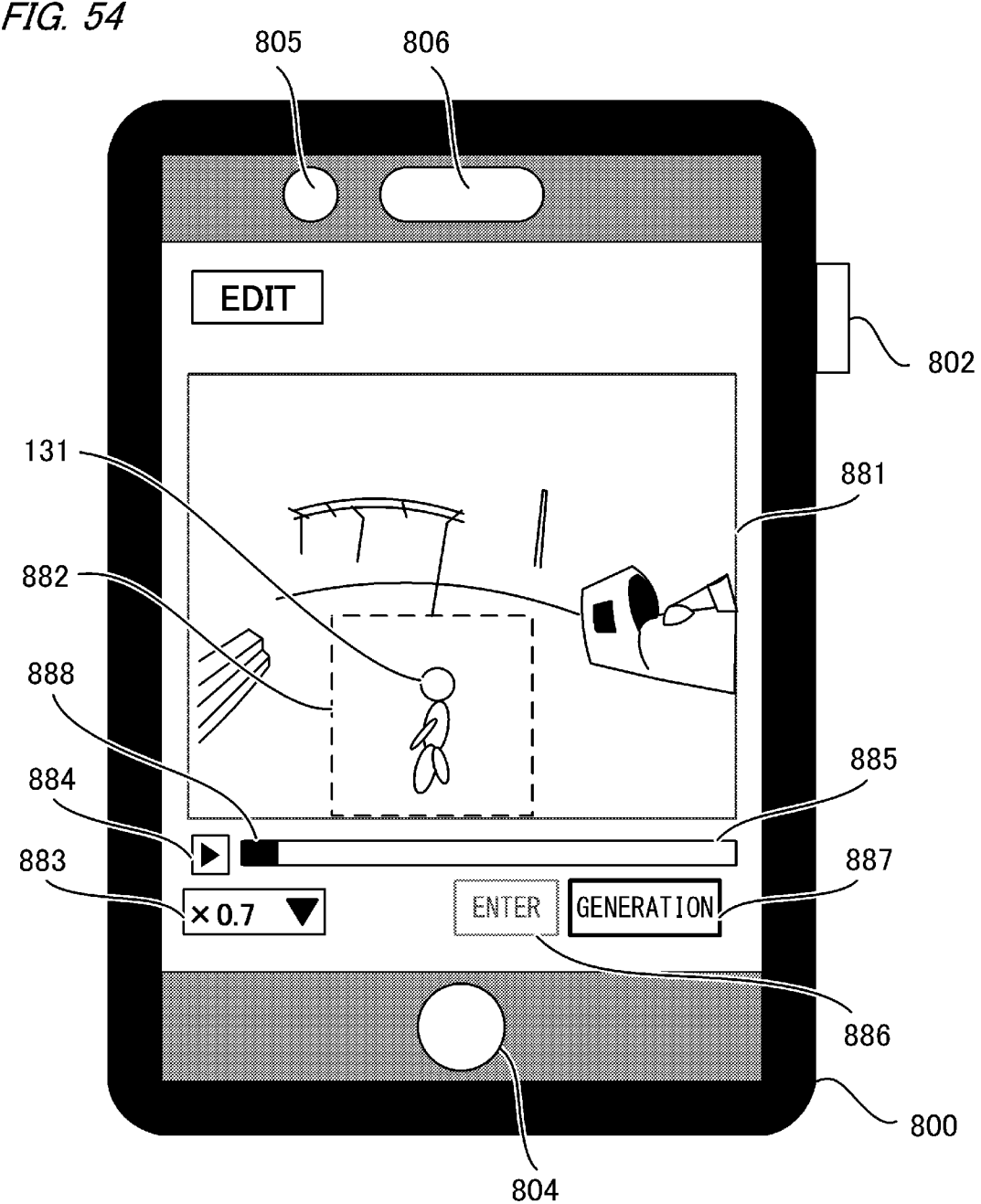
FIG. 54 is a diagram illustrating a correction of a cutout area in a display device.

Referring to FIG. 54, a correction of a cutout area in the display device 800 will be described. The entire area moving image display unit 881 is an area that displays an entire area moving image stored in the display device 800. A cutout area frame 882 represents an area determined as a cutout area in the entire area moving image.

Information of a position and a size of the cutout area frame 882 is determined in Step S300 illustrated in FIG. 52A and is stored in the moving image data as frame metadata. The display device control unit 801 (a display control unit), for a frame image that is being displayed, reads the information of the cutout area of the corresponding frame from the video file 2000 and performs display control such that the cutout area frame 882 representing a cutout area is superimposed in the frame image.

A user can correct the cutout area by performing an operation on the cutout area frame 882. The correction of the cutout area includes changing of at least one of the position and the size of the cutout area.

A user can move a cutout area by moving the cutout area frame 882 through a drag operation or the like for a touch panel (the display unit 803 of the display device 800). The operation for moving a cutout area is not limited to dragging of the cutout area frame 882 and may be an operation of tapping a movement destination of the cutout area frame 882 or a subject 131 that is an imaging target.

In addition, a user can change the size of the cutout area by performing an operation of pinching-in or pinching-out of the cutout area frame 882 for the touch panel. The display device control unit 801 (an acceptance unit) accepts an operation for the cutout area frame 882 through an operation member such as a touch panel.

A reproduction speed selecting unit 883 is a selection member (item) that selects a reproduction speed at the time of reproducing a moving image. A reproduction/temporary stop button 884 is an operation member (item) used for reproducing or temporarily stopping a moving image displayed in the entire area moving image display unit 881.

The reproduction/temporary stop button 884 functions as a reproduction button in a state in which a moving image is not reproduced in the entire area moving image display unit 881. In accordance with a user selecting a reproduction button, a moving image displayed in the entire area moving image display unit 881 is reproduced at a reproduction speed designated by the reproduction speed selecting unit 883. The reproduction/temporary stop button 884 functions as a temporary stop button in a state in which a moving image is reproducing in the entire area moving image display unit 881. In accordance with a user selecting the temporary stop button, reproduction of the moving image being reproduced in the entire area moving image display unit 881 temporarily stops.

A seek bar 885 is an operation member (item) used for displaying an arbitrary frame of a moving image being displayed in the entire area moving image display unit 881 by a user sliding a slider 888. The entire area moving image display unit 881 displays a corresponding cutout area frame 882 together with an image of a frame selected by the user using the slider 888.

An enter button 886 is an operation member (item) used for confirming a user's correction of the cutout area. By selecting (tapping) the enter button 886, movement of the cutout area frame 882 according to a user is confirmed. When the enter button 886 is selected, and the position of the cutout area is confirmed in accordance with movement of the cutout area frame 882, the position of the cutout area frame 882 of a frame before/after the frame that is being displayed is also corrected. In addition, in a case in which the user does not move the cutout area frame 882 from the initial state or the confirmed state, the enter button 886 is in a grey out display indicating that the operation is invalid.

A generation button 887 is an operation member (item) used for generating a cutout moving image acquired by cutting out each cutout area from an image of each frame of the entire area moving image. In addition, in a case in which a moving image is reproducing or a correction of the cutout area frame 882 has not been confirmed, the generation button 887 becomes a grey out display indicating that the operation is invalid.

Referring to FIGS. 55A to 55E, 56, 57A, 57B, and 58A to 58E, an overview of a method of generating a cutout moving image using the display device 800 on the basis of a user's correction operation of a cutout area will be described. FIGS. 55A to 55E illustrate entire area moving images in a case in which scenes that are the same as the cutout moving images illustrated in FIGS. 50A to 50E are imaged without performing a cutting-out process.

Figure 55:
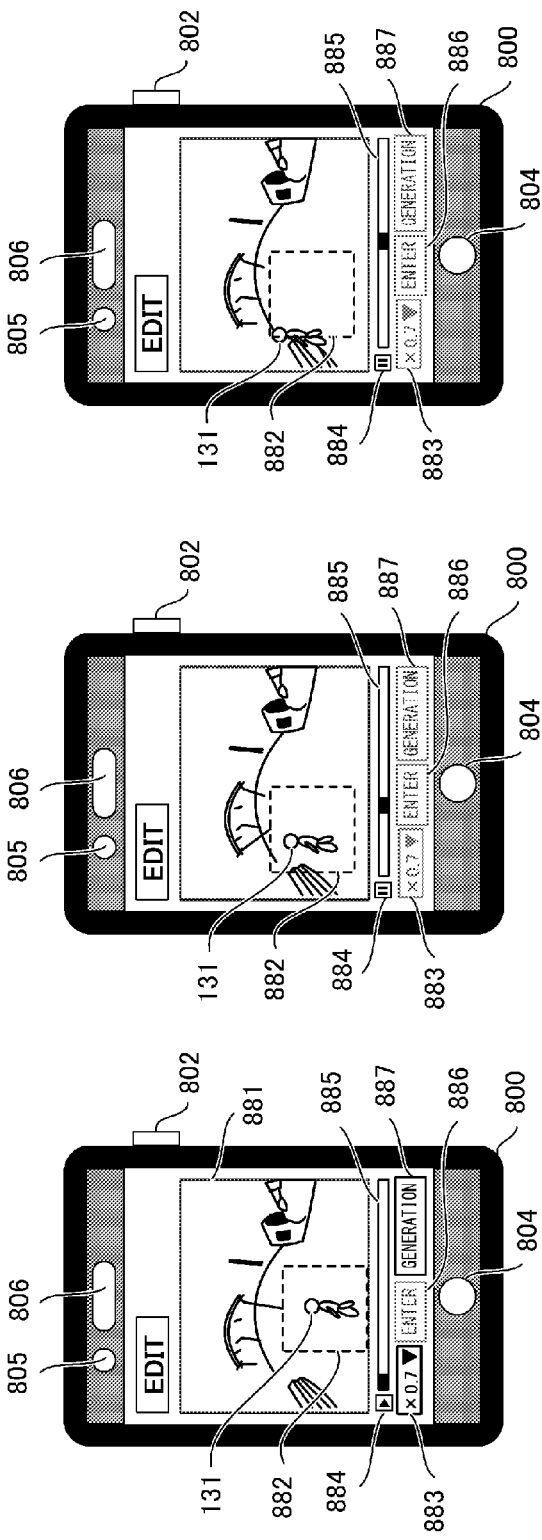
FIGS. 55A to 55E are diagrams illustrating entire area moving images as examples.

By operating the seek bar 885 from a state before start of reproduction illustrated in FIG. 55A, as illustrated in FIG. 55C, the user seeks a frame in which the subject 131 deviates from the cutout area frame 882.

Figure 56:
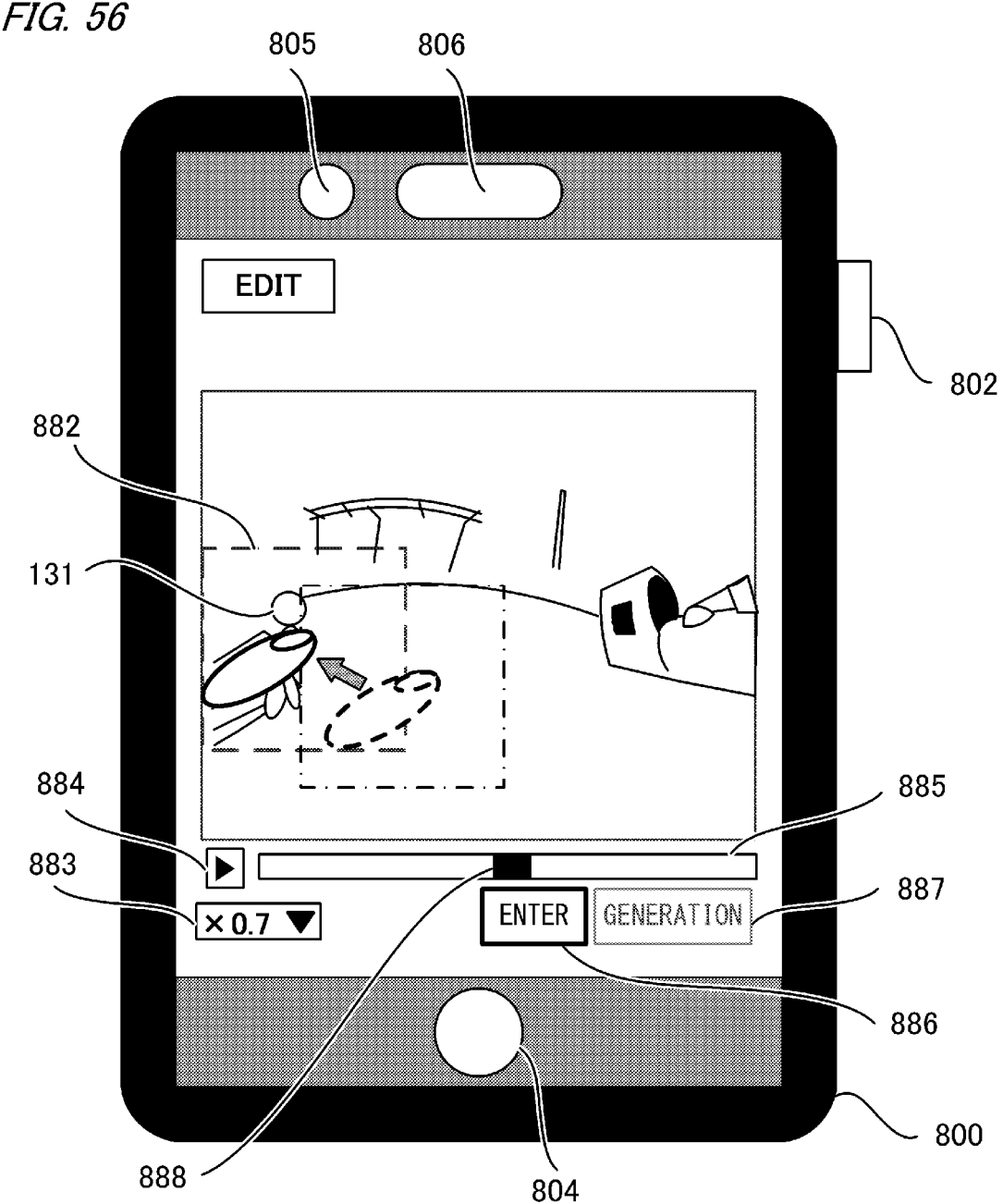
FIG. 56 is a diagram illustrating an example in which a user performs a drag operation on a cutout area frame.

FIG. 56 is a diagram illustrating an example in which a user performs a drag operation of the cutout area frame 882. The user can move the cutout area frame 882 by seeking a frame in which the subject 131 deviates from the cutout area frame 882 as illustrated in FIG. 55C and performing a drag operation of the cutout area frame 882 on the touch panel. In the example illustrated in FIG. 56, the cutout area frame 882 moves from an original position enclosed by a dashed line such that the subject 131 enters the cutout area frame 882. When the movement of the cutout area frame 882 is completed, the user selects the enter button 886.

Figure 57A:
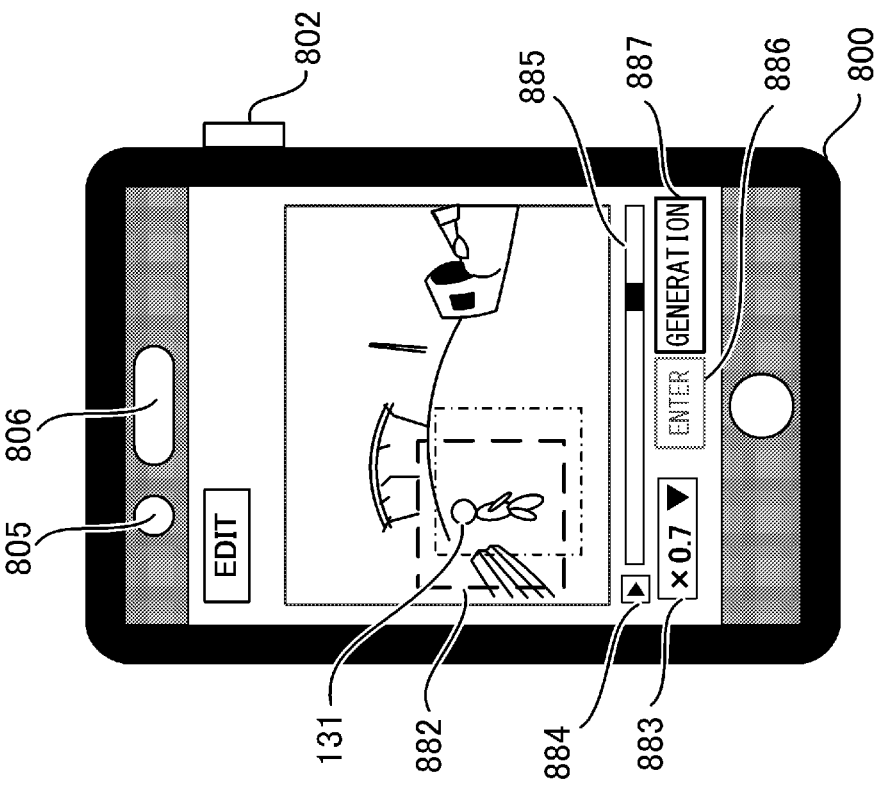
FIGS. 57A and 57B are diagrams illustrating a correction of a cutout area of a non-operation frame.
Figure 57B:
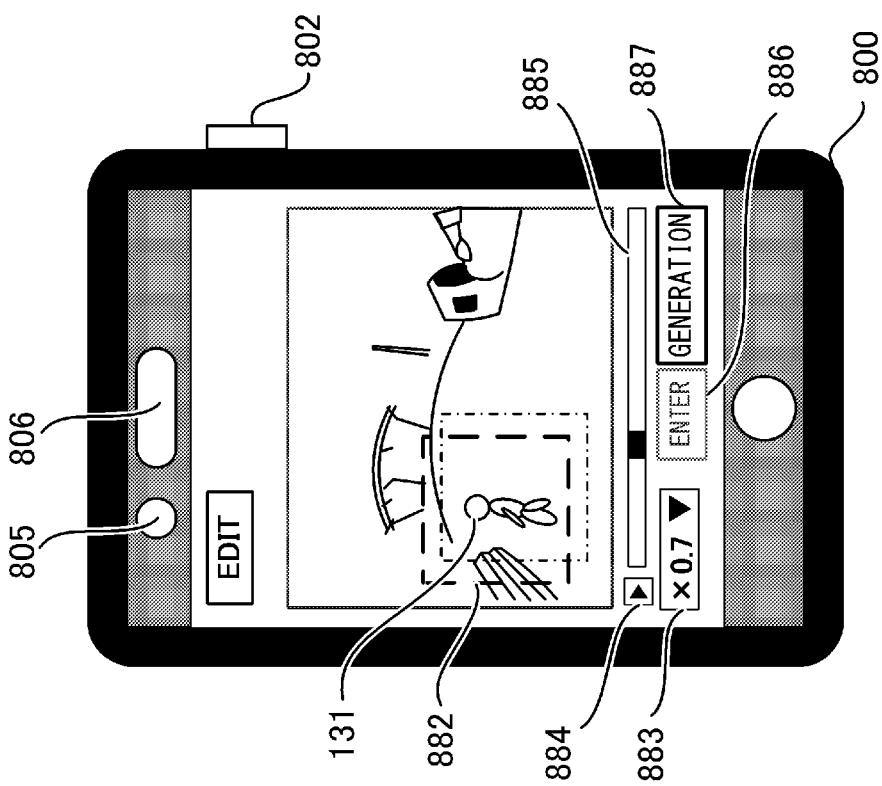

FIGS. 57A and 57B are diagrams illustrating a correction of a cutout area of a non-operation frame. The non-operation frame is a frame that does not accept an operation of correcting the cutout area from a user. A frame that has accepted an operation of correcting a cutout area will be referred to as a correction frame. In the frame illustrated in FIG. 55C, as described with reference to FIG. 56, in a case in which a user moves the cutout area and selects the enter button 886, the display device control unit 801 (a correction unit) also corrects a cutout area of a non-operation frame before/after the frames illustrated in FIG. 55C.

FIGS. 57A and 57B correspond to FIGS. 55B and 55D that are non-operation frames before/after the frame illustrated in FIG. 55C. In the frame illustrated in FIG. 57A, the cutout area frame 882 is moved from an original position enclosed by a dashed line in a direction in which the user has moved the cutout area frame 882 in FIG. 56. Similarly, in the frame illustrated in FIG. 57B, the cutout area frame 882 is moved from an original position enclosed by a dashed line in a direction in which the user has moved the cutout area frame 882 in FIG. 56.

In this way, the display device control unit 801 automatically corrects the cutout area of a non-operation frame in accordance with the correction amount (an amount of change of the movement amount or the size) of the cutout area in a correction frame even the user directly does not perform a correction. The display device control unit 801 (a generation unit) correct a cutout area of a non-operation frame in accordance with a correction of the cutout area in a correction frame, thereby being able to generate a cutout moving image such that cutout area smoothly moves.

The user repeats the process of seeking a frame in which the subject 131 and the cutout area frame 882 deviate from each other and correcting and confirming the cutout area frame 882. When the enter button 886 is selected, a cutout area of the non-operation frame is corrected in accordance with the correction of the cutout area of the correction frame. In addition, the cutout area of the non-operation frame is not limited to the case in which the enter button 886 is selected and may be corrected in a case in which, after the user moves the cutout area in a frame being displayed and switches the frame being displayed to another frame.

In a case in which it is determined that there is no frame of which the cutout area frame 882 is to be corrected, by selecting the generation button 887, the user can generate a cutout moving image acquired by cutting out the cutout area after correction of each frame from the entire area moving image.

FIGS. 58A to 58E are diagrams illustrating a cutout moving image generated by the display device 800. In a case in which the user corrects the cutout area illustrated in FIG. 56 for the entire area moving images illustrated in FIGS. 55A to 55E, the display device control unit 801 can generate cutout moving images illustrated in FIGS. 58A to 58E. By correcting the cutout areas illustrated in FIGS. 55B to 55D in accordance with a user's correction of the cutout area illustrated in FIG. 55C, the display device control unit 801 can generate cutout moving images such that the subject 131 is included in the cutout area in each frame. The generated cutout moving images are stored in the large-capacity non-volatile memory 814.

Figure 59A:
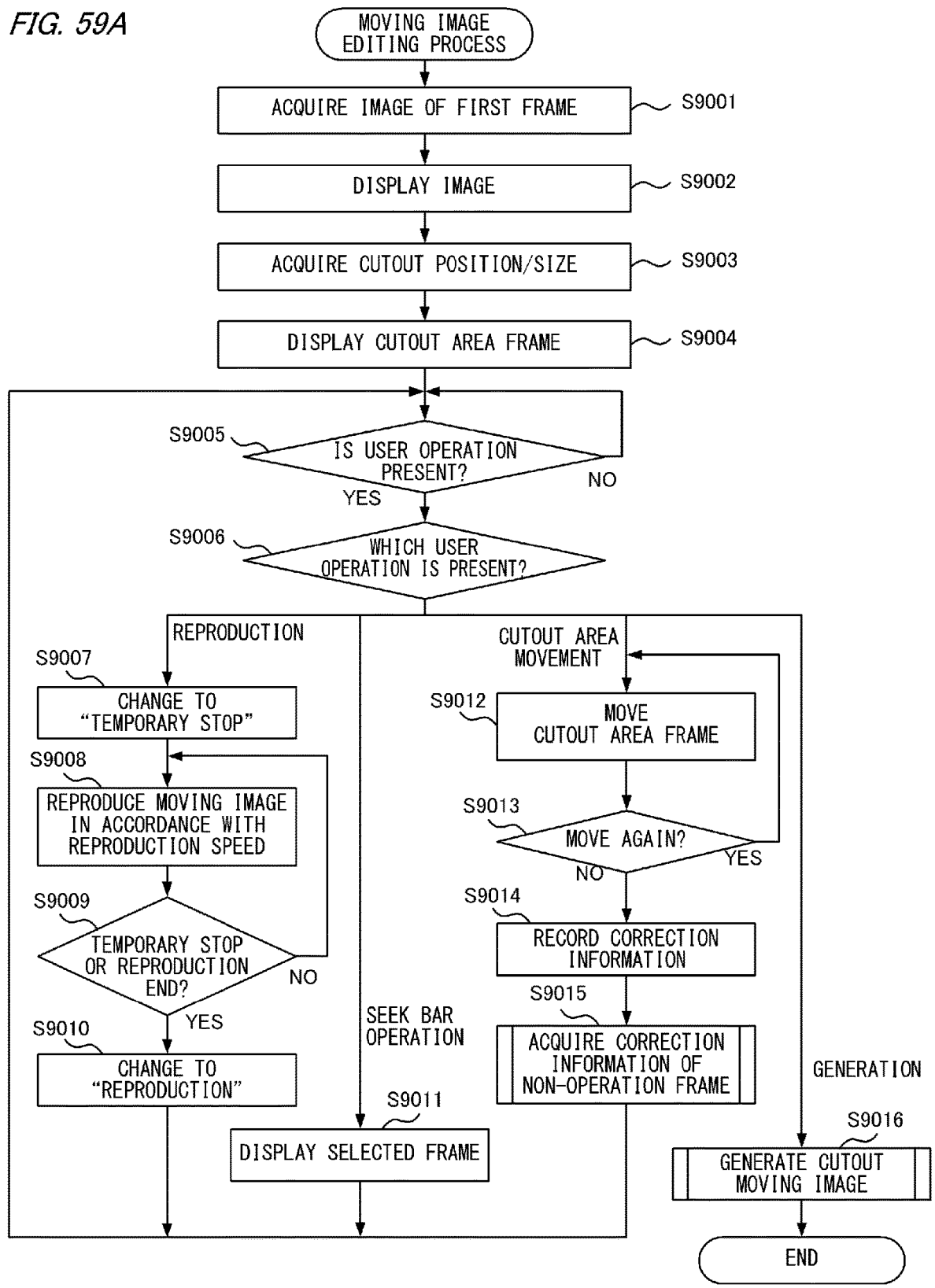
FIG. 59A is a flowchart of a moving image editing process according to Embodiment 10.

By referring to FIGS. 59A, 59B, and 59C, the flow of a moving image editing process using the display device 800 according to Embodiment 10 will be described. FIG. 59A is a flowchart of the moving image editing process correcting a cutout area in an editing mode.

In Step S9001, the display device control unit 801 acquires an image of a first frame from the video file 2000 described with reference to FIG. 53. An image acquired from the video file 2000 is an image of an entire area. In Step S9002, the display device control unit 801 displays the acquired image in the display unit 803 (the entire area moving image display unit 881 illustrated in FIG. 54) of the display device 800.

In Step S9003, the display device control unit 801 acquires a cutout position and a cutout size of the first frame from the video file 2000. The cutout position and the cutout size recorded in the video file 2000 are a default cutout position and a default cutout size determined on the basis of the face direction, the angle of view setting value, and the like for the camera main body 1.

In Step S9004, the display device control unit 801 displays the default cutout area frame 882 on the entire area moving image display unit 881 on the basis of the cutout position and the cutout size of the cutout area acquired in Step S9003. The cutout area frame 882, for example, as illustrated in FIGS. 55A to 55E, is displayed in a rectangular shape enclosing the cutout area.

In Step S9005, the display device control unit 801 waits for an operation from the user. In a case in which it is determined that a user operation is present, the process proceeds to Step S9006. In Step S9006, the display device control unit 801 determines which user operation is present. A user operation illustrated in FIG. 59A is one of four operations including a reproduction operation using the reproduction/temporary stop button 884, an operation of the slider 888 of the seek bar 885, a drag operation of the cutout area frame 882, and a cutout moving image generating operation using the generation button 887.

In Step S9006, in a case in which it is determined that a user operation is an operation for reproducing a moving image through selection of the reproduction/temporary stop button 884, the process proceeds to Step S9007. In Step S9007, the display device control unit 801 changes the display of the reproduction/temporary stop button 884 to a display representing "temporary stop". For example, the display device control unit 801 changed from the display of the reproduction/temporary stop button 884, which is illustrated in FIG. 55A, representing "reproduction" to the display of the reproduction/temporary stop button 884, which is illustrated in FIG. 55B, representing "temporary stop".

In Step S9008, the display device control unit 801 reproduces a moving image in accordance with a reproduction speed selected by the reproduction speed selecting unit 883. Similar to the first frame described in Steps S9001 to S9004, the display device control unit 801 sequentially acquires an image, a cutout position, and a cutout size of each frame from the video file 2000 and displays an image and a cutout area frame 882.

In addition, in a case in which information of a cutout position correction amount and a cutout size correction amount of frame metadata is set, the display device control unit 801 corrects the cutout position and the cutout size using the cutout position correction amount and the cutout size correction amount. The display device control unit 801 displays the cutout area frame 882 of the cutout position and the cutout size after correction in the entire area moving image display unit 881.

In Step S9009, the display device control unit 801 determines whether reproduction of a moving image has been temporarily stopped in accordance with a user's selection of the reproduction/temporary stop button 884 or reproduction has ended in accordance with display up to a final frame. In a case in which the display device control unit 801 determines temporary stop or reproduction end, the process proceeds to Step S9010. In a case in which the display device control unit 801 determines neither selection of temporary stop nor end of reproduction, the process returns to Step S9008, and reproduction of the moving image continues.

In Step S9010, the display device control unit 801 changes the display of the reproduction/temporary stop button 884 to the display representing "reproduction". For example, the display device control unit 801 changes from the display of the reproduction/temporary stop button 884, which is illustrated in FIG. 55D, representing "temporary stop" to the display of the reproduction/temporary stop button 884, which is illustrated in FIG. 55E, representing "reproduction". When the display of the reproduction/temporary stop button 884 is changed, the display device control unit 801 returns to Step S9005 and waits for an operation from the user.

In Step S9006, in a case in which a user operation is determined to be an operation of seeking a frame that is a correction target through an operation of the slider 888 of the seek bar 885 and displaying the frame in the entire area moving image display unit 881, the process proceeds to Step S9011.

In Step S9011, the display device control unit 801 acquires information of an image, a cutout position, a cutout size, a cutout position correction amount, and a cutout size correction amount of a frame corresponding to the position of the slider 888 of the seek bar 885 from the video file 2000. By using the information acquired from the video file 2000, the display device control unit 801 displays the image of the frame corresponding to the position of the slider 888 and the cutout area frame 882 corrected using the correction amount in the entire area moving image display unit 881. When the image of the frame corresponding to the position of the slider 888 and the cutout area frame 882 are displayed, the display device control unit 801 returns to Step S9005 and waits for an operation from the user.

In Step S9006, in a case in which the user operation is determined to be an operation for moving the cutout area frame 882 through a drag operation or the like, the process proceeds to Step S9012. In Step S9012, the display device control unit 801 moves the display position of the cutout area frame 882 in accordance with a user's drag operation or the like.

In Step S9013, the display device control unit 801 determines whether or not the user operation is an operation for moving the cutout area frame 882 again. In a case in which it is determined that the user moves the cutout area frame 882 again, the display device control unit 801 returns to Step S9012 and moves the display position of the cutout area frame 882 in accordance with the user operation.

In Step S9013, in a case in which it is determined that the user operation is not re-movement of the cutout area frame 882, for example, but selection of the enter button 886, the display device control unit 801 proceeds to Step S9014. The user operation determined to proceed to Step S9014 is an operation for confirming the correction of the cutout area frame 882 and is not limited to a user' operation of selecting the enter button 886. The operation for confirming the correction of the cutout area frame 882 may be an operation of the user moving the cutout area frame 882 through a drag operation and separating fingers away from the display unit 803 or an operation of switching the display to another frame such as an operation of the seek bar 885.

In Step S9014, the display device control unit 801 records correction information in the video file 2000. The correction information includes information of a user change operation flag, a cutout position correction amount, and a cutout size correction amount recorded in the video file 2000 as frame metadata.

When the enter button 886 is selected, the display device control unit 801 sets the user change operation flag of the frame being displayed in the entire area moving image display unit 881 to on. The display device control unit 801 records a movement amount (correction amount) from the cutout position before correction in the cutout position correction amount. In addition, in a case in which the size of the cutout area frame 882 is changed in accordance with an operation such as pinch-in, pinch-out, or the like, the display device control unit 801 records a correction amount from the cutout size before correction in the cutout size correction amount.

In Step S9015, the display device control unit 801 acquires correction information of the cutout area of non-operation frames before/after the correction frame. The correction frame is a frame which is displayed in the entire area moving image display unit 881 and in which the cutout area frame 882 has been moved or changed in size by the user. The non-operation frames are frames before/after a correction frame of which the cutout area frame 882 is not corrected by the user and the user change operation flag is off.

Figure 59B:
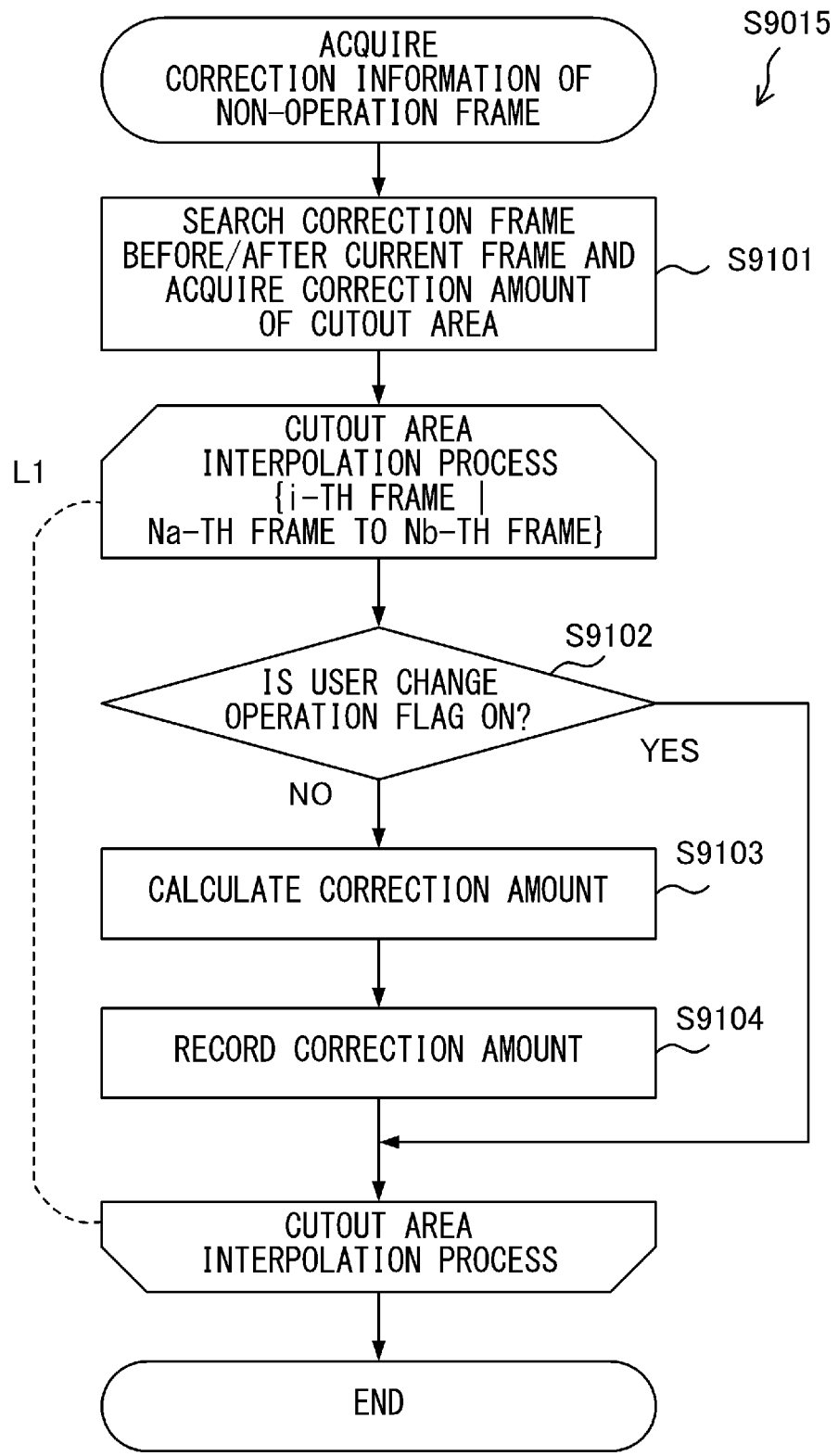
FIG. 59B is a flowchart of a correction information acquiring process for a non-operation frame.

Referring to FIG. 59B, a correction information acquiring process of a non-operation frame will be described. FIG. 59B illustrates a detailed process of Step S9015. In the following description, a correction frame that is currently being displayed in the entire area moving image display unit 881 is assumed to be an N-th frame of the video file 2000. Hereinafter, a k-th frame of the video file 2000 will be referred to as a k-th frame.

In Step S9101, the display device control unit 801 searches for a correction frame of which the user change operation flag is on before/after the N-th frame of the video file 2000. A frame, of which the user change operation flag is on, before the N-th frame will be referred to as an Na-th frame, and a frame, of which the user change operation flag is on, after the N-th frame will be referred to as an Nb-th frame (Na<Nb). The display device control unit 801 acquires cutout position correction amounts and cutout size correction amounts of the retrieved Na-th frame and the Nb-th frame.

The display device control unit 801 performs a cutout area interpolation process L1 of Steps S9102 to S9104 for each frame of the Na-th frame to the Nb-th frame. The cutout area interpolation process L1 is a process of performing interpolation of cutout position correction amounts and cutout size correction amounts on the basis of the correction amount of a correction frame for which a correction operation has been performed for a non-operation frame for which an operation of correcting a cutout area is not performed by the user. In Steps S9102 to S9104, a frame that is a processing target of the cutout area interpolation process L1 will be referred to as an i-th frame.

In Step S9102, the display device control unit 801 determines whether or not the user change operation flag of the i-th frame is on. The Na-th frame, the N-th frame, and the Nb-th frame are correction frames of which cutout areas have been corrected by the user, and thus the user change operation flags thereof are on. Thus, in a case in which the i-th frame is the Na-th frame, the N-th frame, or the Nb-th frame, processes of Steps S9103 and S9104 are not performed.

In Step S9102, in a case in which the i-th frame is a non-operation frame other than the Na-th frame, the N-th frame, and the Nb-th frame, the process proceeds to Step S9103. In Step S9103, the display device control unit 801 calculates a correction amount of the cutout area of the i-th frame that is a non-operation frame. The correction amount includes a cutout position correction amount and a cutout size correction amount.

In the following example, a correction amount of the cutout area of the non-operation frame is calculated using linear interpolation. A cutout position correction amount of the k-th frame is denoted by $(\Delta Xk, \Delta Yk)$. Cutout position correction amounts of the Na-th frame, the N-th frame, and the Nb-th frame of which the user change operation flags are on are respectively denoted by $(\Delta XA, \Delta YA)$, $(\Delta Xn, \Delta Yn)$, and $(\Delta XB, \Delta Yn)$.

The cutout position correction amount $(\Delta Xi, \Delta Yi)$ of the i-th frame of which the user change operation flag is off can be calculated using the following (Equation 1001) using linear interpolation.

[Math. 7]

(Equation 1001)

$$(\Delta Xi, \Delta Yi) = \begin{cases} \left(\Delta XNa + (\Delta XN - \Delta XNa)\frac{i-Na}{N-Na}, \quad (Na < i < N) \right. \\ \left. \Delta YNa - \Delta YNa)\frac{i-Na}{N-Na}\right) \\ \left(\Delta XN + (\Delta XNb - \Delta XN)\frac{i-N}{Nb-N}, \quad (N < i < Nb) \right. \\ \left. \Delta YN + (\Delta YNb - \Delta YN)\frac{i-N}{Nb-N}\right) \end{cases}$$

In accordance with the user correcting the cutout area frame 882 in a frame in which the subject 131 and the cutout area frame 882 deviate from each other, the display device control unit 801 automatically corrects the cutout area of the non-operation frame for which an operation of correction is not performed by the user. Thus, the user can generate a cutout moving image cut out at a desired position using a simple and easy operation.

Although the interpolation process of cutout areas has been described as a process using linear interpolation using adjacent points as a simple and easy method, the process is not limited thereto. The interpolation process of cutout areas may be performed using a method using three-dimensional function interpolation called as ease-in and ease-out such that a cutout moving image after generation is seen to be smoother. In addition, the interpolation process of cutout areas may be a multi-point interpolation using an interpolation calculation equation acquired by interpolating multiple points.

In Step S9104, the display device control unit 801 records the cutout position correction amount and the cutout size correction amount calculated in Step S9103 as frame metadata of the i-th frame of the video file 2000. When the display device control unit 801 records the cutout position correction amount and the cutout size correction amount of the i-th frame in the video file 2000, the process proceeds to the cutout area interpolation process L1 for the next frame.

When the processes of Steps S9102 to S9104 for the Na-th frame to the Nb-th frame end, the process of correcting the cutout area of the non-operation frame ends. In Step S9015 illustrated in FIG. 59A, a correction of the cutout area of the non-operation frame is completed, and the display device control unit 801 returns to Step S9005 and waits for an operation from the user.

In Step S9006, in a case in which the user operation is determined to be an operation of generating a cutout moving image through selection of the generation button 887, the process proceeds to Step S9016. In Step S9016, the display device control unit 801 generates a cutout moving image.

Referring to FIG. 59C, a cutout moving image generating process will be described. FIG. 59C illustrates a detailed process of Step S9016. In FIG. 59C, the display device control unit 801 performs a cutout process L2 of Steps S9201 to S9204 for all the frames of the video file 2000. The cutout process L2 is a process of cutting out a corrected cutout area from an image on the basis of the cutout position correction amount and the cutout size correction amount of each frame. In Steps S9201 to S9204, a processing target frame of the cutout process L2 is a j-th frame.

In Step S9201, the display device control unit 801 acquires an image of the j-th frame from the video file 2000.

In Step S9202, the display device control unit 801 acquires a cutout position, a cutout size, a cutout position correction amount and a cutout size correction amount from frame metadata of the j-th frame.

In Step S9203, the display device control unit 801 cuts out a cutout area of which the cutout position and the cutout size acquired in Step S9202 is corrected using the cutout position correction amount and the cutout size correction amount from the image acquired in Step S9201. In Step S9204, the cutout area cut out in Step S9203 is stored as an image of the j-th frame of the cutout moving image file. When the display device control unit 801 cuts out and stores the cutout area corrected from the image of the j-th frame, the process proceeds to the cutout process L2 for the next frame.

When the processes of Step S9201 to S9204 end for each frame of the video file 2000, a cutout moving image generating process ends. The display device control unit 801 can generate a cutout moving image acquired by cutting out the corrected area to include the subject 131 from each frame of the video file 2000.

According to Embodiment 10 described above, by using the correction amount of the correction frame of which the cutout area has been corrected by a user, the display device 800 corrects a cutout area of a non-operation frame that has not been corrected. Thus, a user can generate a cutout moving image in which the subject 131 enters the cutout area by performing simple and easy operations.

Embodiment 11

In Embodiment 10, a user seeks a frame in which the subject 131 is not included in the cutout area by operating the seek bar 885 and corrects a cutout area for a specific frame that has been retrieved. In contrast to this, in Embodiment 11, a user can correct a cutout area during reproduction of a moving image.

Referring to FIGS. 60A to 60E, a correction of a cutout area during reproduction will be described. In FIG. 60A, a user presses (touches) the reproduction/temporary stop button 884, thereby starting reproduction of a moving image. In addition, in consideration of operability at the time of correcting a cutout area, it is preferable that the moving image is reproduced at a speed less than a normal speed. As illustrated in a rectangle of a dashed line illustrated in FIG. 60B, in a case in which the cutout area frame 882 and the subject 131 deviate from each other, by touching the position of the subject 131, the user can move the cutout area frame 882 such that the subject 131 is present at the center.

As illustrated in FIG. 60C, while the user is continuously touching the subject 131, the display device control unit 801 corrects the position of the cutout area frame 882 such that the subject 131 is present at the center. When the user separates the fingers away from the touch panel (the display unit 803), the cutout area frame 882 is not corrected from the next frame and is displayed at the position of the original cutout area.

In addition, in a case in which the fingers being separated away from the touch panel have been detected, the display device control unit 801 may correct the cutout area after the next frame and display the cutout area frame 882 at the corrected position instead of returning the position of the cutout area to the original.

As illustrated in a rectangle of a dashed line illustrated in FIG. 60D, when the subject 131 moves and deviates from the cutout area frame 882 again, by user's touching the subject 131, the display device control unit 801 moves the cutout area frame 882 in accordance with the subject 131.

As illustrated in FIG. 60E, when the reproduction of a moving image ends, or when the user temporarily stops reproduction of the moving image, the display device control unit 801 corrects the cutout area for a frame in which the cutout area frame 882 has not been corrected. A frame of which the cutout area frame 882 has been corrected through a user's touch operation will be referred to as a correction frame. In a frame of which the cutout area frame 882 has not been corrected by the user will be referred to as non-operation frame. Similar to Embodiment 10, the display device control unit 801 can acquire a correction amount of the cutout area of a non-operation frame through interpolation on the basis of the correction amount of the correction frame.

When the user selects the generation button 887, the display device control unit 801 generates a cutout moving image on the basis of the position and the size of the cutout area set in each frame and the correction amount thereof. By interpolating the correction amount of the non-operation frame on the basis of the correction amount of the correction frame of which the cutout area frame 882 has corrected by the user, the display device control unit 801 can generate a smooth cutout moving image in which the subject 131 enters the inside of the video.

Figure 61A:
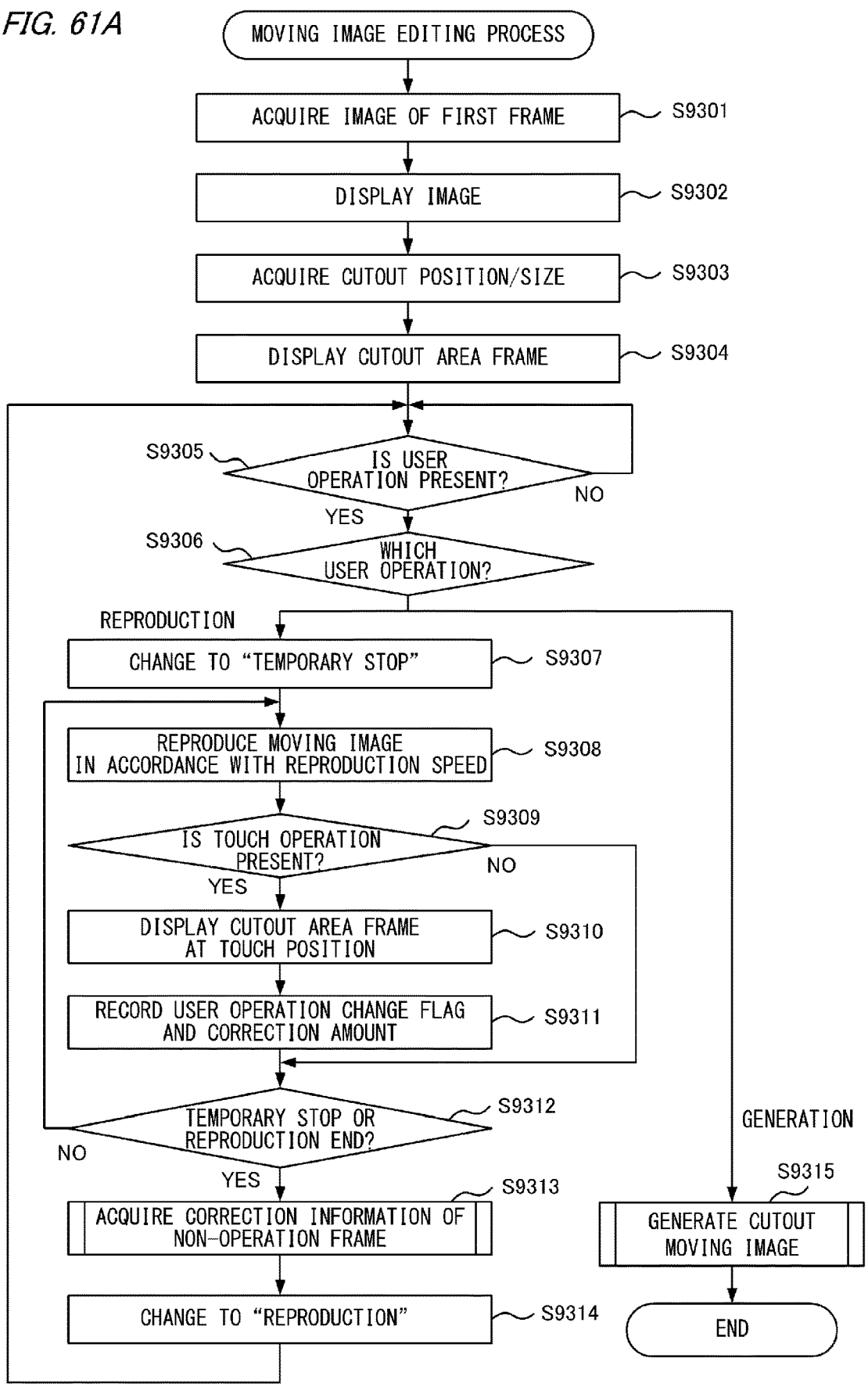
FIG. 61A is a flowchart of a moving image editing process according to Embodiment 11.
Figure 61B:
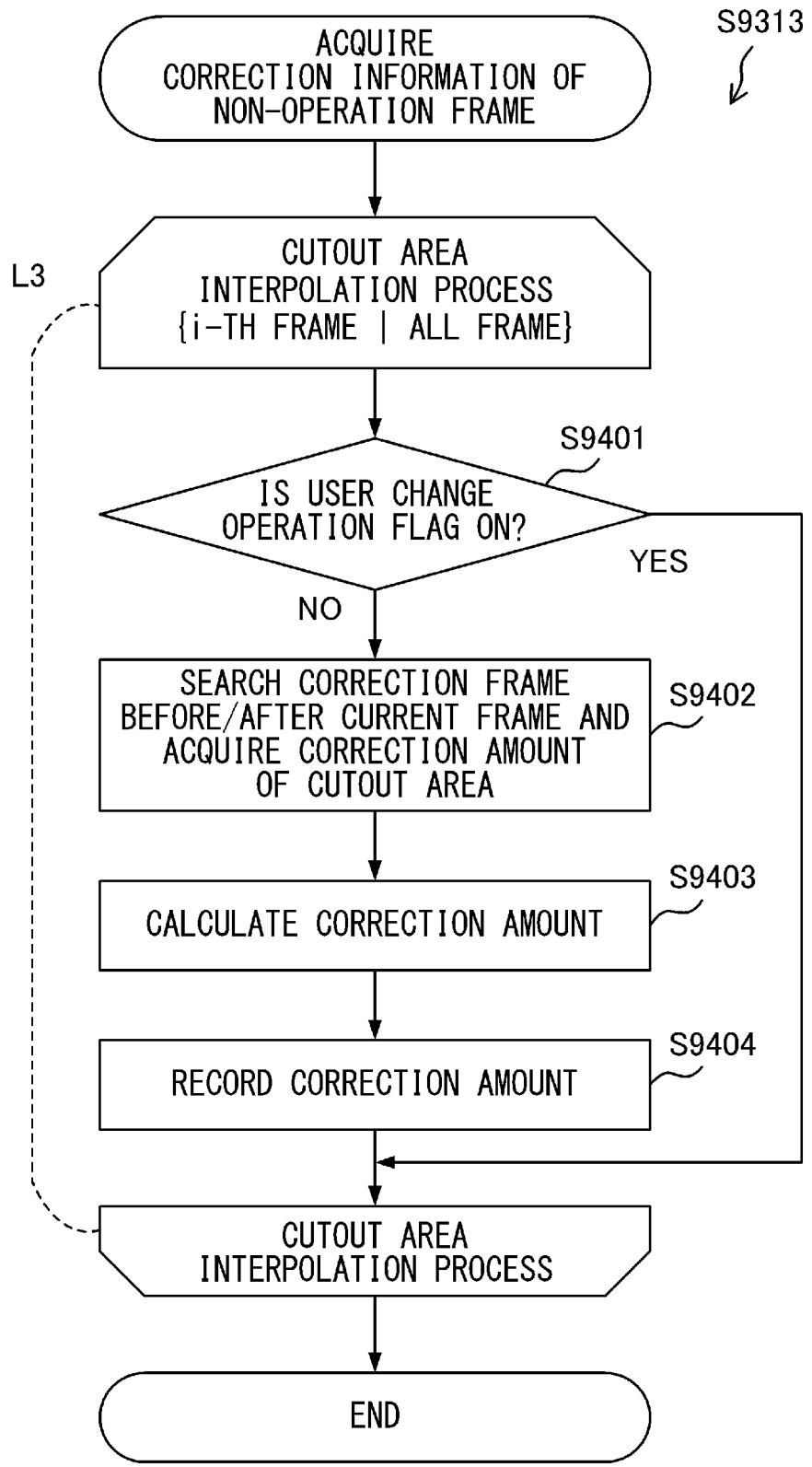
FIG. 61B is a flowchart of a correction information acquiring process for a non-operation frame.

Referring to FIGS. 61A and 61B, the flow of a moving image editing process using the display device 800 according to Embodiment 11 will be described. FIG. 61A is a flowchart of a moving image editing process of correcting a cutout area in the editing mode.

In Steps S9301 to S9304, similar to the processes of Steps S9001 to S9004 illustrated in FIG. 59A, the display device control unit 801 displays an image and a cutout area frame 882 of the first frame in the entire area moving image display unit 881.

In Step S9305, the display device control unit 801 waits for a user's operation. In a case in which it is determined that there is a user operation, the process proceeds to Step S9306. In Step S9306, the display device control unit 801 determines whether a user's operation is a reproduction operation according to selection of the reproduction/temporary stop button 884 or a cutout moving image generating operation according to selection of the generation button 887.

In Step S9306, in a case in which it is determined that the user operation is an operation of reproducing a moving image according to selection of the reproduction/temporary stop button 884, the process proceeds to Step S9307. In Steps S9307 and S9308, similar to Steps S9007 and S9008 illustrated in FIG. 59A, the display device control unit 801 starts reproduction of a moving image.

In Embodiment 11, different from Embodiment 10, the display device control unit 801 accepts an operation of correcting the cutout area at the time of reproducing a moving image. In Step S9309, the display device control unit 801, for example, determines whether or not there has been a user's touch operation as an operation of correcting the cutout area frame 882. In a case in which it is determined that there has been a touch operation, processes of Step S9310 and S9311 are performed. On the other hand, in a case in which it is determined that there has not been a touch operation, the process proceeds to Step S9312.

In Step S9310, the display device control unit 801 moves the cutout area frame 882 to a position touched by the user. For example, the display device control unit 801 moves the cutout area frame 882 such that the position of the subject 131 touched by the user is the center. In addition, the operation of correcting the cutout area frame 882 is not limited to an operation of touching the position of the subject 131 and may be an operation of touching a part of the cutout area frame 882 or the inside of the cutout area frame 882 and dragging it to a desired position.

In addition, in Steps S9309 and S9310, although an example in which a user's touch operation is detected, and the cutout area frame 882 is moved to the touched position has been illustrated, a correction of the cutout area frame 882 is not limited to the movement of the position. The display device control unit 801 may detect a user's operation of pinch-in or pinch-out in Step S9309 and display the cutout area frame 882 with being enlarged or reduced in accordance with the operation of pinch-in or pinch-out in Step S9310.

In Step S9311, the display device control unit 801 records a cutout position correction amount or a cutout size correction amount of the frame metadata of the video file 2000. In a case in which the position of the cutout area frame 882 is changed in Step S9309, the display device control unit 801 records a difference between the cutout position of the frame metadata and the position of the cutout area frame 882 that is currently being displayed as a cutout position correction amount. In addition, in a case in which the size of the cutout area frame 882 is changed in Step S9309, the display device control unit 801 records a difference between the cutout size of the frame metadata and the size of the cutout area frame 882 that is currently being displayed as a cutout size correction amount. Furthermore, the display device control unit 801 also changes the user operation change flag to on.

In Step S9312, similar to Step S9009 illustrated in FIG. 59A, the display device control unit 801 determines whether reproduction of the moving image has been temporarily stopped or whether reproduction has ended. In a case in which neither temporary stop nor reproduction end is determined, the process returns to Step S9308, and reproduction of the moving image continues.

In Step S9312, in a case in which it is determined that the reproduction of the moving image has been temporarily stopped or reproduction has ended, the process proceeds to Step S9313. In Step S9313, the display device control unit 801 acquires correction information of the cutout area of non-operation frames before/after the correction frame. The correction information includes a cutout position correction amount and a cutout size correction amount of the frame metadata.

Referring to FIG. 61B, a correction information acquiring process of non-operation frames will be described. FIG. 61B illustrates a detailed process of Step S9313. In the correction information acquiring process of non-operation frames, the display device control unit 801 performs the cutout area interpolation process L3 of Steps S9401 to S9404 for all the frames of the video file 2000. In Steps S9401 to S9404, a frame that is a processing target of the cutout area interpolation process L3 will be referred to as an i-th frame.

In Step S9401, the display device control unit 801 determines whether or not the user change operation flag of the i-th frame is on. In a case in which it is determined that the user change operation flag is on, the process proceeds to the cutout area interpolation process L3 for the next frame. In a case in which it is determined that the user change operation flag is off, the process proceeds to Step S9402.

In Step S9402, the display device control unit 801 seeks frames, of which the user change operation flag is on, before/after the i-th frame. Similar to Step S9101 illustrated in FIG. 59B, a frame, of which the user change operation flag is on, before the i-th frame will be referred to as an Na-th frame, and a frame, of which the user change operation flag is on, after the i-th frame will be referred to as an Nb-th frame (Na<Nb). The display device control unit 801 acquires cutout position correction amounts and cutout size correction amounts of the retrieved Na-th frame and the Nb-th frame.

In addition, the display device control unit 801 may respectively set a frame that is a predetermined number of frames before the i-th frame and a frame that is a predetermined number of frames after the i-th frame as an Na-th frame and an Nb-th frame instead of seeking frames, of which the user change operation flag is on, before/after the i-th frame. For example, the display device control unit 801 may correct cutout areas of non-operation frames with the (i−50)-th frame set as the Na-th frame and the (i+50)-th frame set as the Nb-th frame without using the user change operation flag.

The predetermined number before/after the i-th frame is not limited to 50 and may be appropriately determined on the basis of a total number of frames of a moving image and the like. The predetermined numbers before and after the i-th frame may be different from each other. By changing the predetermined number, the display device control unit 801 can adjust the load of the interpolation process.

In Step S9403, the display device control unit 801, similar to Step S9103 illustrated in FIG. 59B, calculates a correction amount of the cutout area of the i-th frame. The correction amount includes a cutout position correction amount and a cutout size correction amount.

In Step S9404, the display device control unit 801, similar to Step S9104 illustrated in FIG. 59B, records the correction amount calculated in Step S9403 as frame metadata of the i-th frame of the video file 2000. When the display device control unit 801 records the correction amount of the i-th frame in the video file 2000, the process proceeds to the cutout area interpolation process L3 for the next frame.

In accordance with the process illustrated in FIG. 61B, correction information of the cutout area is set in each frame of the video file 2000. The process illustrated in FIG. 61B, that is, the process of Step S9313 illustrated in FIG. 61A ends, the process proceeds to Step S9314 illustrated in FIG. 61A.

In Step S9314, the display device control unit 801 changes the display of the reproduction/temporary stop button 884 to a display representing "reproduction". The display device control unit 801 returns to Step S9305 and waits for an operation from the user.

In Step S9306, in a case in which it is determined that the user operation is an operation of generating a cutout moving image through selection of the generation button 887, the process proceeds to Step S9315. In Step S9315, similar to Step S9016 illustrated in FIG. 59A, the process illustrated in FIG. 59C is performed, and a cutout moving image is generated.

According to Embodiment 11, the display device 800 accepts an operation of correcting a cutout area from a user during reproduction of a moving image and corrects a cutout area of a non-operation frame using the correction amount of the cutout area corrected by the user. Thus, the user can generate a cutout moving image in which the subject 131 enters the cutout area by performing a simple and easy operation while reproducing the moving image.

In addition, although Embodiment 10 and Embodiment 11 have been described as different embodiments, both the embodiments may be combined. In addition, in Embodiment 10 and Embodiment 11, although a change of the position of the cutout area has been described mainly, the process for the position of the cutout area may be similarly applied also to the size of the cutout area in this way. The correction of the cutout area frame 882 is not limited to the movement of the position through a drag operation or a touch operation and may be a change of the size such as enlargement/reduction according to a pinch-in/pinch-out operation.

For a change of the size of the cutout area, similar to calculation of the correction amount of the cutout position described in S9103 illustrated in FIG. 59B and S9403 illustrated in FIG. 61B, the display device 800 may calculate a correction amount of the cutout size of the non-operation frame by performing an interpolation process. In accordance with this, the display device 800 can correct not only the position of the cutout area but also the size (angle of view) of the cutout area for the non-operation frame.

In addition, in Embodiment 10 and Embodiment 11, although a correction of a cutout area of an image has been described, also for voices, the display device 800 may change a balance between voices recorded by the left microphone 19L and the right microphone 19R in accordance with a correction of the cutout area. The display device 800 receives a video file 2000 (moving image data) including voice data collected using a plurality of microphones included in the camera main body 1 and can change a balance of voice data collected by a plurality of microphones in accordance with a correction of the position and the size of the cutout area. The balance of voice data, for example, can be determined on the basis of a ratio of distances between the center of the cutout area and left and right sides of the entire area image.

As above, while the preferred embodiments of the present disclosure have been described, the present disclosure is not limited to such embodiments, and various modifications and changes can be made within the range of the concept thereof.

According to the present disclosure, a cutout moving image cut out at a desired position can be generated using simple and easy operations.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-049063, filed on Mar. 24, 2022, which is hereby incorporated by reference herein in its entirety.

What is claimed is:

1. A display device comprising at least one memory and at least one processor which function as:
   an acquisition unit configured to acquire moving image data acquired by adding information of a cutout area of a moving image set on the basis of a face direction of a user capturing the moving image to the moving image;
   a display control unit configured to display a frame representing the cutout area when the moving image data is reproduced;
   an acceptance unit configured to accept an operation for the frame for correcting the cutout area;
   a correction unit configured to add correction information of the cutout area corrected by the operation to the moving image data; and
   a generation unit configured to generate a cutout moving image from the moving image on the basis of the information of the cutout area and the correction information.

2. The display device according to claim 1, wherein the generation unit generates the cutout moving image by correcting the cutout area of a non-operation frame that is a frame not accepting the operation using the correction information for a correction frame that is a frame that has accepted the operation.

3. The display device according to claim 2, wherein the generation unit corrects the cutout area of the non-operation frame by interpolating between the correction information for a first correction frame that is a frame placed before the non-operation frame among the correction frames and the correction information for a second correction frame that is a frame placed after the non-operation frame among the correction frames.

4. The display device according to claim 3, wherein the first correction frame is a first frame of the moving image or a first frame of a scene in which the non-operation frame is included among a plurality of scenes included in the moving image.

5. The display device according to claim 3, wherein the second correction frame is a last frame of the moving image or a last frame of a scene in which the non-operation frame is included among a plurality of scenes included in the moving image.

6. The display device according to claim 2, wherein the generation unit corrects the cutout area of the non-operation frame by interpolating the correction information for a frame that is a predetermined first number of frames before the non-operation frame and the correction information for a frame that is a predetermined second number of frames after the non-operation frame.

7. The display device according to claim 3, wherein the generation unit corrects the cutout area of the non-operation frame using at least one method among linear interpolation, cubic function interpolation according to ease-in and ease-out, and multi-point interpolation.

8. The display device according to claim 1, wherein the correction of the cutout area includes a change of at least one of a position and a size of the cutout area.

9. The display device according to claim 1, wherein the correction information includes at least one of a user change operation flag representing whether or not the cutout area has been corrected by a user operation, a cutout position correction amount that is an amount of correction of a position of the cutout area corrected by the user operation, and a cutout size correction amount that is an amount of correction of a size of the cutout area corrected by the user operation.

10. The display device according to claim 1, wherein the operation is an operation of dragging the frame to a movement destination of the cutout area.

11. The display device according to claim 1, wherein the operation is an operation of tapping a movement destination of the cutout area or a subject that is an imaging target.

12. The display device according to claim 1, wherein the operation is an operation of pinching in or pinching out of the frame.

13. The display device according to claim 1, wherein the operation is an operation of touching a movement destination of the frame or a subject that is an imaging target during reproduction of the moving image.

14. The display device according to claim 1, wherein the operation is an operation of pinching in or pinching out of the frame during reproduction of the moving image.

15. The display device according to claim 13, wherein the moving image is reproduced at a speed that is lower than a normal speed.

16. The display device according to claim 1,
   wherein the moving image data includes voice data collected by a plurality of microphones when the moving image is captured, and
   the generation unit changes a balance of the voice data collected by the plurality of microphones in accordance with the correction of the cutout area.

17. A method for controlling a display device comprising:
   acquiring moving image data acquired by adding information of a cutout area of a moving image set on the basis of a face direction of a user capturing the moving image to the moving image;
   displaying a frame representing the cutout area when the moving image data is reproduced;
   accepting an operation for the frame for correcting the cutout area;
   adding correction information of the cutout area corrected by the operation to the moving image data; and
   generating a cutout moving image from the moving image on the basis of the information of the cutout area and the correction information.

18. A non-transitory computer-readable storage medium storing a program for causing a computer to execute a control method of a display device, the control method comprising:
   acquiring moving image data acquired by adding information of a cutout area of a moving image set on the basis of a face direction of a user capturing the moving image to the moving image;
   displaying a frame representing the cutout area when the moving image data is reproduced;
   accepting an operation for the frame for correcting the cutout area;
   adding correction information of the cutout area corrected by the operation to the moving image data; and generating a cutout moving image from the moving image on the basis of the information of the cutout area and the correction information.

* * * * *